United States Patent [19]

Gilbert et al.

[11] Patent Number: 4,495,568
[45] Date of Patent: Jan. 22, 1985

[54] APPARATUS FOR THE CONTROL AND MONITORING OF POWER SUPPLY SOURCES FOR DATA PROCESSING SYSTEMS

[75] Inventors: Takats Gilbert, Le Mesnil Saint Denis; Dumay Gérald, Fontenay le Fleury, both of France

[73] Assignee: Compagnie Internationale pour l'Informatique Cii-Honeywell Bull (Societe Anonyme), Paris, France

[21] Appl. No.: 333,796

[22] Filed: Dec. 23, 1981

[30] Foreign Application Priority Data

Dec. 30, 1980 [FR] France .............................. 80 27770

[51] Int. Cl.³ .......................................... G06F 11/30
[52] U.S. Cl. .................................................. 364/200
[58] Field of Search .............................. 371/4, 16, 66; 364/200 MS File, 900 MS File

[56] References Cited

U.S. PATENT DOCUMENTS

| | | | |
|---|---|---|---|
| 4,016,408 | 4/1977 | Koetzle | 371/4 |
| 4,162,526 | 7/1979 | Gass | 364/200 |
| 4,204,249 | 5/1980 | Dye | 364/200 |
| 4,228,496 | 10/1980 | Katzman et al. | 364/200 |
| 4,233,666 | 11/1980 | Walberg | 364/900 |

OTHER PUBLICATIONS

*IBM Technical Disclosure Bulletin*, vol. 23, No. 7A, Dec. 1980, Anderson et al.: "Data Processing System Power Controller", pp. 2651-2652.
*IBM Technical Disclosure Bulletin*, vol. 22, No. 7, Dec. 1979, Gottshall et al.: "Method to Ensure Validity of the "Pick Backside Contact Switch", pp. 2844-2845.

*Primary Examiner*—Thomas M. Heckler
*Attorney, Agent, or Firm*—Kerkam, Stowell, Kondracki & Clarke

[57] ABSTRACT

Apparatus is disclosed for controlling and monitoring a modular power supply system for supplying power to a data processing system and the like that includes a plurality of power sources allocated among a plurality of power supply subsystems in a predetermined configuration. Each subsystem is interfaced to the control bus of a control unit that includes a microprocessor by an addressable interface unit that controls the power sources in response to control signals from the control unit and that monitors the power sources and the devices powered by such sources and supplies monitor signals to the control unit. Also interfaced to the control bus are an operator's console, a service panel for monitoring and controlling the system for maintenance purposes, a primary power supply that supplies power to the power sources via a separate power bus, and a configuration definition unit comprising a read only memory that stores data defining the system configuration and the parameters of the power sources for use by the control unit. Faults are detected and detail fault information is displayed on the service panel. Because of its modular nature, the system may be readily reconfigured by simply changing modules and the data stored in the configuration definition unit.

28 Claims, 75 Drawing Figures

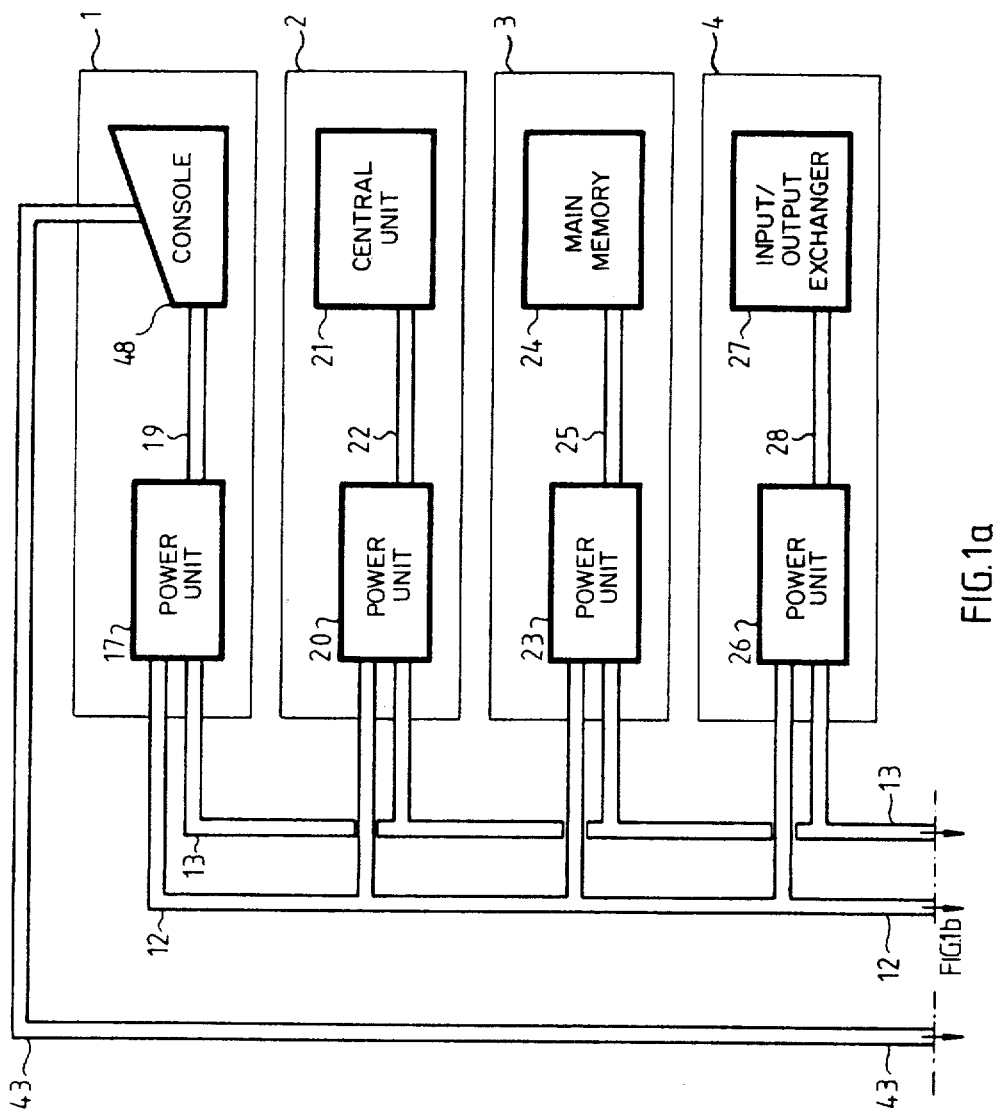

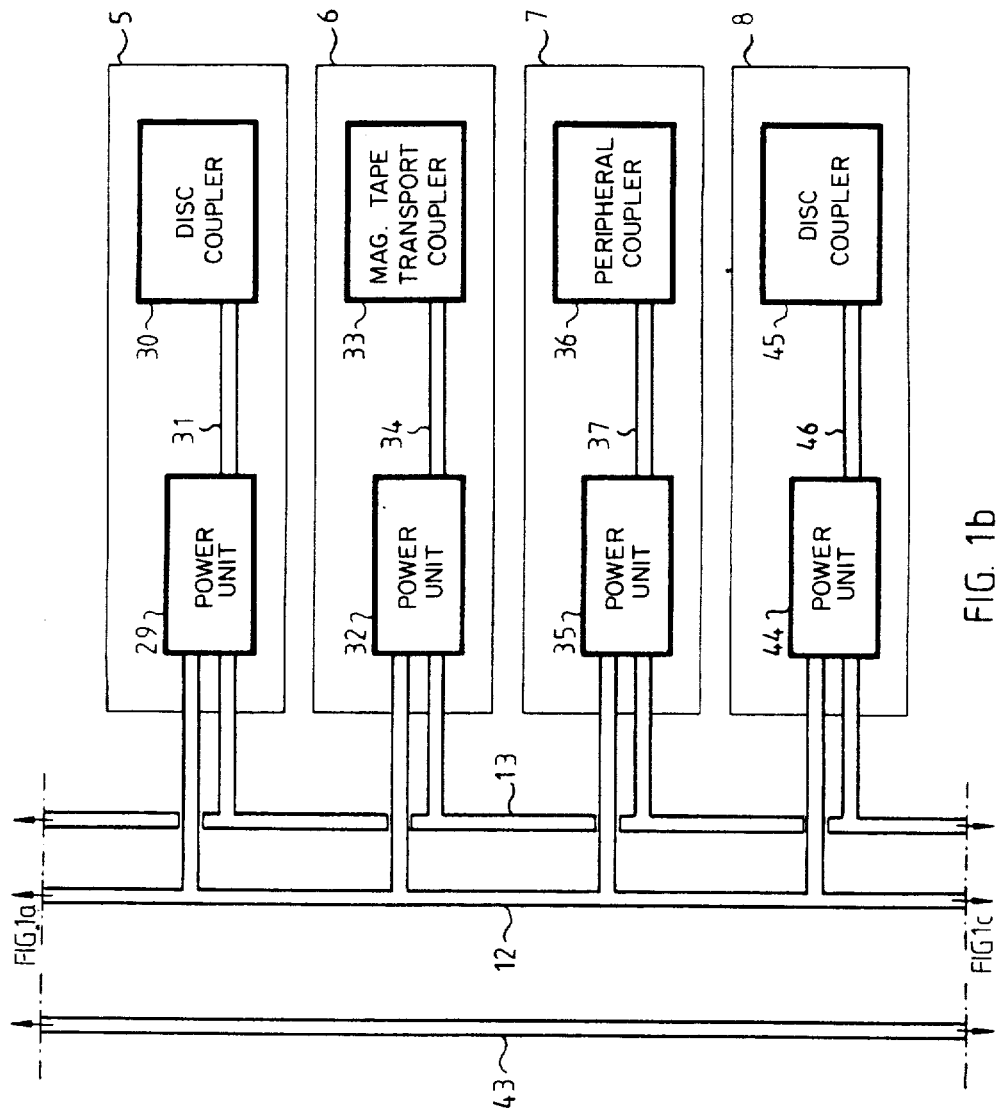

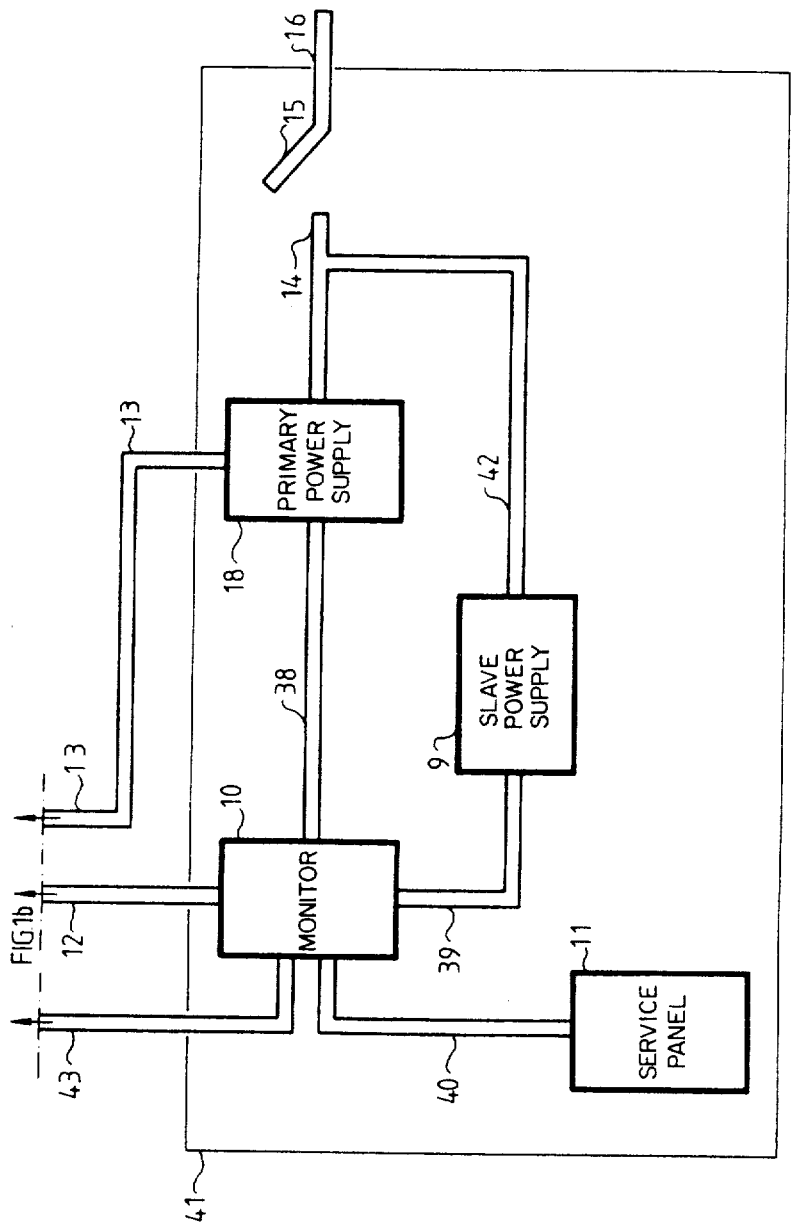

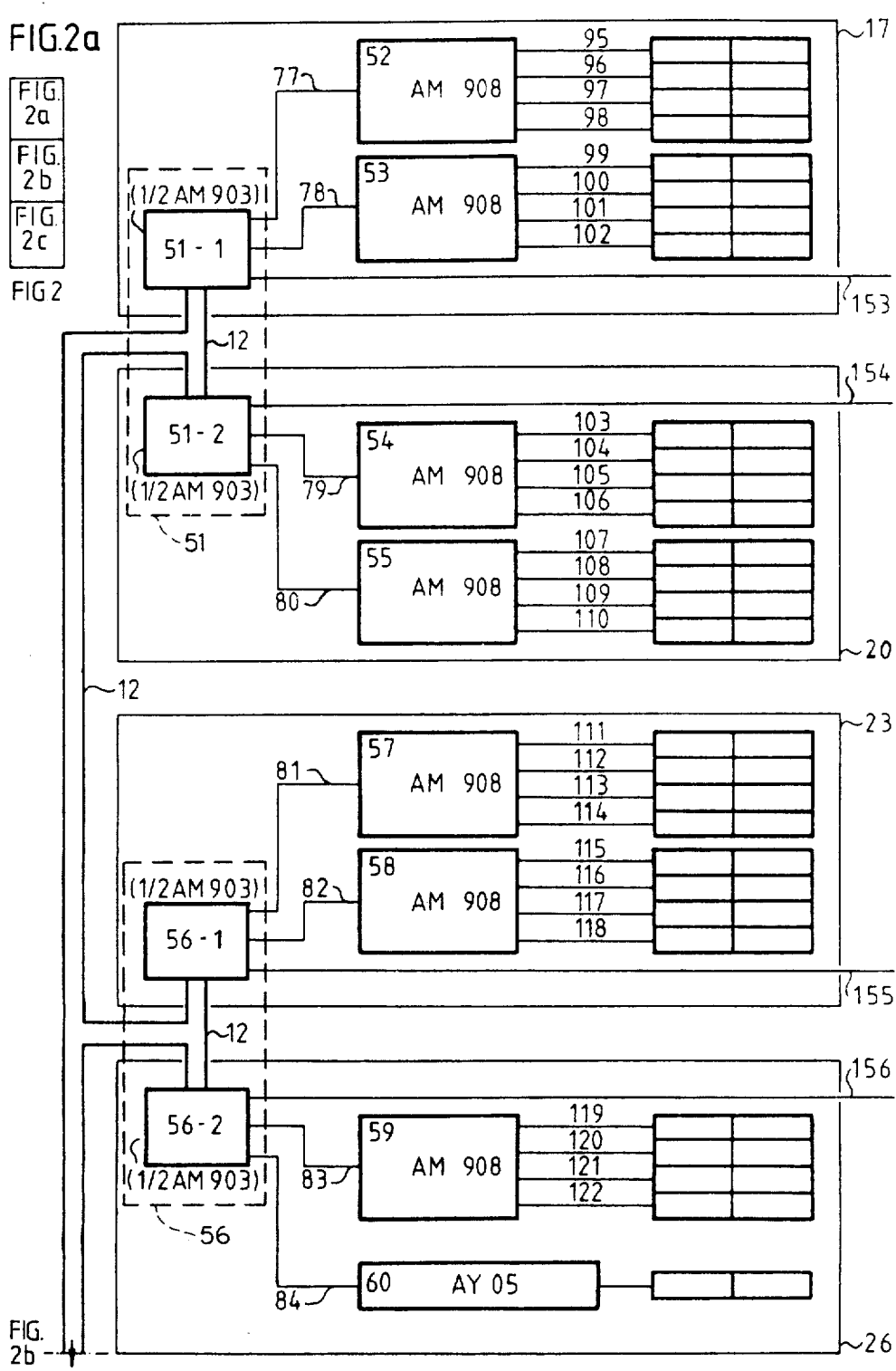

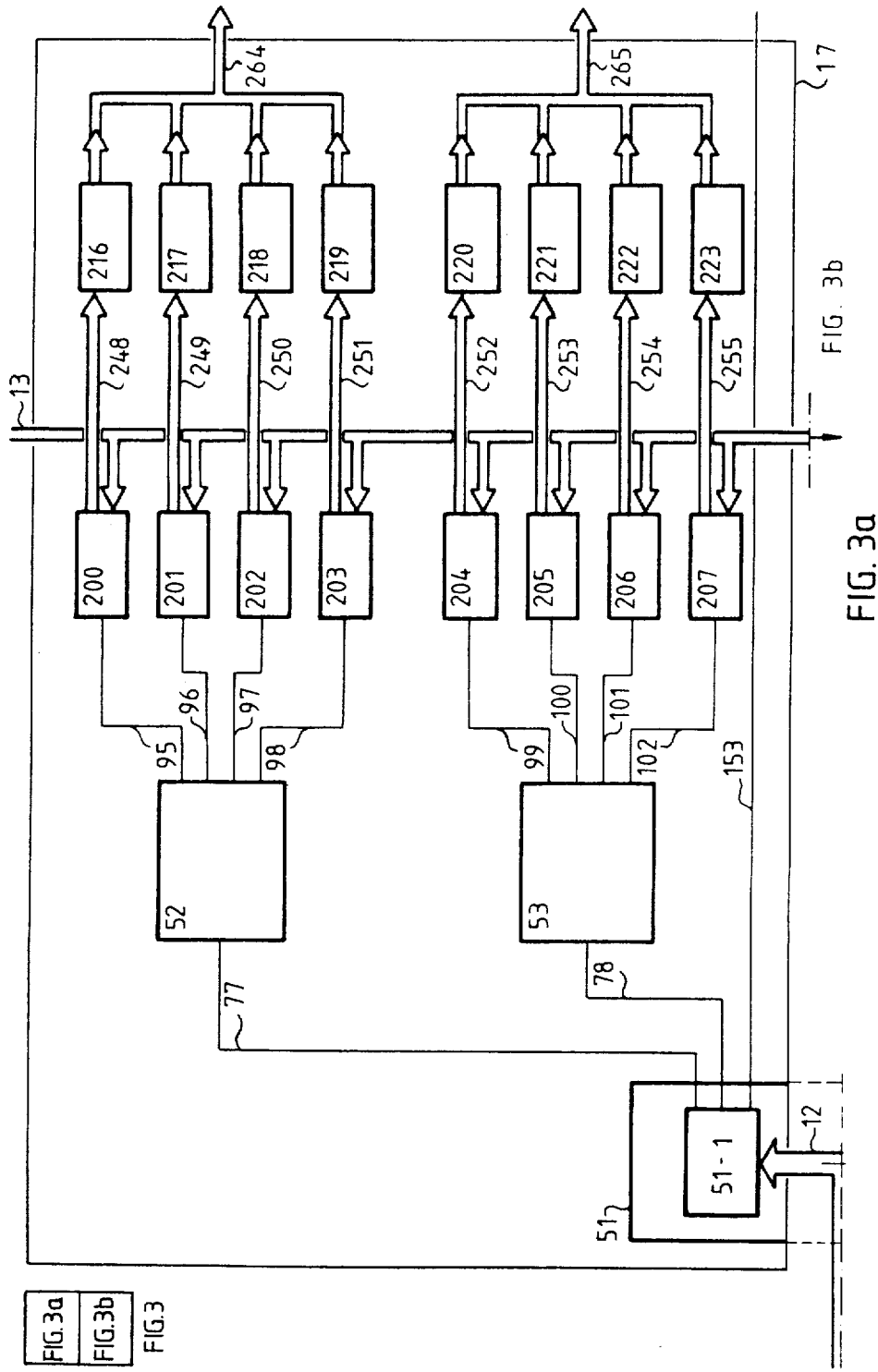

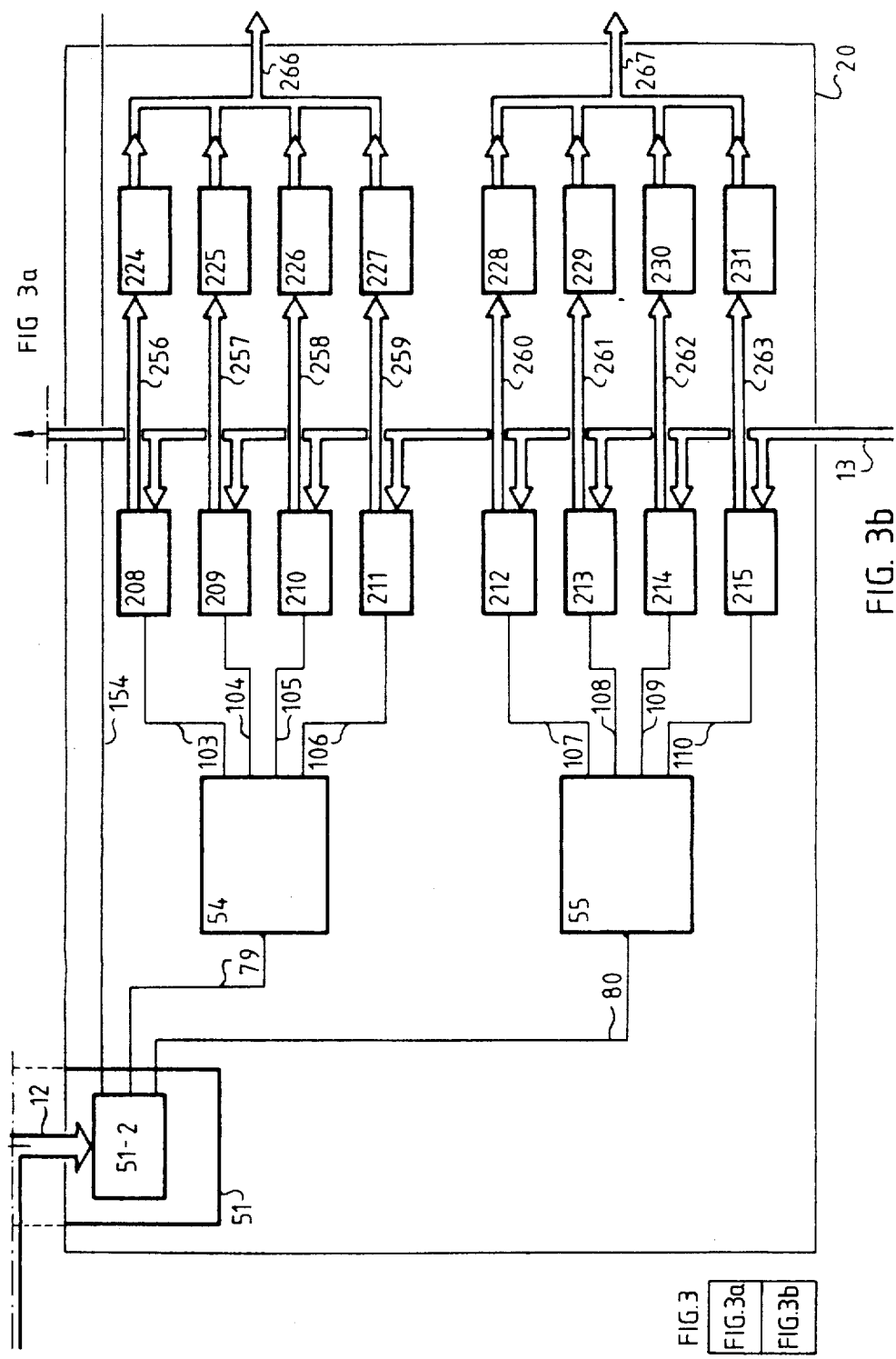

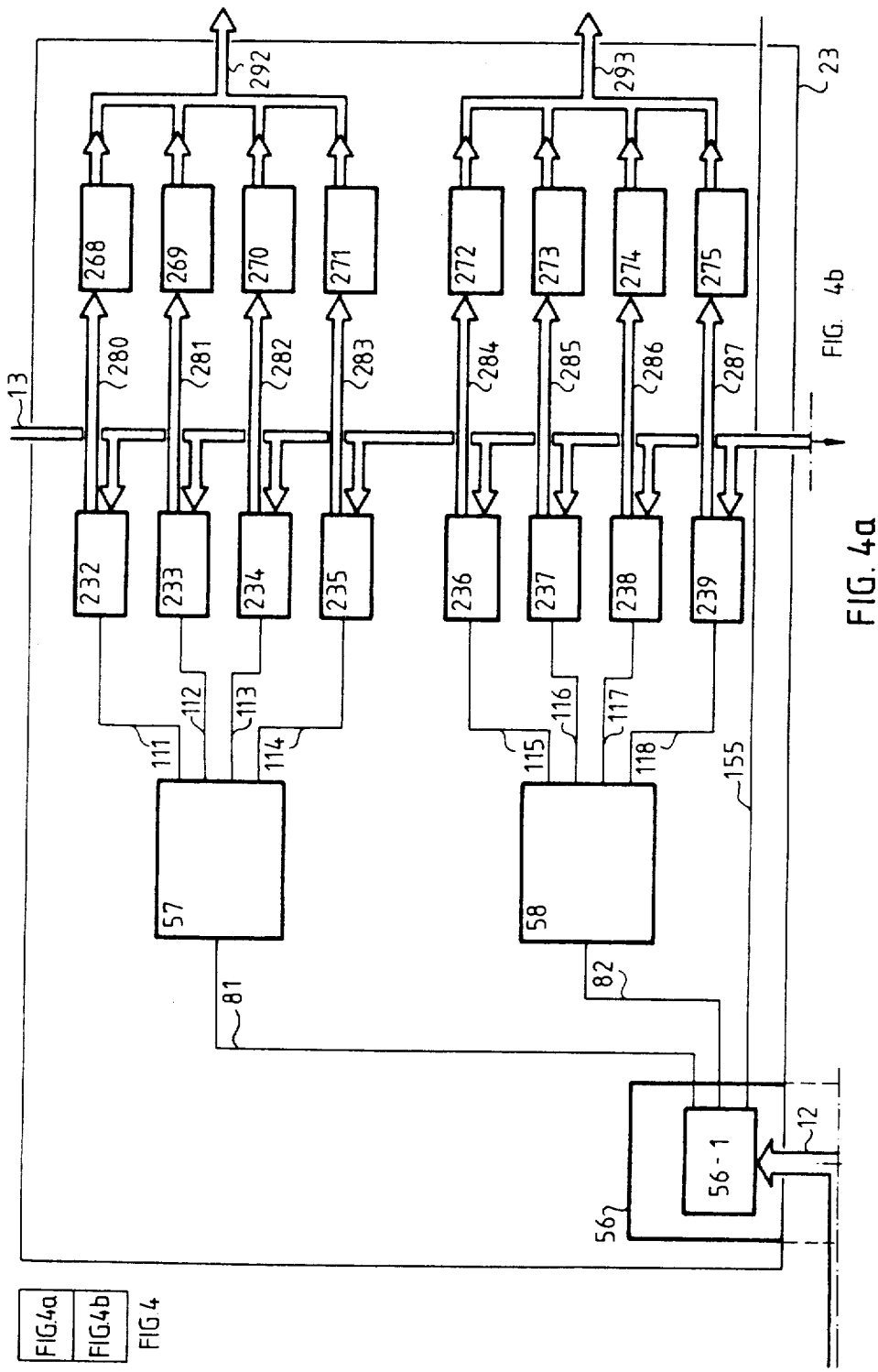

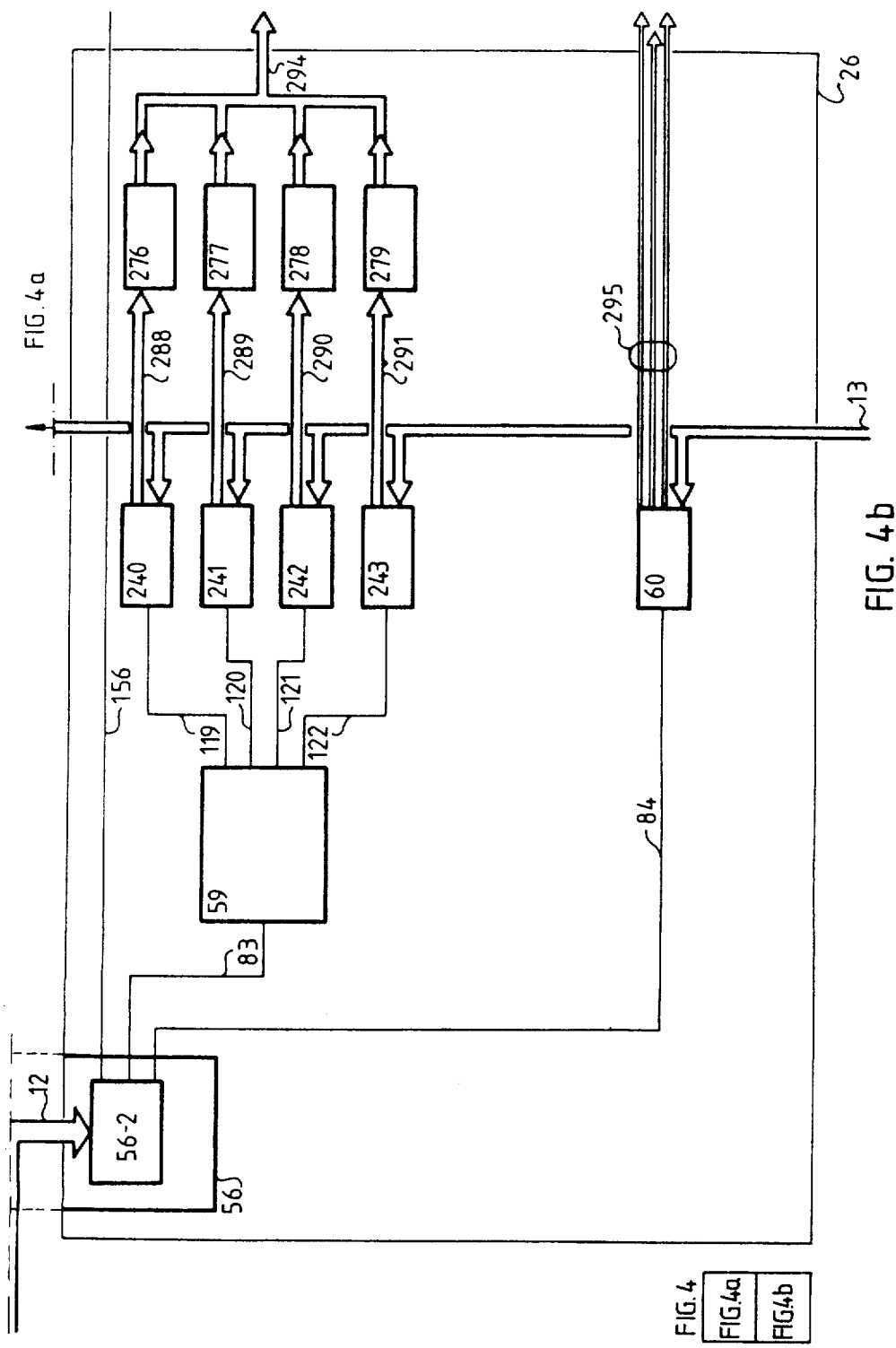

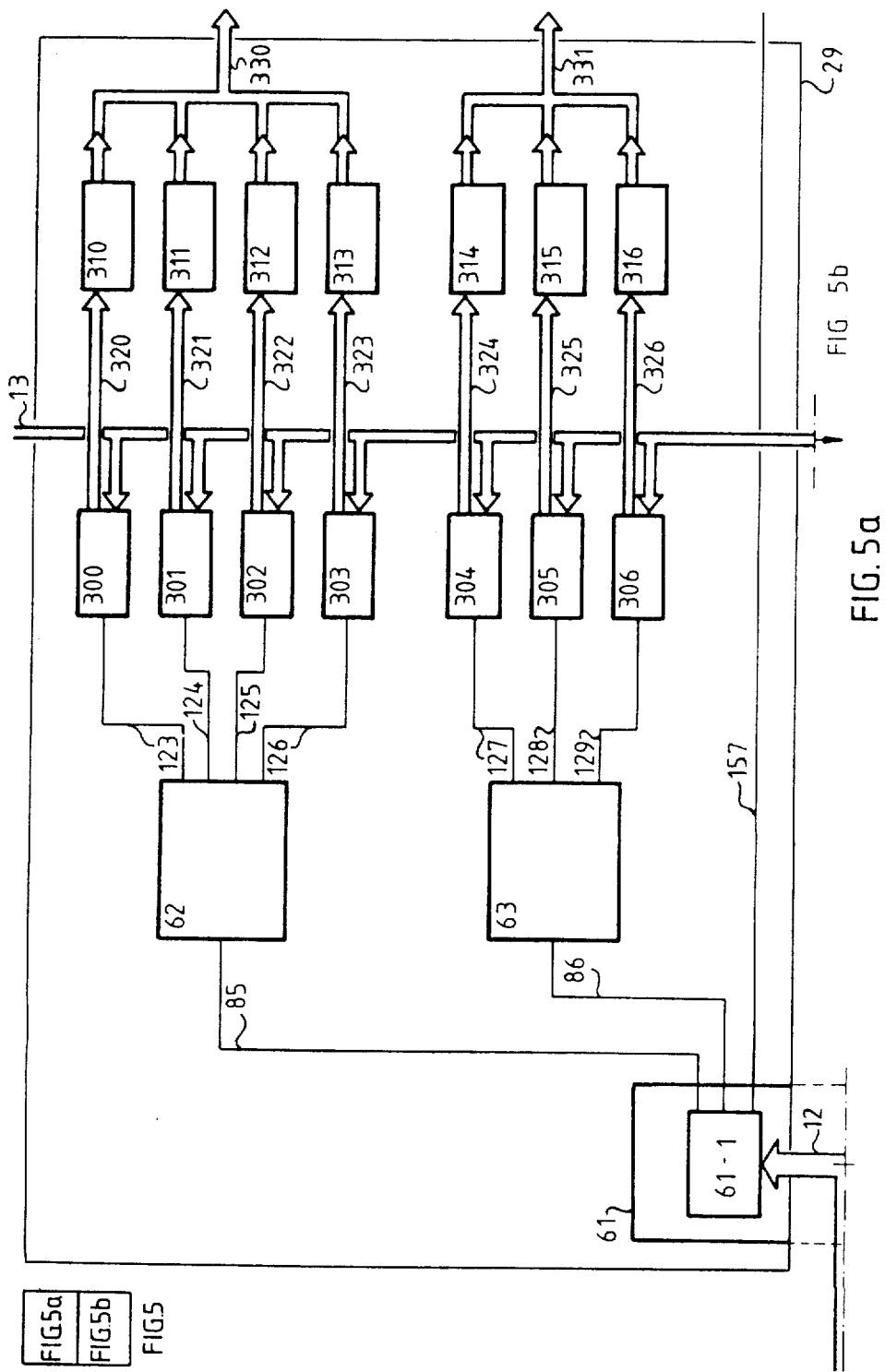

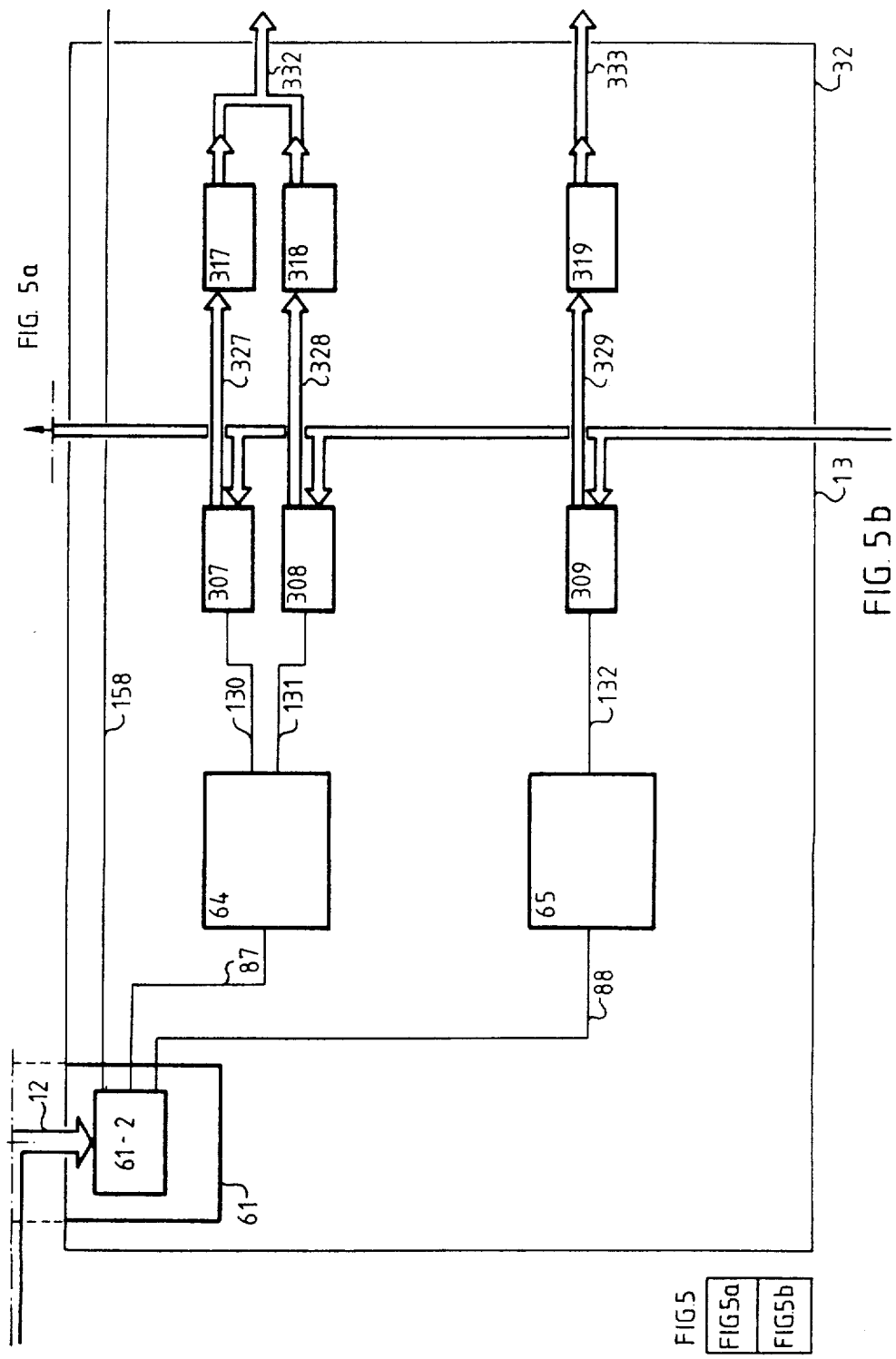

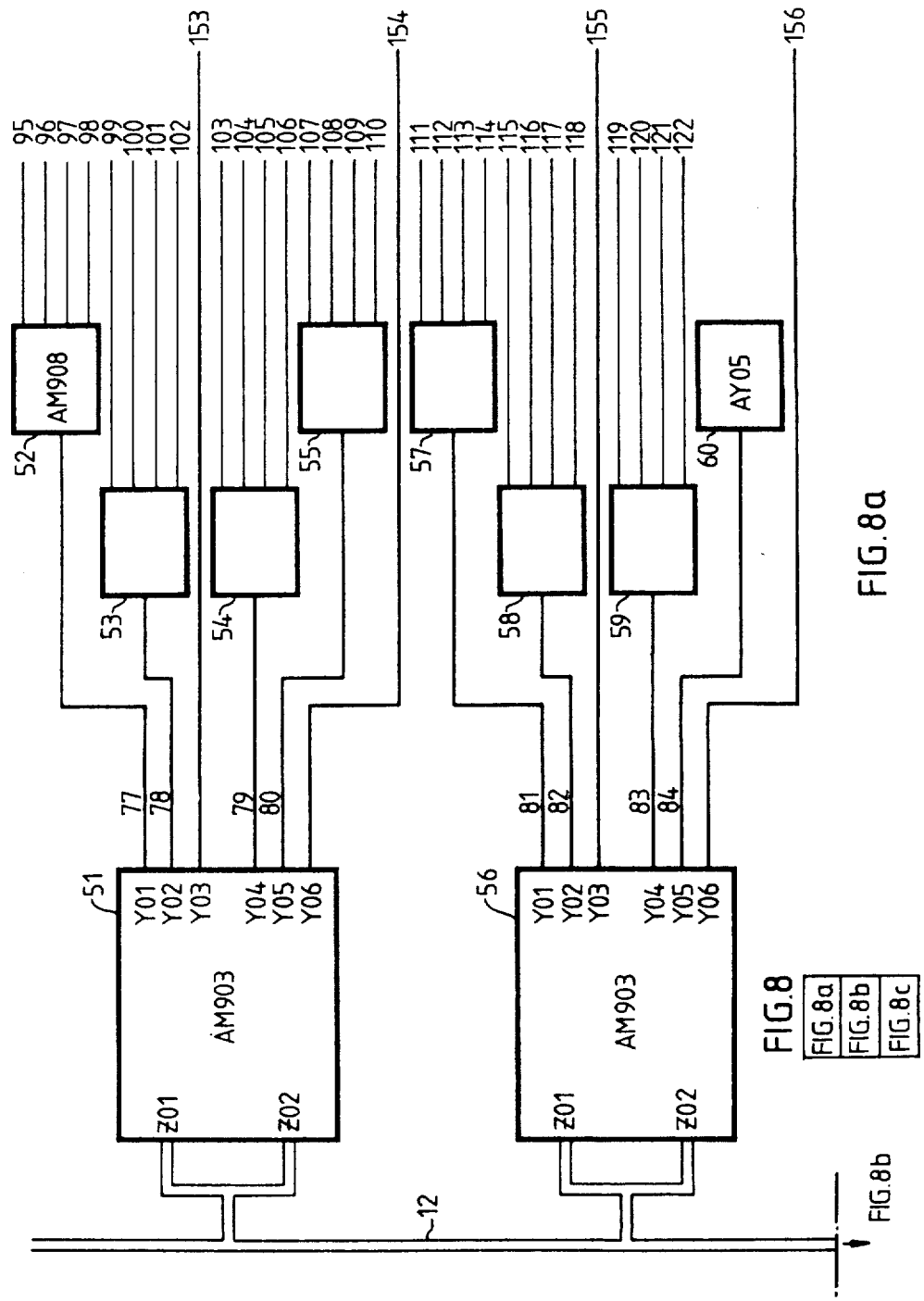

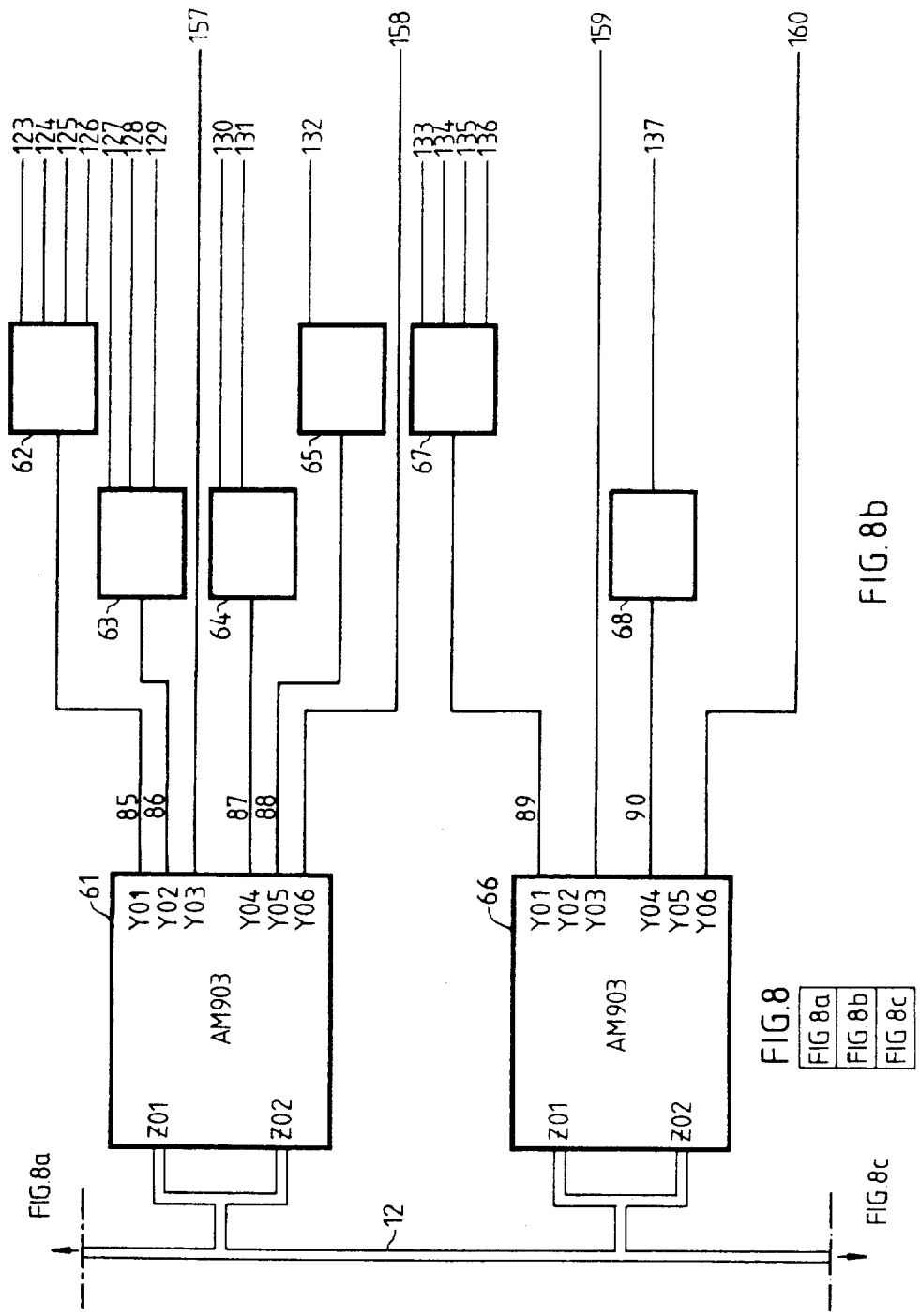

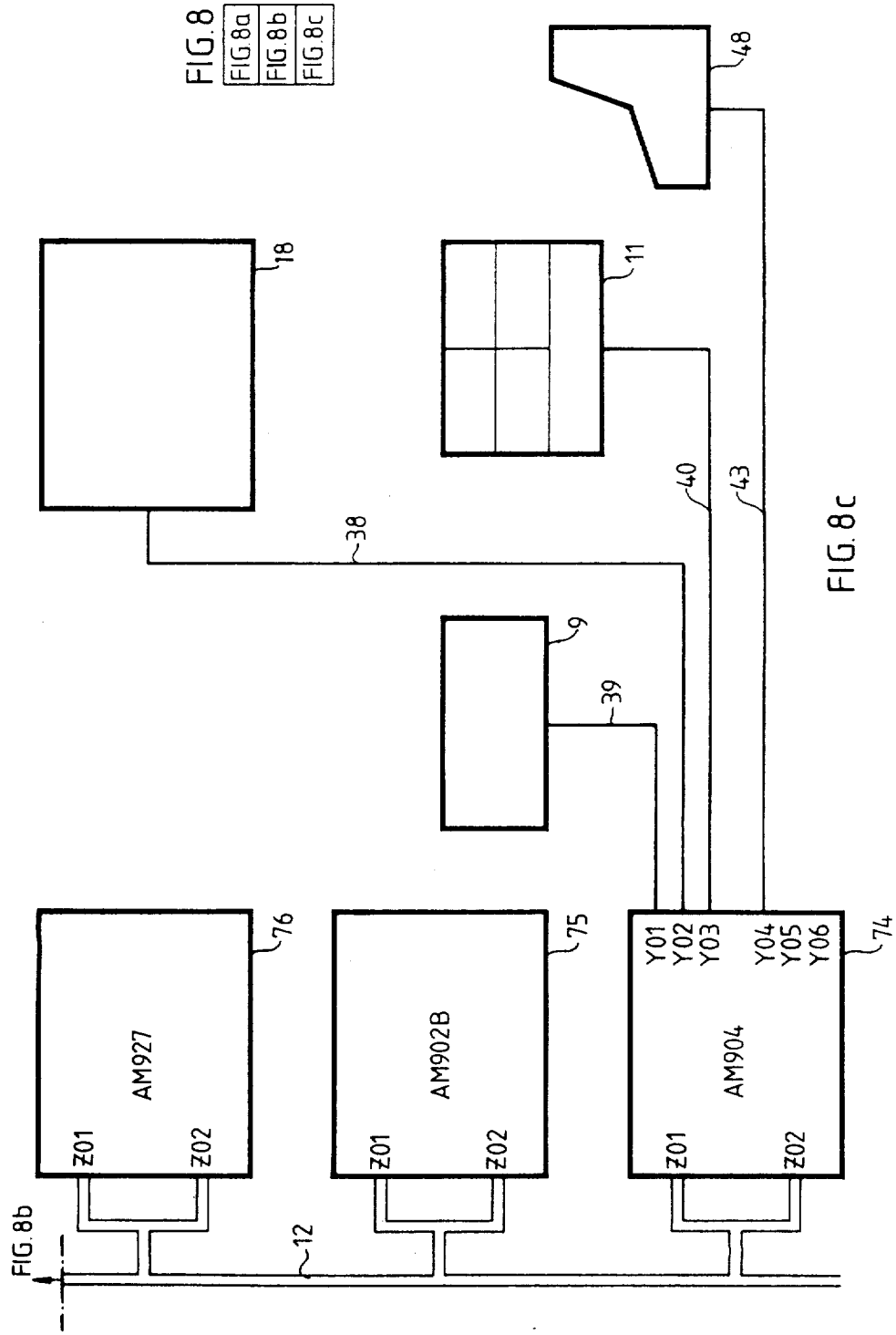

| | SERVICE PANEL (11) REFERENCE | | AM 904 (74) REFERENCE | | | | |
|---|---|---|---|---|---|---|---|
| FUNCTION | FIG.9 REF. | SYSTEM NAME | CONNECT. | PIN # | INTERNAL NAME | NAME | FIGURES |
| SUBSYSTEM STATUS (160) | | | | | | | |
| VISUALISATION | 160-0 | ETAT S/S 0 | Y06 | 15 | POUT 13 | | 14,24 |
| " | 160-1 | ETAT S/S 1 | Y06 | 14 | POUT 12 | | |
| " | 160-2 | ETAT S/S 2 | Y06 | 13 | POUT 11 | | |
| " | 160-3 | ETAT S/S 3 | Y06 | 11 | POUT 10 | | |
| " | 160-4 | ETAT S/S 4 | Y06 | 06 | POUT 03 | | |
| " | 160-5 | ETAT S/S 5 | Y06 | 05 | POUT 02 | | |
| " | 160-6 | ETAT S/S 6 | Y06 | 04 | POUT 01 | | |
| " | 160-7 | ETAT S/S 7 | Y06 | 03 | POUT 00 | | |
| GENERAL COMMANDS (161) | | | | | | | |
| SIGNAL LIGHT | 161-1 | MONITOR | Y06 | 01 | POUT 30 | MONITOR | 14,24 |
| " | 161-2 | ON | Y06 | 08 | POUT 05 | ØN | |
| " | 161-3 | OFF | Y06 | 07 | POUT 04 | ØFF | |
| PUSH BUTTON | 161-4 | ON | Y05 | 03 | PIN 01 | GEN.ØN | 14,19 |
| " | 161-5 | OFF | Y05 | 01 | PIN 00 | GEN.ØFF | |
| SUBSYSTEM COMMANDS (162) | | | | | | | |
| INVERTER/SWITCH | 162-0 | KEY 0 | Y05 | 24 | PIN 17 | | 14,20 |
| " | 162-1 | KEY 1 | Y05 | 20 | PIN 16 | | |
| " | 162-2 | KEY 2 | Y05 | 18 | PIN 15 | | |
| " | 162-3 | KEY 3 | Y06 | 18 | PIN 14 | | |
| " | 162-4 | KEY 4 | Y05 | 11 | PIN 13 | | |
| " | 162-5 | KEY 5 | Y05 | 07 | PIN 12 | | |
| " | 162-6 | KEY 6 | Y05 | 21 | PIN 11 | | |
| " | 162-7 | KEY 7 | Y06 | 22 | PIN 10 | | |

FIG. 26 (CONTINUATION)

| AM 904 | SERVICE PANEL (11) REFERENCE | | | AM 904 (74) REFERENCE | | | |
|---|---|---|---|---|---|---|---|
| FUNCTION | FIG.9 REF | SYSTEM NAME | CONNECT. | PIN # | INTERNAL NAME | NAME | FIGURES |
| STATUS INTERNAL BYTES (163) | | | | | | | |
| VISUALISATION | 163- 0 | VISU 0 | Y06 | 17 | POUT 15 | | |
| " | 163- 1 | VISU 1 | Y06 | 16 | POUT 14 | | |
| " | 163- 2 | VISU 2 | Y06 | 24 | POUT 25 | | |
| " | 163- 3 | VISU 3 | Y06 | 23 | POUT 24 | | |
| " | 163- 4 | VISU 4 | Y06 | 22 | POUT 23 | | |
| " | 163- 5 | VISU 5 | Y06 | 21 | POUT 22 | | 14, 24 |
| " | 163- 6 | VISU 6 | Y06 | 20 | POUT 21 | | |
| " | 163- 7 | VISU 7 | Y06 | 19 | POUT 20 | | |
| PRESS BOUTON | 163- 8 | INITIALISATION | Y05 | 05 | PIN 02 | | |
| " | 163- 9 | EXPLORATION | Y05 | 19 | PIN 07 | | 14, 19 |
| MAINTENANCE (164) | | | | | | | |
| KEY | 164- 0 | KEY/VISU 0 | Y05 | 22 | PIN 37 | | |
| KEY | 164- 1 | KEY/VISU 1 | Y05 | 17 | PIN 36 | | |
| KEY | 164- 2 | KEY/VISU 2 | Y05 | 16 | PIN 26 | | |
| KEY | 164- 3 | KEY/VISU 3 | Y05 | 13 | PIN 35 | | 14,15,17 |
| KEY | 164- 4 | KEY/VISU 4 | Y05 | 08 | PIN 04 | | |
| KEY | 164- 5 | KEY/VISU 5 | Y05 | 06 | PIN 03 | | |
| KEY | 164- 6 | KEY/VISU 6 | Y05 | 04 | PIN 21 | | |
| KEY | 164- 7 | KEY/VISU 7 | Y05 | 02 | PIN 20 | | |
| | 164- 8 | ADRESS/MODE | Y05 | 15 | | | |
| INV SWITCH | 164- 9 | INHIBIT/LOCAL | Y05 | 14 | | | |
| MAINTENANCE / NORMAL SWITCH (NOT SHOWN) | | | | | | | |
| INV SWITCH | | MAINT/EXPL | Y05 | 23 | OUT 67 | PIN 27 | 14, 21 |

FIG. 27

| AM 904 | SPCI INTERFACE | | | | AM 904 REFERENCE | | | |
|---|---|---|---|---|---|---|---|---|
| FUNCTION | FIG.10/13 REF | SYSTEM NAME | CONNECT. | PIN # | INTERNAL NAME | | NAME | FIGURES |
| SPCI-IN | | | | | | | | |
| COMMAND | 74 - 1 OR | LØGØFF | YO1 | 2 | LØØF | ØUT 06 | LØGØFF | 14 |
| AKNOWL | 179 - 1 OR | CRERRØR | YO1 | 4 | CRER | | CRERROR | 15 |
| COMMAND | 181 - 1 OR | LØGØN | YO1 | 6 | LØØN | ØUT 05 | LØGØN | 23 |
| AKNOWL | 183 - 1 OR | SEQCØMP | YO1 | 8 | SEQC | | SEQCØMP | 24 |
| AKNOWL | 185 - 1 OR | SEQERR | YO1 | 12 | SEQE | | SEQUERR | |
| SYNCHRONISATION | | ENI | YO1 | 14 | ENAB | | ENI | |
| AKNOWL | | FANFLT | YO1 | 10 | SYCF | | FANFLT | |
| AKNOWL | 227 | AUXVØL | YO1 | 18 | +VAUX | | AUXVØL | |
| AKNOWL | | SYSFLT | YO1 | 20 | SYPF | | SYSFLT | |
| SPCI-OUT | | | | | | | | |
| COMMAND | 74 - 2 OR | LØGØFF | YO2 | 2 | LØØF | ØUT 06 | LØGØFF | 14 |
| AKNOWL | 179 - 2 OR | CRERRØR | YO2 | 4 | CRER | | CRERRØR | 15 |
| COMMAND | 181 - 2 OR | LØGØN | YO2 | 6 | LØØN | ØUT 05 | LØGØN | 23 |
| AKNOWL | 183 - 2 OR | SEWCØMP | YO2 | 8 | SEQC | | SEQCØMP | 24 |
| AKNOWL | 185 - 2 OR | SEQERRØR | YO2 | 12 | SEQE | | SEQERRØR | |
| SYNCHRONISATION | | ENØ | YO2 | 14 | ENAB | | ENØ | |
| AKNOWL | | FANFLT | YO2 | 16 | SYCF | | FANFLT | |
| AKNOWL | | AUXVØL | YO2 | 18 | +VAUX | | AUXVØL | |
| AKNOWL | 228 | SYSFLT | YO2 | 20 | SYPF | | SYSFLT | |

FIG. 28

| FUNCTION | PRIMARY SUPPLY / SERVITUDE | | | AM 904 REFERENCE | | | |
|---|---|---|---|---|---|---|---|
| | FIG 13 REF. | SYSTEM NAME | CONNECT | PIN # | INTERNAL NAME | OTHER NAME | FIGURES |
| SERVITUDE POWER SUPPLY | | | | | | | |
| AKNOWL | 229 | SERVUV | Y03 | 18 | ØUT 04 | SERVUV | 15,23 |
| POWER-ON CONTACTOR | | | | | | | |
| AKNOWL | 229 | COMREL | Y03 | 02 | ØUT 17 | COMREL | 15,16 |
| COMMAND | 229 | RELCØM | Y03 | 24 | REG 12 | RELCØN | 23,24 |
| TEMPERATURE CONTROL | | | | | | | |
| AKNOWL | 229 | CØØLF1 | Y03 | 06 | ØUT 14 | CØØLF1 | 15,16 |
| AKNOWL | 229 | CØØLF2 | Y03 | 08 | ØUT 13 | CØØLF1 | 23,24 |
| AKNOWL | 229 | CØØLF3 | Y03 | 12 | ØUT 12 | CØØLF3 | |
| BLEEDER CONTROL | | | | | | | |
| COMMAND | 229 | BLDCØN1 | Y04 | 06 | REG 13 | BLDCØN1 | 15,16 |
| COMMAND | 229 | BLDCØN2 | Y04 | 08 | REG 14 | BLDCØN2 | 23,24 |
| PRIMARY POWER SUPPLY (REGULATION CONTROL AND RESET) | | | | | | | |
| AKNOWL | 230 | DCØN | Y04 | 18 | ØUT 03 | DCØN | 15,16 |
| AKNOWL | 230 | DCØFF | Y04 | 16 | ØUT 02 | DCØFF | 23,24 |
| AKNOWL | 230 | PREGUV | Y04 | 14 | ØUT 01 | PREGUV | |
| AKNOWL | 230 | PREGØV | Y04 | 12 | ØUT 00 | PREGØV | |
| AKNOWL | 230 | DCRES | Y04 | 04 | DCRES | DCRES | |

FIG 29

| AM 904 | | | | | | | |
|---|---|---|---|---|---|---|---|
| | AM 903 REFERENCE | | | AM 904 REFERENCE | | | |
| FUNCTION | NAME | AM 903 POSITION | CONNECT. | PIN # | INTERNAL NAME | NAME | FIGURES |
| | GFLT 12 | ~ 10 A | Z01 | 26 | BPC-IN 07 | GFLT | |
| | GFLT 11 | ~ 10 A | Z01 | 25 | BPC-IN 17 | GFLT | |
| | GFLT 10 | ~ 10 B | Z01 | 28 | BPC-IN 06 | GFLT | |
| | GFLT 09 | ~ 10 B | Z01 | 27 | BPC-IN 16 | GFLT | |
| | GFLT 08 | ~ 9 A | Z01 | 40 | BPC-IN 05 | GFLT | 14 |
| | GFLT 07 | ~ 9 A | Z01 | 39 | BPC-IN 15 | GFLT | 17 |
| | GFLT 06 | ~ 9 B | Z01 | 38 | BPC-IN 04 | GFLT | 18 |
| | GFLT 05 | ~ 9 B | Z01 | 37 | BPC-IN 14 | GFLT | 23 |
| | GFLT 04 | ~ 8 A | Z01 | 36 | BPC-IN 03 | GFLT | |
| | GFLT 03 | ~ 8 A | Z01 | 35 | BPC-IN 13 | GFLT | |
| | GFLT 02 | ~ 8 B | Z01 | 32 | BPC-IN 02 | GFLT | |
| | GFLT 01 | ~ 8 B | Z01 | 31 | BPC-IN 12 | GFLT | |
| | GFLT 14 | | Z01 | 66 | BPC-IN 10 | GFLT | |
| | GFLT 13 | | Z01 | 64 | BPC-IN 11 | GFLT | |

FIG. 30

EXPLOITATION INTERFACE MODULE AM 904 (74)

CONNECTION TO THE MONITORING BUS (12)

Z01 CONNECTOR

| Z01 | | | | | Z01 | | | |
|---|---|---|---|---|---|---|---|---|
| 1 | | | | | 36 | BPCIN 03 | GFLT | 04 |
| 2 | | | | | 37 | BPCIN 14 | GFLT | 05 |
| 3 | | | | | 38 | BPCIN 04 | GFLT | 06 |
| 4 | | | | | 39 | BPCIN 15 | GFLT | 07 |
| 5 | | | | | 40 | BPCIN 05 | GFLT | 08 |
| 6 | | | | | 41 | | | |
| 7 | | | | | 42 | PMC | MEMR | |
| 8 | | | | | 43 | | | |
| 9 | | | | | 44 | PMC | | |
| 10 | | | | | 45 | ØUT 05 | LØGØN | 10 |
| 11 | | | | | 46 | ØUT 15 | SYSTØFF | |
| 12 | | | | | 47 | | | |
| 13 | | | | | 48 | | | |
| 14 | | | | | 49 | DBM | EDB | 7 |
| 15 | ØUT | 14 | CØØLF | 1 | 50 | DBM | EDB | 6 |
| 16 | BPCOUT | 4 | | | 51 | | | |
| 17 | ØUT | 06 | LØGØFF | 10 | 52 | | | |
| 18 | ØUT | 16 | SYSTØN | | 53 | DBM | EDB | 5 |
| 19 | | | | | 54 | DBM | EDB | 4 |
| 20 | | | | | 55 | DBM | EDB | 3 |
| 21 | ØUT | 17 | CØMREL | | 56 | DBM | EDB | 2 |
| 22 | ØUT | 07 | ENI | | 57 | DBM | EDB | 1 |
| 23 | | | | | 58 | DBM | EDB | 0 |
| 24 | | | | | 59 | | | |
| 25 | BPCIN | 17 | GFLT | 11 | 60 | | | |
| 26 | BPCIN | 07 | GFLT | 12 | 61 | ØUT 03 | DCØN | |
| 27 | BPCIN | 16 | GFLT | 09 | 62 | PMC-REST | | |
| 28 | BPCIN | 06 | GFLT | 10 | 63 | ØUT 01 | PREGUV-10 | |
| 29 | | | | | 64 | BPCIN 11 | GFLT | 13 |
| 30 | | | | | 65 | ØUTO 2 | DCØFF | |
| 31 | BPCIN | 12 | GFLT | 01 | 66 | BPCIN 10 | GFLT | 14 |
| 32 | BPCIN | 02 | GFLT | 02 | 67 | ØUT 12 | CØØLF | 3 |
| 33 | | | | | 68 | OUT 13 | CØØLF | 2 |
| 34 | | | | | 69 | | | |
| 35 | BPCIN | 13 | GFLT | 03 | 70 | | | |

FIG. 31

EXPLOITATION INTERFACE MODULE AM 904 (74)

CONNECTION TO THE MONITORING BUS (12)

Z02 CONNECTOR

| Z02 | | | Z02 | | |
|---|---|---|---|---|---|
| 1 | | | 34 | REG 13 | BLOCON 1 |
| 2 | | | 35 | | |
| 3 | PMC ADR 15 | | 36 | | |
| 4 | ØUT 00 | PREGØV 10 | 37 | | |
| 5 | BPCØU 26 | KEY/VISU 2· | 38 | REF 14 | BLOCON 2 |
| | | ØUT 66· | 39 | | |
| 6 | BPCØU 27 | MAINT/EXPL | 40 | | |
| | | ØUT 67 | 41 | | |
| 7 | | | 42 | | |
| 8 | | | 43 | MCR | INT |
| 9 | BPC | DTWØ | 44 | | |
| 10 | | | 45 | | |
| 11 | | | 46 | | |
| 12 | | | 47 | | |
| 13 | PMC ADR 09 | | 48 | | |
| 14 | PMC ADR 10 | | 49 | | |
| 15 | | | 50 | | |
| 16 | | | 51 | DBM-EDB 5 | |
| 17 | | | 52 | DBM-EDB 4 | |
| 18 | PMC ADR 02 | | 53 | DBM-EDB 3 | |
| 19 | | | 54 | DBM-EDB 2 | |
| 20 | | | 55 | DBM-EDB 1 | |
| 21 | PMC ADR 01 | | 56 | DBM-EDB 0 | |
| 22 | PMC ADR 00 | | 57 | | |
| 23 | | | 58 | | |
| 24 | | | 59 | | |
| 25 | REG 03 | SEQUERR | 60 | | |
| 26 | REG 02 | ENØ | 61 | | |
| 27 | REG 05 | FANFLT | 62 | | |
| 28 | REG 04 | SYSFLT | 63 | | |
| 29 | | | 64 | | |
| 30 | REG 12 | RELCØN | 65 | | |
| 31 | REG 11 | DCRES | 66 | | |
| 32 | REG 10 | ØNØFF | 67 | | |
| 33 | | | 68 | | |
| | | | 69 | | |
| | | | 70 | | |

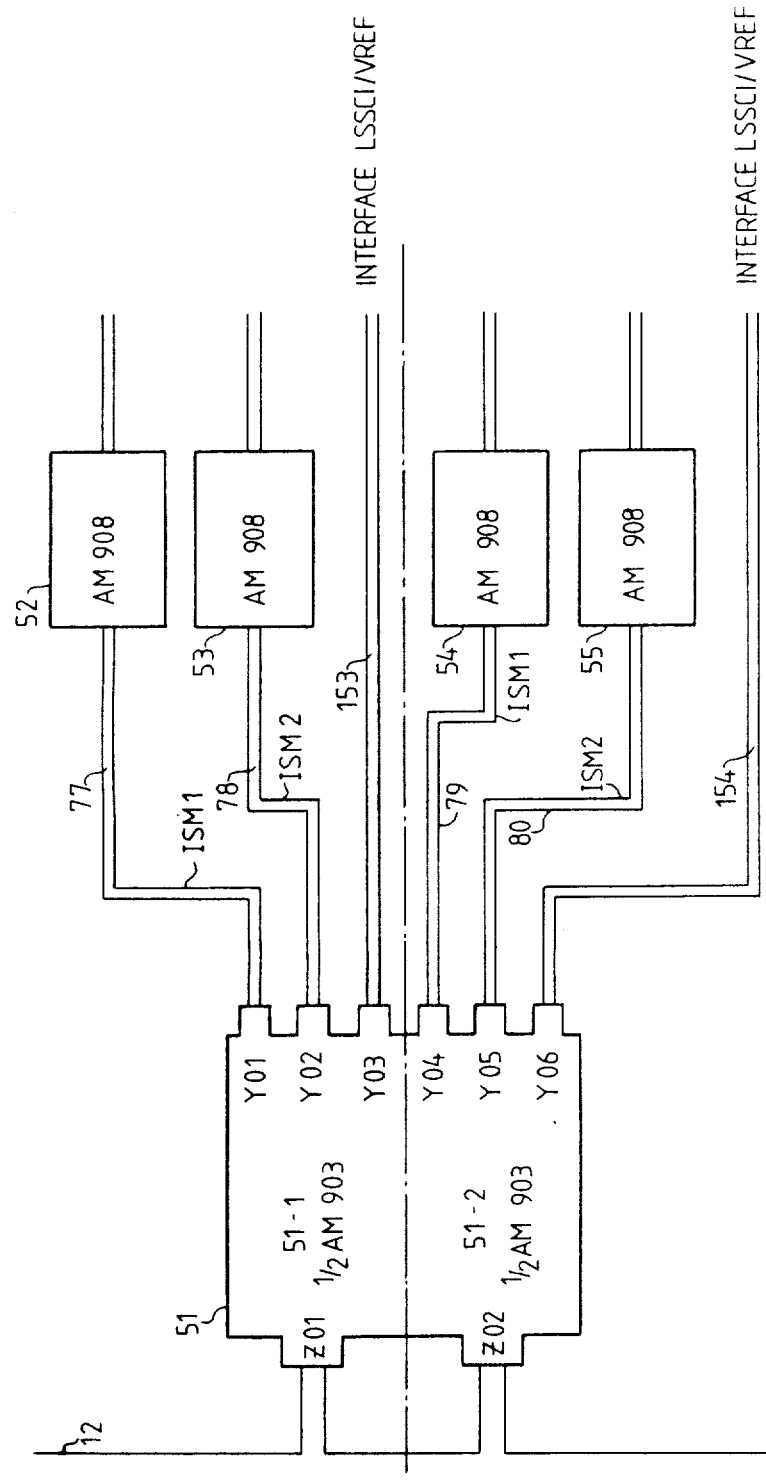

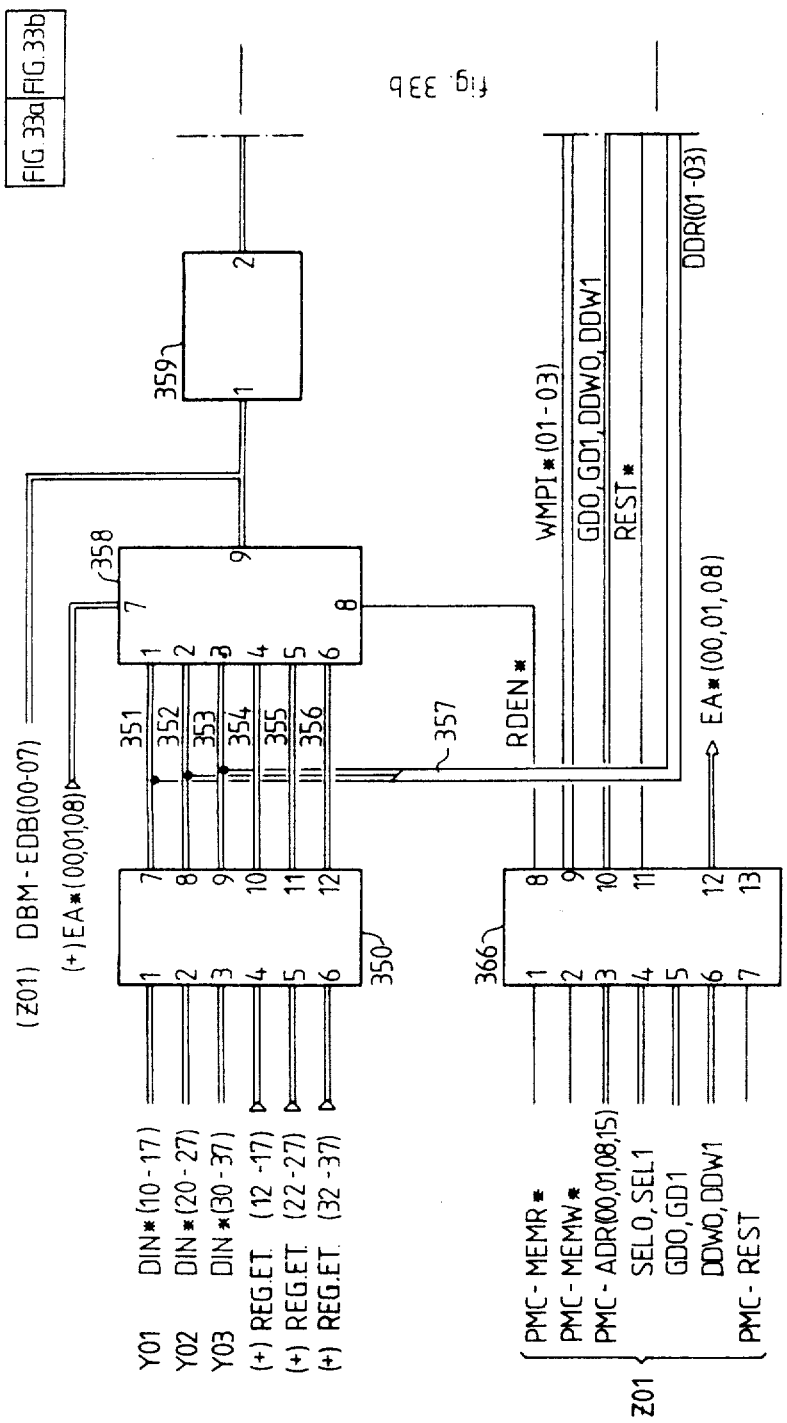

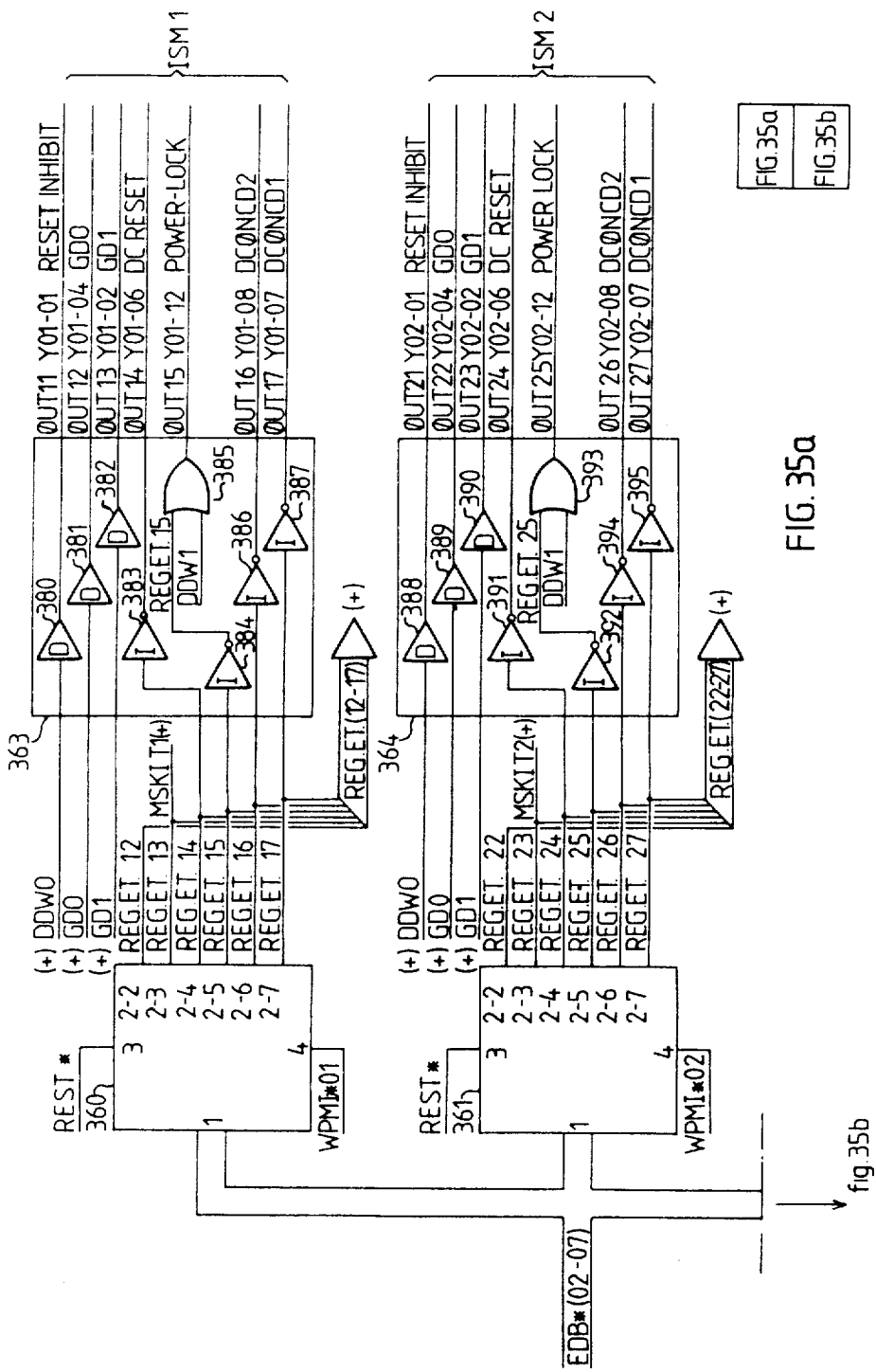

ISM1-IN

| | | 77 FIGURE 13 | | 79 FIGURE 13 | |
|---|---|---|---|---|---|
| | | REFERENCES 1/2 AM903(51-1) | | REFERENCES 1/2 AM903(51-2) | |
| | | CONNECT | PIN | FIGURES | CONNECT | PIN | FIGURE |
| DIN 10 | STATUS≠7 | Y01 | 24 | 33 | Y04 | 24 | |
| DIN 11 | STATUS≠6 | | 22 | 34 | | 22 | |
| DIN 12 | STATUS≠5 | | 20 | | | 20 | |
| DIN 13 | STATUS≠4 | | 19 | | | 19 | |
| DIN 14 | STATUS≠3 | | 18 | | | 18 | |
| DIN 15 | STATUS≠2 | | 16 | | | 16 | |
| DIN 16 | STATUS≠1 | | 14 | | | 14 | |
| DIN 17 | DEFC | | 13 | | | 13 | |

ISM1-ØUT

| | | CONNECT | PIN | FIGURES | CONNECT | PIN | FIGURE |
|---|---|---|---|---|---|---|---|
| ØUT 11 | RESET-INHIBIT(INRZ) | Y01 | 01 | 33 | Y04 | 01 | |
| ØUT 12 | GD0 (ADRE 2) | | 04 | 35 | | 04 | |
| ØUT 13 | GD1 (ADRE1) | | 02 | | | 02 | |
| ØUT 14 | DC RESET (RZCP) | | 06 | | | 06 | |
| ØUT 15 | POWER LOCK(INVA) | | 12 | | | 12 | |
| ØUT 16 | DCØNCD1 (CDMA2) | | 08 | | | 08 | |
| ØUT 17 | DCØNCD2 (CDMA1) | | 07 | | | 07 | |

FIG. 37

| | 78 FIGURE 13 | | | 80 FIGURE 13 | | |
|---|---|---|---|---|---|---|
| | REFERENCES 1/2 AM903(51-1) | | | REFERENCES 1/2 AM903(51-2) | | |
| | CONNECT | PIN | FIGURES | CONNECT | PIN | FIGURE |
| ISM2-IN | | | | | | |
| DIN 20  STATUS≠7 | Y02 | 24 | | Y05 | 24 | |
| DIN 21  STATUS≠6 | | 22 | | | 22 | |
| DIN 22  STATUS≠5 | | 20 | | | 20 | |
| DIN 23  STATUS≠4 | | 19 | 33 | | 19 | |
| DIN 24  STATUS≠3 | | 18 | 34 | | 18 | |
| DIN 25  STATUS≠2 | | 16 | | | 16 | |
| DIN 26  STATUS≠1 | | 14 | | | 14 | |
| DIN 27  DEFC | | 13 | | | 13 | |
| ISM2-OUT | | | | | | |
| OUT 21  RESET-INHIBIT(INRZ) | Y02 | 01 | | Y05 | 01 | |
| OUT 22  GD0   (ADRE2) | | 04 | | | 04 | |
| OUT 23  GD1   (ADRE1) | | 02 | 33 | | 02 | |
| OUT 24  DC RESET  (RZCP) | | 06 | 35 | | 06 | |
| OUT 25  POWERLOCK(INVA) | | 12 | | | 12 | |
| OUT 26  DCØNCD1 (CDMA2) | | 08 | | | 08 | |
| OUT 27  DCØNCD2 (CDMA1) | | 07 | | | 07 | |

FIG.38

AM903 - INTERFACE LSSCI

| | 153 FIGURE 13 | | | 154 FIGURE 13 | | |
|---|---|---|---|---|---|---|
| | REFERENCES 1/2 AM903(S1-1) | | | REFERENCES 1/2 AM903(S1-2) | | |
| | CONNECT | PIN | FIGURES | CONNECT | PIN | FIGURE |
| LSSCI-IN | | | | | | |
| DIN 34 | Y03 | 24 | | Y06 | 24 | |
| DIN 35 | | 22 | | | 22 | |
| DIN 36 | | 19 | | | 19 | |
| DIN 37 | | 13 | | | 13 | |
| STAT * 04 | | | | | | |
| STAT * 03 | | | | | | |
| STAT * 02 | | | | | | |
| STAT * 01 | | | | | | |
| LSSCI-OUT | | | | | | |
| OUT 31  DESET INHIBIT (INRZ) | Y03 | 01 | 33 | Y06 | 01 | 33 |
| OUT 32  DC0NCD      (CMDA) | | 07 | 34 | | 07 | 35 |
| OUT 33-1 CHLCK OUT01(CLCK) | | 16 | | | 16 | |
| OUT 33-2 CHLCK OUT02(CLCK) | | 18 | | | 18 | |
| OUT 33-3 CHLCK OUT03(CLCK) | | 20 | | | 20 | |
| OUT 35  WARNING    (ETNA) | | 12 | | | 12 | |
| OUT 36  PWRS | | 14 | | | 14 | |
| OUT 37  DC RESET   (CDRZ) | | 06 | | | 06 | |

CONNECTEUR Z01

| N° | | N° | |
|---|---|---|---|
| 1 | | 36 | |
| 2 | | 37 | DDR 1 |
| 3 | PMC ADR 15 | 38 | |
| 4 | | 39 | DDR 2 |
| 5 | | 40 | |
| 6 | | 41 | DDR 3 |
| 7 | SEL 0 | 42 | PMC MEMR* |
| 8 | | 43 | BPC INTR 4* |
| 9 | SEL 1 | 44 | PMC MEMW* |
| 10 | PMC-ADR 08 | 45 | |
| 11 | | 46 | |
| 12 | | 47 | |
| 13 | | 48 | |
| 14 | | 49 | DBM-EDB 7 |
| 15 | | 50 | DBM-EDB 6 |
| 16 | | 51 | DBM-EDB 5 |
| 17 | | 52 | DBM-EDB 4 |
| 18 | | 53 | DBM-EDB 3 |
| 19 | PMC-ADR 01 | 54 | DBM-EDB 2 |
| 20 | PMC-ADR 00 | 55 | DBM-EDB 0 |
| 21 | PMV-FLT | 56 | |
| 22 | BPC-INTR 5*(PMV INT*) | 57 | |
| 23 | | 58 | PMC-REST |
| 24 | | 59 | |
| 25 | BPC- DDW 0 | 60 | |
| 26 | BPC- DDW 1 | 61 | |
| 27 | ELOG1 | 62 | |
| 28 | | 63 | |
| 29 | | 64 | |
| 30 | | 65 | PMC-GD0 |
| 31 | | 66 | PMC-GD1 |
| 32 | | 67 | |
| 33 | BPC-IN + | 68 | CHLCK-IN |
| 34 | | 69 | |
| 35 | | 70 | |

| N° | | N° | |
|---|---|---|---|
| 1 | | 36 | |
| 2 | | 37 | DDR1 |
| 3 | PMC-ADR 15 | 38 | |
| 4 | | 39 | DDR2 |
| 5 | | 40 | |
| 6 | | 41 | DDR3 |
| 7 | SEL0 | 42 | PMC MEMR* |
| 8 | | 43 | BPC INTR 4* |
| 9 | SEL1 | 44 | PMC MEMW* |
| 10 | PMC-ADR 08 | 45 | |
| 11 | | 46 | |
| 12 | | 47 | |
| 13 | | 48 | |
| 14 | | 49 | DBM-EDB 7 |
| 15 | | 50 | DBM-EDB 6 |
| 16 | | 51 | DBM-EDB 5 |
| 17 | | 52 | DBM-EDB 4 |
| 18 | | 53 | DBM-EDB 3 |
| 19 | PMC-ADR 01 | 54 | DBM-EDB 2 |
| 20 | PMC-ADR 00 | 55 | DBM-EDB 0 |
| 21 | PMC-FLT | 56 | |
| 22 | BPC-INTR 5*(PMV INT*) | 57 | |
| 23 | | 58 | PMC-REST |
| 24 | | 59 | |
| 25 | BPC-DDW 0 | 60 | |
| 26 | BPC-DDW 1 | 61 | |
| 27 | -ELOG1 | 62 | |
| 28 | | 63 | |
| 29 | | 64 | |
| 30 | | 65 | PMC-GD 0 |
| 31 | | 66 | PMC-GD 1 |
| 32 | | 67 | |
| 33 | BPC-IN xx | 68 | CHLCK-IN |
| 34 | | 69 | |
| 35 | | 70 | |

| FIGURE 2 | 7 | | 8 | | 9 | | 10 | |
|---|---|---|---|---|---|---|---|---|
| | 51-1 | 51-2 | 56-1 | 56-2 | 61-1 | 61-2 | 66-1 | 66-2 |
| Z01/Z02-30-GFLT | BPCIN 11 | BPCIN 10 | BPCIN 03 | BPCIN 02 | BPCIN 05 | BPCIN 04 | BPCIN 07 | BPCIN 06 |
| Z01/Z02-07-SELO | PMCADR-03 | PMCADR-03 | PMCADR-02 | PMCADR-03 | PMCADR-02 | PMCADR-02 | PMCADR-02 | PMCADR-02 |
| Z01/Z02-09-SELO | PMCADR-05 | PMCADR-06 | PMCADR-07 | PMCADR-04 | PMCADR-05 | PMCADR-06 | PMCADR-03 | PMCADR-04 |

| N° | | N° | |
|---|---|---|---|
| 1 | | 36 | |
| 2 | | 37 | |
| 3 | PMC-ADR 15 | 38 | |
| 4 | PMC-ADR 14 | 39 | |
| 5 | PMC-ADR 13 | 40 | |
| 6 | PMC-ADR 12 | 41 | |
| 7 | PMC-ADR 11 | 42 | PMC MEM R* |
| 8 | PMC-ADR 10 | 43 | |
| 9 | PMC-ADR 09 | 44 | PMC MEM W* |
| 10 | PMC-ADR 08 | 45 | |
| 11 | | 46 | |
| 12 | | 47 | |
| 13 | PMC-ADR 07 | 48 | |
| 14 | PMC-ADR 06 | 49 | |
| 15 | PMC-ADR 05 | 50 | |
| 16 | PMC-ADR 04 | 51 | |
| 17 | PMC-ADR 03 | 52 | |
| 18 | PMC-ADR 02 | 53 | |
| 19 | PMC-ADR 01 | 54 | |
| 20 | PMC-ADR 00 | 55 | |
| 21 | | 56 | |
| 22 | | 57 | |
| 23 | | 58 | PMC-REST 20 |
| 24 | | 59 | |
| 25 | | 60 | |
| 26 | | 61 | BPC-RZ* |
| 27 | | 62 | |
| 28 | | 63 | |
| 29 | | 64 | |
| 30 | | 65 | BPC-INTR IN(BPC-REST-IN) |
| 31 | | 66 | PMC-$ CLK 2 |
| 32 | | 67 | |
| 33 | | 68 | |
| 34 | | 69 | |
| 35 | | 70 | |

| N° | | N° | |
|---|---|---|---|
| 1 | | 36 | |
| 2 | | 37 | |
| 3 | PMC-ELOG 1 | 38 | BPC INTR0*(IT BASE TEMPS |
| 4 | | 39 | (1) |
| 5 | | 40 | |
| 6 | | 41 | |
| 7 | | 42 | |
| 8 | | 43 | BPC INTR 4*IT SOURCES+RC |
| 9 | | 44 | BPC INTR 5*IT VREF |
| 10 | BPC $ CLK2 | 45 | BPC INTR6*(PMC TOUT1) |
| 11 | | 46 | |
| 12 | | 47 | |
| 13 | | 48 | |
| 14 | | 49 | DBM EDB7 |
| 15 | PMC-WR* | 50 | DBM EDB6 |
| 16 | | 51 | DBM EDB5 |
| 17 | | 52 | DBM EDB4 |
| 18 | | 53 | DBM EDB3 |
| 19 | | 54 | DBM EDB2 |
| 20 | | 55 | DBM EDB1 |
| 21 | PMC-RD* | 56 | DBM EDB0 |
| 22 | | 57 | |
| 23 | | 58 | |
| 24 | | 59 | |
| 25 | | 60 | |
| 26 | | 61 | |
| 27 | | 62 | |
| 28 | | 63 | |
| 29 | | 64 | |
| 30 | | 65 | PMC-GD0 (ADRE 2) |
| 31 | EDB OUT | 66 | PMC-GD1 (ADRE1) |
| 32 | | 67 | PMC-GD 2 (BPC DDW1)(2) |
| 33 | EDB EN | 68 | PMC-GD 3 (BPC DDW0)(3) |
| 34 | | 69 | |
| 35 | SELRP*10 | 70 | |

(1) BPC INTR*=IT BASE DE TEMPS=PMC TOUT 2
(2) PMC GD2  =BPC DDW1= POWER LOCK
(3) PMC GD3  =BPC DDW0= RESET INHIBIT

| N° | | N° | |
|---|---|---|---|
| 1 | | 36 | |
| 2 | | 37 | PMC ADR 15 |
| 3 | | 38 | |
| 4 | | 39 | |
| 5 | | 40 | |
| 6 | | 41 | |
| 7 | | 42 | |
| 8 | | 43 | MEMR * |
| 9 | | 44 | |
| 10 | | 45 | |
| 11 | | 46 | |
| 12 | | 47 | |
| 13 | | 48 | |
| 14 | | 49 | |
| 15 | PMC ADR 00 | 50 | |
| 16 | PMC ADR 01 | 51 | |
| 17 | | 52 | |
| 18 | PMC ADR 03 | 53 | DBM EDB 03 |
| 19 | PMC ADR 04 | 54 | DBM EDB 02 |
| 20 | PMC ADR 05 | 55 | DBM EDB 01 |
| 21 | | 56 | DBM EDB 00 |
| 22 | PMC ADR 07 | 57 | |
| 23 | | 58 | |
| 24 | | 59 | |
| 25 | | 60 | |
| 26 | | 61 | |
| 27 | | 62 | |
| 28 | | 63 | |
| 29 | | 64 | |
| 30 | | 65 | |
| 31 | PMC ADR 08 | 66 | |
| 32 | | 67 | |
| 33 | PMC ADR 09 | 68 | |
| 34 | | 69 | |
| 35 | PMC ADR 14 | 70 | |

FIG. 51

| MODULE | AM 902 | AM 903A | | AM 903B | | AM 903C | | AM 903D | | AM 904 | | AM 907 | |
|---|---|---|---|---|---|---|---|---|---|---|---|---|---|
| FIG. 2 REF. | 75 | 51 | | 56 | | 61 | | 66 | | 74 | | 76 | |
| RACK LOCATION | 14 | 7 | | 8 | | 9 | | 10 | | 16 | | 13 | |
| CONNECTOR | Z01 Z02 | Z01 | Z02 | Z01 | Z02 | Z01 | Z02 | Z01 | Z02 | Z01 | Z02 | Z01 | Z02 |
| DBM EDB 07 | | 49 | 49 | 49 | 49 | 49 | 49 | 49 | 49 | 49 | 49 | | |
| DBM EDB 06 | | 50 | 50 | 50 | 50 | 50 | 50 | 50 | 50 | 50 | 50 | | |
| DBM EDB 05 | | 51 | 51 | 51 | 51 | 51 | 51 | 51 | 51 | 53 | 51 | | |
| DBM EDB 04 | | 52 | 52 | 52 | 52 | 52 | 52 | 52 | 52 | 54 | 52 | | |
| DBM EDB 03 | | 53 | 53 | 53 | 53 | 53 | 53 | 53 | 53 | 55 | 53 | | 53 |
| DBM EDB 02 | | 54 | 54 | 54 | 54 | 54 | 54 | 54 | 54 | 56 | 54 | | 54 |
| DBM EDB 01 | | 55 | 55 | 55 | 55 | 55 | 55 | 55 | 55 | 57 | 55 | | 55 |
| DBM EDB 00 | | 56 | 56 | 56 | 56 | 56 | 56 | 56 | 56 | 58 | 56 | | 56 |
| PMC ADR 15 | 03 | | 03 | 03 | 03 | 03 | 03 | 03 | 03 | | 03 | | 37 |
| PMC ADR 14 | 04 | | | | | | | | | | | | 35 |
| PMC ADR 13 | 05 | | | | | | | | | | | | |
| PMC ADR 12 | 06 | | | | | | | | | | | | |
| PMC ADR 11 | 07 | | | | | | | | | | | | |
| PMC ADR 10 | 08 | | | | | | | | | | | | |
| PMC ADR 09 | 09 | | | | | | | | | | | | 33 |
| PMC ADR 08 | 10 | | 10 | 10 | 10 | 10 | 10 | 10 | 10 | | | | 31 |
| PMC ADR 07 | 13 | | | 09 | | | | | | | | | 22 |
| PMC ADR 06 | 14 | | 09 | | | 09 | | | | | | | 21 |
| PMC ADR 05 | 15 | 09 | | | 09 | | | | | | | | 20 |
| PMC ADR 04 | 16 | | | | 09 | | | 09 | | | | | 19 |
| PMC ADR 03 | 17 | 07 | 07 | | 07 | | | 09 | | | | | 18 |
| PMC ADR 02 | 18 | | | 07 | | 07 | 07 | 07 | 07 | | 18 | | 17 |
| PMC ADR 01 | 19 | 19 | 19 | 19 | 19 | 19 | 19 | 19 | 19 | | 21 | | 16 |
| PMC ADR 00 | 20 | 20 | 20 | 20 | 20 | 20 | 20 | 20 | 20 | | 22 | | 15 |

FIG 52

| MODULE | AM 902 | AM 903A | | AM 903B | | AM 903C | | AM 903D | | AM 904 | | AM 927 | |
|---|---|---|---|---|---|---|---|---|---|---|---|---|---|
| FIG. 2 REF. | 75 | 51 | | 56 | | 61 | | 66 | | 74 | | 76 | |
| RACK LOCATION | 14 | 7 | | 8 | | 9 | | 10 | | 16 | | 13 | |
| CONNECTOR | Z01 | Z01 | Z02 | Z01 | Z02 | Z01 | Z02 | Z01 | Z02 | Z01 | Z02 | Z01 | Z02 |
| PMC MEMR * | 42 | | 42 | 42 | 42 | 42 | 42 | 42 | 42 | 42 | | 42 | 43 |
| PMC MEMW * | 44 | | 44 | 44 | 44 | 44 | 44 | 44 | 44 | 44 | | | |
| PMC REST 20 | 58 | | 58 | 58 | 58 | 58 | 58 | 58 | 58 | 62 | | | |
| PMC REST 10 | 61 | | | | | | | | | | | | |
| PMC SCLK 2 | 66 | | | | | | | | | | | | |
| PMC GD1 | | | 66 | 66 | 66 | 66 | 66 | 66 | 66 | 66 | | | |
| PMC GD0 | | | 65 | 65 | 65 | 65 | 65 | 65 | 65 | 65 | | | |
| BPC INTR 4 | | | 43 | 43 | 43 | 43 | 43 | 43 | 43 | | 43 | | |
| BPC INTR 5 | | | 44 | 22 | 22 | 22 | 22 | 22 | 22 | 22 | | | |
| BPC INTR 6 | 36 | | | | | | | | | | | | |
| BPC DDW0 | | | 68 | 25 | 25 | 25 | 25 | 25 | 25 | | | | |
| BPC DDW1 | | | 67 | 26 | 26 | 26 | 26 | 26 | 26 | | | | |
| BPC REST IN * | 65 | | | | | | | | | 16 | | | |
| BPC IN 07 | | | | | | | | | 33 | 26 | | | |
| BPC IN 06 | | | | | | | | | | 33 | 28 | | |
| BPC IN 05 | | | | | | | 33 | | | 40 | | | |
| BPC IN 04 | | | | | | | | 33 | | 38 | | | |
| BPC IN 03 | | | | | 33 | | | | | 36 | | | |
| BPC IN 02 | | | | | | 33 | | | | 32 | | | |
| BPC IN 11 | | | 33 | | | | | | | 64 | | | |
| BPC IN 10 | | | | 33 | | | | | | 66 | | | |

APPARATUS FOR THE CONTROL AND MONITORING OF POWER SUPPLY SOURCES FOR DATA PROCESSING SYSTEMS

BACKGROUND OF THE INVENTION

The present invention relates to data processing systems and, more particularly, to the control and monitoring of the power supply sources of these systems.

It should also be noted that the teachings of the present invention can be applied directly to power supply sources of complex systems requiring multiple power supply sources such as, for example, industrial robots, process control systems, or even medical intensive care units.

In existing data processing systems, the power supply circuits are controlled and checked by hard-wired logic circuits. These hard-wired logic circuits have a number of disadvantages. For example, they are ill-suited for circuit modifications that may be required, for example, to improve operation; they become very expensive as soon as the functions needed become complicated; and they make it difficult to manufacture data processing systems with modular configurations. Heretofore, these drawbacks have been offset by the advantages inherent in these hard-wired logic circuits.

Today, we are witnessing a major evolution in the architecture of data processing systems.

This evolution in architecture has been made possible by the advances made in the field of semiconductors, particularly the appearance of large-scale integrated (LSI) circuits. In these LSI circuits, so named because of the large number of basic components incorporated in them, an increase has been seen from year to year in the number of basic components in each substrate. This increase in integration density results in numerous advantages in the design of data processing systems:
the logic circuits are faster;
the cost is lower; and
the space requirements are smaller.

All of these advantages have enabled manufacturers to make the structure of computers evolve as follows:
new functions are being added and, in particular, multiprocessor systems are finding increased application;
systems are being designed to be modular, since microprogramming allows construction of systems that can evolve in their functions as well as in their capacities;
systems are designed to be more compact, since a larger number of logic circuits can be placed within the same space.

However, this evolution in the architecture of data processing systems has resulted in some disadvantages, such as complexity of the power supply units, which must:
supply increasingly higher outputs at lower voltages;
have the same modularity and the same evolutionary nature as the devices they power;
ensure effective protection for the powered circuits to avoid massive destruction of components; and
solve protocol problems between the power supplies during the various operational phases of the data processing system.

It is extremely difficult and costly to develop hard-wired logic circuits that meet these requirements.

Therefore, this invention provides an improved power supply system which utilizes the capabilities offered by microprocessors to control and check, i.e, monitor, power supply units of modern data processing systems and the like. Power supply systems in accordance with the invention, controlled by one or more microprocessors, allow the following:

power supply systems which are evolutionary, i.e., whose configurations can be readily modified as a function of variations in the configuration of the data processing system, by very simply changing a module of the system;

improved power systems, i.e., power supply systems which can readily be improved by simply changing the recorded program controlling the microprocessor; and conversational power supply systems, i.e., one which enables the operator to have a dialogue with the power supply system.

In the system of the invention, the microprocessor(s), in conjunction with suitable devices is (are) used to obtain functions designed to facilitate this dialogue between the operator and the power supply system, namely:

the centralized control of several power supply systems from the console of the data processing system is made possible;

the decentralized control of a power supply system is made possible from a service panel where each source can be accessed;

a general display of the breakdowns occurring in the power supply system(s) being checked is made on the console of the data processing system;

a detailed display of the incidents occurring in the power supply system is made on the service panel of the power supply system; and a specific operation of the power supply system in the maintenance mode is made possible by a switch, access to which is limited to qualified personnel only.

SUMMARY OF THE INVENTION

In accordance with one aspect of the invention, apparatus for controlling and monitoring a power supply system may comprise:

a control unit (75) including a microprocessor, a set of memories and associated logic circuits to send commands and to receive reports over a control bus (12) serving as a routing circuit for all signals exchanged between said control unit (75) and the units connected thereto and listed below;

a unit called the operation interface unit (74) connected to the control bus (12) and containing a logic circuits required for controlling and checking via signals exchanged over the control bus (12) an operator console (48), a service panel (11), a slave power supply (9), and a primary power supply unit (8) to which said operation interface unit (74) is connected by a plurality of links (43), (40), (39), and (38);

the same number of downstream interface units (51-1, 51-2, 56-1, 56-2, 61-1, 61-2, 66-1, 66-2) required to meet the check and control needs of the power supply system sources, each downstream interface unit being connected to the control bus (12) and containing the logic circuits required to control and check a group of sources to which said downstream interface unit is connected by a link;

a unit called the configuration definition unit (76) connected to control bus (12) and containing an addressable read-only memory in which are defined all the parameters enabling the control unit (75) to know the type and number of sources making up the power supply system; and a control bus (12) connected in the manner described above and including lines to carry the signals exchanged between the control unit (75) and the units connected to said control bus (12).

Each downstream interface unit may be connected to units called intermediate units [(54, 55) or (57, 58) or (59, 60) or (62, 63) or (64, 65)], said intermediate units being located between the downstream interface unit and the sources it must control and check and containing the control and check hardware for such sources.

It is a feature of the invention that each downstream interface unit may include a control and check link [(153) or (154) or (155) or (156) or (157) or (158) or (159) or (160)] connected to the circuits powered by said sources (LSSCI interface).

According to another feature of the invention, each downstream interface unit may be addressed by the control unit (75).

According to another feature of the invention, the operator console (48) may be addressed by the control unit (75).

According to another feature of the invention, the service panel (11) may be addressed by the control unit (75).

According to another feature of the invention, the slave power supply (9) may be addressed by the control unit (75).

According to another feature of the invention, the primary power supply unit (8) may be addressed by the control unit (75).

According to another feature of the invention, the service panel (11) includes control facilities (161-4) to start up, and control facilities (161-5) to shut down, the power supply system.

The service panel (11) may include display facilities (161-2) showing the ON-state and display facilities (161-3) showing the OFF-state of the power supply system.

The service panel (11) includes display facilities (161-1) to indicate the appearance of an operating failure at the level of the control unit (75) microprocessor.

The system sources, addressable by means of the downstream interface unit to which they are connected, may be distributed by power supply subsystems, each power supply subsystem being defined via tables contained in the configuration definition unit (76).

The service panel (11) may include (162-0, 162-1, 162-3, 162-4, 162-5, 162-6, 162-7) either to authorize or to prohibit the start-up of power supply subsystems by the control unit (75).

The service panel (11) may include facilities for displaying (160-0, 160-1, 160-2, 160-3, 160-4, 160-5, 160-6, 160-7) the operating states of the power supply subsystems to show the ON or OFF states of all the sources of each power supply subsystem.

The service panel (11) may include facilities (160-0, 160-1, 160-2, 160-3, 160-4, 160-5, 160-6, 160-7) for displaying power supply subsystems experiencing minor faults so as to indicate the power supply subsystem(s) in which a minor fault has been detected.

The service panel (11) may include facilities (160-0, 160-1, 160-2, 160-3, 160-4, 160-5, 160-6, 160-7) for displaying power supply subsystems that are experiencing major faults in order to indicate the power supply subsystem(s) in which a major fault has been detected.

The service panel (11) may include facilities (160-0, 160-1, 160-2, 160-3, 160-4, 160-5, 160-6, 160-7) for displaying subsystems that are in a shutdown failure state so as to show the power supply subsystems for which the shutdown sequence has not been successfully completed.

The facilities for displaying the various states (160-0, 160-1, 160-2, 160-3, 160-4, 160-5, 160-6, 160-7) on the service panel (11) may comprise a single display means per power supply subsystem which is capable of displaying several states, because it is itself capable of assuming several different observable states.

The state-display facilities (160-0, 160-1, 160-2, 160-3, 160-4, 160-5, 160-6, 160-7) on the service panel (11) may be luminous devices, and the single display facility per power supply subsystem has a different mode of lighting according to the different states to be displayed.

The service panel (11) may include facilities (163-0, 163-1, 163-2, 163-6, 163-4, 163-5, 163-6, 163-7) for displaying the operating parameters of the sources, indicating the contents, or a synthesis thereof, of the internal registers of the sources.

The facilities (163-0, 163-1, 163-2, 163-3, 163-4, 163-5, 163-6, 163-7) for displaying the operating parameters of the sources only display one group of bits at a time, said group of displayed bits being defined by an address, the progression of which is obtained by a facility (163-9) for controlling the address progression of the group of bits to be displayed.

According to another feature of the invention, the service panel (11) may include reset facilities (163-8) in order to restore to an initial position the address of the group of bits displayed by the facilities (163-0, 163-1, 163-2, 163-3, 163-4, 163-5, 163-6, 163-7) for displaying the operating parameters of the sources.

The facilities (163-0, 163-1, 163-2, 163-3, 163-4, 163-5, 163-6, 163-7) for displaying the operating parameters of the sources on the service panel (11), outside the periods during which they are required to display the operating parameters of the sources, may display the operating parameters of the devices which are common to the power supply subsystems such as, for example, the slave power supply unit (9) and the primary power suply unit (18).

The invention further provides a process of operating such aforementioned facilities for displaying the operating parameters of the sources that comprises the following steps:

in an initial step, the operator activates the reset facilities (163-8) in order to restore to an initial position the address of a first group of bits displayed by the display facilities (163-0 . . . 163-7);

in a second step, the operator, by activating address progression control facilities (163-9), causes the address of the group of bits displayed by the display facilities (163-0 through 163-7) to progress by one step, said display facilities thus displaying a second group of bits;

in the following successive steps the operator causes the address of the displayed groups of bits to progress in a same manner until the last group of bits to be displayed has been reached.

The invention also provides such a process which comprises the following steps:

in an initial step, the operator activates the reset facilities (163-8) in order to restore to its initial state the sequence for scanning the addresses of the groups of bits to be displayed, the successful completion of this first stage being indicated by a specific type lighting of the display facilities (163-0 through 163-7);

in a second step, the operator, by activating the address progression control facilities (163-9), orders the display of the first group of bits, said first group of bits being displayed by the display facilities (163-0 through 163-7);

in the following successive steps, the operator causes the address of the displayed groups of bits to progress in the same manner until the last group of bits to be displayed has been reached;

once the last group of bits has been displayed, a reactivation of the address progression facilities (163-9) restores to its initial position the address scanning sequence for the groups to be displayed;

once this resetting has been completed, the display facilities (163-0 through 163-7) light up according to a specific mode of lighting to indicate to the operator that the initial state has been achieved.

Another aspect of the invention provides such a process comprising the following steps:

In an initial step, the operator activates the facilities (163-8) for resetting the indicator of the address to be displayed so as to restore to its initial position said indicator of the address to be displayed, the successful completion of said first step being indicated by a specific lighting mode of the display facilities (163-0 through 163-7), said lighting signifying to the operator that the indicator of the address to be displayed has been restored to its initial position.

In a second step, the operator, by activating the address progression control facilities (163-9) for the address to be displayed requests that the contents of the first address be displayed by the display facilities (163-0 through 163-7), the contents of said first address containing an indication as to which power supply subsystems are placed in an artificial operating mode, i.e., the subsystems for which the faulty sources will not be displayed;

In a third step, the operator, by reactivating the address progression control facilities (163-9) for the address to be displayed, requests that the indicator of the address to be displayed be advanced by one step and controls the display of the contents of said second address by the display facilities (163-0 through 163-7), the contents of said second address providing the references for the first source in an abnormal operating state; if no fault has been detected in the power supply system, the address indicator responds to the address progression command for said third step by pointing to the address which corresponds to the final stage, which will be described further below.

In a fourth step, the operator, by reactivating the address progression control facilities (163-9) for the address to be displayed, requests that the indicator of the address to be displayed be advanced by one step and controls the display of the contents of said third address by the display facilities (163-0 through 163-7), the contents of said third address providing an indication of the faults observed in the source referenced during the third step;

In a fifth step, the operator, by reactivating the address progression control facilities (163-9) for the address to be displayed, requests that the indicator of the address to be displayed be advanced by one step and controls the display of the contents of said fourth address by the display facilities (163-0 through 163-7), the contents of said fourth address providing the references for the second source in an abnormal operating state; if there is no faulty second source in the power supply system, the address indicator responds to the address progression command for the fifth step by pointing to the address which corresponds to a final step, which will be described further below.

In a sixth step, the operator, by reactivating the address progression control facilities (163-9) for the address to be displayed, requests that the indicator of the address to be displayed progress by one step and orders the display of the contents of said fifth address by the display facilities (163-0 through 163-7), the contents of said fifth address providing an indication of the faults observed in the source referenced during the fifth step.

And so forth and so on during the successive odd-numbered steps, the operator will call in the references for the various faulty sources, and during the even-numbered steps the operator will cause an indication of the faults observed in the sources referenced during the previous step to appear until, proceeding in this manner, the final step has been reached.

When all of the faulty sources have been referenced and the indications of their faults have been displayed, the final step is reached, and during this final step of scanning the faulty sources, the operator, by activating the address progression control facilities (163-9) for the address to be displayed, causes the indicator of the address to be displayed to advance to a terminal address and orders the display of the contents of this terminal address by the display facilities (163-0 through 163-7), the contents of this terminal address causing another specific mode of lighting of the display facilities (163-0 through 163-7) signifying to the operator that scanning of the faulty sources has been completed and that the final step has been reached.

Another aspect of the invention provides such a process, characterized in that during the third step and subsequent odd-numbered steps, with the exception of the final step, the display facilities (163-0 through 163-7) are periodically lighted. The resulting flashing indicates to the operator that the display concerns the references for a faulty source and is not an indication of faults observed in any one source.

Another aspect of the invention provides a process consisting of the following steps:

During a first initialization step, the operator activates the facilities (163-8) for resetting the indicator of the address to be displayed so as to restore said indicator of the address to be displayed to its initial position, the successful completion of said first step being indicated by a specific lighting mode of the display facilities (163-0 to 163-7) which signifies to the operator that the indicator of the address to be displayed has been restored to its initial position.

In a second step, the operator, by activating the address progression control facilities (163-9) for the address to be displayed, requests that the first address be displayed by the display facilities (163-0 through 163-7), the contents of sid first address containing the indication of the subsystems placed in an artificial mode of operation, i.e., subsystems for which the faulty sources will not be displayed.

In a third stage, the operator, by reactivating the address progression control facilities (163-9) for the address to be displayed, requests that the indicator of the address to be displayed be advanced by one step, and orders the display of the contents of said second address by the display facilities 163-0 through 163-7), with the contents of said second address providing the references for the first source in an abnormal operating state; if no fault has been detected in the power supply system, the address indicator responds to the address progression command for said third step by pointing toward the address corresponding to the final stage described further below.

In a fourth step, the operator, by reactivating the address progression control facilities (163-9) for the address to be displayed, requests that the indicator of the address to be displayed be advanced by one step, and controls the display of the contents of said third address by the display facilities (163-0 through 163-7), with the contents of said third address providing the operating parameters of the source referenced during the third step immediately prior to the appearance of the fault.

In a fifth step, the operator, by reactivating the address progression control facilities (163-9) for the address to be displayed, requests that the indicator of the address to be displayed be advanced by one step, and orders the display of the contents of said fourth address by the display facilities (163-0 through 163-7), with the contents of said fourth address providing the indication of the faults observed in the source referenced during the third step.

In a sixth step, the operator, by reactivating the address progression control facilities (163-9) for the address to be displayed, requests that the indicator of the address to be displayed be advanced by one step, and orders the display of said fifth address by the display facilities (163-0 through 163-7), with the contents of said fifth address providing the references for the second source in an abnormal operating state; if there is no faulty second source in the power supply system, the address indicator responds to the address progression command for said sixth step by pointing toward the address corresponding to the final stage described further below.

In a seventh step, the operator, by reactivating the address control facilities (163-9) for the address to be displayed, requests that the indicator of the address to be displayed be advanced by one step, and controls the display of the contents of said sixth address by the display facilities (163-0 through 163-7), with the contents of said sixth address providing the operating parameters of the source referenced during the sixth step immediately prior to the appearance of the fault.

In an eighth step, the operator, by reactivating the address progression control facilities (163-9) for the address to be displayed, requests that the indicator of the address to be displayed be advanced by one step, and orders the display of the contents of said seventh address by the display facilities (163-0 through 163-7), with the contents of said seventh address providing the indication of the faults observed in the source referenced during the sixth step.

And so forth and so on, by successive steps the operator will, for each faulty operating source, first call in the reference of the source, then the operating parameters of the sources immediately prior to the appearance of the faults, then the indication of the faults experienced by the sources.

The final step is reached when all of the faulty sources have been thusly scanned; during said final faulty-source scanning step, the operator, by activating the address progression control facilities (163-9) for the address to be displayed, causes the indicator of the address to be displayed to jump to a terminal address and orders the contents of this terminal address to be displayed by the display facilities (163-0 through 163-7), with the contents of this terminal address causing a specific lighting mode of the display facilities (163-0 through 163-7) signifying to the operator that the faulty-source scanning operation has been completed and the final phase has been reached.

The process is further characterized in that during the third step, the sixth step, and the subsequent steps providing the faulty-source references the display facilities (163-0 through 163-7) are periodically lighted, the resulting flashing indicates to the operator that the display concerns the references for one faulty source and not the operating parameters preceding the fault nor the indication of the faults observed in any one source.

The process may also be characterized in that if the time interval separating two consecutive activations by the operator of the address progression control facilities (163-9) exceeds a specified period of time, the display facilities (163-0 through 163-7) switch away from the faulty-source scanning process in order to display the operating states of the facilities which are common to all power supply subsystems such as, for example, the slave power supply (39) and the primary power supply system (38).

The service panel (11) includes a test facility (163-8) for checking the proper operation of the facilities (160-0 through 160-7) for displaying the states of the power supply subsystems, as well as the facilities (160-0 through 163-7) for displaying the internal states.

The test facility (163-8) for checking the proper operation of the facilities (160-0 through 160-7) for displaying the states of the power supply subsystems and the facilities (163-0 through 163-7) for displaying the internal states may use some of the facilities (163-8) for restoring to its initial position the indicator of the address to be displayed by the internal-state display facilities (163-0 through 163-8).

The service panel (11) may also include maintenance facilities (164-0 through 164-9).

According to another aspect of the invention, the facilities (164-0 through 164-9) for maintaining the service panel (11) may include (OPERATION/MAINTENANCE) access-control facilities to prevent their use by uninitiated personnel.

According to another aspect of the invention, the (OPERATION/MAINTENANCE) access-control facilities may prevent access by invalidating the maintenance logic functions when said access control facilities are switched to the OPERATION operating mode.

The maintenance facilities (164-0 through 164-9) may include maintenance indicator facilities (164-0 through 164-7) through which one of the power supply subsystems may be addressed and, within this addressed power supply subsystem, one of the sources may be addressed.

The maintenance indicator facilities (164-0 through 164-9) may include function selector facilities (164-8, 164-9) in order to assign multiple maintenance functions to said maintenance indicator facilities (164-0 through 164-7).

According to another aspect of the invention, said function selector facilities (164-8, 164-9) may assign to said maintenance indicator functions (164-0 through 164-7) the function of defining, in cooperation with a sampling facility (163-9), the references for one source, the state of which is displayed on the source-state word display facilities (163-0 through 163-7).

The indicator facilities (164-0 through 164-7) may be associated with additional indicator facilities (163-8 and 163-9) to address a multiplicity of state words relating to the source which is referenced by said indicator facilities (164-0 through 164-7).

According to another aspect of the invention, said multiplicity of state words may allow the display of the state words for the referenced source which characterize the operation of said referenced source under different circumstances in a known chronological order.

The multiplicity of displayed state words may include the display of the operating state word of said source reference source immediately prior to the appearance of the last breakdown and the display of the operating state word of said source referenced immediately following the appearance of the last breakdown.

The maintenance facilities (164-0 through 164-9) may also include facilities (164-0 through 164-7) for defining the operating mode of the power supply subsystems associated with an enabling facility (163-9) to change the operating mode of the subsystems.

The facilities (164-0 through 164-7) defining the operating mode of the power supply subsystems may include additional associated facilities (163-8 and 163-9) to assign to said facilities (164-0 through 164-7) defining the operating mode of the power supply subsystems the capability of defining, for each power supply subsystem, a mode of operation selected from a multiplicity of modes of operation, said selection being made by means of additional associated facilities (163-8 and 163-9).

The multiplicity of said modes of operation selected by said additional associated facilities (163-8 and 163-9) may include a mode of operation, called the local mode of operation, in which the monitor (11) disregards faults occurring in the sources belonging to power supply subsystems which have been switched to the local mode.

The power supply system may include a facility (161-4) for resetting the major fault storage devices as well as the storage devices for the minor faults occurring in power supply subsystems switched to the local mode, this being done exclusively for these subsystems.

The reset facility (161-4) may be the same facility as the power supply start-up facility (161-4).

The local mode may only exist if the power supply system is switched to the maintenance mode by the OPERATION/MAINTENANCE access-control facilities.

The OPERATION/MAINTENANCE access-control facilities from the maintenance position to the operating position may permanently erase the local modes of the power supply subsystems.

The multiplicity of said modes of operation selected by said additional associated facilities (163-8 and 163-9), may include a mode of operation called the inhibit mode, also called the invalidation mode of operation, in which the source circuits operate normally except for the power circuits which are inhibited and thus do not deliver any power.

Only the power supply subsystems which have been previously switched to the local mode may have their mode of operation switched to or out of the inhibit mode.

The subsystems switched to the inhibit mode may remain in this mode of operation even if the OPERATION/MAINTENANCE access-control facilities leave the maintenance position and are switched to the operating position, which means that the power supply system could operate with subsystems which do not deliver any power.

According to another aspect of the invention, the power supply system includes facilities to initiate operation in the local mode.

According to another aspect of the invention, the operator console (48) may be connected to the operation interface unit (74) by a link (43) called the intersystem power supply link (SPCI), which includes two separate links:
a link (187) called the input link (SPCI-IN), which carries, among other signals, all the signals transmitted from the operator console (48) to the operation interface unit (74); and
a link (193) called the output link (SPCI-OUT), which carries, among other signals, all the signals transmitted from the operation interface unit (74) to the operator console (48).

The power supply systems are preferably connected in series and constitute a chain extending from the operator console (48) through the link called the output link (187) to the operation interface unit of the first power supply system, continuing from the operation interface unit (74) of the first power supply system through the intersystem power supply link (188) to the operation interface unit (179) of the second power supply system, continuing from the operation interface unit (179) of the second power supply system through the intersystem link (189) to the operation interface unit (181) of the third power supply system, and continuing in the same manner until the operation interface unit (185) of the last power supply system in the chain is reached, finally completing the loop by connecting the operation interface unit (185) of the last power supply system through the link called the output link (192) back to the operator console (48).

According to another aspect of the invention, the link called the input link (187) may comprise:
a start-up request link carrying a stored signal (LØGØN) signifying that the operator has requested a power supply system start-up sequence from the console (48);
a shutdown request link carrying a stored signal (LØGØFF) signifying that the operator has requested a power supply system shutdown sequence from the console (48);
an input synchronization link carrying a synchronization signal (ENI) signifying to the operation interface unit (74) that the monitor (10) is required to respond to the start-up request if the corresponding signal (LØGØN) is active, or respond to the shutdown request if the corresponding signal (LØGØFF) is active.

According to another aspect of the invention, the link called the output link (193) comprises:
link checking the receipt of the start-up request carrying the stored start-up request signal (LØGØN) after passing through the operation interface unit (74);
a link for checking the receipt of the shutdown request carrying the stored shutdown request signal (LØGØFF) after passing through the operation interface unit (74); and
an end-of-sequence link carrying a synchronization signal (ENØSEQC) signifying that the monitor (10) has completed the execution of the sequence requested by the operator.

According to another aspect of the invention, the link called the input link (187) comprises:
- a start-up request link carrying a stored signal (LØGØN) signifying that the operator has requested from the console (48) a power supply system start-up sequence;
- a shut-down request link carrying a stored (LØGØFF) signal signifying that the operator has requested from the console (48) a power supply system shut-down sequence; and
- an input synchronization link carrying a synchronization signal (ENI) signifying to the operation interface unit (74) that the monitor (10) is required to respond to the start-up request if the corresponding signal (LØGØN) signal is active, or respond to the shut-down request if the corresponding shut-down signal (LØGØFF) is active.

According to another aspect of the invention, the link called the output link (193) comprises:
- a link for checking the receipt of the start-up request carrying the stored start-up request signal (LØGØN) after it has passed through the operation interface unit (74);
- a link for checking the receipt of the shut-down request carrying the stored shut-down request signal (LØGØFF) after it has passed through the operation interface unit (74); and
- an end-of-sequence link carrying a synchronization signal (ENØ/SEQC), signifying that the monitor (10) has completed the execution of the sequence requested by the operator.

According to another aspect of the invention, the intersystem links (188, 189, 190, 191) each comprise:
- a link for checking the propagation of the start-up request carrying the stored (LØGØN) signal, after it has passed through the operation interface unit of the preceding power supply system, to the input of the operation interface unit of the following power supply system;
- a link for checking the propagation of the shut-down request carrying the stored (LØGØFF) signal, after it has passed through the operation interface unit of the preceding power supply system to the input of the operation interface unit of the following power supply system; and
- a sequence control link to transmit the end-of-sequence signal (ENØ) of the preceding power supply system to the input of the operation interface unit of the following power supply system where it constitutes the synchronization signal (ENI) of the start of the sequence of said following power supply system or the end-of-sequence signal (SEQC), if the preceding power supply system was the last system.

Another aspect of the invention provides a process for operating a power supply system, characterized in that the start-up operation sequence is as follows:

at instant t1 and during a time interval θ1, the operator requests a start-up sequence by sending a signal (201-1) (PØWER ØN) through the console (48) circuits;

at instant t2, the console (48), in response to the signal (202-1) (PØWER ØN), causes the power supply system start-up request signal (201) (LØGØN) to go up and the power supply system shutdown request signal (201-1) (LØGØFF) to come down;

after a time interval θ2, at instant t3, the console (48) transmits a synchronization signal (204-1) (ENI) during a time interval θ3 over the input synchronization link to the operation interface unit (74) of the power supply system;

at instant t4, the monitor (10), alerted by the operation interface unit (74) of the power supply system, initiates the power supply system start-upprocess; and after a time interval θ4 required to complete the start-up process, at instant t5, the power supply system indicates the completion of the start-up sequence by sending an end-of-sequence signal (205-1) (ENØ or SEQC) to the console (48) circuits.

The shutdown operation sequence may be as follows:

at instant t11, the operator requests a shutdown sequence by sending a signal (203-1) (PØWER ØFF) through the console (48) circuits;

at instant t12, the console (48), in response to the signal (203-1) (PØWER ØFF), causes the power supply system start-up request signal (200-2) (LØGØN) to comedown and the shutdown request signal (201-2) (LØGØFF) to go up;

after a time interval, at instant t13, the console (48) transmits a synchronization signal (204-2) (ENI) over the input synchronization link to the power supply system operation interface unit (74);

at instant t14, the monitor (10), alerted by the power supply system operation interface unit (74), starts the power supply system shutdown process; and upon completion of the shutdown process, at instant t15, the power supply system indicates said completion of the shutdown process by sending an end-of-sequence signal (205-2)(ENØ or SEQC) to the console (48) circuits.

The startup operation sequence may be as follows:

at instant T1 and during a time interval θ1, the operator requests a start-up sequence by sending a signal (201-1) (PØWER ØN) through the console (48) circuits;

at instant t2, the console (48), in response to the signal (202-1) (PØWER ØN) signal, causes the complex-power-supply system start-up request signal (200-1) (LØGØN) t0 go up and the complex-power-supply system shutdown request to come down;

after a time interval θ2, at instant t3, the console (48) transmits during a time interval θ3 a synchronization signal (204-1) (ENI) over the input synchronization link to the operation interface unit (74) of the power supply system in the chain;

at instant t4, the monitor (10) of the first operating system, alerted by its operation interface unit (74), initiates the start-up process for the first power supply system in the chain;

after a time interval θ4 required for the completion of its start-up process at instant t5, the first power supply system indicates to the second power supply system that it can now initiate the start-up process by sending an end-of-sequence (205-1) (ENØ) signal to the operation interface unit (179) of the second power supply system, said end-of-sequence signal (205-1) (ENØ) for the first system being interpreted by the operation interface unit (179) of the second power supply system as a synchronization signal (206-1) (ENI).

this interpreted signal (206-1) (ENI) enables the operation interface unit (179) of the second power supply system to request the monitor to initiate the start-up process;

upon completion of the start-up process, the second power supply system advises the third power supply system by sending an end-of-sequence signal (207-1)

(ENØ) to the operation interface unit (181) of said third power supply system;

the operation interface unit (181), in turn, interprets this end-of-sequence signal (207-1) (ENØ) as a synchronization signal (208-1) (ENI), said interpreted signal causing the third power supply system to be started up, and so on until the last power supply system in the chain is reached;

when the last power supply system in the chain has completed its start-up process, which also means that all power supply systems have terminated their start-up sequences, said last power supply system sends a general end-of-sequence signal (209-1) (ENØ/SEQC) to the circuits in the console (48) which is thus advised of the successful completion of the start-up process.

The shutdown operations may be as follows:

at instant t11, the operator requests a shutdown sequence by sending a signal (203-1) (PØWER ØFF) through the console (48) circuits;

at instant t12, the console (48), in response to the signal (203-1) (PØWER ØFF), causes the complex-power-supply system start-up request signal (200-2) (LØGØN) to come down and the shutdown request signal (201-2) (LØGØFF) to go up;

after a safeguarding period, at instant t13, the console (48) transmits a synchronization signal (204-2) (ENI) through the input synchronization link to the operation interface unit (74) of the first power supply system in the chain;

at instant t14, the monitor (10) of the first power supply system, alerted by its operation interface unit (74), initiates the shutdown process for the first power supply system;

upon completion of its shutdown process, at instant t15, the first power supply system advises the second power supply system that it can now initiate its shutdown process by sending an end-of-sequence signal (205-2) (ENØ) to the operation interface unit (179) of the second power supply system, said end-of-sequence signal (205-2) (ENØ) of the first power supply system being interpreted by the operation interface unit (179) of the second power supply system as a synchronization signal (206-2) (ENI);

said interpreted signal (206-2) (ENI) enables the operation interface unit (179) of the second power supply system to request the monitor to initiate the shutdown process;

upon completion of the shutdown process, the second power supply system so advises the third power supply system by sending an end-of-sequence signal (207-2) (ENØ) to the operation interface unit (181) of said third power supply system;

the operation interface unit (181), in turn, interprets said end-of-sequence signal (207-2) (ENØ) as a synchronization signal (208-2) (ENI); said interpreted signal causes the third power supply system to be shut down; and so on and so forth until the last power supply system in the chain is reached; and when the last power supply system in the chain has completed its shutdown process, which also means that all power supply systems have completed their shutdown sequences, it sends a general end-of-sequence signal (209-2) (ENØ-SEQC) to the circuits in the console (48), which is thus advised of the successful completion of the shutdown process.

According to another aspect of the invention, the operation interface unit (74) may have facilities (235 and 236) for selecting and routing operation signals in order to select, upon receiving a command from the monitor (10), some of said operation signals (BPC-IN, PIN, CØNSØLE, ALIM. PRIM) emitted by the operation control and checking facilities (9, 11, 18, 48) and to transmit said selected operation signals to the monitor (10) through the control bus (12).

The power supply system may include addressable storage facilities (238, 239, 240, 241, 242) to store the control and check signals transmitted by the monitor (10) to the power supply system operation control and check facilities (9, 11,18, 48), said addressable storage facilities (238, 239, 240, 241, 242) having their inputs connected to the control bus (12).

The power supply system may have internal signal relooping facilities (235, 236) for the control and check signals (CMD1, CMD2, PØUT) stored in the storage facilities (238, 239, 240, 241, 242) in order to select, upon receiving a command from the monitor (10), some of said control and check signals (CMD1, CMD2, PØUT) and transmit said selected control and check signals (CMD1, CMD2, PØUT) to the monitor (10) through the control bus (12).

The facilities for selecting and routing operation signals of the operation interface module (74) may include:

an interface block (235) to match and/or connect the control and check signals (BPC-IN, PIN, CØNSØLE, ALIM. PRIM) received from the operating devices (9, 18, 11, 48) with the multiplexer-block (236) input circuits; a multiplexer block (236) to select some of the signals applied to its inputs and to transmit said selected signals over the control bus (12) to which it is connected through its outputs, said multiplexer block (236) being addressed by address lines (PMC ADR09, PMC ADR10, PMC ADR15), and the selection criteria being defined by selection lines (PMC ADR00-PMC ADR02), said address lines and said selection lines belonging to the control bus (12).

The selection and routing facilities of the operation interface unit (74) may include:

an interface block (235) to match and/or connect the internal relooping signals (REG) received from the operation interface unit (74) circuits proper with the multiplexer block (236) input circuits;

a multiplexer block (236) to select some of the signals applied to its inputs and to transmit said selected signals over the control bus (12) to which it is connected through its outputs, said multiplexer block (236) being addressed by addres lines (PMC ADR09, PMC ADR10, PMC ADR15) and the selection criteria being defined by selection lines (PMC ADR-00-PMC ADR12), said address lines and said selection lines belonging to the control bus (12).

According to another aspect of the invention, the addressable storage facilities (238, 239, 240, 241, 242) for the control and check signals include:

a plurality of operation command storage registers (238, 239, 240, 241, 242) to store the operation commands (REG) to be transmitted to the operating devices (9, 18, 11, 48), the inputs of said operation command storage registers (238, 239, 240, 241, 242) being connected in parallel over the control bus (12), and the contents of said control bus (12) being transferred in response to a command from the monitor to one of the operation command storage registers (238, 239, 240, 241, 242) previously addressed by means of address lines [PMC ADR(00, 02, 09, 10, 15)], the transfer of the contents of the control bus (12) being itself sampled by means of a control line (PMC-MEMW), the outputs of said operation command storage registers (238, 239, 240, 241, 242) being connected to the inputs of the control circuits (243, 244, 245, 246, 247) of the operating devices (9, 8, 11, 48);

a plurality of control circuits (243, 244, 245, 247) for the operating devices (9, 11, 18, 48) to match the commands received from the operation control storage registers (238, 239, 240, 241, 242) with the operating-device control lines (CMD1, CMD2, PØUT).

The operation interface unit (74) may include:

facilities (248) for processing power system opeation state change requests in order to generate, in response to requests (PREGØV, PREGUV, LØGØN, LØGØFF, ENI, CØØLF1, CØØLF2, CØØLF3, CØMREL) transmitted by the operating devices (9, 11, 18, 48), interrupt signals (MCRINT*, INTR1-,,INTR2,,INTR5, INTR) transmitted over the interrupt request lines from the control bus (12) to the monitor (10).

Each downstream interface unit (51-1, 51-2, 56-1, 56-2, 61-1, 61-2, 66-1, 66-2) may include facilities (350 and 358) for selecting and routing downstream interface signals in order to select, upon receiving a command from the monitor (10), certain downstream interface signals among those (DIN, REG ET) which are transmitted by the control and check facilities (AM908 modules) (52 through 65, 67, 68) and transmit said selected signals to the monitor (10) through the control bus (12).

Each downstream interface unit (51-1, 51-2, 56-1, 56-2, 61-1, 61-2, 66-1, 66-2) may have addressable facilities (360, 361, 362, 363, 364, 365) for calling into memory source control and check signals (ISM1, ISM2) so as to store the control and check signals sent by the monitor (10) to the devices powered by the sources, the inputs of said facilities (360, 361, 363, 364) being connected to the control bus (12).

Each downstream interface unit (51-1, 51-2, 56-1, 56-2, 61-1, 61-2, 66-1, 66-2) may have addressable facilities (263, 265) for calling into memory the signals to control and check the devices powered by the sources so as to store the control and check signals sent by the monitor (10) to the devices powered by the sources, the inputs of said facilities (362, 365) being connected over the control bus (12).

The selection and routing facilities of each downstream interface unit (51-1, 51-2, 56-1, 56-2, 61-1, 61-2, 66-1, 66-2) may include:

an input interface block (350) to match and/or connect the (D IN) signals received from the facilities (intermediate modules AM908), [(52, 53) or (54, 55) or (57, 58) or (59, 60) or (62, 63) or (64, 65) or (67) or (68)] for controlling and checking the sources with the multiplexer block (358) inputs;

a multiplexer block (358) to select certain signals applied to its inputs and to transmit said selected signals over the control bus (12) to which it is connected, said multiplexer block (358) being addressed and the signal selection criteria being defined by the monitor (10) through address lines [PCM ADR (00, 01, 08, 15)].

The selection and routing facilities of each downstream interface unit (51-1, 51-2, 56-1, 56-2, 61-1, 61-2, 66-1, 66-2) may include:

an input interface block (350) to match and/or connect the (REG. ET) loopback signals received from the command storage registers (360, 361, 362) with the multiplexer block (358) inputs;

a multiplexer block (358) to select certain signals applied to its inputs and to transmit said selected signals over the control bus (12) to which it is connected, said multiplexer block (358) being addressed and the signal selection criteria being defined by the monitor (10) through address lines [PCM ADR (00, 01, 08, 15)].

The addressable source control and check signal (ISM1, ISM2) storage facilities may include:

a plurality of service command storage registers (360, 361) to store the commands (REG ET) to be transmitted to the sources, the input of each command register (360, 361, 362) being connected in parallel over the control bus (12), the contents of said control bus (12) being transferred as a result of a command from the monitor (10) to one of the command storage registers (360, 361) which has been previously addressed through address lines [PMC ADR (00, 01, 08, 15)], the transfer of the control bus (12) contents being itself sampled through a control line (PMC MEMW), the outputs of said command storage registers (360, 361, 362) being connected to the inputs of the control circuits (363, 364);

a plurality of control circuits (363, 364, 365) to match the commands received from the command storage registers (360, 361, 362) with the source control lines (ISM1, ISM2).

The addressable facilities for calling into memory the control and check signals (LSSCI) of the devices powered by the sources may comprise:

a plurality of service command storage registers (362) to store the commands (REG ET) to be transmitted to the devices powered by the sources, the inputs of said command registers (360, 361, 362) being connected in parallel over the control bus (12) and the contents of said control bus (12) being transferred as a result of a command from the monitor (10) to one of the command storage registers (362) which had been previously addressed by means of address lines [PMC ADR (00, 01, 08, 15)], the transfer of the contents of the control bus (12) being itself sampled by means of a control line (PMC MEMW), the outputs of said command storage registers (300, 361, 362) being connected to the control circuit (363, 364) inputs;

a plurality of control circuits (364) to match the commands received from the command storage registers (360, 361, 362) with the control lines of the devices powered by the sources (LSSC1).

Each downstream interface unit (51-1, 51-2, 56-1, 56-2, 61-1, 61-2) may include facilities (367) for processing breakdown-triggered stop requests so as to generate via breakdown signals (GFLT, PMVLT) sent out by the sources or by the devices powered by the sources, interrupt signals (INTR*, PMW INTR, GFLT, PMVLT, DDR (01-03) transmitted through the control bus (12) interrupt request lines to the monitor (10).

According to another aspect of the invention, the control unit (75) may include:

a microprocessor (451) with its clock circuit, said microprocessor (451) including an (INTERRUPT) request input (451-1) connected to a request processing block (450) and three outputs (451-2, 451-3, 451-4); a first control and check signal output (451-2) connected to an internal control and check bus (473), a second output (451-3) connected to an internal address bus (464), a third output (451-4) connected to an internal data bus (462);

an internal control and check bus (473) to carry the internal control and check signals (HLDA, REST, WR*, CSIØ, RD*, INTA*, DBS0, DBS1, ALE), as well as the clock signals (SCLK);

an internal address bus (464) to carry the internal addressing signals [TA (08-15)];

an internal data bus (462) to carry the internal data signals [IDB (00-07)];

a request processing block (450) to receive the internal requests (PMC-TØUT1, PMC-TØUT2) and external requests (BPC-REST-IN, BPC-INTR4*; BPC-INTR5*) and to convert them into interrupt requests (REST-IN-10, INTR4, INTR5, INTR0, INTR6), said request processing block (45) receiving the internal requests at its input (450-1) and the external requests at its input/output (450-3) and tansmitting the interrupt signals at its output (450-2) and at its input/output (450-3);

an internal control and check signal processing block (452) to process via said internal control and check signals, signals for the peripheral units (453, 454, 455, 456, 460) placed under the control of the microprocessor (451), said control and check signal processing block (452) including an input (452-1) at which it receives the internal control and check signals, and two outputs (452-2) and (452-3) to which it applies the command signals to said peripheral units;

a data-address routing block (453) to enable the temporary use of the internal data bus (469) to transmit the light loads of the address which the microprocessor (451) wishes to call: this data-address routing block (453) receives From the command processing block output (452-3):

an internal command bus (465) to carry the internal commands to the control unit (75), this internal command bus (465) powered from the output (452-2) of the command processing block (452);

a bus (467) for addresses internal to the control unit (75); this bus (465) is powered via the output (453-3) of the data address routing block (453).

a block preselector (455) to preselect, upon receiving a command from the microprocessor (451), a block from which the microprocessor is requesting a service; this preselector has its input (455-3) connected to the internal address bus (465), its input (455-1) connected to the internal command bus (465) and its output (455-2) connected to the block preselection bus (468);

a block preselection bus (465) to carry the block preselection signals;

a storage block (454) to call into memory the data and certain power supply system operating parameters; this storage block (454) has its input (454-1) connected to the internal command bus (465), its input (454-2) connected to the block preselection bus (468), its input (454-4) to the internal address bus (467) and its output (454-3) to the internal data bus (462).

a second level control block (456) to process the commands to be transmitted to the circuits powered by the power supply system sources; this second level command block (456) has its input (456-1) connected to the block preselection bus (468), its input (456-2) connected to the internal command bus (465) and its output (456-3) connected to the lines (471) for transmitting commands to the circuits powered by the sources;

a first level command block (458) to process the commands to be transmitted to the sources; this first level command block (458) has its input (458-1) connected to the internal command bus (465) and its output (465-2) connected to the lines (465) for transmitting commands to the sources;

an external address buffer-register (459) to call into memory the addressing signals sent by the microprocessor (451) to the peripheral units; the address buffer-register (459) has its input (459-1) connected to the internal address bus (467) and its output (459-2) connected to the external address bus (459);

a device (460) for checking the direction of the data transfer process to route the data either from the external units to the microprocessor (451) in the case of input data, or from the microprocessor (451) to the external units in the case of output data, this device (460) for checking the direction of the data transfer process has its input/output (460-1) connected to the internal data bus (462), its input/output (460-3) connected to the external data bus (472), and its input (460-2) connected to the internal command bus (465);

The time-base block (457) may include several counter circuits, the initial contents of which are loaded by the microprocessor (451) and the counting process of which is commanded by a clock signal sent out by the microprocessor (451); when each counter passes through zero, it sends out a request signal (PMCTØUT1, PMCTØUT2) to signal to the microprocessor (451) that its contents are equal to zero; the time base block (457) has its input (457-1) connected to the internal command bus (465), its input/output (457-2) connected to the internal address bus (467), and its input (457-3) connected to the internal data bus (462).

The configuration definition unit (76) may include a read-only-memory-type unalterable storage facility (512) to hold all the parameters required by the monitor (10) to know the addresses and characteristics of the power supply subsystems as well as the corresponding source definitions; this storage facility receives at its inputs (512-1 and 512-3) the address signals (PMC-ADR) applied to the external address bus, the read command signal at its input (512-4) and at its output (512-2), it transmits the read command signals over the external data bus (472).

The invention also provides data processing systems, complex or analog systems equipped with a power supply system in accordance with the invention.

Other objects, features and advantages of this invention will be more clearly apparent from the description given below, with reference to the accompanying drawings, which represent a preferred embodiment of this invention.

BRIEF DESCRIPTION OF THE DRAWINGS

FIG. 1 comprising FIGS. 1a–1c; is a block diagram of a power supply device for a data processing system in accordance with the teachings of the invention.

FIG. 2 comprising FIGS. 2a–2c is another representation of the power supply device illustrated in FIG. 1. Only the control and check signals are represented in this figure.

FIG. 3 comprising FIGS. 3a–3b is a block diagram of the POWER MODULE of FIG. 2.

FIG. 4 comprising FIGS. 4a–4b is a block diagram of another POWER MODULE of FIG. 2.

FIG. 5 comprising FIGS. 5a–5b is a block diagram of another POWER MODULE of FIG. 2.

FIG. 8 comprising FIGS. 8a-8c is a block diagram of the FUNCTIONAL CIRCUIT BOARD connector circuits with a CONTROL BUS (12) as well as PERIPHERAL LINK CABLES.

FIG. 14 comprising

FIG. 23 comprising

FIG. 24 comprising

FIG. 26 is a table showing the mapping between the references assigned to the signals in the SERVICE PANEL (11) block diagram, and the references assigned to those same signals in the AM 904 OPERATION INTERFACE UNIT block diagram.

FIG. 27 shows the various signals carried by the SPCI-IN and SPCI-∅UT links of FIG. 13.

FIG. 28 shows the various signals carried by the (229) and (230) links of FIG. 13.

FIG. 29 contains a table defining the signals which are directly exchanged through the CONTROL BUS between the POWER SOURCES and the AM 904 OPERATION INTERFACE UNIT.

FIG. 30 is a table defining for each Z01 connector on the AM 904 OPERATION INTERFACE UNIT, the logic designation(s) of the signal which is received by that connector.

FIG. 31 is a table defining for each pin in connector Z02 of the AM 904 OPERATION INTERFACE UNIT the logic designation(s) of the signal which reaches it.

FIG. 32 is a block diagram of an AM 903 DOWNSTREAM INTERFACE UNIT of FIG. 2.

FIG. 33 comprising FIGS. 33a-33b is a block diagram of a half AM 903 DOWNSTREAM INTERFACE UNIT.

FIG. 34 comprising

FIG. 35 comprising FIGS. 35a-35b is a detailed illustration of the output circuits of the half AM 903 DOWNSTREAM INTERFACE UNIT illustrated in FIG. 33.

FIG. 37 is a table defining the signals carried in the ISM1 interface of an AM 903 DOWNSTREAM INTERFACE UNIT.

FIG. 38 is a table defining the signals carried in the ISM2 interface of an AM 903 DOWNSTREAM INTERFACE UNIT.

FIG. 39 is a table defining the signals carried in the LSSCI interface of an AM 903 DOWNSTREAM INTERFACE UNIT.

FIG. 40 is a table defining the interface signals exchanged through connector Z01 between an AM 903 DOWNSTREAM INTERFACE UNIT and the CONTROL BUS.

FIG. 41 is a table defining the interface signals exchanged through connector Z02 between an AM 902 DOWNSTREAM INTERFACE UNIT and the CONTROL BUS.

FIG. 43 contains a table defining the position, within the rack, of the operational circuit boards supporting the downstream interface units. This table also defines the connection mode of the input signals on pins Z01 and Z02 of the AM 903 downstream interface units.

FIG. 48 is a table defining the AM 902 B control module logic signals connected to the control bus through connector Z01.

FIG. 49 is a table defining the AM 902 B control module logic signals connected to the control bus through connector Z02.

FIG. 51 is a table defining the AM 927 configuration module logic signals connected to the control bus through connector Z02.

FIGS. 52 and 53 contain tables defining the interconnection of the power supply system CONTROL BUS (12) wires.

DESCRIPTION OF THE PREFERRED EMBODIMENT

Figure 2B:
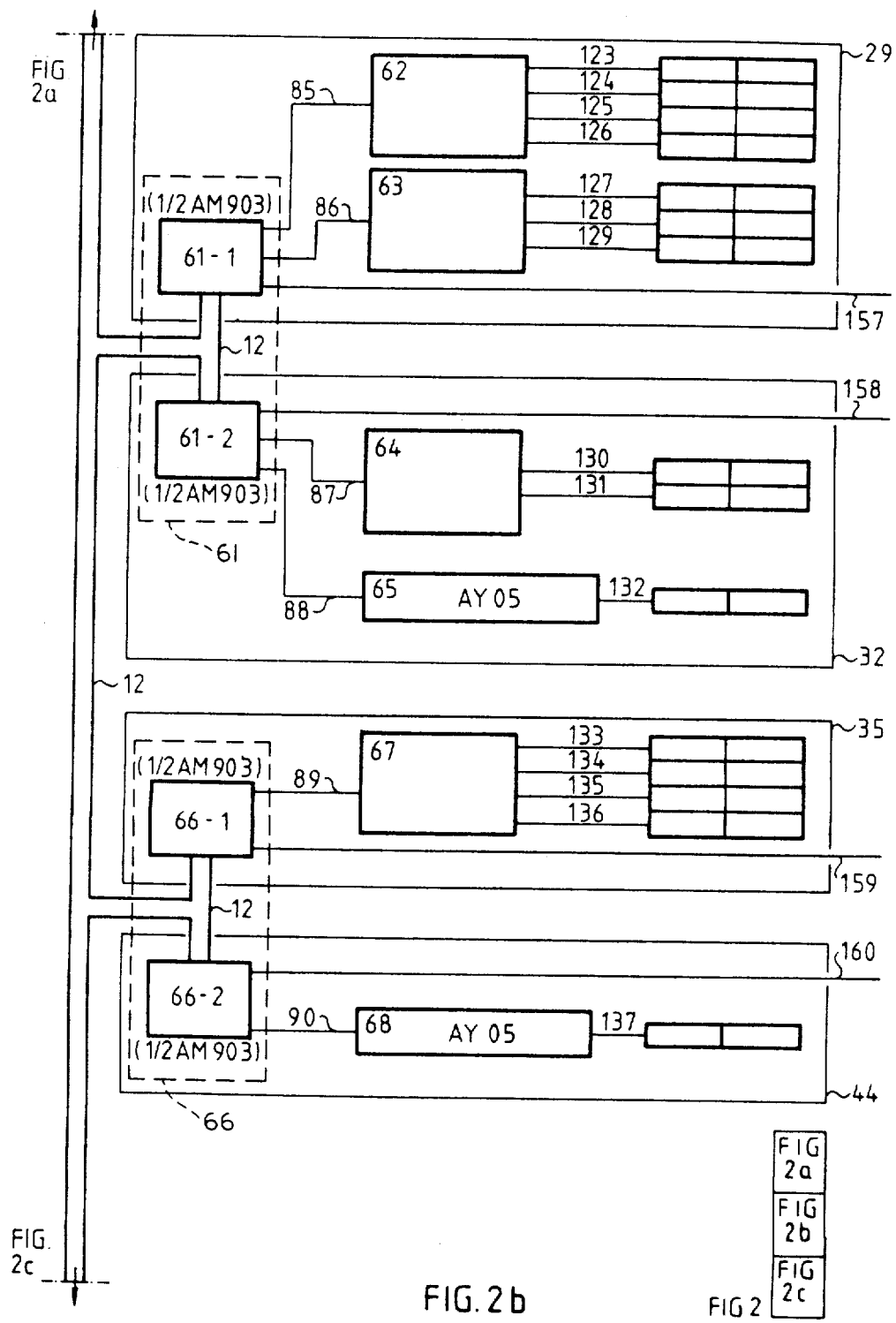

As mentioned above, the data processing system power supply source control and monitoring functions were previously provided by a group of hardwired logic circuits. These hardwired logic circuits are often designated in the trade by the term "GENERAL CIRCUITRY".

In accordance with this invention, the "GENERAL CIRCUITS" are replaced by a certain number of ADDRESSABLE OPERATIONAL MODULES controlled by one or several CONTROL MICROPROCESSORS. These ADDRESSABLE OPERATIONAL MODULES are connected to the CONTROL MICROPROCESSORS through a BUS SYSTEM. Thus, the CONTROL MICROPROCESSORS are capable of sending commands to be executed to the ADDRESSABLE FUNCTIONAL MODULES, and of receiving reports from the ADDRESSABLE FUNCTIONAL MODULES. To illustrate this invention, one specific application will be described, i.e., the CONTROL OF ENERGY SOURCES IN A DATA PROCESSING SYSTEM. However, as will be appreciated, this is illustrative of only one utility of the invention.

A data processing system generally consists of various functional subsystems. As mentioned above, the start-up, operation maintenance and shutdown processes for complex machines, such as data processing systems, present significant control and check problems, and these control and check problems are typically resolved by means of a group of electrical circuits often designated by the term "GENERAL CIRCUITRY". This GENERAL CIRCUITRY consists of specialized electrical circuits, the operation of which is often timed by a clock device. Due to their specialized nature, these electrical circuits cannot be readily modified, and it can be said that the "GENERAL CIRCUITRY" obtained by these means is of a quasi-immutable nature.

In this invention, the "GENERAL CIRCUITRY" functions are obtained by means of a certain number of ADDRESSABLE FUNCTIONAL MODULES controlled by one or several CENTRAL PROCESSORS. These addressable FUNCTIONAL MODULES are connected to the CENTRAL PROCESSORS through a BUS SYSTEM. Thus, the CENTRAL PROCESSORS are capable of:

sending commands to be executed to the ADDRESSABLE FUNCTIONAL MODULES, and receiving reports from the ADDRESSABLE FUNCTIONAL MODULES.

The functional subsystems of a data processing system may generally comprise one or more processing units designated by the term "Central Processing Unit", one or more storage units designated by the term "Main Memory", one or more data inputs and outputs designated by the term "Exchanger Unit" or, occasionally, "Input/Output Controller", a certain number of peripheral device control and check units designated by the term "Peripheral Couplers", and facilities for operation and maintenance such as the operation console and the maintenance console.

All these subsystems require POWER SOURCES in order to operate. These POWER SOURCES are generally distributed throughout a certain number of POWER SUPPLY MODULES. As will be seen below, this distribution is not done on a random basis, but is designed to meet certain PROPER OPERATING CRITERIA for the data processing system during its various phases of operation. In addition, these proper operation criteria often lead to having one or more POWER SUPPLY MODULES or UNITS associated with each FUNCTIONAL SUBSYSTEM.

A second consequence of these proper operation criteria is the requirement that an order of priority be followed among the various FUNCTIONAL SUBSYSTEMS during the start-up and shutdown operations.

Another consequence of these proper operating criteria is the requirement for virtually continuous monitoring of the OPERATING CONDITIONS of the various POWER SUPPLIES. This monitoring should facilitate fault prevention, as well as the diagnostic function test and fault finding.

All these points will be covered in detail in subsequent paragraphs.

For the time being, the only point which needs to be kept in mind from what has just been discussed is that each POWER SUPPLY MODULE is capable of controlling and checking a cluster of associated power supplies.

Each POWER SUPPLY MODULE is assigned an order of priority in relation to the other power supply modules. This is true for each one of its phases of operation. This order of priority will be designated as the order of modular priority. It should be noted that, for instance, this order of modular priority may differ for the start-up and shutdown phases.

All the requirements for meeting these OPERATING CRITERIA must be met through the COMMANDS transmitted to the POWER SUPPLY MODULES.

In accordance with the invention, the COMMANDS are transmitted by a POWER SOURCE CONTROL MONITOR. This POWER SOURCE CONTROL MONITOR will hereinafter be designated as the MONITOR. The MONITOR consists of a PROCESSOR associated with:

unalterable ROM storage circuits;

RAM storage circuits;

interface circuits; and timing and synchronization circuits.

Operation and maintenance personnel may access the MONITOR through:

a service panel, or a link with the data processing system operator console.

All these circuits, the service panel, as well as the link to the console, will be covered in subsequent paragraphs.

FIGS. 1a-1c a block diagram of the power supply system for a data processing system designed in accordance with the teachings of this invention. These figures only show the data processing system power supply circuits. As shown, the data processing system may include 8 data processing operational units, i.e., units (1), (2), (3), (4), (5), (6), (7), (8) and one control unit (41) for the power supply modules.

Unit (1) includes a control and checks console (48) connected to its power unit (17) by a cable (19);

Unit (2) includes a Central Unit (21) connected to its power unit (20) by a cable (22);

Unit (3) includes a main memory (24) connected to its power unit (23) by a cable (25);

Unit (4) includes an Input/Output Exchanger (27), also called the Exchanger Unit, connected to its power unit (26) by a cable (28);

Unit (5) includes a Disc Unit Coupler connected to its power unit (29) by a cable (31);

Unit (6) includes a Magnetic Tape Transport Unit Coupler (33) connected to its power unit (32) by a cable (34);

Unit (7) includes a slow Peripheral and Teleprocessing Coupler (36) connected to its power unit (35) by a cable (37);

Unit (8) includes a Magnetic Disc Coupler (45) connected to its power unit (44) by a cable (46).

These eight operational units (1), (2), (3), (4), (5), (6), (7), (8) are data processing system subsystems. These subsystems are treated as separate units by the power unit control system. In the subsequent paragraphs, they will be called: DATA PROCESSING LOGIC SUBSYSTEMS. The corresponding eight power units (17), (20), (23), (26), (27), (32), (35), (44) will be called, respectively, POWER SUPPLY SUBSYSTEM 0, POWER SUPPLY SUBSYSTEM 1, POWER SUPPLY SUBSYSTEM 2, POWER SUPPLY SUBSYSTEM 3, POWER SUPPLY SUBSYSTEM 4, POWER SUPPLY SUBSYSTEM 5, POWER SUPPLY SUBSYSTEM 6, POWER SUPPLY SUBSYSTEM 7.

The control unit (41) for the power supply modules includes:
a monitor (10);
a service panel (11);
a slave power supply (9);
a primary power supply (18), which includes:
   the primary power supply proper which provides a preset voltage over the power bus;
   the cooling devices for the data processing system;
   the devices to control and start up the primary power supply, and the cooling devices;
   the devices for supervising the primary power supply and the cooling devices;
a general isolating switch (15).

The monitor (10) is connected as follows:
through cable (40) to the service panel (11),
through cable (39) to the slave power supply (9),
through the control bus (12) to units (1), (2), (3), (4), (5), (6), (7), and (8), and
through cable (38) to the primary power supply (18).

The primary power supply (18) is connected as follows:
through cable (38) to the monitor (10),
through cable (14) to a general isolating switch (15), and
through the power bus (13) to units (1), (2), (3), (4), (5), (6), (7) and (8).

The general isolating switch (15) is connected as follows:
through cable (16) to a network,
through cable (14) to the primary supply (18) and a cable (42) to the slave power supply (9).

The service panel (11) is connected to the monitor (10) through cable (40).

The figures also show the control and check command console (48). This command console (48) is connected to the monitor (10) through a cable (43).

The operation of such a power supply system is as follows: When the user wishes to turn on the power supply system, the first operation to be done is the manual closing of the general isolating switch (15). The closing of this general isolating switch (15) connects cable (14) which is connected, on the one hand, to the primary power supply (18) and to the slave power supply (9) slave power supply.

The slave power supply (9) is directly connected to the cable (14) and connecting that cable (14) to cable (16) causes the slave power supply (9) to turn on. This turning on of the slave power supply (9) supplies power to the monitor (10) and puts the monitor (10) into operation. However, a switch (not illustrated) is located at the input of the primary and slave power supplies and these primary and slave power supplies will only be turned on by a command from the monitor (10).

The primary power supply (18) will therefore only provide power to the power bus (13) upon receiving a command from the monitor (10). The primary power supply (18) is driven by the monitor (10) through cable (38) carrying both the monitor (10) control commands and the primary supply operation state reports.

When the slave power supply (9) has been turned on, it provides the slave with the power it needs to operate.

As will be explained in subsequent paragraphs, upon the monitor (10) being turned on, it will generate commands and receive status reports through cables (38), (39), (40), and on the control bus (12), and it will assume control of the power supply system.

Figure 2C:
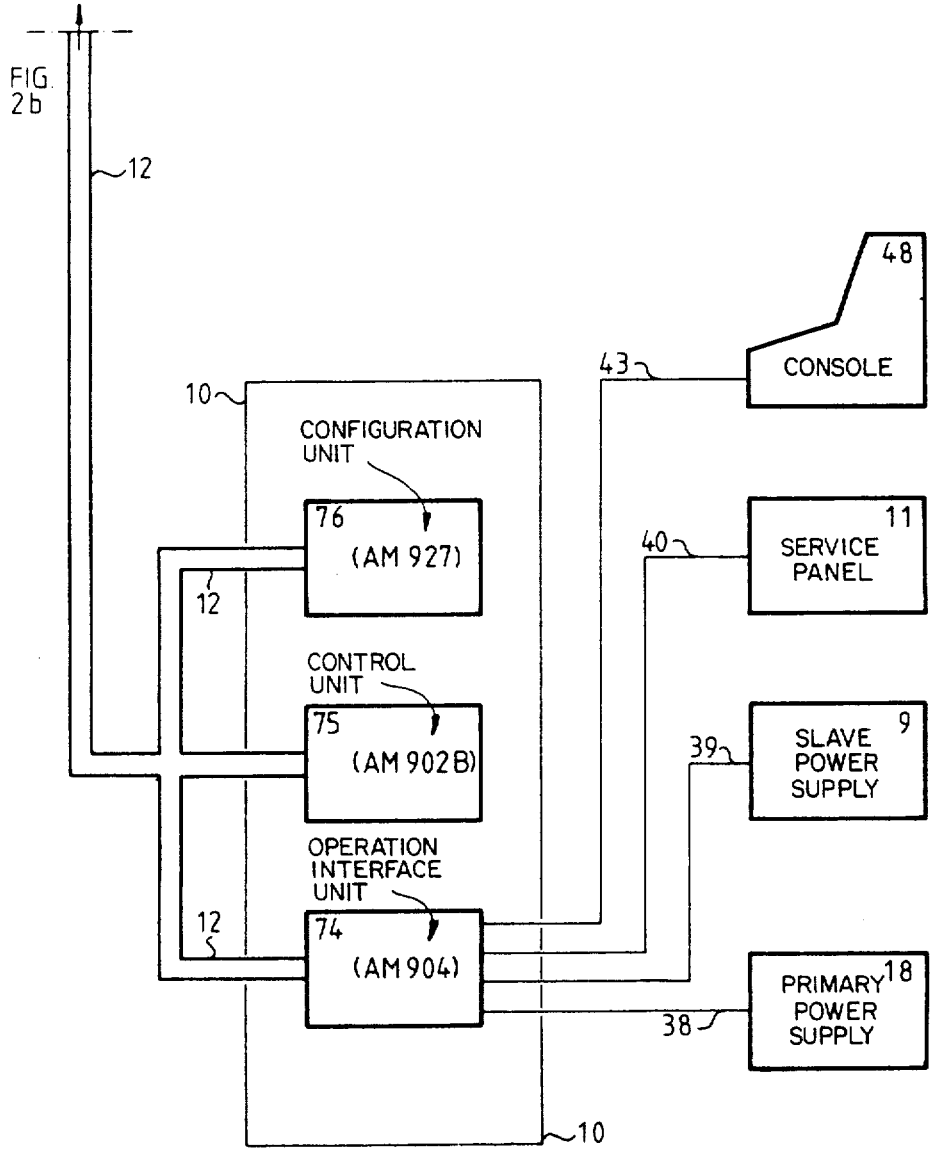

FIGS. 2a-2c are another illustration of the power supply system of FIG. 1 designed in accordance with the teachings of this invention. For purposes of simplification, only the links related to the control and check signals are shown.

These figures show the blocks designated as AM 902 B (75), AM 904 (74), AM 903 (51-1), (51-2), (56-1), (56-2), (61-1), (61-2), (51), (56), (61), (66-1), (66-2) and AM 908 [(52), (53), (54), (55), (57), (58), (59), (60), (62), (63), (64), (65), (67), (68)].

Each of these blocks represents a functional subsystem. Each of these subsystems is entirely contained on a printed circuit board. This arrangement makes it possible to have a modular system which has adaptable features through the addition or removal of a certain number of printed circuit boards. This has advantages both from a manufacturing and from a maintenance standpoint. From a manufacturing standpoint, it makes it possible to have standard elements, thus reducing the number of required toolings and allowing the equipment to evolve without requiring complicated modifications. From a maintenance standpoint, it reduces the diversity of the circuits used and thus simplifies the setting up of stocks of maintenance spare parts as well as personnel training.

These functional subsystems will be called FUNCTIONAL CIRCUIT BOARDS in the subsequent paragraphs.

FIG. 2c shows that the MONITOR (10) comprises subsystems AM 904 (74), AM 902B (75), and AM 927 (76), which are connected to subsystems AM 903 in the power units (17), (20), (23), (26), (29), (32), (35) and (44) via the CONTROL BUS (12).

The central operation subsystem is FUNCTIONAL CIRCUIT BOARD AM 902B (75). This circuit board, which will be discussed in detail in subsequent paragraphs, contains a MICROPROCESSOR, MEMO- RIES, and a TIME BASE. It will be called the CONTROL UNIT.

FUNCTIONAL CIRCUIT BOARD AM 927 (76) contains a ROM-type unalterable memory. This unalterable memory contains tables recording the information concerning the configuration of the power supply system; this circuit board will therefore be called the CONFIGURATION UNIT. This circuit board contains in particular information enabling the microprocessor of the CONTROL UNIT to know all the parameters which will be useful during the various phases of operation of the power supply system. This functional circuit board is custom-made for each power supply system at the time of manufacture and acts, as it were, as an "anthropmetric circuit board", which the microprocessor will consult, as required.

FUNCTIONAL CIRCUIT BOARD AM 904 (74) is an interface unit located between the CONTROL BUS (12), on the one hand, and, on the other hand, the PRIMARY POWER SUPPLY (18), the SLAVE POWER SUPPLY (9), the SERVICE PANEL (11) and the DATA PROCESSING SYSTEM CONTROL AND CHECK CONSOLE (48). In subsequent paragraphs, this module will be called the OPERATION INTERFACE UNIT to indicate that it is basically serving functions required for the operation of the power supply system.

FIGS. 2a-2b also show 4 FUNCTIONAL CIRCUIT BOARDS AM 903 [(51), (56), (61), and (66)]. Each of these circuit boards contains two interface units designated ½ AM 903 that are allocated to different power supply subsystems. Each ½ AM 903 unit will be referred to as a DOWNSTREAM INTERFACE HALF UNIT. These circuit boards are connected, on the one hand, to the CONTROL BUS (12) and, on the other hand, to FUNCTIONAL CIRCUIT BOARDS AM 908 or AY 05, as follows:
functional circuit board (51) is connected to functional circuit boards [(52), (53), (54), (55)];
functional circuit board (56) is connected to functional circuit boards [(57), (58), (59), (60)];
functional circuit board (61) is connected to functional circuit boards [(62), (63), (64), (65)];
functional circuit board (66) is connected to functional circuit boards [(67), (68)].

The AM903 FUNCTIONAL CIRCUIT BOARDS are actually interface units which enable signals to be exchanged between the CONTROL BUS (12) and the AM908 or AY05 FUNCTIONAL CIRCUIT BOARDS.

The AM903 FUNCTIONAL CIRCUIT BOARDS will hereinafter be called DOWNSTREAM INTERFACE UNITS to indicate that they are used to control and check the voltages and currents at the outputs of the power sources.

The AM908 FUNCTIONAL CIRCUIT BOARDS are units which serve as intermediate units between each DOWNSTREAM INTERFACE UNIT and the POWER SOURCES it is assigned to control. These units essentially consist of registers and amplifiers. The AM908 FUNCTIONAL CIRCUIT BOARDS will hereinafter be called INTERMEDIATE UNITS to indicate their function.

Each AM908 functional circuit board is capable of controlling and checking up to 4 POWER SOURCES. This is illustrated in FIGS. 2a-2b where, for instance, functional circuit board AM908 (52) controls and checks 4 power source by means of 4 links (95), (96), (97), and (98). It will be seen in subsequent paragraphs that 2 bytes are required to store the states of a power source. Therefore, in the maximum configuration, an AM908 functional circuit board will demand 8 bytes from the monitor (10) to store the states of the 4 power sources it controls.

The AY05 FUNCTIONAL CIRCUIT BOARD is a special unit which is used to meet the requirements of power sources having a reduced energy level. This is a dual module, because it contains two sections:
a control and check section which performs the same functions as the AM 908 intermediate unit; and
a "Power Source" section which contains the sources to be checked.

The AY05 FUNCTIONAL CIRCUIT BOARD will be called the MODERATE POWER SOURCE UNIT in subsequent paragraphs to reflect the power levels generated.

In addition, each AM 903 FUNCTIONAL BOARD contains up to 2 service links to the data processing operating unit it serves. FIGS. 2a-2b show 2 service links per AM 903 functional circuit board, although some of these links might actually be non-existent. The links shown are links [(153), (154)], [(155), (156)] [(157), (158)], [(159), (160)], [(161), (162,)], the roles of which will be covered in subsequent paragraphs.

In the maximum configuration, a ½ AM 903 functional circuit board is capable of controlling and checking two AM 908 functional circuit boards. If these functional circuit boards are themselves in their maximum configuration, they each check 4 power sources. As shown, for example, in power unit (17) in FIG. 2a. In such a case, the monitor (10) will need to store 16 status bytes in the memory per ½ AM 903 functional circuit board.

All the following functional circuit boards: AM 902B (75), AM 904 (74), AM 927 (76), AM 903 [(51), (56), (61), (66)], AM 908 [(52), (53), (54), (55), (57), (58), (59), (62), (63), (64), (67)], and AY05 [(60), (65), (68)] will be discussed in the subsequent portion of this description, but prior to this discussion a certain number of technical details must be clarified.

Firstly, it has been stated that these functional circuit boards AM902B, AM904, AM927, AM903, AM908, AY04 were each designed on a printed circuit board. In their actual configuration, all the printed circuit boards are mounted in a mounting designated in the trade as the BASKET, but which will be designated hereinafter as the RACK. The rack is formed so as to be able to contain all the printed circuit boards required to implement a system requiring the maximum power source checking system capacity. In the case of systems having lower capacities, only the required number of required circuit boards will be mounted, thus leaving a certain number of vacant positions in the rack.

FIG. 3a and 3b contain block diagrams of the POWER UNITS (17) and (20), and make it possible to see more clearly how a power unit is built for the specific implementation of the invention. POWER UNITS (17) and (20) are for the maximum configuration permitted by the circuits in the design described.

Power unit (17) supplies 2 voltages as well as a service link. The 2 voltages are supplied by cables (264) and (265), respectively. The service link is link (153).

As shown in the diagram, the current carried by cable (264), is produced by 4 sources connected in parallel:
a VOLTAGE REGULATOR (200) followed by a FILTER (216), a VOLTAGE REGULATOR (201) followed by a FILTER (217), a VOLTAGE REGULATOR (202) followed by a FILTER (218), and a VOLTAGE REGULATOR (203) followed by a FILTER (219)

The level of current supplied to cable (264) is thus distributed among the 4 VOLTAGE REGULATORS (200), (201), (202), (203).

These voltage regulators are powered by the POWER BUS (13) and are individually controlled and checked by an AM908 FUNCTIONAL CIRCUIT BOARD (52), i.e., an INTERMEDIATE UNIT (52), through links (95), (96), (97) and (98).

In the implementation discussed above, each AM908 INTERMEDIATE UNIT is capable of controlling and checking ing up to 4 VOLTAGE REGULATORS.

As explained in the following paragraphs, the desired throughput determines the number of voltage regulators to be connected in parallel. One of the features of the invention is its ability to enable the implementation of a modular power supply system.

This same configuration is repeated in the case of the voltage supplied over cable (265). This voltage is produced by a set of 4 VOLTAGE REGULATORS (204), (205), (206) and (207) with 4 associated FILTERS (220), (221), (222), (223). These 4 voltage regulators are controlled and checked by the INTERMEDIATE UNIT (53) through links (99), (100), (101) and (102).

Power unit (20) is similar to power unit (17). The voltage supplied over cable (266) is provided by the 4 VOLTAGE REGULATORS (208), (209), (210) and (211) with 4 associated FILTERS (224), (225), (226), (227). These 4 voltage regulators are controlled and checked by the INTERMEDIATE UNIT (54) through links (103), (104), (105) and (106).

Finally, the power supplied over cable (267) is obtained from 4 VOLTAGE REGULATORS (212), (213), (214) and (215) with 4 associated FILTERS (228), (229), (230), (231). These 4 voltage regulators are controlled and checked by the INTERMEDIATE UNIT (55) through links (107), (108), (109) and (110).

CABLES (264), (265), (153) and (154), (266), (267) are shown in FIG. 1a as cables (19) and (22), respectively.

The 4 INTERMEDIATE UNITS (52), (53), (54) and (55) are connected to the DOWNSTREAM INTERFACE HALF UNITS (51-1) and (51-2) by links (77), (78), (79) and (80). These DOWNSTREAM INTERFACE HALF UNITS are connected to the CONTROL BUS (12).

Link (153) is used by the downstream interface half unit (51-1) to communicate with the logic unit served by cables (264) and (265). Similarly, link (154) is used by the downstream interface half unit (51-2) to communicate with the logic unit served by cables (266) and (267).

FIGS. 4a and 4b contain a block diagram of POWER UNITS (23) and (26).

Module (23) is a power unit similar to (17) and (20) described above. It will not be described since its operation is derived from the explanations provided with the description of units (17) and (20).

The voltage supplied over cable (294) at power unit (26) is a voltage which produces the maximum level of current. That voltage is thus supplied by 4 VOLTAGE REGULATORS (240), (241), (242), (243) through 4 associated FILTERS (276), (277), (278), (279). These 4 VOLTAGE REGULATORS are controlled and checked by the intermediate unit (59).

However, power unit (26) includes a MODERATE POWER SOURCE (60).

The multiconductor cable (295) produces a group of moderate voltage outputs. These voltages are generated by a specific AY05 module located in an AY05 FUNCTIONAL CIRCUIT BOARD (60). Because of the moderate output in the specific embodiment described above it is possible to mount on the same functional circuit board the voltage regulators, their associated filters, and the electrical circuits acting as intermediate modules. Therefore, the FUNCTIONAL CIRCUIT BOARD AY05 or MODERATE POWER SOURCE UNIT is connected directly to DOWNSTREAM INTERFACE HALF UNIT (56-2) through link (84).

Cables (292), (293), (294), (295), (155), (156) are shown as cables (25) and (28) in FIG. 1a. Cables (155) and (156) are used by DOWNSTREAM INTERFACE HALF UNITS (56-1) and (56-2) to communicate with the logic units they serve. The role of the signals carried by these cables (155) and (156) will be described in the following sections.

The 4 INTERMEDIATE UNITS (57), (58), (59) are connected, respectively, by cables (81), (82) and (83) to DOWNSTREAM INTERFACE HALF UNITS (56-1) and (56-2). As stated above, the MODERATE POWER SOURCE UNIT (60) is connected to DOWNSTREAM INTERFACE UNIT (56-2) by cable (84).

FIGS. 5a and 5b are a block diagram of the POWER UNITS (29) and (32). These units are shown in order to illustrate the 4 possible configurations for supplying a high output.

The first source with a high output is that which is connected via cable (330). This power source is made up of 4 parallel-connected VOLTAGE REGULATORS (300), (301), (302), (303), and 4 associated filters (310), (311), (312), (313). These 4 voltage regulators are connected to INTERMEDIATE UNIT (62) through cables (123), (124), (125) and (126).

The output required via cable (331) is lower than that over the preceding cable (330), and 3 VOLTAGE REGULATORS (304), (305), (306) and 3 associated FILTERS (314), (315), (316) suffice to ensure that output. These 3 voltage regulators are connected to INTERMEDIATE MODULE (63) via cables (127), (128) and (129).

The output through the cable (332) is even lower, and only 2 VOLTAGE REGULATORS (307), (308), with 2 associated filters (317), (318) are sufficient. These 2 voltage regulators are connected to INTERMEDIATE MODULE (64) by cables (130) and (131).

The last cable (333) requires an output which does not exceed the maximum admissible output for one voltage regulator. Thus, this cable (333) is powered by a single VOLTAGE REGULATOR (309) with associated FILTER (319). This voltage regulator is connected to INTERMEDIATE MODULE (65) by cable (132).

INTERMEDIATE UNITS (62), (63), (64), (65) are connected, respectively, by cables (85), (86), (88) to DOWNSTREAM INTERFACE HALF UNITS (61-1) and (61-2).

In FIG. 1b cables (330), (331) and (157), and cables (158), (332), and (333) are represented by cables (31) and (38), respectively.

Cables (157) and (158) are used to handle signals between DOWNSTREAM INTERFACE UNIT (61) and logic modules (30) and (33).

The foregoing description of POWER UNITS (17), (20), (23), (29) and (32) given with reference to FIGS. 3, 4 and 5 shows how the configuration modularity of the POWER UNITS is achieved.

After defining the various units making up a data processing system, the designer of that system ponders how the voltage or current supply requirements for these units will be met. For each unit he takes stock of the necessary voltage and current outputs for the operation of that unit. Once this power budget has been drawn up, the designer has all the elements needed to define the POWER UNIT corresponding to each data processing unit. As explained with reference to FIGS. 3, 4 and 5, each POWER UNIT may comprise:

1 to 4 HIGH POWER SOURCES. FIGS. 3a–b show the case where maximum power is provided, i.e., 4 HIGH POWER SOURCES, each including 4 VOLTAGE REGULATORS. This configuration may be modified as desired and may be reduced to the minimum configuration including a single VOLTAGE REGULATOR;

1 to 3 HIGH POWER SOURCES, as defined above, and one MODERATE POWER SOURCE;

1 or 2 HIGH POWER SOURCES, and 1 or 2 MODERATE POWER SOURCES or;

1 to 4 MODERATE POWER SOURCES.

Thus, the data processing system designer has a whole range of possible configurations available to him for supplying power to the units of the data processing system.

As explained above, each power source, be it a high-power or a moderate-power source, requires one memory byte to store into memory the states that characterized its operation. To store the states of the power sources belonging to the power supply system, the monitor (10) is provided with a memory in which the states are stored in a well-defined order. This order is defined at 3 levels:

by the rank of the source within the AM908 intermediate unit to which said source is connected;

by the rank of said AM908 intermediate unit within the ¼ AM903 downstream interface unit which controls and checks said AM908 intermediate unit; and by the rank of said ¼ AM903 downstream interface unit within the rack, because the physical position of the operational circuit board on which the ¼ AM903 downstream interface unit is mounted corresponds to an address in the monitor addressing system.

In the preferred embodiment of the invention, provision may be made for a storage location with a total capacity of 128 bytes. This means that the designer can use up to 128 power sources to make up power units (17), (20), (23), (26), (29), (32), (35), (44). The state bytes are called into memory in the increasing order of their address to give the monitor (10) direct access to the state byte of a particular power source if it knows its ranking number.

The designer has the option of distributing the power sources into a maximum number of power supply subsystems. In FIGS. 1a–1b all 8 power supply subsystems are shown used, each being assigned to a power supply unit: power supply subsystem 0 to power supply unit (17), subsystem 1 to unit (20), subsystem 2 to unit (23), subsystem 3 to unit (26), subsystem 4 to unit (29), subsystem 5 to unit (32), subsystem 6 to unit (35), and subsystem 7 to unit (44). Accordingly, this is the distribution which will be stored in the tables of the AM927 configuration module (76).

This arrangement also allows for service repair facilities. It may come to pass that the power units includes a large number of power sources. Only one power source needs to experience a failure for all power units to be rendered useless. To overcome this problem, the invention makes it possible to have a rack location for another AM903 downstream interface unit, called a diagnostic module, which is not connected in normal operation. In this downstream interface unit, each of the 4 links to the AM908 intermediate units is assigned to a power supply subsystem. As will be seen further below, it is possible to isolate a power supply subsystem by switching it to the LOCAL mode. In the event of a breakdown, the maintenance technician can disconnect the suspicious peripheral links of the sources, and connect them to the AM903 diagnostic downstream interface unit. If the failed power source(s) is (are) among the power sources disconnected from the system, the power unit will still be capable of functioning, provided the load is somewhat relieved. On the other hand, the maintenance technician will be capable of working freely on the power sources which have been disconnected from the system. It should be noted that in order to enable the power supply system to operate and to avoid getting confused during these peripheral link changes, the maintenance technician may put a cap on all the unused AM903 downstream interface outputs. These caps may include an electrical circuit which places a specific code at the output of the AM903 downstream interface unit. When the monitor (10), in turn, reads the state of the corresponding power source, it finds the code inserted by the cap and this code signifies to the monitor that there is no power source in that location and that there is a valid reason for its absence.

As mentioned above, the circuits are mounted on FUNCTIONAL CIRCUIT BOARDS. These FUNCTIONAL CIRCUIT BOARDS are actually printed circuit boards on which various components have been mounted. They are designed to be plugged into a RACK. The rear section of this RACK contains a CIRCUIT BOARD INTERCONNECT WIRING HARNESS, called a BASKET BOTTOM in data processing terminology. However, in subsequent paragraphs it will be called CIRCUIT BOARD INTERCONNECT CABLE. This CIRCUIT BOARD INTERCONNECT CABLE is made up of a series of connections linking, in accordance with a specific diagram, the REAR CONNECTOR terminals in which the various CIRCUIT BOARDS are plugged.

Moreover, some FUNCTIONAL CIRCUIT BOARDS also have FRONT CONNECTORS in which PERIPHERAL LINK CABLES are plugged to connect said FUNCTIONAL CIRCUIT BOARDS with devices not mounted in the RACK.

All these points will be reviewed in subsequent paragraphs.

Figure 6:
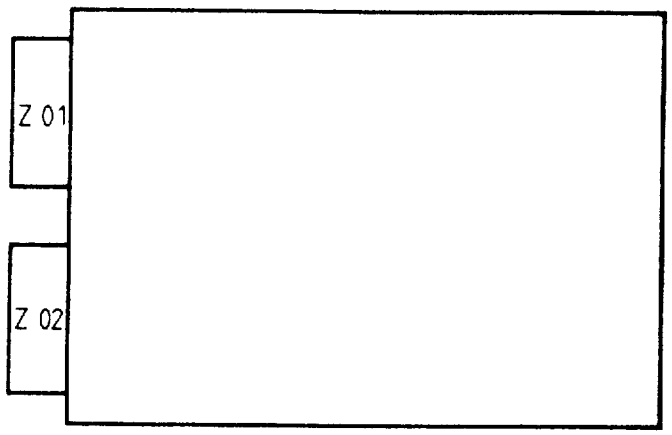
FIG. 6 represents an FUNCTIONAL CIRCUIT BOARD which includes rear connectors.

FIG. 6 shows a FUNCTIONAL CIRCUIT BOARD which has only REAR CONNECTORS. These connectors are designated in the diagrams as Z01 and Z02. Each of these connectors contains 70 CONTACT PINS. In the electrical diagrams, these contact pins are designated by the reference number of the connector to which they belong, followed by the contact pin number. For example, the contact pins for REAR CONNECTOR Z01 are marked: Z01-01, Z01-02, Z01-3 . . .

Z01-70. The same designation system is used for REAR CONNECTOR Z02, where the contact pins are marked: Z02-01, Z02-02 . . . Z02-70.

Figure 7:
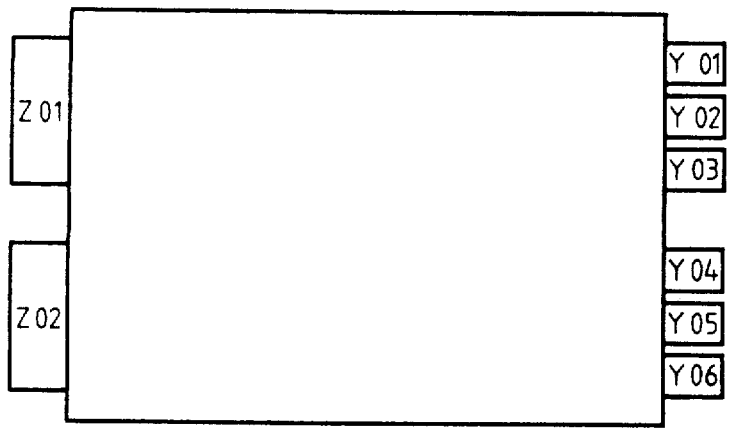
FIG. 7 represents an FUNCTIONAL CIRCUIT BOARD which includes rear connectors and front connectors.

FIG. 7 shows a FUNCTIONAL CIRCUIT BOARD which includes REAR CONNECTORS and FRONT CONNECTORS. The CONTACT PINS for the REAR CONNECTORS are marked in the same manner as in FIG. 6. The 6 FRONT CONNECTORS are marked Y01, Y02, Y03, Y04, Y05, Y06. Each of these connectors has 24 CONTACT PINS, 22 of which are reserved for electrical connections, and 2 are used for an ERROR CORRECT KEY to avoid certain errors in connecting the PERIPHERAL LINK CABLES. The various CONTACT PINS are marked with the number of the connector to which they belong, followed by the contact pin number. For example, the CONTACT PINS in the diagrams will be marked as Y01-01, Y01-02, . . . Y01-22, Y03-01, . . . Y02-22, . . . Y06-22.

FUNCTIONAL CIRCUIT BOARDS with no FRONT CONNECTORS are those circuit boards which are only connected to the CONTROL BUS (12), i.e., the AM902B CONTROL UNIT, and the AM927 CONFIGURATION UNIT. FUNCTIONAL circuit boards which have a FRONT CONNECTOR are those which have outside connections, i.e., the AM904 OPERATION INTERFACE UNIT, and the AM903 DOWNSTREAM INTERFACE UNIT.

FIGS. 8a–8c are diagram showing the circuits connecting the operational circuit boards with the CONTROL BUS (12), as well as the PERIPHERAL LINK CABLES.

These figures show connectors Z01 and Z02 which are used to connect with the CIRCUIT BOARD INTERCONNECT CABLE or CONTROL BUS (12). Connectors Y01, Y02, Y03, Y04, Y05, Y06 are also shown, as well as the PERIPHERAL LINK CABLES.

Through PERIPHERAL LINK CABLES (77), (78) . . . (83), (85) . . . (89) an output, Y0x, of an AM903-type DOWNSTREAM INTERFACE UNIT may be connected to an AM-908 type INTERMEDIATE UNIT, as shown in FIGS. 8a and 8b.

Through PERIPHERAL LINK CABLE (84), the output, Y05, of the AM903-type DOWNSTREAM INTERFACE UNIT (56) may be connected to the AY05-type MODERATE POWER SOURCE UNIT (60). Similarly, through peripheral link cable (90), the output, Y04, of downstream interface unit (66) may be connected to the AY05 MODERATE POWER SOURCE UNIT (68).

It may be recalled that outputs (95), (96) . . . (136) are each respectively connected to a VOLTAGE REGULATOR, which may be designated as AY-10.

As shown in FIG. 8c, PERIPHERAL LINK CABLE (38) is connected to PRIMARY SUPPLY UNIT (18). PERIPHERAL LINK CABLE (39) is connected to SLAVE POWER SUPPLY (9), and PERIPHERAL LINK CABLE (43) is connected to the DATA PROCESSING SYSTEM OPERATING CONSOLE (48). PERIPHERAL LINK CABLE (40) is connected to the SERVICE PANEL (11).

At this point in the description of the preferred embodiment of a invention, and before going into the detailed description of the the various components of the system ilustrated in FIGS. 1 and 2, the concept of modularity as applied to a data processing system will to be defined from the point of view of the power supply systems. Then, the various components will be described in detail.

In FIGS. 1a–1c, the data processing system may be divided into a certain number of functional subsystems, i.e., data processing operational units:
functional subsystem (1) which contains power unit (17) and the data processing system console (48);
functional subsystem (3) which contains power unit (23) and the main memory (24);
functional subsystem (4) which contains power unit (26) and the input/output exchanger unit (27);
functional subsystem (5) which contains power unit (29) and the magnetic disc coupler unit (30);
functional subsystem (6) which contains power unit (32) and the magnetic tape transport coupler unit (33);
functional subsystem (7) which contains power unit (35) and the slow peripheral coupler unit (36);
functional subsystem (8) which contains power unit (44) and the coupler magnetic disc oupler unit (45).

In the subsequent sections of the descriptions and in accordance with the specific embodiment selected for the purpose of illustrating the invention, power units (17), (20), (23), (26), (29), (32), (35) and (44) will be designated as power supply subsystem 0, power supply subsystem 1, power supply subsystem 2, power supply subsystem 3, power supply subsystem 4, power supply subsystem 5, power supply subsystem 6, and power supply subsystem 7, respectively, as previously described.

The sources may, of course, be distributed in any other manner. For example, it is perfectly possible for the sources to be connected to a single power supply subsystem. The selection which was adopted for this illustration is solely for the purpose of facilitating the explanations given below. The distribution of the sources among the power supply subsystems is done at the level of the AM927 configuration module (76). For example, it would be quite possible to have a power supply system in which the subsystems would be distributed as follows:
subsystem 0 may inlude the power units for the following:
  the data processing system console
  the central unit
  the main memory
  a first input/output exchanger unit
  a first magnetic disc coupler unit
  a first slow peripheral coupler unit.
subsystem 1 may include the power units for four additional magnetic disc units
subsystem 2 may include the power units for four additional magnetic tape units
subsystem 3 may include the power units for a second input/output exchanger unit.
And so on through subsystem 7.

The distribution of the power units is recorded in the form of tables in the AM927 configuration module, as previously mentioned. By consulting these tables, the control unit (75) will know the composition of each subsystem. This composition can be changed simply by plugging in the AM927 configuration unit which has the tables illustrating the composition of the power supply subsystems.

Having said this, assume that the monitor (10) wishes to communicate with a particular power supply subsystem or with a subsystem source. The monitor must determine its address. For the system configuration illustrated in the figures, in order to call up power supply subsystem 0, it must address downstream interface half unit (51-1). To call in power supply subsystem 1, it must address downstream interface half unit (51-2). And so forth and so on, downstream interface half unit (56-1) for power supply subsystem 2, downstream interface half unit (56-2) for power supply subsystem 3, downstream interface half unit (61-1) for power supply subsystem 4, downstream interface half unit (61-2) for power supply subsystem 5, downstream interface half unit (66-1) for power supply subsystem 6, and downstream interface half unit (66-2) for power supply subsystem 7.

In the preferred embodiment of the invention, the number of power supply subsystems has been shown as 8, it being understood that this number is not limitative. Moreover, it will be seen hereinbelow that power supply systems can be combined in a chain-type configuration, which is another means of increasing the number of power supply subsystems being served, while preserving the individual characteristics of each power supply system. For example, a chain of power supply systems enables power to be supplied to multiprocessor data processing systems.

As will be described in more detail shortly, the service panel (11) is the means that enables the operator or the maintenance technician to have a dialogue with the power supply system. This dialogue is made possible by the existence on the service panel of a certain number of push-buttons, keys, reversing switches and indicator lights.

This dialogue between the operator and maintenance technician and the power supply system is required under three sets of circumstances, for example:

during the automatic monitoring periods when the monitor needs to alert the operator that an operation anomaly has occurred;

during the normal power supply system operating periods when the operator wishes to be advised on the operating situation and, if necessary, to make changes in the operation of the system;

during the maintenance periods, while the maintenance technician is working on the power supply system to detect and trace failures.

Because of its function, the SERVICE PANEL (11) preferably has several operating sections:

a GENERAL CONTROL operating sections in which the controls and the reports on the common elements of the POWER SUPPLY SYSTEM may be all grouped together; for example, the ON and OFF push-buttons to turn the power supply system on and off may be located in this section;

a POWER SUBSYSTEM CONTROL AND CHECK operating section. The subsystem controls and state indicators reporting back to the SERVICE PANEL (11) may be located in this section;

finally, a MAINTENANCE operating section containing the units required for the maintenance operations. It may happen, as in the case of the embodiment described herein, that the two preceding operating areas will have a common section.

In another connection, outside the SERVICE PANEL in a location with access limited to technicians qualified to perform MAINTENANCE operations, there is a device with which the operation of the POWER SUPPLY SYSTEM can be changed. In the "OPERATION" position, the power supply system operates within normal parameters, i.e., for example, all electrical protective circuits are effective and some of the failure storage circuits are inaccessible at the reset position. In the "MAINTENANCE" position, the operation of the power supply system is changed so as to enable the maintenance technician to select operation modes and to perform the operations which will allow him to diagnose and trace failures and faults. In the following sections this device will be designated as the "OPERATION/MAINTENANCE SWITCH".

This switch may be in one of two positions:
in the OPERATION position, the power supply system operates normally;
in the MAINTENANCE position, the power supply system is in operation for maintenance purposes.

SERVICE PANEL

Figure 9:
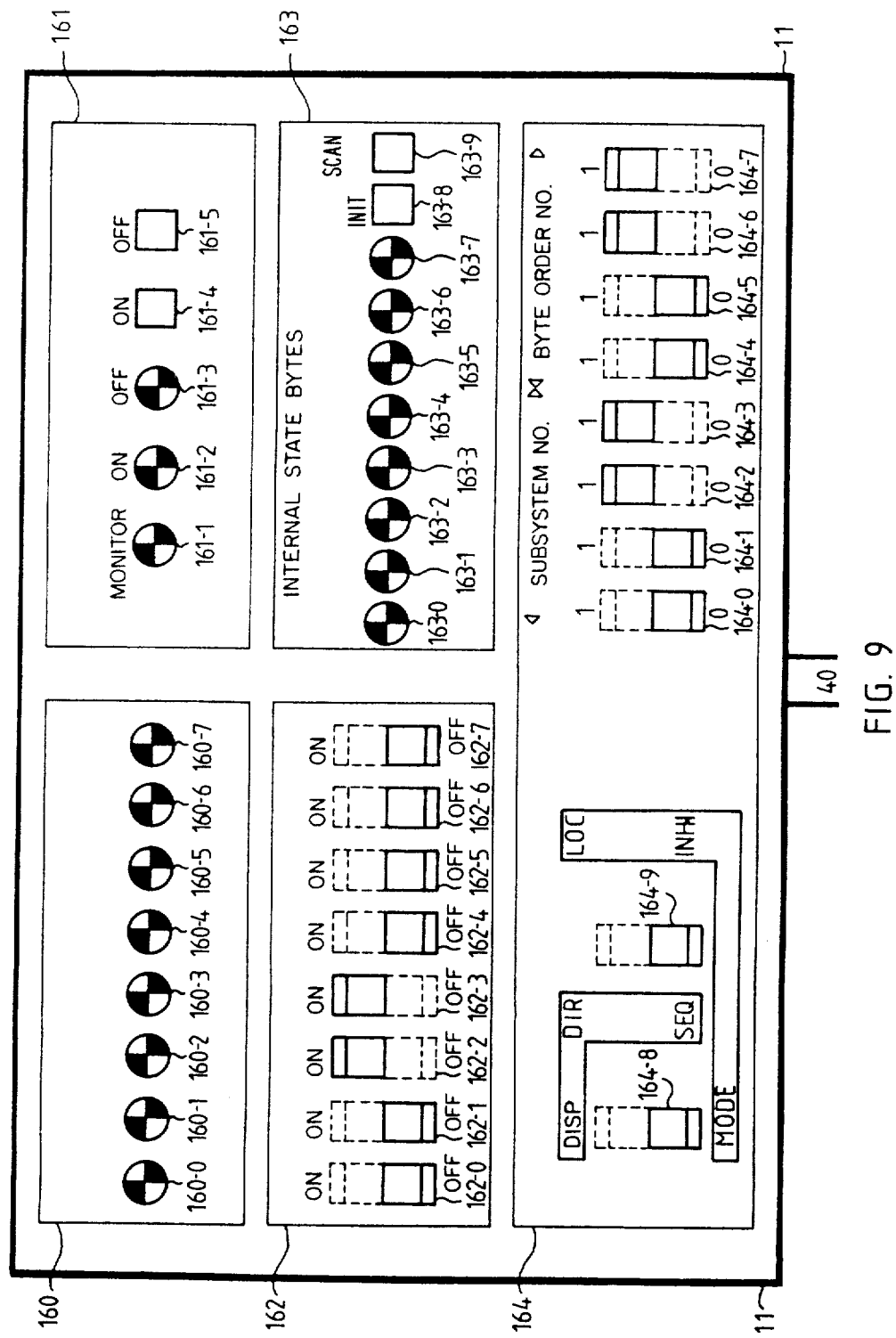
FIG. 9 is a block diagram of a SERVICE PANEL (11).

FIG. 9 is a schematic representation of a "SERVICE PANEL (11)". This service panel (11) has five sections:
(161): the GENERAL POWER SUPPLY SYSTEM CONTROLS;
(160): the POWER SUPPLY SUBSYSTEM STATE INDICATORS;
(162): the POWER SUPPLY SUBSYSTEM CONTROLS;
(163): the POWER SUBSYSTEM INTERNAL STATE BYTE SELECTIVE INDICATORS;
(164): the MAINTENANCE CONTROLS.

Not shown in this FIG. 9 but, as explained hereinabove, located in a limited-access location there is provided a two-position OPERATION/MAINTENANCE SWITCH, which may be either in the OPERATION or in the MAINTENANCE position.

In the description hereinbelow, the SERVICE PANEL (11) will be discussed in its OPERATION mode. In other words, the operation/maintenance switch will be placed in the OPERATION position. The functions of the units contained on the Service Panel (11) will likewise be described and, later on, it will be seen how these functions are performed. The GENERAL ISOLATING SWITCH (15) will not be covered at this point; this switch must be manually closed by the operator prior to any power supply system start-up operation.

Section (161), the GENERAL POWER SUPPLY SYSTEM CONTROLS, includes:
an "ON" PUSH-BUTTON (161-4). This push-button, (161-4), controls the PRIMARY POWER SUPPLY (18) start-up operation. Pressing this "ON" push-button (161-4) results in the following:
If the power supply system has already been turned "ON", the SUBSYSTEM FAULT FLIP-FLOPS are PARTIALLY or TOTALLY RESET TO ZERO. This zero reset has a different significance according to the MODE OF OPERATION OF THE POWER SUPPLY SYSTEM. If the system is in the NORMAL OPERATION mode, the zero reset only occurs for flip-flops storing MINOR FAULTS. What is meant by "minor faults" will be covered subsequently; for the time being, faults to be considered as MINOR are those which do not jeopardize the safety of the operation of the power supply system.
If the power supply system has been turned "OFF", the PRIMARY POWER SYSTEM (18) is TURNED ON, followed by all the subsystems for which the "ON" keys (162-0 to 162-7) in the SUBSYSTEM CONTROL AND CHECK OPERATIONAL SECTION have been placed in the "ON" position.

It should be noted that the "START-UP" operations which have just been described may also originate from the data processing system CONTROL AND CHECK CONSOLE (48), provided that the power supply system is in the NORMAL OPERATION mode. If the power supply system is in the MAINTENANCE mode, START-UP operations cannot originate from the control and check console (48) to protect maintenance technicians who might be performing repair work. This arrangement is readily understood if one considers that the data processing system operator should normally be capable of turning on the POWER SUPPLY SYSTEM in the operation mode from the command and control console (48) without having to move to have access to the SERVICE PANEL (11). It will be seen later on how these controlsignals from the control and check console (48) are transmitted to the monitor (10) through link (43). It will also be seen that, according to the invention, the "ON" controls and the "OFF" controls for several power supply systems may be connected in series. This method of connection is called a "DAISY CHAIN". In the connection used for the invention, the system in the daisy chain system which is the nearest to the data processing system console is the first to execute the received commands. Only when the received command has been executed does the system transmit the command to the next system. And so on, and so forth, up to the last system, which retransmits the command, after its execution, back to the data processing system console (48). This looped back command is a signal for the data processing system console (48) reporting that the command received by all the systems in the daisy chain has been properly executed. If one of the power systems is put OUT OF SERVICE by opening its Manual Isolating Switch (15), there is a device provided to prevent the daisy chain from opening. For this reason, opening the Manual Isolating Switch short-circuits the daisy chain through that power supply system. The circuits in the daisy chain are called "TELECOMMAND CIRCUITS":

an "OFF" BUTTON (161-5). Pressing this "OFF" button (161-5) turns the Power System off. This turn-off operation occurs in two stages:
  in the first stage the power supply subsystems are turned off one after the other.
  then, the primary power supply (18) is turned off.
The power supply system may also be turned off from the control and check console (48) through the daisy chain link as explained above in the description of the power supply system turn-on procedure.

an "ON" INDICATOR LIGHT (161-2). This "ON" indicator light (161-2) may light up in 3 different modes:
  if the ON indicator light (161-2) is OFF continuously, this means that the last command received by the power supply system was an "OFF" COMMAND, i.e., a command to turn the system off. The power supply system is shut down.
  if the ON indicator light (161-2) is ON continuously, this means that the last command received by the power supply system was an "ON" command, i.e., a command to start the system. In that case, the power supply system is functioning: the slave power supply (9) and the primary power supply (18) are on, and the MONITOR (10) has started all the subsystems for which a control key, i.e., reversing switch, (162-0 through 162-7) has been placed in the ON position and these subsystems do not contain any faults.
  if the "ON" indicator light (161-2) is FLASHING, i.e., turns on and off successively, this may be attributable to either one of the following causes:
    the power supply system start-up process is underway and everything is normal, or
    the start-up process is underway or has ended, but at least one fault in the power supply system has been detected by the MONITOR (10).

an "OFF" INDICATOR LIGHT (161-3). This "OFF" indicator light (161-3) may light up in 3 different modes:
  if the OFF indicator light (161-3) is continuously OFF, this means that the last command received by the power supply system was an "ON" command, i.e., a command to turn the system on. A turn-on sequence is therefore either underway or completed.
  if the OFF indicator light (161-3) is ON continuously, this means that the power supply system is completely off.
  if the OFF indicator light (161-3) is FLASHING, i.e., successively turning on and off, this may be due to two different causes:
    the power system turn-off process has begun but has not yet been completed, or,
    the turn-off process has begun but at least one of the completion signals has not been received. These completion signals are sent by the power supply subsystems in the "ON" mode and by the primary power supply (18), as well as by the slave power supply (9). It is only after receiving all these signals that the system is certain that the turn-off sequence has been successively completed. In the case in point, the flashing indicator light (161-3) means that an anomaly has occurred during the turn-off process.

a "MONITOR" INDICATOR LIGHT (161-1). This indicator light is used to display the MONITOR's (10) trouble-shooting function. When this "MONITOR" indicator light (161-1) is on continuously, it means that an anomaly has been detected during the execution of the WATCH-DOG MICROPROGRAMS within the MONITOR (10). These WATCH-DOG MICROPROGRAMS will be described in subsequent paragraphs. When this situation occurs, the monitor (10) emits a GENERAL INHIBIT SIGNAL to all subsystems in order to turn them off.

The POWER SUBSYSTEM CONTROL Section (162) includes a certain number of REVERSING SWITCHES (162-0), (162-1), (162-2), (162-3), (162-4), (162-5), (162-6), (162-7). The number of these reversing switches (162-0 through 162-7) is equal to the number of POWER SUPPLY SUBSYSTEMS making up the POWER SUPPLY SYSTEM. In the specific embodiment described herein by way of example, the Power Supply System includes 8 power supply subsystems referenced by the following designations: POWER SUPPLY SUBSYSTEM 0 through POWER SUPPLY SUBSYSTEM 7. A reversing switch (162-0 through 162-7) is assigned to each Power Supply Subsystem, with the digit corresponding to the number of the power supply subsystems. Thus, reversing switch (162-0) is assigned to power supply subsystem 0; reversing switch (162-1) is associated to power supply subsystem 1, and so on, through reversing switch (162-7) which is assigned to power subsystem 7. This number of 8 power supply subsystems is, of course, not limitative, and the number of power supply subsystems contained in a power supply system designed in accordance with the teachings of the invention may be as high as the designer wishes.

Each reversing switch (162-0 through 162-7) may be in either one of two positions: an "ON" position or an "OFF" position. These two positions correspond to the following functions:

In the case of all subsystems whose reversing switches are placed in the "ON" position at the time the power supply system is started, the subsystems whose reversing switches are placed in the "ON" position, and only those subsystems, are started. All subsystems whose reversing switches are in the "OFF" position will not be started.

After the system has been started, moving a reversing switch from the "OFF" to the "ON" position will result in a sequence that will start the subsystem involved.

After the system has been started, moving a reversing switch from the "ON" to the "OFF" position will result in a sequence that will stop the subsystem involved.

It becomes evident that these reversing switches (162-0 through 162-7) allow the operator to start or stop the power supply subsystems at will.

It should be pointed out that placing the reversing switch in the "OFF" position will inhibit transmission to the MONITOR (10) of the faults detected at the subsystem level. As far as the MONITOR (10) is concerned, the power subsystems in the "OFF" position are no longer taken into account.

In the preferred embodiment of the invention, the POWER SUPPLY SUBSYSTEM STATE DISPLAY SECTION (160) includes EIGHT INDICATOR LIGHTS (160-0 through 160-7). It will be understood that this number is not limitative: there are as many indicator lights as there are power supply subsystems in the power supply system. In FIG. 9, each indicator light has been assigned the number 160 followed by a digit. This digit indicates the number of the subsystem to which the indicator light is assigned" thus, indicator light (160-0) corresponds to subsystem 0, indicator light (160-1) corresponds to subsystem 1, and so forth and so on, through indicator light 7, which corresponds to subsystem 7.

The lighting modes for each indicator light (160-0 through 160-7) reflect the operating state of its corresponding power supply subsystem, as follows:

A "CONTINUOUSLY LIGHTED" indicator light indicates that its subsystem is on and that no fault has been detected.

A "BRIEFLY FLASHING" indicator light, i.e., whose lighted period is periodically interrupted by a short interval during which the light is out, indicates that its subsystem is on but that at least one "MINOR FAULT" has been detected. A minor fault is an anomaly which does not require the power supply subsystem to be turned off.

An indicator light which "FLASHES AT EQUAL INTERVALS", i.e., whose lighted intervals are just about equal to the intervals during which the light is out, indicates that:
either the power supply subsystem could not be fully stopped by moving the appropriate reversing switch (162-x) from the "ON" position to the "OFF" position, or the entire system has been shut down;

or the power supply system has experienced a "MAJOR FAULT" and thus has required a shutdown operation which may or may not have been successfully completed;

an indicator light which is "CONTINUOUSLY OFF" means that its power supply subsystem is in its normal "OFF" state.

SECTION (163), which contains the FACILITIES FOR SCANNING AND DISPLAYING THE CONTENTS OF THE POWER SUBSYSTEM INTERNAL MEMORIES, includes eight INDICATOR LIGHTS (163-0 through 163-7), an INITIALIZATION PUSH-BUTTON (163-8), an ADDRESS SCAN PUSH BUTTON (165-9).

Section (163), as indicated by its designation, makes it possible to have access to the status bytes contained in tables associated with the subsystems. These tables contain information on the operation of the subsystems. As will be explained in subsequent paragraphs, the operator or the maintenance technician may extract, byte by byte, the contents of these tables by activating the INITIALIZATION push button (163-8) as well as the address SCAN pushbutton (163-9).

Outside the times when the operator or the maintenance technician is using this section (163) which contains the facilities for scanning and displaying the contents the internal memories of the power supply subsystems, the eight indicator lights (163-0 through 163-7) are used to display the state bytes for the primary power supply and the common resources (18).

During the periods of operation, such as, for example, the transient start-up operation following an "ON" command and shutdown operation following an "OFF" command, the eight indicator lights (163-0 through 163-7) will start flashing. However, when the power supply system is in a permanent duty cycle, the eight indicator lights (163-0 through 163-7) are used to signal faults detected in the slave power supply (9) and in the primary power supply (18). This means that each detected fault will cause one of the indicator lights (163-0 through 163-7) to turn on, this indicating to the operator that a breakdown has occurred. In the absence of any failure, all indicator lights are off.

But, as stated above, the operator and/or maintenance technician may need to consult the subsystem state tables. To do this, they may display the various state bytes by using two push-buttons: the INITIALIZATION push button (163-8) and the address SCAN push-button (163-9).

The INITIALIZATION push button (163-8) makes it possible to initialize the address scan sequence within the tables. In other words, it resets the address scan sequence if the previous scan sequence has not been completed. This reset operation is indicated by having the indicator lights (163-0 through 163-7) resume displaying the state bytes of the slavepower supply (9) and of the primary power supply (18). The INITIALIZATION push-button (163-8) is also used to check the proper operation of all indicator lights on the service panel (11) except the MONITOR indicator light (161-1): The indicator lights should be flashing as long as the the INITIALIZATION push button (163-8) is held down. Any indicator light which would not be flashing is defective and should be replaced. The MONITOR (11) indicator cannot be tested because it is connected directly to the MONITOR (11) on the RETURN VOLTAGE circuits. The address scan push button (163-9) allows the sequential scanning of the faulty source state tables in the order of increasing addresses.

Before a faulty source internal byte scanning sequence can be started, it is absolutely necessary for the scanning sequence to be restored to its initial state. This restoring to the initial state may be accomplished as explained above by pressing the INITIALIZATION push button (163-8). Finally, as will be seen below, the initial state is achieved at the end of sequence while the SCAN push button (163-9) is being pressed for the last time.

After the address scan sequence has been restored to its initial state, a first activation of the SCAN push button (163-9) initiates the address SCAN sequence. This initiation is indicated to the operator by a specific mode of lighting of the indicator lights (163-0 through 163-7): only one indicator light out of the 8 lights is on at any one time, and that lighted indicator light changes periodically. This mode of lighting indicates to the operator that the next time the SCAN push button (163-9) is pressed, the first phase of the address scan procedure or cycle is initiated. That procedure or cycle will now be described.

When the address scan push button (163-9) is pressed a second time, the lighted indicator lights (163-0 through 163-7) will indicate which power supply subsystems were placed in the inhibit state. The procedure for placing a power supply subsystem in the inhibit state will be described in subsequent paragraphs. What this means is that the power supply subsystem involved is being put out of service. If power supply subsystem 0 is in the inhibit state, indicator light (163-0) will be on; if this power supply subsystem 0 is in normal service, indicator light (163-0) will be off. And so forth and so on, depending on whether it is on or off, each indicator light (163-1 through 163-7) will indicate whether its subsystem is in the inhibit state or in normal operation.

When the address scan push button (163-9) is pressed for the third time, two situations can occur:

if no voltage source is faulty, the address scan sequence is placed in an end-of-scan state, since the monitor has not found any faulty source. In this case, the monitor indicates the end of sequence by turning on all the indicator lights (163-0 through 163-7) except one, with the turned-off indicator light permuting cyclically among the 8 indicator lights. In short, this end-of-sequence phase is indicated by a lighting mode which complements the lighting mode of the start-up phase. If the operator presses the SCAN push button (163-9) another time, the address SCAN sequence is restored to its initial state, i.e., the indicator lights (163-0 through 163-7) are assigned to display the slave power supply (9) and the primary power supply (18) faults.

if there is at least one faulty source, the indicator lights (163-0 through 163-7) will provide the address of the state byte of the first faulty source. The above-mentioned indicator lights will flash to indicate clearly that this is an address and not a state byte.

This address contains two bytes which will be scanned successively. The first byte denotes the situation prior to the appearance of the fault and is called the "PRE-INCIDENT STATE BYTE". The second state byte denotes the situation following the appearance of the fault and is called the "POST-BREAKDOWN BYTE".

As explained above, the state bytes are called into memory at consecutive addresses: the first byte to be stored is the byte of digit place 0 of the power supply subsystem 0, the following byte is the byte of index 1 of the power supply subsystem 0, and so forth and so on, until the last byte of the subsystem with the highest index is reached. The monitor (10) is familiar with the distribution of the bytes to the various power supply subsystems by means of the tables contained in the AM927 configuration module (76).

When the address scan push button (163-9) is pressed for the fourth time, the indicator lights (163-0 through 163-7) show the value of the PRE-BREAKDOWN state byte.

When the push button (163-9) is pressed for the fifth time, the indicator lights (163-0 through 163-7) show the value of the POST-BREAKDOWN state byte.

When the push button (163-9) is pressed for the sixth time, the situation becomes similar to the one when the push button was pressed for the third time. If there are no more faulty sources, pressing the SCAN push button (163-9) for the sixth time will place the scan sequences in the end-of-scan phase, and the monitor (10) will indicate this situation by causing all the indicator lights (163-0 through 163-7), except one, to light up, and with the turned-off indicator light permuting cyclically among the 8.

If there is still at least one faulty source, the indicator lights (163-0 through 163-7) will provide the address of the state byte of the next faulty source. Once again, the excited indicator lights will flash to indicate that this is an address and not a state byte.

When the address scan push button (163-9) is pressed for the seventh time, the indicator lights (163-0 through 163-7) will indicate the value of the PRE-BREAKDOWN state byte contained at the address obtained when the push button (163-9) was pressed for the sixth time.

When the address scan push button (163-9) is pressed for the eighth time, the POST-BREAKDOWN state byte will be displayed by the indicator lights (163-0 through 163-7).

And so forth and so on, by successively pressing push button (163-9), the operator and the maintenance technician can successively scan the faulty sources so as to know the address of the state bytes as well as the contents of the PRE-BREAKDOWN and POST-BREAKDOWN bytes.

Upon completion of this scanning operation, which is indicated by the lighting of all the indicator lights except one, pressing the push button (163-9) for the last time will return the indicator lights to their first assignment, which is to display the state bytes of the slave power supply (9) and of the primary source supply (18).

As stated earlier, if the scan push button (163-9) has not been operated for 3 minutes, the address scan sequence will be automatically reset, that is, the indicator lights (163-0 through 163-7) will once again be assigned to display the faults of the slave power supply (9) and of the primary power supply (18).

The service panel (11) will now be considered in its MAINTENANCE OPERATING MODE, i.e., after the OPERATION/MAINTENANCE switch has been placed in the MAINTENANCE position by the maintenance technician. In this position, the MAINTENANCE COMMANDS (164) are validated in the MAINTENANCE operating mode, the fault flip-flops are reset differently in accordance with the subsystems. During maintenance procedures, the maintenance technician elects to work more specially on one or more subsystems. To this end, he has at his disposal a means of particularizing these subsystems. When this means is put into service on a particular subsystem, this subsystem is said to be placed in the LOCAL CHECK mode or, simply, in the "LOCAL" mode, in order to indicate that this system partially escapes from the normal check of the power supply system and that it therefore requires a local check. More specifically, for subsystems placed in the "LOCAL CHECK" mode, pressing the "ON" push button (161-4) causes the resetting of all the fault storage flip-flops as well as of the MINOR FAULT and MAJOR FAULT storage flip-flops. This "LOCAL CHECK" operating mode will be described in greater detail in subsequent paragraphs.

Section (164) is the section in which the MAINTENANCE CHECK DEVICES are located. This section only becomes operational if the OPERATION/MAINTENANCE switch is placed in the MAINTENANCE position. It comprises the following elements:
EIGHT REVERSING SWITCHES (164-0, 164-1, 164-2, 164-3, 164-4, 164-5, 164-6, 164-7), each capable of assuming two positions: a position marked "1", and a position marked "0". These eight reversing switches will subsequently be designated as KEY (164-0), KEY (164-2) . . . KEY (164-7) and will constitute the DISPLAY KEYBOARD (164 through 164-7);
a SWITCH-FUNCTION-DEFINITION REVERSING SWITCH (164-8). In the upper position marked DISP (abbreviation of DISPLAY), the reversing switch (164-9) assumes the DISPLAY ONLY FUNCTIONS. In its lower position marked MODE, the switch (164-9) is used to control and check the SOURCE OPERATING MODES.
a FUNCTION SELECT REVERSING SWITCH (164-9) which, as indicated above, serves to select the maintenance functions from those preselected by the reversing switch (164-8).

To summarize, the maintenance section (164) may be said to operate in 2 different ways according to the position of the reversing switch (164-8). If the switch (164-8) is placed in its upper "DISP" position, the maintenance technician may use the indicator lights (163-0 through 163-7) to display the machine's internal bytes. If the switch (164-8) is placed in its lower "MODE" position, the maintenance technician can send commands to the sources and read the report of those commands on the indicator lights (163-0 through 163-1).

These 2 operating modes of the maintenance section (164) will now be discussed in detail. The first operating mode to be examined is the mode in which the reversing switch (164-8) is placed in the upper DISP positon. In this case, if the reversing switch (164-9) is placed in its upper position marked DIR (abbreviation of "DIRECT"), the KEYBOARD (164-0 through 164-7) serves to define the address of the byte the maintenance technician wishes to have displayed by the indicator lights (163-0 through 163-7). To accomplish this, the maintenance technician defines the NUMBER OF THE POWER SUPPLY SUBSYSTEM INVOLVED by positioning the KEYS (164-0 through 164-3), then defines the BYTE ORDER NUMBER by positioning the keys (164-4 through 164-7).

Once the address has been displayed, the maintenance technician has two alternatives which he can use in any order of sequence. By pressing the INITIALIZATION push button (163-8), the displayed byte is the internal state byte of the source which is addressed prior to the execution of the last ON or OFF or RESET command, or prior to the correction of a possible fault. By pressing the SCAN push button (163-9), the displayed byte is the current state byte.

In the case where, with the reversing switch (164-8) still placed in its upper position, the reversing switch (164-9) is placed in its lower SEQ (abbreviation of SEQUENTIAL) position, the operation of the indicator lights (163-0 through 163-7) is identical to that described for the power supply system OPERATION mode of operation.

The SCAN (163-9) push button is used to change the displayed byte address, and the INITIALIZATION (163-8) push button serves to initialize the address scan sequence.

In the second operating mode, which is defined by having the reversing switch (164-8) placed in its lower position marked MODE, the maintenance technician can change the OPERATING MODE OF THE SUBSYSTEMS. How this is accomplished will be described below.

When the reversing switch (164-9) is placed in its upper LOCAL position, the maintenance technician can place at will any number of SUBSYSTEMS in the "LOCAL" operating mode.

When a subsystem is placed in the LOCAL mode, minor and major faults detected on the level on this subsystem will not be passed on to the console (48). This feature enables the maintenance technician to work on a faulty subsystem without requiring the MONITOR (10) to switch off that subsystem. In fact, in subsequent paragraphs it will be seen how this operation sometimes requires this faulty subsystem to operate in a simulated mode, i.e., supplying no current, to prevent components from being destroyed. This LOCAL operating mode exists only when the OPERATION/MAINTENANCE switch has been placed in the MAINTENANCE position; placing this switch in the OPERATION mode will cause the LOCAL mode to disappear permanently for all subsystems which had been placed in that mode. To return to the LOCAL mode, it will be necessary to perform the operations discussed below. To reset the minor fault and major fault flip-flops of the subsystems which had been placed in the LOCAL mode, the maintenance technician presses the ON push button (161-4). It should be noted that pressing the ON push button (161-4) under these conditions will have no impact on the error flip-flops of the subsystems which have not been placed in the LOCAL mode. In order to place subsystems in the LOCAL mode, the technician must act on the KEYBOARD (164-0 through 164-7). Each KEY on the KEYBOARD is assigned to a subsystem; KEY 0 is assigned to subsystem 0, KEY 1 to subsystem 1, . . . KEY 7 to subsystem 7. The maintenance technician places in the upper position labeled "1" the KEYS for the subsystem he wishes to place or keep in the LOCAL mode, and places in the lower position labeled "0" the keys for the subsystems he wishes to place or keep in the NORMAL mode. By pressing the SCAN push-button (163-9) the maintenance technician validates the positioning of the KEYS and the MONITOR (10) places the subsystems in the modes being displayed. The maintenance technician is kept informed of the proper execution of the operation by the indicator lights (163-0 through 163-7).

Each indicator light is assigned to a subsystem: indicator light (163-0) to subsystem 0, indicator light (163-1) to subsystem 1, . . . indicator light (163-7) to subsystem 7. For each subsystem switched to the LOCAL mode, a corresponding indicator light (163-4) turns on and, conversely, the indicator lights (164-4) which correspond to the subsystems in the NORMAL mode, are turned off.

When, with reversing switch (164-8) still being placed in the lower "MODE" position, reversing switch (164-9) is placed in the lower position labeled INHI (abbreviation of INHIBIT), the maintenance technician can place subsystems in the INHIBIT state. This INHIBIT state is also called INVALIDATE state. The inhibit state is a subsystem operating mode in which all control and check units are operating, but a blocking signal prevents power from being applied. This INHIBIT operating condition enables fault detection and localization without endangering electrical circuits.

The transition to the INHIBIT operating condition is effected through display on the KEYBOARD (164-0 through 164-7). Each KEY on the KEYBOARD (164-0 through 164-7) is assignd to the SUBSYSTEM whose number is the last digit of the number on the KEY: subsystem 0 corresponds to KEY (164-0), subsystem 1 corresponds to KEY (164-1) . . . , subsystem 7 corresponds to KEY (164-7).

The power supply system is designed such that, as described above, only subsystems that have previously been switched to the LOCAL mode can be switched to the INHIBIT operating condition or returned to the NORMAL operating condition. Thus, the maintenance technician first switches to the LOCAL mode the subsystems for which he wishes to change the NORMAL ON state to the INHIBIT state, or vice versa. Then, he switches to the "1" position the KEYS corresponding to the subsystems he wishes to switch to the INHIBIT state, and to the "0" position the KEYS corresponding to the subsystems he wishes to switch to, or maintain in, the NORMAL ON state.

The change of state is validated by pressing the SCAN push button (163-9). Pressing the SCAN push button (163-9) authorizes the MONITOR (10) to proceed with a possible change in operating condition. The operating condition of the subsystems is shown by the indicator lights (163-0 through 163-7), each of which is assigned to the subsystem which corresponds to the last digit of its designator number: indicator light (163-0) corresponds to subsystem 0, indicator light (163-1) to subsystem 1, . . . indicator light (163-X) to subsystem 7. The indicator lights (163-X) which are on indicate which subsystems have been placed in the INHIBIT state, and the indicator lights (163-Y) which are off indicate which subsystems have been placed in the NORMAL ON state.

There will be no change in operating condition for subsystems which have not been switched to the LOCAL mode, whether they are in the NORMAL ON or INHIBIT state.

It should also be noted that a subsystem's operating condition is not affected by any change in the position of the OPERATION/MAINTENANCE switch. Thus, when a subsystem has been switched to the INHIBIT state by the maintenance technician, it remains in that operating condition when the subsystem returns to the OPERATING mode.

The OFF command is generated by pressing the OFF push button (165-5) and, thus, the OFF command generated from the data processing system console does not erase the INHIBIT state, for these INHIBIT states are stored into memory in the MONITOR (10) which continues to be powered by the SLAVE SUPPLY POWER.

The INHIBIT state can only be erased by using the maintenance procedure discussed below.

Figure 10:
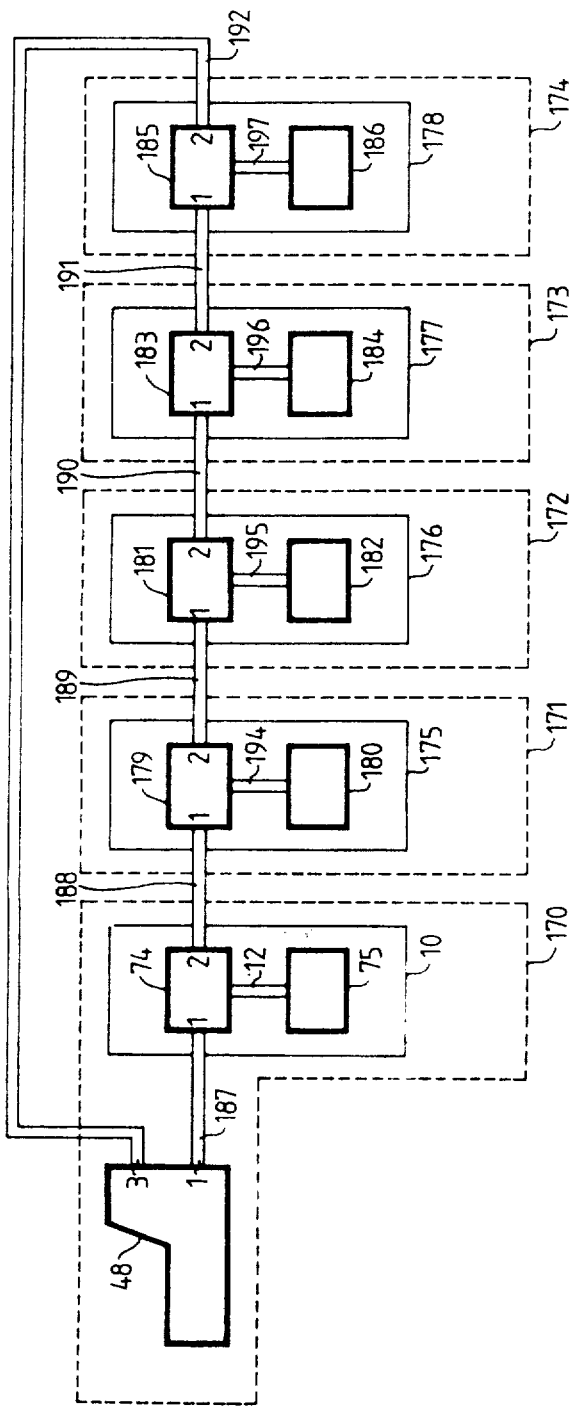
FIG. 10 illustrates the daisy chain mode of connecting serveral power supply systems to an OPERATOR CONSOLE (48).

The Service Panel (11) is not the only means of communication between the operator and the power supply system; the operator can control and check the power supply system from the console (48) and from the data processing system. The equipment is, in fact, designed to allow several power supply systems to be controlled and checked from a single console (48). This is accomplished by organizing the control and check links for the power supply systems in a daisy chain, as already mentioned above. This mode of connecting the power supply systems is illustrated in FIG. 10. cl INTERCONNECTING SEVERAL POWER SUPPLY SYSTEMS FIG. 10 shows 5 data processing systems (170), (171), (172), (173), (174). System (170) represents the date processing system described above. As a reminder, system (170) consists of (see FIGS. 1a –1b):

the control and check console (48)
a central unit (21)
a main memory (24)
(an input/output exchanger (27)
a magnetic disc coupler unit (30)
a magnetic tape coupler unit (33)
a slow-peripheral coupler unit (36) and, finally,
a second magnetic disc coupler unit (45).

This system (170) is a self-contained data processing system.

The user can complete this system by adding, for example, other data processing systems in order to form a multiprocessor-based data processing system. This type of system is illustrated in FIG. 10: systems (171), (172), (173), (174) are self-contained systems, each having a central unit.

System (170) will be called data processing system 0, system (174) data processing system 1, system (172) data processing system 2, system (173) data processing system 3, and system (174) data processing system 4.

Figure 11:
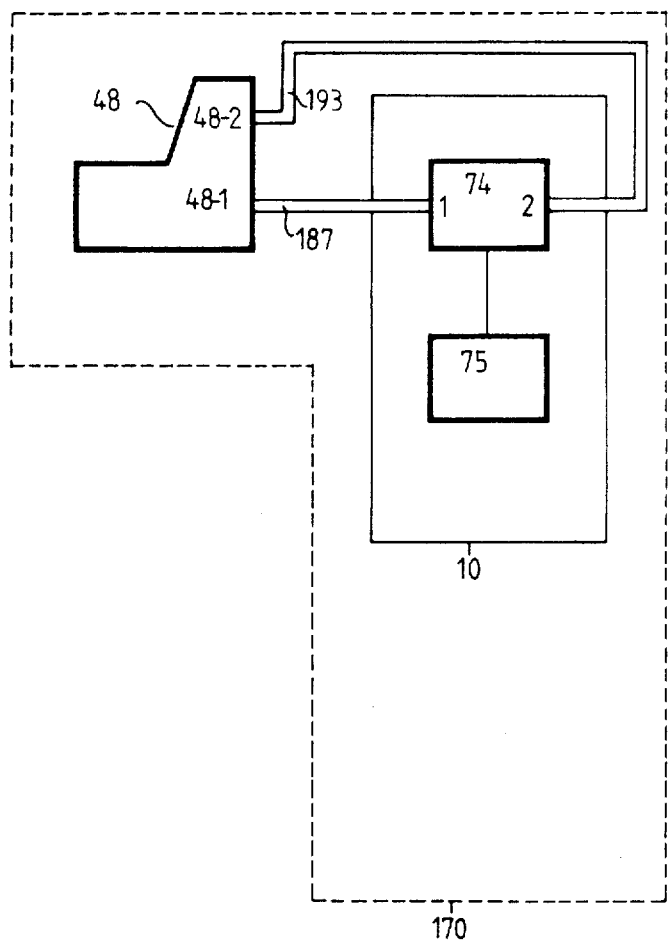
FIG. 11 illustrates the mode of connecting a single power supply system to the OPERATOR CONSOLE (48).

In system (170) which was shown in the previous Figures and is also shown in FIG. 11, the operating console (48) is connected with the monitor (10) through link (43). This is shown in FIG. 11 by link (187) which connects output (48-1) of the console (48) to input (74-1) of an AM904-type operation interface module (74) and as link (193) which connects output (74-2) of operation interface module (74) with input (48-2) of the console.

In FIG. 10, which represents a multiple data processing system, output (74-2) is connected through link (188) to input (179-1) of the AM904 operation interfaces module (179) of system (171). Output (179-2) of the AM904 operation interface module (179) is connected through link (189) to input (181-1) of the AM904 operation interface module (181) of system (172). Output (181-2) is connected through link (190) to input (183-1) of the AM904 operation interface module (183) of system (173). Output (183-2) is connected through link (191) to input (185-1) of the AM904 operation interface module (185) of system (174). Output (185-2) is connected through link (192) to input (48-2) of the console. This return to the console (48) thus closes the loop.

In the device illustrated in FIG. 10, signals sent by the operator to the multiple system through the control and check console (48) are transmitted through link (187) to system (170). The signals arrive at input (74-1) of the (AM904) operation interface module (74) belonging to the MONITOR (10). The module (74) passes these signals on to the control module (75) through the control bus (12). These received commands are executed by the MONITOR (10) and it is only after these commands have been fully executed that the MONITOR (10), through output (74-2) of the AM904 operation interfce module (74), applies the signals to be transmitted to link (188). That link (188) terminates at the input (179-1) of the AM904 operation interface module (179) belonging to monitor (175). This monitor (175) checks the power supply system of data processing system (171). Operation interface module (179) sends the commands to Control Module (180) through control bus (194). This control module (180) executes the received commands and it is only after these commands have been executed that it sends to the AM904 operation module (179) a command to apply to output (179-2) the signals to be routed through link (189) to data processing system (172). And so on, and so forth, the signals generated move on and pass through the data processing systems until the last data processing system (174) itself has executed the received commands. This execution causes a command to be generated for the AM904 operation interface module (185) to apply the signals to link (192) which is connected to output (185-2). Link (192) routes these signals to the control and check console (48), into which they enter through input (48-2). This return of the resulting signals enables the console (48) to control and to check the proper execution of the commands.

FIG. 11 illustrates the case of a data processing system which includes a single power supply system (170). In that system, the operator sends commands from the data processing system console (48). The commands are transmitted by signals carried over link (187) which is connected, on the one hand, to output (48-1) of the data processing system console (48), and, on the other hand, to input (74-1) of the AM904 operation interface modules (74). The signals received by the AM904 operation interface module (74) are used, as will be explained in subsequent paragraphs, by the AM902B control module (75). Once its task has been completed, the AM902B control module (75) will return to the AM904 operation interface module (74), through the control bus (12), the discharge signals reflecting the manner in which the task requested of the AM902B control module (75) was completed. These discharge signals will be covered in subsequent paragraphs. These discharge signals are transmitted by the operation interface module (74) through link (173) to input (48-2) of the data processing system console (48). These discharge signals are transformed within the data processing system console (48) and become display signals which allow the operator to be advised as to the manner in which the action be requested was executed. In the particular design of the invention which is described herein, the signals carried by links (187) and (193) are designated by the term SPCI signals (abbreviation of SYSTEM PØWER CØNTRØL INTERFACE). In the following paragraphs, the SPCI signals arriving at input (1) of the AM904 operation interface units will be designated as SPCI-ØUT signals.

The console (48) contains appropriate circuitry to execute the operations for controlling and checking the power supply system(s) which is (are) connected to it. This circuitry will not be described because it is similar to the conventional circuitry in most data processing systems, such as, in particular, that manufactured by the applicant.

Basically, the interface signals exchanged between the console (48) on the one hand, and the various power subsystems which the console (48) is required to control and check, on the other hand, will be used to explain the operation of the invention. As explaind above, these interface signals are carried by daisy-chain-wired interface (SPCI Interface) links.

The first signals to be considered are the signals sent by the console (48) to the power supply systems. These are the start-up request signal, LØG ØN (abbreviation of LØGICAL ØN), the shutdown request signal, LØG ØFF (abbreviation of LØGICAL ØFF), and the ENAB (abbreviation of ENABLE) synchronization signal (see FIG. 12).

Start-Up Request Signal, LØG ØN:

Initially, when the entire system is off, including the console (48) and the power system(s), the operator must first turn on the console (48) which has its own autonomous power supply. This start-up operation is immediately followed by a console (48) circuit initialization sequence. This sequence is intended to place all the circuits in the console (48) in a given initial state. This given initial state will hereinafter be called the "ORIGINAL" initial state.

The ORIGINAL initial state of the start-up request signal, LØG ØN, is down. This can easily be explained, since at that moment no start-up request has yet been made. This start-up request signal is designed to indicate to the on-line power supply systems that the operator has requested that the power sources be turned on. To make that request, the operator is required to press a POWER ON push button. The LØG ØN start-up request signal begins to go up when the operator releases the POWER ON push button on the console (48). The LØG ØN start-up request signal remains up until the operator requests that a power supply system shutdown sequence be executed, or until he switches off the console (48).

Shutdown Request Signal, LØG ØFF:

The LØG ØFF SHUTDOWN request signal indicates to the power supply systems that the operator has requested that all the power supply systems be turned off. The "ORIGINAL" initial state of the LØG ØFF shutdown request signal is up. This can easily be explained, since initially all the power supply systems are off, pending a start-up request by the operator. This signal remains up until the operator executes a start-up request by pressing the PØWER ØN push-button at the console (48). At that moment the LØG ØFF shutdown request signal goes down. It will stay down until the operator requests that the power supply systems be shut down by pressing the PØWER ØFF push-button at the console (48). At that moment, the LØG ØFF shutdown signal will go up.

The LØG ØN start-up request signal and the LØG ØFF shutdown request signal are only requests.

Execution of the start-upsequence or shutdown sequence requires the appearance of an ENI (abbreviation of ENABLE IN) synchronization signal. This synchronization signal will trigger the execution of the sequence requested.

ENI Synchronization Signal

This signal consists of a pulse of a specific duration $\theta_2$. This pulse occurs at the end of a time interval $\theta_1$ after the operator has released either the PØWER ØN push-button, or the PØWER ØFF pushbutton at the console (48). This ENI pulse is transmitted through the SPCI daisy chain of the links between the power supply systems and the console (48).

Each power supply system has a synchronization input and a synchronization output. The ENI (abbreviation of ENABLE IN) synchronization signal is applied to the synchronization input. This ENI input synchronization signal initializes the sequence requested by one of the LØG ØN or LØG ØFF signals. Once this sequence has been completed, the power supply system sends through its synchronization output an ENØ (abbreviation of ENABLE ØUT) output synchronization signal to the next power supply system where it will serve as an ENI input synchronization signal. If the power supply system is the last system in the PSCI daisy chain, this ENØ output synchronization signal will be changed through a special cable connecting the peripheral connection link to the console (48) into an SEQC (abbreviation of SEQUENCE COMPLETE) end of sequence completion signal.

Figure 12:
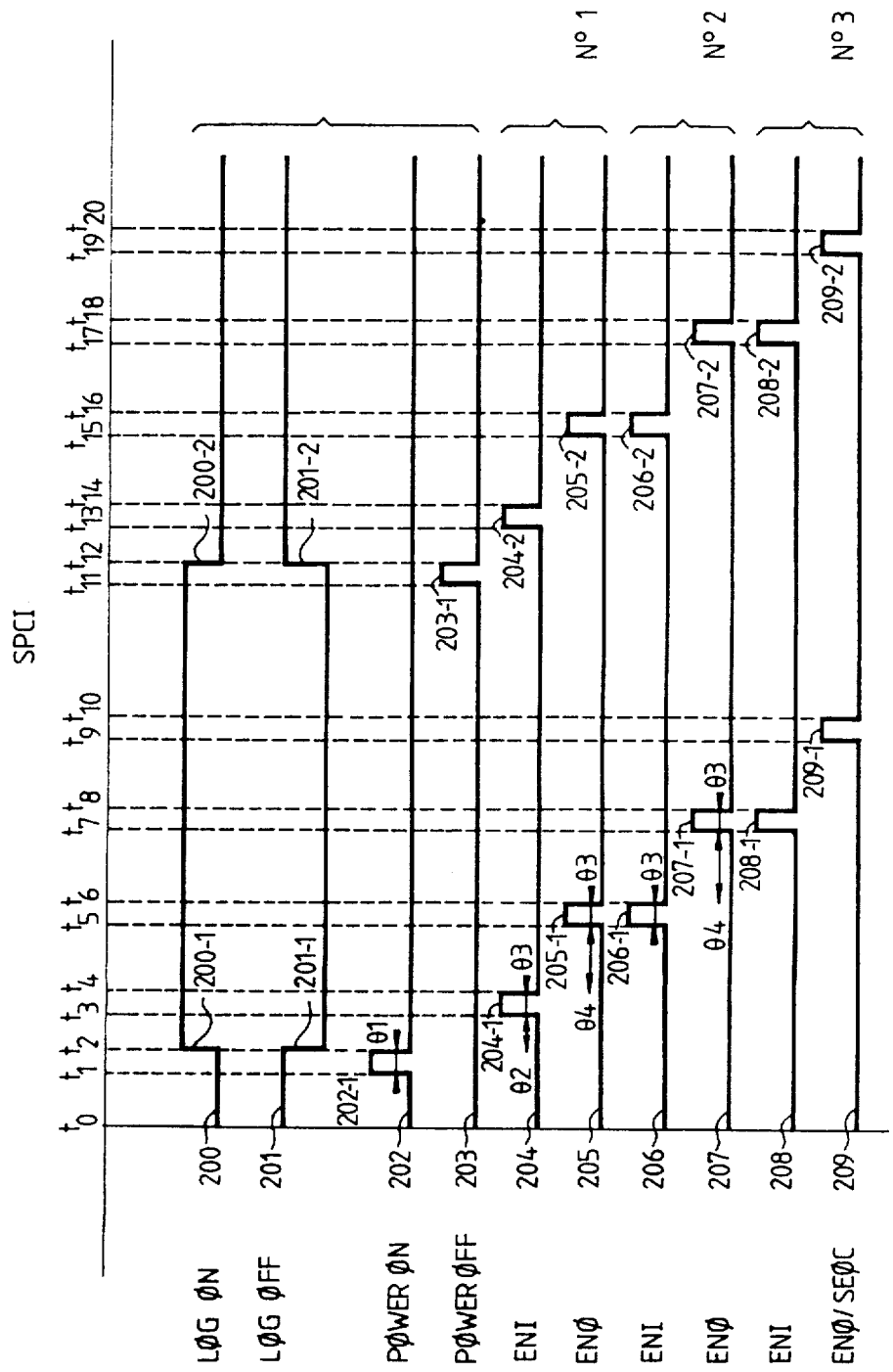
FIG. 12 illustrates the chronological flow chart of the signals exchanged within the daisy chain in the specific case of three power supply systems.

FIG. 12 shows the flow chart of the signals exchanged in the specific case of a data processing system which includes 3 power supply systems. This number of power supply systems, is, of course, not limitative, but has been limited to 3 in the figure to avoid unnecessary cluttering of the figure.

The LØG ØN start-up request signal, is represented at (200), the LØG ØFF shutdown request signal is represented at (201), the signal generated by the PØWER ØN push-button at the console (48) is shown at (202), the signal generated by the PØWER ØFF push-button at the console (48) is shown at (203), the ENI synchronization signal generated by the console (48) following each pressing of one of the PØWER ØN or PØWER ØFF push-buttons is shown at (204).

Instant t0 represents the ORIGINAL initial instant, which is the instant when, for example, the console (48) having been turned on, the circuits have been placed in their initial state: the LØG ØN (200) signal is down, the LØG ØFF (201) signal is up, the PØWER ØN push-button output signal (202) is down as well as the PØWER ØFF push-button signal (203), and the ENI synchronization signal (204) is also down. A chronological analysis of the instants involved reveals that at t1, the operator presses the PØWER ØN push-button to request that the power supply systems be turned on. Pressing that button causes the signal (302) to come up until instant t2 when the operator releases the PØWER ØN push-button which causes the signal (202) to come down. A pulse (202-1) having a t1−t2=θ1 duration has been added to signal (202). The descending edge of said pulse is a request to the ENI synchronization signal (204) generation circuitry. This ENI synchronization signal occurs at instant t3 after a period of time t3−t2=θ2 and has a duration which is equal to the time interval θ3 separating instant t4 from instant t3. This ENI synchronization pulse (204-1) is transmitted to the input of the power supply system located at the beginning of the SPCI daisy chain; this power supply system will be called POWER SYSTEM NO. 1. This ENI pulse (204-1) will trigger in power system No. 1 the execution of the power system start-up sequence, since the LØG ØN signal is up and the LØG ØFF signal is down. This sequence begins at instant t4 and ends at instant t5, which represents a time interval of t5−t4=θ4. At t5, the power supply system has completed its start-up sequence, and the monitor of this power supply system generates an ENØ output synchronization signal (205-1)

(abbreviation of ENABLE ØUT). This ENØ output synchronization signal (205-1) is intended for the next power system in the SPCI daisy chain: power system No. 2. This ENØ output synchronization signal (205-1) will serve as an ENI synchronization signal (206-1) for the monitor of power system No. 2. In the presence of this synchronization signal (206-1) and the LØG ØN (200) request signal which is up, the monitor will turn on power system No. 7. Once this sequence has been completed, it will send out an ENO output synchronization signal (207-1). This synchronization signal (207-1) is transmitted to power system No. 3 where it serves as an ENI input synchronization signal (308). This power system will then be started up. Once this start-up operation has been completed, power system No. 3 will send out an ENØ output synchronization signal (209-1), but, since it is the last power system in the SPCI daisy chain, the ENØ output synchronization signal (209-1) is transmitted by means of a cap placed over the unused connector of the SPCI daisy chain to the console (48) through a link called the SEQC link (abbreviation of SEQUENCE COMPLETE). The arrival of the SEQC pulse indicates to the console (48) circuitry that all shutdown operations have been successfully completed.

It is now possible to discuss what transpires when the operator requests a power supply system shutdown operation. This is what happens at instant t11 when the operator presses on the PØWER ØFF push-button, until instant t12; this is illustrated at (203-1) where a pulse is produced. When the push-button is released at instant t12, the LØG ØN start-up request signal (200-2) goes to zero, and the LØG ØFF shutdown request signal (201-2) goes to 1. This means that a shutdown cycle request has indeed occurred, following this transition from the LØG ØN (200) to the LØG ØFF (201) signal, the console (48) circuitry generates an ENI synchronization pulse (204-2) which occurs between instants t13 and t14. This ENI input synchronization pulse (204-2) is transmitted to power system No. 1. The monitor of this power system, in the presence of this ENI synchronization pulse (204-2) and a LØG ØFF (201) signal which is up, will trigger a shutdown sequence for power system No. 1. Once this shutdown sequence has been completed, the monitor will send between instants t15 and t16 an ENØ output synchronization signal (205-2) to system No. 2. This ENØ output synchronization pulse (205-2) will serve asn an ENI input synchronization pulse (206-2) for power supply system No. 2. This power supply system then completes shutdown sequence and transmits betwen instants T17 and T18 an ENØ output synchronization signal (207-2) for power system No. 3. When power system No. 3 receives this pulse as an ENI synchronization signal (208-2) it completes a shutdown sequence before sending out an ENØ synchronization signal (209-2) between instants t19 and t20. This ENØ output signal (209-2) is used to produce the SEQC pulse which is looped back to the console (48) to indicate that the shutdown sequence has been completed for all power supply systems.

In addition, the console applies a DC voltage to one of the links. This DC voltage is called a PROTECTION VOLTAGE or also an AUXILIARY VOLTAGE. This protection voltage is provided by a high-impedance source and is applied to all AM904 operation interface circuit boards in the data processing system. In each AM904 operation interface circuit board, this voltage is applied to the circuit which generates the SEQUENCE ERROR (SEQUERR) signal which will be discussed in subsequent paragraphs. This voltage is in conflict of access with the sequence error circuit control signal transmitted by the monitor. However, in normal operation, the monitor has priority over the protection voltage to monitor the circuit generating the SEQUENCE ERROR signal. The usefulness of the protection voltage is made apparent in the event of a failure of the monitor. In such a case, the protection voltage forces the separate error circuit to generate a sequence error signal. Without such an arrangement, the anomaly would not have been signalled because of the monitor failure.

After having examined the signals sent out by the console (48) to the AM904 operation interface units, it is useful to examine the signals which these operation interface units send back to the console (48). These signals are:
SEQUENCE ERRØR* SEQUERR
SYSTEM FAULT* SYS FLT
CØØLING FAULT* FAN FLT*
SEQUENCE CØMPLETE SEQC*
CØMMON RESØURCES ERRØR* CRE RR*
Each of these signals is used to light up an indicator light on the console (48). These indicator lights advise the operator of the operating conditions of the power supply system.

A preliminary remark needs to be made. The signals with an asterisk (*) are inverted signals: that is to say, for example, that when the SEQUENCE ERROR* signal is up, it means that there is no sequence error. There is a sequence error if the SEQUENCE ERROR* signal is down. This remark is true for each signal bearing an asterisk(*).

All these signals transmitted to the console (48) are generated by devices which use an open-collector transistor as an output. The collectors of transistors which are used as the output circuit for a given signal such as, for example, the SEQUENCE ERROR signal, are connected in parallel over a bus whose resetting resistor is located in the console (48). Morever, they pass through all the downstream interface units. They enter through connector Y01 (see FIG. 13) and exit through connector Y02. Thus, if one of the peripheral links is not connected, the system will be blocked because, since the bus is open, the non-powered section of this bus will be at a lower level than the "abnormal" level, i.e., the level which indicates an abnormal operation.

It should also be noted that if the console (48) is not turned on, or if there is no resetting voltage, the buses will not be powered and the system will also be The SEQUENCE*ERROR (SEQUERR**) signal As explained above, the power supply system start-up and shutdown operations are carried out one after the other. For example, in the case of the turn-on operation, when the operator presses the PØWER ØN push button, the LØG ØN turn-on signal is made to take on a high value. This transition of the LØG ØN start-up signal to a high value is followed by the transmission of an ENI input synchronization signal. This signal is transmitted to power supply system No. 1 which initiates its start-up sequence. Upon completion of this start-up operation, power supply system No. 1 sends out an ENØ output synchronization signal which is transmitted to power supply system No. 2, which receives said signal as an ENI input synchronization signal. And so forth and so on. All the power supply systems connected to the SPCI daisy chain are started one after the other. The shutdown process is simlar, as mentioned earlier.

It is necessary, however, to consider what transpires at the level of each power system during this transient period between the moment the operator presses the "PØWER ØN" push button and the moment all the systems complete their start-up or shutdown sequences, as the case may be.

Within each power supply system, the monitor (10) is equipped with a memory in which it notes the operating condition of the system it is required to monitor. This memory may contain either one of the following bits of information: power supply system on or power supply system off. The monitor (10) is alert and it cyclically compares the contents of this memory with the state of the LØG ØN and LØG ØFF signals which advises it of the operator's wishes. It is obvious that when the operator requests a change in the operating condition of the power supply system, a brief period of time will elapse during which the monitor (10) notes a divergence between the operator's request and the state of the power supply system. This time interval is the time required by the ENI synchronization signal to advise the monitor plus the time needed for the execution of the requested sequence by the power supply system.

The monitor (10) thus signals to the console (48) that it has noted that divergence. To accomplish this, it brings down the SEQUERR* bus and the latter will stay down as long as it does not note the correspondence between the operating state of the power supply system it is checking and the request expressed by the operator over the LØG ØN bus or over the LØG ØFF bus, as the case may be.

There is another circumstance where the monitor is required to bring down the SEQUERR bus. This is the case when, as a result of an incident, the 2 signals, LØG ØN and LØG ØFF, are both down. This is because in that case the monitor is unable to recognize the operator's request and does not know whether the operating condition of the power supply system it is checking is satisfactory.

It should be noted that because of the design it is impossible for both LØG ØN and LØG ØFF signals to be up simultaneously.

The SYSTEM FAULT* (SYSFLT*) Signal

As explained above, a data processing system designed according to the teachings of this invention contains one or more power supply systems. Each power supply system includes a certain number of power sources controlled by a monitor. For some reason, one or more power sources may experience operating faults. These operating faults result in difficulties which are more or less serious for the proper operation of the data processing system. The monitor, which is advised of these operating faults, advises, in turn, the console (48) by bringing down the "SYSTEM FAULT*" bus. When this signal goes down, the "SYSFLT*" indicator light which is located on the console (48) is either turned on or flashed on or off, according to the type of fault encountered: a major or a minor fault. This advises the operator that an incident has occurred at the level of one or more power sources.

The COOLING FAULT* (FANFLT*) Signal

When the primary power supply (18) is started, one or more fans designed to remove the heat dissipated within the power supply system are also started. Any failure of this cooling system may cause certain sections of the power supply system to overheat abnormally. To monitor the overheating of the components in the power supply system, thermal probes are placed at properly selected sites inside the power supply system. These thermal probes are designed to advise the monitor in the event any excessive overheating occurs which could cause the deterioration of the equipment. If such an incident occurs, it is recorded by the monitor, which so advises the console (48) by bringing down the "FANFLT*" bus, which is reflected by the turn-on of the console (48) FANFLT* indicator light.

The PRIMARY POWER SUPPLY AND COMMON RESOURCES FAILURE* Signal (CRERR*)

Each power supply system has a PRIMARY SUPPLY module (18) which in the preferred embodiment of the invention is actually a regulated DC power supply with a high current output and moderate regulation. It has a dual role: it must provide an appropriate DC voltage at the input of the power sources, while lightening the work of the power-source voltage regulators through coarse preregulation.

Moreover, there is likewise provided a group of electrical circuits designated herein by the term COMMON RESOURCES such as, for example, the cabinet and fan turn-on contactor. When the monitor orders the closing or opening of this contactor, the latter will, in turn, open or close a relay, as the case may be, which advises the monitor that the command has been executed.

If a breakdown occurs in the primary power supply (18) such as, for example, an excessive output voltage, the primary power supply sends out a PREREGULATIØN ØVERVØLTAGE signal ("PREGØV"). On the other hand, if the output voltage is too low, the primary power supply sends out a PREREGULATION UNDERVOLTAGE Signal ("PREGUV"). As for the contactor, it sends out a "RELAY CLOSED" signal "CØMREL" (abbreviation of RELAY CONTROL) when its contacts are in the closed position. These signals are intended for the MONITOR (10), but a synthesis is obtained by mixing the PREGØV, PREGUV, CØMREL signals to provide the CRER* signal over the PRIMARY POWER SUPPLY AND COMMON RESOURCES ERROR" bus. This CRER* signal causes the CRER* indicator light to turn on at the console (48).

The SEQUENCE COMPLETE (SEQC) Signal

As mentioned earlier, when changes in the operating condition of the power supply systems are requested, the operations for changing the operating condition of the power supply surplus are carried out one after the other. These state-change sequences are synchronized by an ENI input pulse which moves along the SPCI supply system interconnect daisy chain. When a power supply system receives an ENI input synchronization signal, it proceeds to change the state. Upon completion of this state change, it sends out an ENØ output synchronization signal to the next power supply system in the SPCI daisy chain. This ENØ output synchronization signal becomes an ENI input synchronization signal for the next power supply system. And so forth and so on. The synchronization signal moves along the SPCI daisy chain until it arrives at the last power supply system in the daisy chain. After receiving the ENI input sychronization signal, this last power supply system in the chain will undergo a state change. When its state change has been completed, it processes a signal which, this time, will not be an ENØ output synchronization signal as in the case of the other power supplies, but a SEQUENCE COMPLETE SEQC signal. This SEQUENCE COMPLETE SEQC signal is sent to the console (48) where it advises the control circuitry that the sequence has been completed.

As shown in FIG. 2, the AM904 operation interface unit (74) is also used for two other power supplies: the SLAVE POWER SUPPLY (9) and the PRIMARY POWER SUPPLY (18).

The SLAVE POWER SUPPLY (9) contains sources which supply slave voltages to the power supply system.

In the embodiment of the invention described herein, the SLAVE POWER SUPPLY sends out through link (39), in addition to certain slave voltages, a SERVUV report signal.

The SERVUV (abbreviation of Slave Undervoltage) is a signal which is up when at least one of the voltages supplied by the slave supply has decreased below a certain voltage limit. This SERVUV signal indicates to the monitor (10) that at least one of the voltages supplied by the slave power supply has exceeded the admissible tolerance.

The PRIMARY POWER SUPPLY (18) includes the following:
the primary power supply and slave power supply start-up circuitry;
the primary power supply checking circuitry;
the primary power supply;
the circuitry for turning on the cooling fans in the enclosure containing the power supply system;
the circuitry for checking the internal temperature within said enclosure.

In the preferred embodiment of the invention, the signals exchanged between the primary power supply and the slave power supply are:

Input signals in the primary and slave power supply block (18):
RELCØN
BLDCØN1
BLDCØN2
DCRES Output signals in the primary and slave power supply (18):
DCØN
DCØFF
CØØLF1
CØØLF2
CØØLF3
PREGUV
PREGØV
CØMREL
SERVUV The RELCØN (abbreviation of RELAY COMMAND) signal is a signal which commands the closing of the GENERAL CONTACTOR in the power supply system. When this contactor closes, it starts the primary power supply, the slave power supplies, and the cooling system.

The BLDCØN1 (abbreviation of BLEEDER 1 COMMAND) and BLDCØN2 (abbreviation of BLEEDER 2 COMMAND) signals are signals which command the contactors which switch the ballast resistors in or out.

The DCRES (abbreviation of Direct Current Reset) signal is a signal which resets the circuits which have a storage function. This DCRES signal is the signal which, for instance, makes it possible for the circuits to be placed in an appropriate status when the system is switched on.

The DCØN (abbreviation of Direct Current On) signal is the signal which is up when the primary supply output voltage level is in a determined area around the nominal level of said output voltage. This DCØN signal is the signal which advises the monitor (10) that the primary supply output voltage is on and is within satisfactory tolerances.

The DCØFF (abbreviation of Direct Current Off) signal is the signal which is up when the primary supply output voltage is between zero and a determined upper voltage limit over the zero voltage level. This DCØFF signal is the signal which advises the monitor (10) that the primary supply output voltage is near the zero voltage level, i.e., that the supply output voltage is quiescent.

The CØØLF1 (abbreviation of CØØ1 Fan 1), CØØLF2 (abbreviation of CØØ1 Fan 2) and CØØLF3 (abbreviation of CØØ1 Fan 3) signals are signals which are up when the thermal probes located in cooling duct 1, cooling duct 2, and cooling duct 3, respectively detect an excessive temperature level. Each of these signals, CØØLF1, CØØLF2, CØØLF3, advises the monitor (10) that there is possible overheating in one or more cooling ducts.

The PREGUV (abbreviation of Preregulation Undervoltage) signal is the signal which is up when the primary supply voltage is under the lower limit of the nominal voltage level, and the upper limit of the quiescent voltage value. This PREGUV signal advises the monitor (10) when the primary supply output voltage is lower than the normal voltage, without, however, being as low as the quiescent value.

The PREGØV signal (abbreviation of Preregulation ØVERVØLTAGE) signal is the signal which is up when the primary power supply output voltage exceeds the upper limit of the nominal voltage level. This PREGØV signal advises the monitor (10) that the primary power supply output voltage exceeds the upper limit of the allocated area.

The CØMREL (abbreviation of RELAY CONTROL) signal is the signal which is up when the GENERAL CONTACTOR is closed. This CØMREL signal advises the Monitor (10) that the general contactor has indeed responded to the RELCØN signal and that it is indeed closed, thus applying power to the power supply system.

THE AM904 OPERATION INTERFACE UNIT

Figure 13:
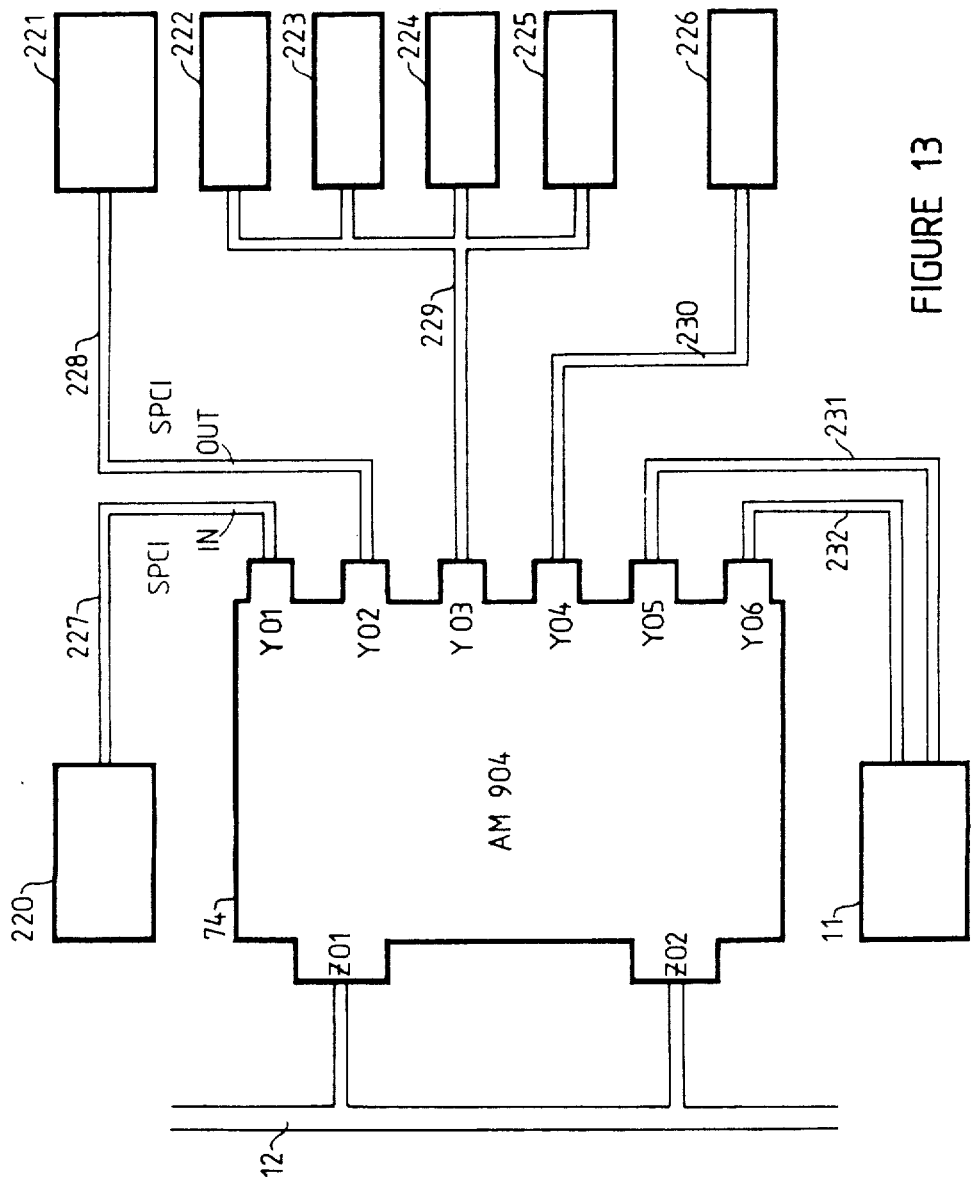
FIG. 13 is a block diagram of an AM 904 OPERATION INTERFACE UNIT (74) as well as the various links which are connected thereto.

FIG. 13 is a block diagram of an AM904 operation interface unit (74) with the various links terminating at said unit, i.e., (12), (227), (228), (230), (231) and (232);
links (12) is the power supply system control bus;
links (231) and (232) are used to connect the AM904 operation interface unit (74) to the Service Panel (11);
links (227) and (228) are links making up the SPCI daisy chain which is used to loop together the supply systems which are controlled and checked via the console (48);
link (229) connects the AM904 operation interface unit (74) to:
the slave power supply (222);
the tripping contactor (223);
the thermal controllers (224);
the ballast resistor control (225).
link (230) connects AM904 operation interface unit (74) to the primary power supply (226) proper.

Link (12) is the control bus which will be discussed in dedetail in subsequent paragraphs. This bus is used to communicate between the operation interface unit (74) and the monitor (10). This control bus (12) includes a certain number of conductors which are connected to the AM904 operation interface unit (74) through two connectors denoted Z01 and Z02. Each of these connectors contains 70 pins labeled 1 through 70. In the following figures, the connections are labeled Z01 and Z02 according to the connector involved, followed by a number indicating the pin number. Thus, the designation Z01-42PMC-MEMR means that the PMC-MEMR logic signal is received on pin 42 of connector Z01.

FIG. 30 is a table defining the logic designation(s) of the signal(s) received by each contact of connector Z01.

FIG. 31 provides the same information for connector Z02. The functions of these signals will be described in subsequent paragraphs.

Links (231) and (232) in FIG. 13 serve to connect the service panel (11) to the AM904 operation interface unit (74). FIG. 26 is a table which specifies the various signals conveyed by links (231) and (232). The signals in this table are classified by function:
power supply subsystem state signals (160);
power supply system general command signals (161);
subsystem command signals (162);
internal state byte display signals (163);
maintenance operation signals (164).

This same table also indicates the signal supplied by the MAINTENANCE/OPERATION switch.

The table in FIG. 26 shows the correspondence between the service panel (11) references and those for AM904 operation interface unit (74). This table contains 2 sections:
the left-hand section, with 3 columns corresponding to the references used in the description of the service panel, along with FIG. 9.

These three columns are as follows, from left to right:
a FUNCTION column defining the functions which correspond to the signals. These functions are: DISPLAY, PUSH BUTTON, INVERTER/SWITCH and KEY. These functions are described along with the description of FIG. 9;
a REFERENCE FIG. 9 column. This column contains the references shown in FIG. 9 for the devices which receive the various signals in the service panel (11);
a SYSTEM DESIGNATION column which provides the logic designation of the signals at the power supply system level;

the right-hand section, containing 5 columns, contains the references and designations utilized in this description of the AM904 operation interface unit (74). These 5 columns are as follows, from left to right:
a CONNECT column defining the connector on which each signal is received;
a PIN column defining the connector pin to which each signal is connected;
an INTERNAL DESIGNATION column indicating, for each signal, the designation used in the description of the AM904 operation interface unit (74);
a NAME column indicating, for each signal having multiple designators, the additional name(s) designating that signal;
a FIGURE column indicating the numbers of the figures in which the signals are illustrated.

Links (227) and (228) in FIG. 13 are the daisy chain or SPCI interface links between the console (48) and the various power supply systems as illustrated in FIG. 10 and 11. Link (227) is the link between the power supply system and either the console (48) if that system is the first supply system in the daisy chain, or the power supply system located downstream if that system is not the first one. Line (227) is labeled SPCI-IN to indicate that it conveys the signals which enter the operation interface unit (74). Link (228) is the link between the operating system and either the console (48) if that system is the last power supply system in the daisy chain, or with the power supply system located upstream if that system is not the last one. Link (228) is labeled SPCI-ØUT to indicate that it conveys the signals which come out of the operation interface unit (74).

FIG. 27 details the various signals conveyed by links (227) and (228). This FIG. 27 includes a table which is divided into 2 horizontal sections. The upper section, labeled SPCI-IN, concerns the signals carried by link (227). These signals are signals entering the AM904 operation interface module (74). The lower section, labeled SPCI-ØUT, concerns the signals carried by link (228). These signals are signals coming out of the AM904 operation interface unit.

The table in FIG. 27 is also divided into two vertical sections. The left-hand section, consisting of 3 columns, concerns the SPCI interface, and the right section, consisting of 5 columns, concerns the AM904 operation interface module (74).

The left section contains the following 3 columns:
a FUNCTION column. This column contains the designation of the function of the signal concerned by the line. Three types of functions are indicated: COMMANDS, REPORTS and SYNCHRONIZATION.
a FIGURE 10/11/13 REFERENCE column. This column contains the references for the signals in FIG. 10, 11 and 13;
a SYSTEM DESIGNATION column. This column contains the designators given to the signals at the power supply system level.

The right-hand section includes the following 5 columns:
a CONNECTOR column which contains the reference for the 401 or 402 connector through which each signal passes;
a PIN column indicating the pin to which the line associated with each signal is connected;
an INTERNAL DESIGNATION column providing for each signal the NAME given to that signal in the AM904 operation interface unit (74);
a NAME column providing for each signal having multiple designators, the additional name(s) designating that signal;
a FIGURES column indicating the numbers of the Figures in which those signals are illustrated.

FIG. 28 contains a table listing the signals conveyed by links (229) and (230). This table has 4 sections. Each section corresponds to a block in FIG. 13: the service supply (222), the ON/OFF contactor (223), the thermal control (224), the ballast resistor control (225), and the primary supply (226). The table lists for each section the signals exchanged with the AM904 operation interface unit.

Table 28 is divided into 2 vertical sections: a left-hand section which contain 3 columns and concerns the primary and service supplies, and a right-hand section which contains 5 columns and concerns the AM904 operation interface unit.

The 3 columns in the left-hand section are as follows:
a FUNCTION column defining the function assumed by each link;
a REF. FIG. 13 column defining the number in FIG. 13 corresponding to each link;
a SYSTEM DESIGNATION column defining the designation of each signal at the power supply system level.

The 5 columns in the right-hand section are as follows:
a CONNECT column defining the connector through which each signal passes;
a PIN column defining the connector pin to which each signal belongs;
an INTERNAL DESIGNATION column defining each signal's internal designation within the AM904 operation interface module (74);
an OTHER NAMES column listing the other names used to designate the signal;
a FIGURES column indicating the numbers of the figures in which the signal-carrying links are shown.

FIG. 29 contains a table defining the signals going back and forth directly through the control bus (12) between the power sources and the AM904 circuit board. Each power source in the power supply system has been assigned a dedicated line designated by the name GFLTxx (abbreviation of GENERATOR FAULT) where the postfix xx represents the number of the power source the GFLT signal is concerned with. The number of a power source xx is defined by the position of the AM903 downstream interface unit controlling it in the RACK. It will be seen in subsequent paragraph that this line enables the associated power source to advise the control module (11) if any operating fault should appear. This table (29) makes it possible to establish a correspondence between the GFLT lines, the power source numbers, the designations and connector pins.

The GFLT signals are also shown, of course, in FIG. 30 which contains all the signals belonging to the control bus (12).

Upon examination, this table (FIG. 29) shows that in the preferred embodiment of the invention, the possibility of having 14 half AM903 circuit boards has been adopted; for a total of 28 ISM (Source Monitor) interfaces and 14 LSSCI interfaces, since there is one GFLT signal per half AM903 circuit board.

This number is, of course, not limitative; it has only been selected here for reasons of convenience, any other number could have been chosen, on condition that provision is made for the links and circuit board locations in the rack which are required by the implementation of the power supply system.

The table in FIG. 29 is divided into 2 vertical parts. The left side concerns the signals as they relate to the AM903 downstream interface unit and the power supply system, and the right side concerns the relationship of these same signals with the AM904 operation interface unit.

The left side of table 29 contains 3 columns:
a FUNCTION column, which indicates the signal function;
a DESIGNATION column, which indicates the designation of each signal at the level of the power supply system;
an "AM903 POSITION" column, which defines the position, in the frame of the AM903 downstream interface unit which generates each signal.

The right side of table 29 contains 5 columns:
a connector column defining the connector through which each signal passes;

a PIN column defining the pin on which each GFLT signal is received;

an INTERNAL DESIGNATION column which indicates, for each signal, the designation assigned to that signal within the AM90r operation interface unit;

a NAME column containing the other possible names given to the signals;

a FIGURES column indicating the numbers of the figures on which the signals are illustrated.

Figure 14A:
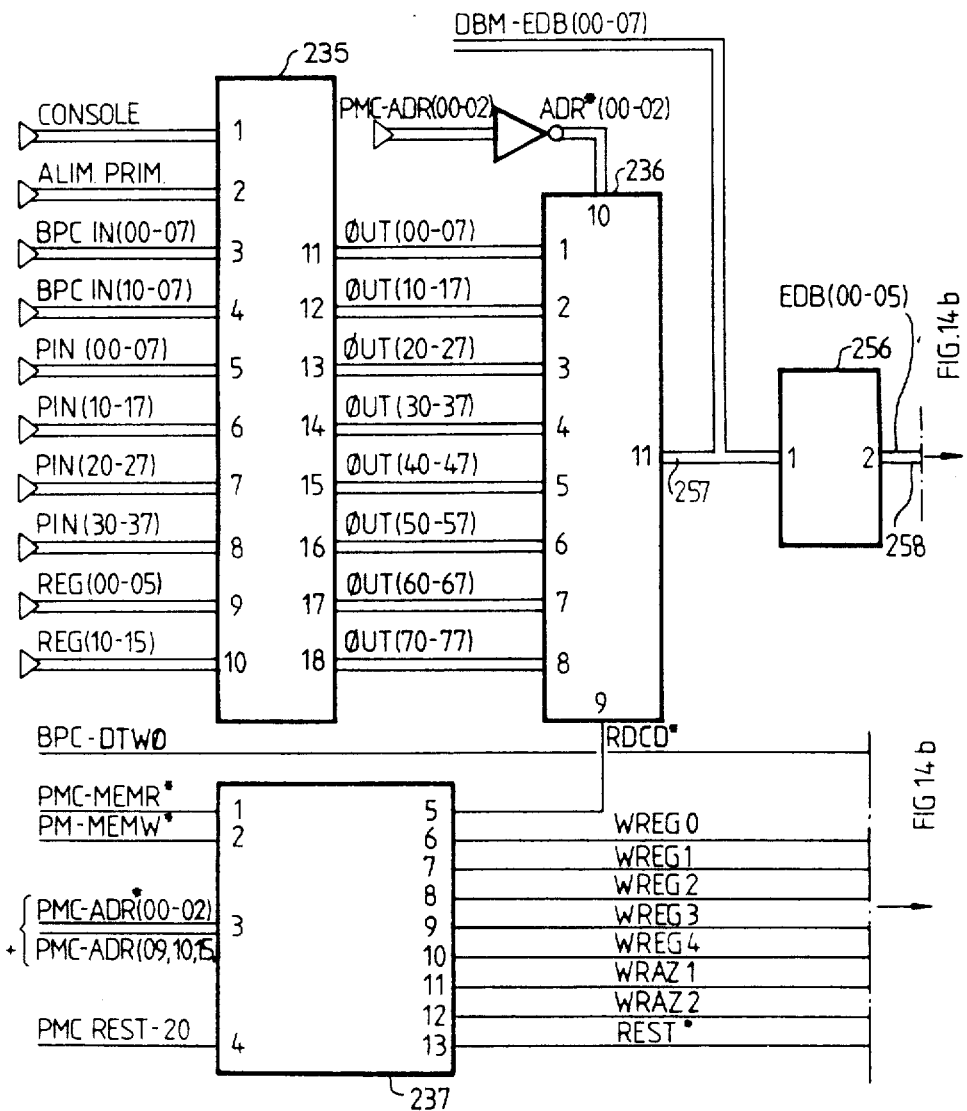
FIGS. 14a-14b is a more detailed block diagram of the AM904 OPERATION INTERFACE UNIT of FIG. 13.
Figure 14B:
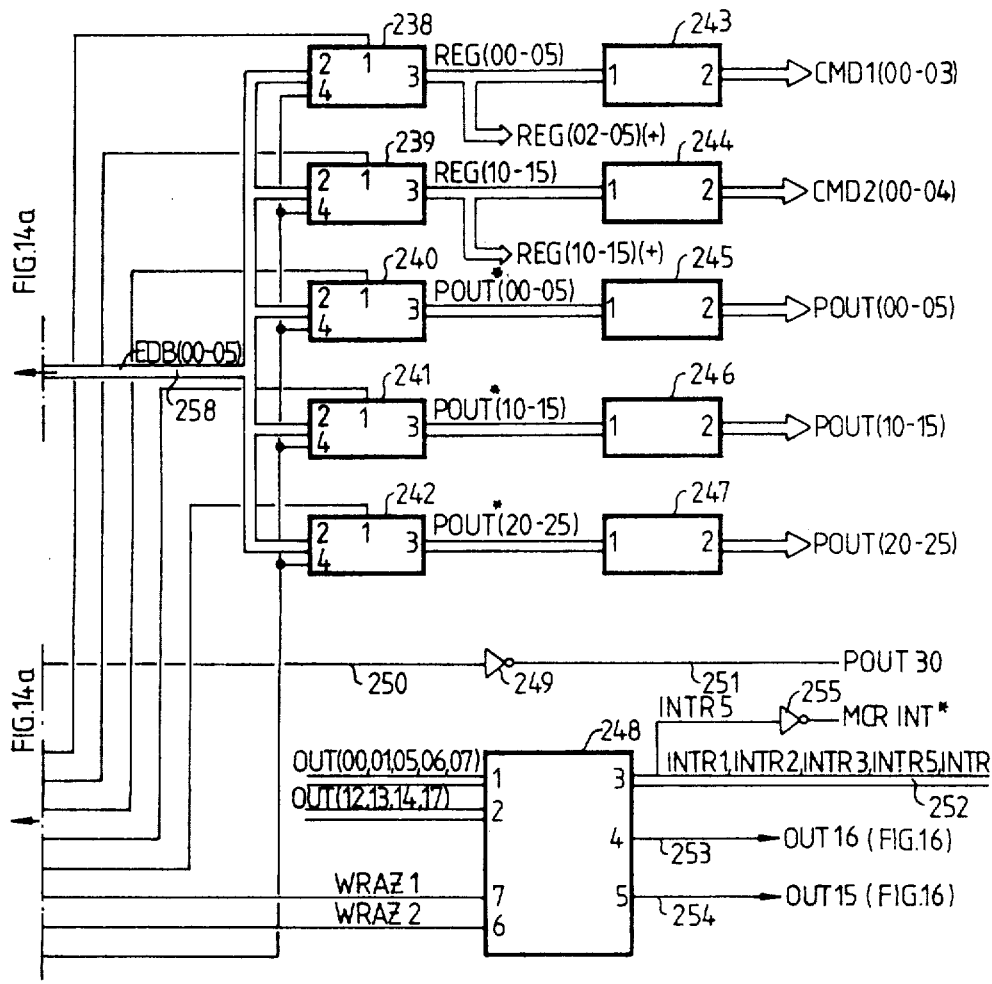

The signals coming in or out of the AM904 operation interface unit (74) having been defined, it is now possible to consider the block diagram of the AM904 operation interface unit (74) which is illustrated in FIG. 14.

In this block diagram, as in subsequent block diagrams, signals go from left to right except for signals for which the opposite direction is explicitly indicated. Signals through the buses may, of course, go in both directions, indifferently.

Once this convention has been adopted, it may be said that input signals coming to the operation interface unit (74) are those which are located on the left of FIG. 14a. These input signals, which are classified according to the device which has generated them, are as follows, from top to bottom:

the signals designated by the word CONSOLE, and which are the signals received from the console (48) through link (227). These are signals LØG ØFF, LØG ØN and ENI;

the signals designated by the words ALIM. PRIM., which are the signals received through links (229) and (230) which come from the slave power supply (222), tripping contactor (223), temperature control (224), ballast control (225) and primary power supply (226);

the BPC-IN signals (00-07) (abbreviation of Back Panel Control Input) which are the GFLT fault signalling signals power source level. These signals are defined on the table shown in FIG. 30;

the signals designated by the symbol BPC-IN (10-17), which are also GFLT fault signalling signals at the power source level, and which are also defined in the table in FIG. 30.

the signals designated by the symbol P-IN (00, 01, 02, 07) (abbreviation of Panel In), which are signals arriving from the service panel (11). These signals are defined in FIG. 16;

the signals designated by the symbol P-IN (10-17) which are also signals generated by the service panel (11) and are defined in FIG. 26;

the signals designated by the symbol P-IN (20-27) which, as above, are generated by the service panel (11) and are described in FIG. 26.

the signals designated by the symbol P-IN (30-37), which also originate in the service panel (11) and are defined in FIG. 26;

the signals designated by the symbol REG (02-05) (abbreviation of Register) which are signals from the output of the downstream register (238) of the AM904 operation interface unit (74). These signals and this register are described below;

the signals designated by the symbol REG (10-15) are generated by another downstream register, register (239). These will also be described below;

the signal designated by the symbol BPC-DTWO (abbreviation of Back Panel Control—Direct Trap Write Output) which is a trap signal, interrupts the operation of the control bus and will be described later. This signal is defined in FIG. 31;

the signal designated by the symbol PMC-MEMR* (abbreviation of Power Monitor Control—Memory Head) is a signal generated by the monitor (11) to indicate that it is requesting a read cycle. This cycle is described in FIG. 30;

the signal designated by the symbol PMC-MEMW* (abbreviation of Power Monitor Control—Memory Write) is a signal generated by the Monitor (11) to indicate that it is requesting the execution of a write cycle. This connection is defined in FIG. 30;

the bus designated by the symbol PMC-ADR* (00-07) (abbreviation of Power Monitor Control—Address) is the monitor (11) address bus. Through this bus, the monitor (11) may select the AM904 operation interface module (74). The manner in which this bus is connected is defined in FIG. 31;

the signal designated by the symbol PMC-REST (abbreviation of Power Memory Control—Reset) is a reset signal generated by the monitor (11). The manner in which it is connected is defined in FIG. 30.

On examination, the input signals to the AM904 operation interface unit (74) can be divided into two categories: data input signals and input command signals. The data input signals are the signals that carry data the operation interface unit (74) is to transmit. These signals are the INPUT DATA signals. The input command signals are the signals intended to determine the operation of the operation interface unit (74). These are the COMMAND signals.

The data input signals are the signals: CØNSØLE, ALIM. PRIM, BPC-IN (00-07), BPC-IN (10-17), P-IN (00-07), P-IN (10-17) P-IN (20-27), P-IN (30-37), REG (02-05), REG (10-15).

The command signals are the signals: BPC-DTWO, PMC-MEMR* PMC-MEMW*, PMC-ADR* (00-07), PMC-REST. The role of these signals will be detailed at a later time with reference to the description of FIG. 25.

In FIG. 14a, the data input signals: CØNSØLE, ALIM. PRIM, BPC-IN (00-07), BPC-IN (10-17), P-IN (20-27), P-IN (30-37), REG (02-05), REG (10-15) are connected, respectively, to terminals 1, 2, 3, 4, 5, 6, 7, 8, 9, 10 of block (235), which is an interface and link block for the AM904 operation interface unit (74). This interface and link block (235) includes all the circuits to match the data input signals and to group together said data input signals into 8 groups of 8 signals each. These eight signal groups leave the interface and link block (235) via outputs 11, 12, 13, 14, 15, 16, 17, 18, in that order, and are called, respectively: ØUT (00-07), ØUT (10-17), ØUT (20-27), ØUT (30-37), ØUT (40-47) ØUT (50-57), ØUT (60-67), ØUT (70-77).

Each of these 8 groups of ØUT signals is applied to one of the 8-channel multiplexer's (236) inputs: ØUT signal group (00-07) to input 1, ØUT signal group (10-17) to input 2, ØUT signal group (20-27) to input 3, ØUT signal group (30-37) to input 4, ØUT signal group (40-47) to input 5, ØUT signal group (50-57) to input 6, ØUT signal group (70-77) to input 8.

The 8-channel multiplexer (236) is controlled by input terminals 9 and 10.

An RDCD* (abbreviation of Read Command) signal generated by the synchronization and control block (237) is applied to input 9. This RDCD* signal indicates to the 8-channel multiplexer (236) the instant when monitor (10) wishes to be advised of the contents of one of the 8 ØUT signal groups. The ØUT signal group the Monitor (10) wishes to read is defined by the 3 signals placed on input 10 of the 8-channel multiplexer (236). These three signals, which are addressing signals, are ADR00, ADR01, ADR02.

When Monitor (10) requests the contents of an ØUT signal group to be read, the 8-channel multiplexer (236) selects the requested ØUT signal group and transmits it to its output.

The output signals are directed to bus (257) called DBM-EDB (abbreviation of Data Bus Monitor—External Data Bus). Bus DBM-EDB is the data bus for Monitor (10), it belongs to the control bus (12).

FIG.'s 14a–b are a schematic representation of the AM904 operation interface unit (74). In this representation, signals travel from left to right with the exception of DBM-EDB (00-07) (abbreviation of Data Bus Monitor—External Data Bus) which carries the data signals transmitted or received by Monitor (10). For this bus, the signals can travel in one direction or the other, depending on the case.

The input signals in the operational interface unit AM904 belong to 3 categories: data signals, addressing signals, check and control signals.

Input data signals are designated by the following names:

CØNSØLE refers to the signals coming from Console (48), namely: LØGØN, LØGØFF, ENI (cf. FIG. 27);

ALIM. PRIM. refers to the signals coming from the slave power supply (222), from the contactor (223), from the temperature control (224), from the ballast control (225), and from the presetting and resetting control (see FIG. 13). These signales are: SERVUV, CØMREL, DCØN, DCØFF, PREGUV, PREGØV (cf. FIG. 28);

BPC-IN (00-07) and BPC-IN (10-17) refer to signals coming from the power supply sources and carried via the wiring on the back of the rack. These signals are denoted by the abbreviation GFLT (abbreviation of General Fault) followed by an index corresonding to the source transmitting the GFLT signal. This signal indicates, when high, that the corresponding source has detected an operational malfunction. GFLT 1 through GFLT 14 signals are shown in FIG. 29;

PIN (00-07), PIN (10-17), PIN (20-27), PIN (30-37) denote signal coming from the service panel (11). These signals are shown on the table in FIG. 26.

REG (02-05) and REG (10-15) refer to signals transmitted by registers (238) and (239) of the operational interface unit (74). As will be shown later on, these signals are used to form the loop which will enable monitor (10) to read the contents of registers (238) and (239).

The operation interface unit (74) generates interrupt signals INTR1* and INTR2, which also serve as input signals. As will be shown later on, these signals are used to alert the monitor (10) by means of bus DBM-EDB (00-07).

Addressing signals are designated as follows: PMC-ADR* (00-02) and PMC-ADR* (09, 10, 15). Signals PMC-ADR 09, PMC-ADR 10 and PMC-ADR 15 are used to select the AM904 operation interface unit (74). PMC-ADR00, PMC-ADR01 and PMC-ADR02 signals are used to address one of the 5 registers (238), (239), (240), (241), (242) for a write function or one of the 8 channels of multiplexer (236) for a read function.

Control and check signals are designated as follows:

PMC-MEMBR* (abbreviation of Power Monitor Control—Memory Read) refers to the signal indicating a read request transmitted by Monitor (10);

PMC-MEMR* (abbreviation of Power Monitor Control—Memory Write) refers to the signal indicating a write request transmitted by monitor (10);

PMC-REST-20 (abbreviation of Power Monitor Control—Reset) refers to a circuit reset signal transmitted by monitor (10);

BPC-DTWO (abbreviation of Back Panel Control—Direct Trap Write Operation) refers to a signal for halting a cycle (a "trap" in English) which is emitted by a time base when the latter detects an abnormal duration in the execution of a program.

In FIG. 14a, the input data signals arrive at an interface block (235). The signals arrive at the 10 inputs numbered 0 through 10 of the interface block (235): CØNSØLE signals at input 1, ALIM. PRIM signals at input 2, BPC-IN (00-07) signals at input 3, BPC-IN (10-17) at input 4, PIN signals (00-07) at input 5, PIN signals (10-17) at input 6, PIN signals (20-27) at input 7, PIN signals (30-37) at input 8, REG signals (02-05) at input 9, and REG signals (10-15) at input 10. After passing through the interface block circuits (235), these signals emerge as 8 signal groups, each group made up of 8 signals. These signal groups exit through outputs 11 through 18 of interface block (235). These groups are designated as follows:

ØUT (00-07) for output 11;
ØUT (10-17) for output 12;
ØUT (20-27) for output 13;
ØUT (30-37) for output 14;
ØUT (40-47) for output 15;
ØUT (50-57) for output 16;
ØUT (60-67) for output 17;
ØUT (70-77) for output 18.

Each of these 8 groups re-enters inputs 1 through 8 of the 8-channel multiplexer (236). Multiplexer (236) is controlled at its 9 terminals by read signal RDCD* (abbreviation of Read Command). It will be shown later on that this read signal RDCD* is generated at the request of monitor (10). Also, the channel to be read by multiplexer (236) is determined by addressing signals ADR (00-02) applied at its input (10). In the presence of an RDCD* signal, multiplexer (236) places through its output (10) a group of 8 signals to bus (257) DBM-EDB (abbreviation of Data Bus Monitor—External Data Bus) which is the general data bus for the power supply system. This bus is part of control bus (12).

Bus (257) DBM-EDB is also connected to input 1 of inverting amplifier block (256). This block (256) of inverting amplifiers supplies power to bus (258) EDB* (00-05) by means of its output 2.

It thus appears that bus (257) DBM-EDB is the means of data communication between monitor (10) and AM904 operation interface unit (74). By means of this DBM-EDB (257) bus the monitor (10) can either output data from multiplexer (236) or send data through the inverting amplifier (256).

It should be noted that in the preferred embodiment of the invention, bus (258) EDB* (00 through 07) includes 8 wires, since it is connected to an 8-bit microprocessor. However, in the embodiment of the invention, 6-bit registers were used in the operation interface unit AM904, because that was sufficient. Therefore, only the six EDB* wires (00 through 05) were used in bus (258) EDB* (00-07). 8-bit registers could, of course, be used without going beyond the scope of the invention. Inverting amplifier block (256) thus supplies power to bus EDB* (00-05) through its output 2. Bus EDB* (00-05) supplies power in parallel to inputs 2 of the 5 registers (238), (239), (240), (241) and (242). Only one of registers (238), (239), (240), (241) and (242) can be accessed at a time. This access control is effected through terminal (1) of the registers. The control signals are: WREG0 for register (238), WREG1 for register (239), WREG2 for register (240), WREG3 for register (241) and WREG4 for register (242). It will be shown later how these access-enabling WREG signals are processed via signals provided by the monitor (10). Each of registers (238), (239), (240), (241) and (242) has an output 3 by means of which it supplies to a bus:

register (238) supplies power to bus REG (00-05);
register (239) supplies power to bus REG (10-15);
register (240) supplies power to bus PØUT* (00-05);
register (241) supplies power to bus PØUT* (10-15).

In subsequent paragraphs it will be explained how each operation interface unit AM904, as well as each register within this operation interface unit AM904, is considered by the processor as a memory address.

Each of these buses supplies power to input 1 of an output amplifier:

bus REG (00-05) takes on output amplifier (243);
bus REG (10-15) takes on output amplifier (244);
bus PØUT* (00-05) takes on output amplifier (245);
bus PØUT* (10-15) takes on output amplifier (246);
bus PØUT* (20-25) takes on output amplifier (247).

Also, buses REG (00-05) and REG (10-15) include a branch which is to take on inputs 9 and 10, respectively, of interface block (235), as mentioned earlier.

These 5 output amplifiers use their output 2 to supply power to control lines 2:

register (243) supplies power to the group of 4 lines designated by CMDI (00-03) (abbreviation of COMMAND No. 1). These 4 lines carry the output signals to the SPCI daisy chain: ENØ, SEQUERR, SYSFLT, FAULT. These signals are shown in the table of FIG. 27.

register (244) supplies power to the group of 5 lines referred to as CMD2 (00-04) (abbreviation of COMMAND No. 2). These 5 lines carry the output signals to the primary power supply (226) and to the contactor (223): ØNØFF, DCRES, RELCØN, BLD CØN1, BLD CØND2. These signals are shown in the table of FIG. 27;

register (245) supplies power to the group of 6 PØUT (00-05) lines. These 6 lines carry the control signals from monitor (10) to service panel (11). These signals are shown in the table of FIG. 26;

register (247) supplies power to the group of 6 PØUT (20-25) lines. These 6 lines carry the control lines from monitor (10) to service panel (11). These signals are shown in the table of FIG. 26.

A 6th inverting output amplifier (249) amplifies the input signal BPC-DTWO to provide the output signal PØUT 30. This output signal PØUT 30 is sent to daisy chain SPCI in order to light an indicator at the console to show that monitor (10) is in an interrupted cycle state.

The preceding discussion dealt with the flow of data within the AM904 operation interface unit (74). It will now be shown how this flow is controlled and checked by monitor (10). To provide the commands and the checks, monitor (10) has available addressing links and function defining links. These addressing and function defining links are connected to circuit selecting and function defining block (237).

Via addressing signals and the function defining signals placed on its input, circuit selecting and function defining block (237) processes control signals in order to control the functional circuits of the AM904 interface unit (74).

The addressing signals PMC-ADR* (00-02, 09, 10, 15) are applied to input 3 of circuit selecting and function defining block (237) and the addressing signals PMC-ADR (00-02) and function defining block (237) processes control signals in order to control the functional circuits of AM904 operational interface unit (74).

The addressing signals PMC-ADR* (00-02, 09, 10, 15) are applied to input 3 of circuit selecting and function defining block (238) and addressing signals PMC-ADR* are applied, after inversion, to input 10 of multiplexer block (236). PMC-ADR* (00-15) addressing signals are conveyed in bus PMC-ADR*, which is the addressing bus for monitor 10. Bus (PMC-ADR*) belong to control bus (12).

The role of the PMC-ADR* (00-15) addressing signals is to determine:

in the read mode, the ØUT (X0-X7) channel to be selected by the multiplexer;
in the write mode, the register which is to be selected from the 5 registers (238), (239), (240), (241) or (242).

The role of the PMC-ADR* (09, 10, 15) addressing signals is to select the operation interface unit AM904 (74).

The control and check signals are as follows:

PMC-MEMR* (abbreviation of Power Monitor Control—Memory Read). This signal generated by monitor (10) signifies that monitor (10) requests a read cycle.

PMC-MEMW* (abbreviation of Power Control Monitor—Memory Write). This signal generated by monitor (10) signifies that monitor (10) request a write cycle;

PMC-REST-20 (abbreviation of Power Monitor Control—Reset). This signal generated by monitor (10) signifies that monitor (10) requests that the circuits be reset.

These control and check signals are carried by control and check lines which belong to control bus (12).

Block (237) receives:

at its terminal 1 the control signal PMC-MEMR*;
at its terminal 2 the control signal PMC-MEMW*;
at its terminal 3 the addressing signals PMC-ADR* (00-02, 09, 10, 15);
at its terminal 4 the reset signal PMC-REST-20.

When monitor (10) desired to address the AM904 operation interface unit (74), it places the address of this AM904 operation interface unit (74) on the PMC-ADR* (09, 10, 15) lines. Similarly, it defines by means of PMC-ADR* (00-02) lines either the group of ØUT signals (X0-X7) when in the read more or one of the 5 registers (238), (239), (240), (241) or (242) when in the write mode.

Moreover, monitor (10) signifies the requested mode of operation:

the read mode by way of the PMC-MEMR* link;
the write mode by way of the PMC-MEMW* link;

If the read mode is requested by monitor (10), circuit selecting and function defining block (237) transmits at its output 5 an RDCD* signal (abbreviation of Read Command), which is a read command signal. This signal is applied to input (8) of multiplexer block (236).

This RDCD* signal paired with the addressing DMC-ADR* (00-02) signals enables the transfer of the selected group of ØUT (X0-X7) signals to the multiplexer block (237) output 11. Consequently, the selected group of OUT (X0-X7) signals is transferred, on the one hand, to data bus DBM-EDB (00-07) and, on the other hand, to input 1 of the reversing amplifier block (256). Data bus DBM-EDB (00-07) transmits to monitor (10) data contained in the selected group of ØUT (X0-X7) signals. Thus, the monitor will have carried out the reading of the contents of the input signals it has selected. Moreover, since this is a read function, the signals placed on input 1 of inverting amplifier group (256) will have no effect on any of the 5 registers (238), (239), (240), (241) and (242).

If write mode is requested by monitor (10), circuit selecting and function defining block (237) transmits:

its output 6, a WREG0 signal (abbreviation of Write Register 0) if the writing is to be done in register 0;
to its output 7, a WREG1 signal (abbreviation of Write Register 1) if the writing is to be done in register 1;
to its output 8, a WREG2 signal (abbreviation of Write Register 2) if the writing is to be done in register 2;
to its output 9, a WREG3 signal (abbreviation of Write Register 3) if the writing is to be done in register 3;
to its output 10, a WREG4 signal (abbreviation of Write Register 4) if the writing is to be done in register 4.

The transmitted WREG signal arrives at input 1 of the register selected to be written in. This WREG signal enables signals placed on input 2 of the selected register to be applied to input 2 of this register. These signals are designated by EDB* (00-05). These EDB* (00-05) signals are transmitted by output 2 of inverted amplifier block (256). Hence, these EDB* (00-05) signals are the result of inverting DBM-EDB (00-05) signals applied at input 1 of inverting amplifier block (256). Thus it appears that this write operation enables the content of bus DBM-EDB (00-05) to be written into the register selected by monitor (10).

If monitor (10) requests a reset cycle by transmitting a PMC-REST-20 signal associated with a PMC-MEMW* write signal, circuit selecting and function defining block (237) transmits:

its output 11, a WRAZ 1 signal (abbreviation of Write Remise à Zéro), which is applied to input 7 of state change handling block (248) (RAZ IT SPCI);
to its output 12, a WRAZ2 signal (abbreviation of Write Remise à Zéro), which is applied to input 6 of state change handling block (248) (RAZ of LØGØN, LØGØFF of SPCI);
to its output 13, a REST* signal (abbreviation of RESET), which is applied to the inputs of 4 of the 5 registers (238), (239), (240), (241) and (242). This REST* signal resets the contents of the 5 registers.

State change handling block (248), as its name suggests, is responsible for handling the state changes required by the input signals which signal breakdowns in the power supply system or merely signaling a request for a change in the operating condition of the power supply system, such as, for example, to start or to stop.

ØUT (00, 01, 05, 06, 07) signals are applied to terminal 1 of state change handling block (248). These signals originate from terminal 11 of interface block (235) and correspond to the following signals:

ØUT 00 is the PREGØV signal
ØUT 01 is the PREGUV signal
ØUT 05 is the LØGØN signal
ØUT 06 is the LØGØFF signal
ØUT 07 is the ENI signal ØUT signals (12, 13, 14, 17) are applied to terminal 2 of state change handling block (248). These signals originating from terminal 12 of interface block 12 (235) correspond to the following signals:

ØUT 12 is the CØØL F1 signal
ØUT 13 is the CØØL F2 signal
ØUT 14 is the CØØL F3 signal
ØUT 17 is the CØMREL signal State change handling block (248) processes two types of signals:

natural-state-change signals, i.e., signals which correspond to changes in the operating conditions of the power supply system requested by the operator or by the maintenance inspector acting either via console (48) or via service panel (11);
accidental-state-change signals, i.e., signals which correspond to state changes in the power supply system necessitated by one or more breakdowns occurring in the power supply system.

There are two types of natural state changes:
start-ups caused by the pairing of LØGØN and ENI signals, as mentioned earlier;
shutdowns caused by the pairing of LØGØFF and ENI signals.

A start-up request is expressed by the transmission of ØUT signal 16 to terminal 4 of state change handling block (248). ØUT signal 16 is applied to the corresponding line of input 2 of multiplexer block (236).

A shutdown request is expressed by the transmission of an ØUT signal 15 to terminal 5 of state change handling block (248). This ØUT signal 15 is applied to the corresponding line of input 2 of multiplexer block (236).

The arrival of an ENI synchronization signal generates an interrupt request signal INTR1*. This interrupt request signal is applied to input ØUT 20 of multiplexer (236). In this manner, monitor (10) is advised of the existence of this interrupt request, INTR1*.

Accidental state changes correspond to the appearance of a failure at the level of the power supply system. These breakdowns in the preferred embodiment of the invention are:

absence of a closing of the contactor signalled by CØMREL;
overheating of the circuits signalled by CØØLF1, CØØLF2 and CØØLF3;
overvoltage in primary power supply 226 signalled by PREGØV.

These signals are grouped together to supply an interrupt request signal INTR2*.

This interrupt request signal INTR2* is applied to input ØUT 21 of multiplexer (236). In this manner, monitor (10) is advised of the existence of this interrupt request, INTR2*.

Moreover, these two interrupt request signals INTR1* and INTR2* are grouped together so as to generate a grouping-together interrupt signal request MCR INT*. This signal is transmitted over a check line, also called MCR INT*, which belongs to control bus (12). As will be seen later, this MCR INT* signal informed monitor (10) directly of the existence of at least one interrupt request, common source or resource or SPCI. Is then up to monitor (10) to take the initiative to detect the interrupt requests which have caused the transmission of signal MCR INT*.

Figure 15:
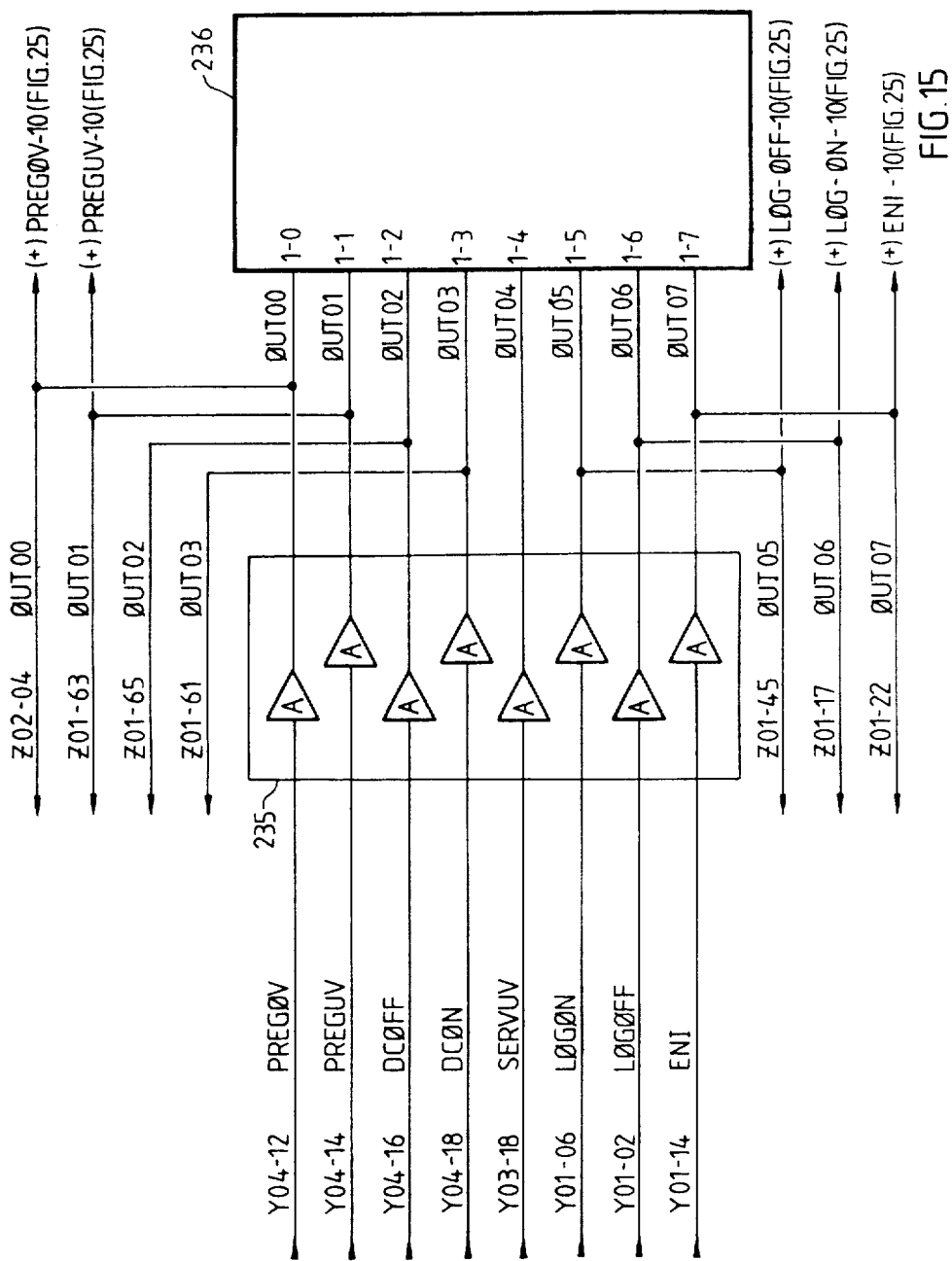
FIG. 15 is a detailed illustration of a first portion of the INTERFACE BLOCK (235) of FIG. 14 internal circuits.

FIG. 15 gives a first detailed partial representation of the internal circuits of interface block (235). The internal circuits shown in this figure are those that generate the group of 8 ØUT signals (00-07). In this figure, each triangle containing the letter A represents a reference to connector Y01 or Y03 or Y04, as well as the number of the pin.

ØUT signals (00-07) are linked, on the one hand, to multiplexer (236) at terminals 1-0 through 1-7 and, on the other hand, to the interplate cable by means of connectors Z01 and Z02. For each signal, the connector reference is accompanied by the number of the corresponding pin. Lines ØUT 00, ØUT 05, ØUT 06 and ØUT 07 also carry outgoing lines marked with a cross (+). This cross (+) signifies that these outgoing lines go to the very interior of operation interface unit (74), where they are used in the logic of operation interface unit (74). They will also be found in the other diagrams under their respective designation: ØUT 00, ØUT 01, ØUT 05, ØUT 06 and ØUT 07.

Figure 16:
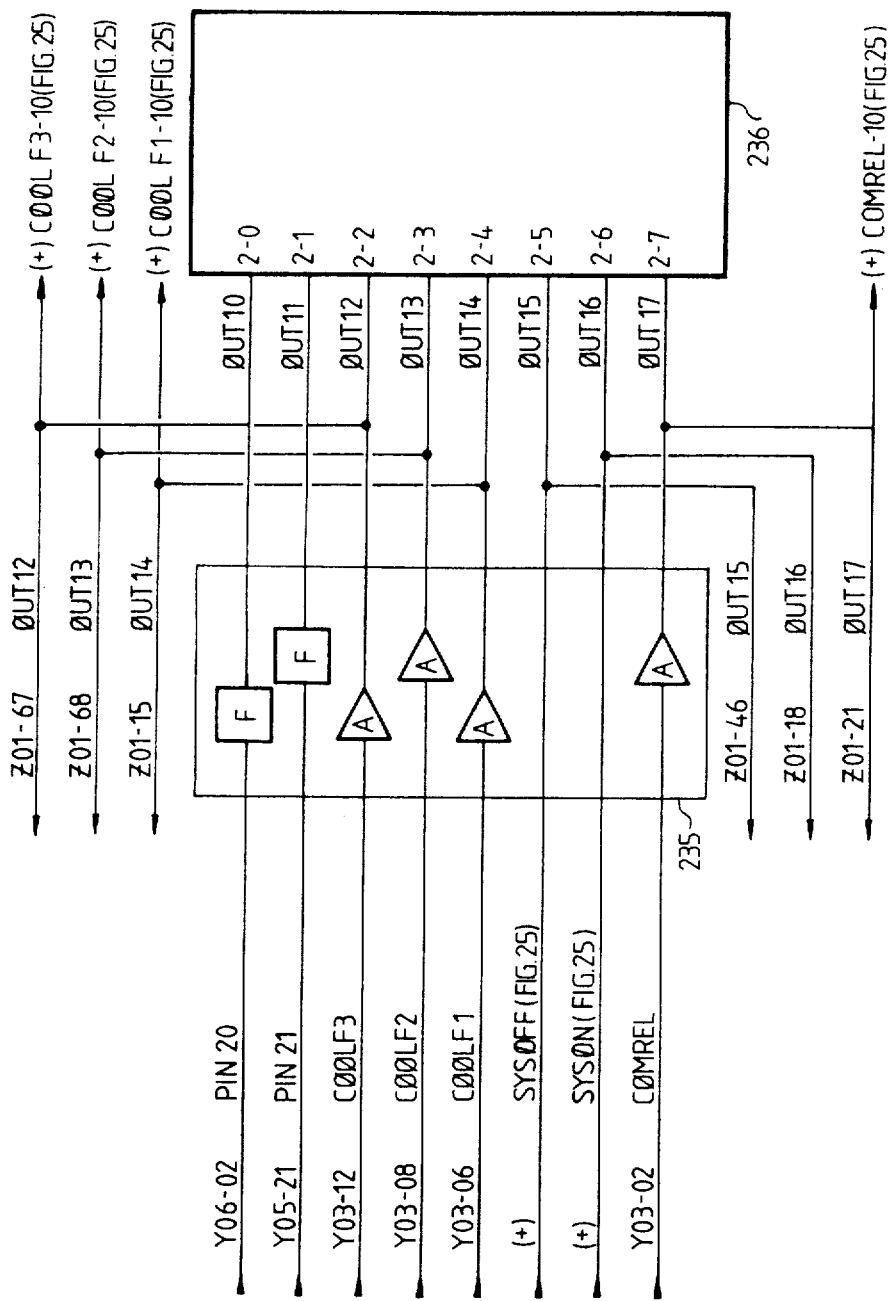
FIG. 16 is a detailed illustration of a second portion of the INTERFACE BLOCK (235) internal circuits.

FIG. 16 is a second detailed partial representation of the internal circuits of interface block (235). The internal circuits shown in this figure are those that generate the group of 8 ØUT signals (10-17). In this figure, each triangle containing the letter A represents an amplifier and each square containing the letter F represents an electronic filter. Connector reference Y03 or Y05 or Y06 is indicated next to each input signal on the left-hand side of the figure along with the number of the corresponding pin. Two OUT signals 15 and 16 do not make reference to a pin but are accompanied by a cross (+): this signifies that these signals are generated in the very heart of operation interface unit (74).

ØUT signals (10-17) are linked, on the one hand, to multiplexer (236) at terminals 2-0 through 2-7 and, on the other hand, to the interplate cable by means of connector Z01. For each signal, the connector reference is accompanied by the number of the pin. ØUT lines (12-17) also carry outgoing lines marked with a cross (+). These outgoing lines go to the very interior of operation interface unit (74), where they are used in the logic of operation interface unit (74). They will be found in the other diagrams under their respective designation: ØUT 12, ØUT 13, ØUT 14, ØUT 15, ØUT 16 and ØUT 17.

Figure 17:
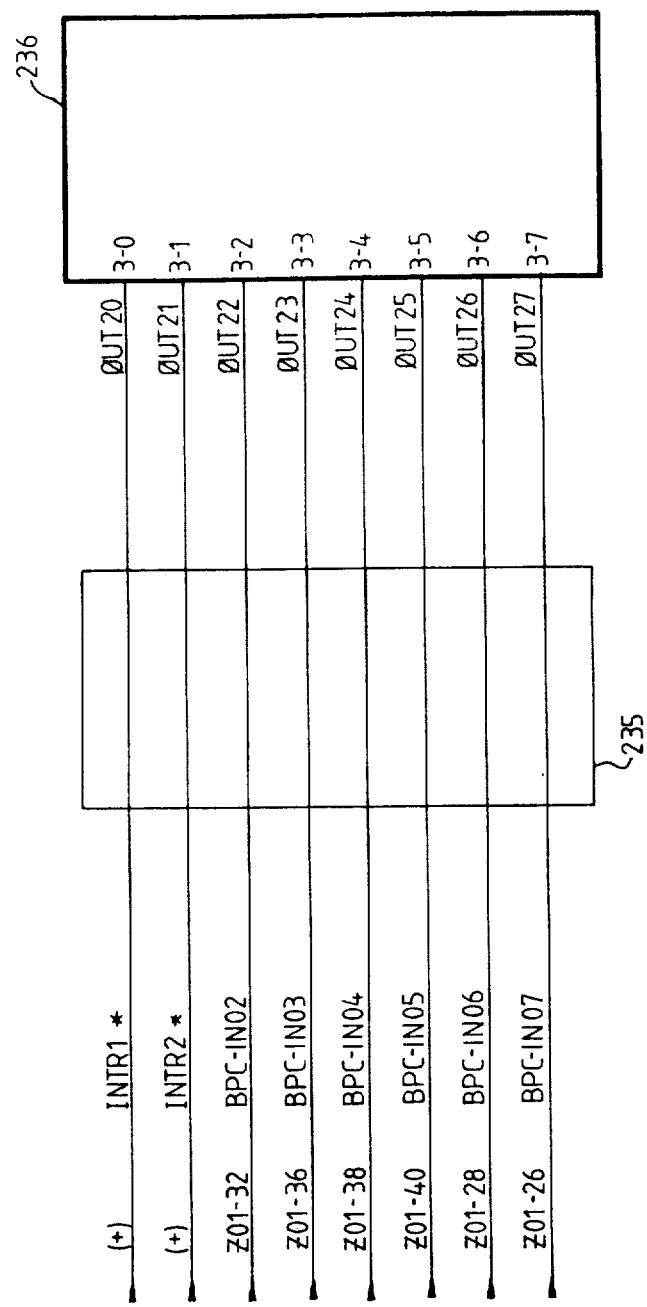
FIG. 17 is a detailed illustration of a third portion of the INTERFACE BLOCK (235) internal circuits.

FIG. 17 is a third detailed partial representation of the internal circuits of interface block (235). The internal circuits shown in this figure are those that generate the group of 8 ØUT signals (20-27). Connector reference Z01 is indicated next to each input signal on the left-hand side of the figure along with the number of the corresponding pin. Two signals, INTR1* and INTR2* do not make reference to a connector but are accompanied by a cross (+): this signifies that these signals were discussed with reference to the description of FIG. 14 on the state change handling block (248). ØUT signals (20-27) are linked to multiplexer (236) at terminals (3-0 through 3-7).

Figure 18:
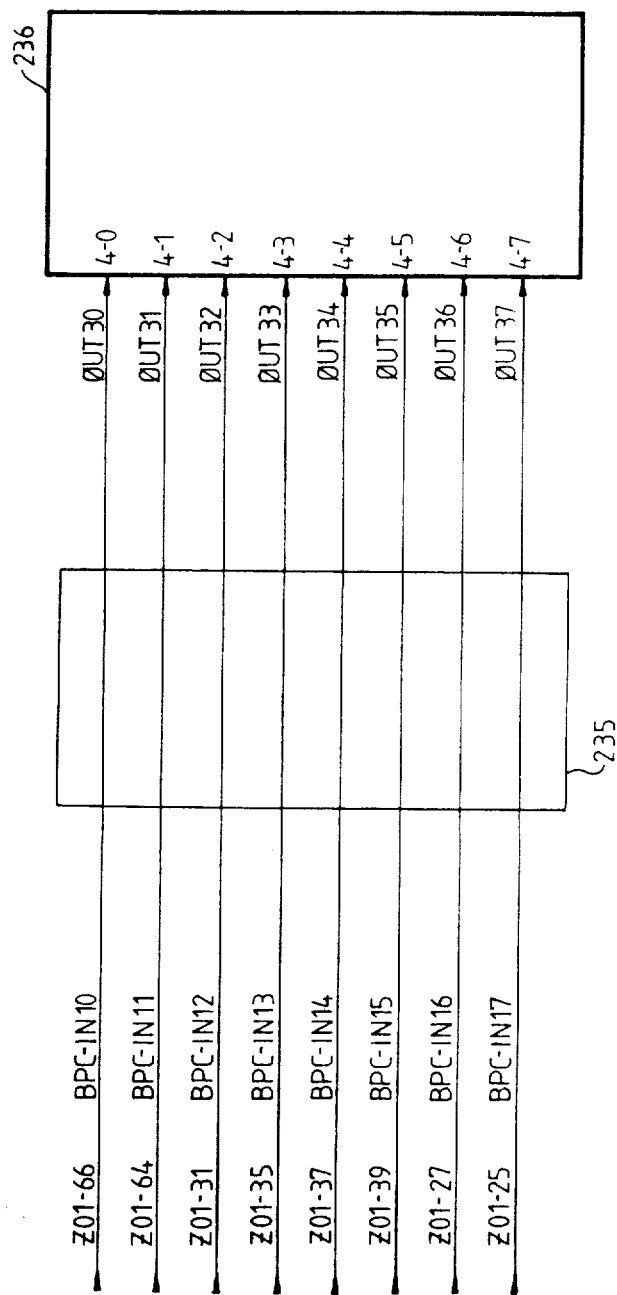
FIG. 18 is a detailed illustration of a fourth portion of the INTERFACE BLOCK (235) internal circuits.

FIG. 18 is a fourth detailed partial representation of the internal circuits of interface block (235). The internal circuits shown in this figure are those that generate the group of 8 ØUT signals (30-37). Connector reference Z01 is indicated next to each input signal on the left-hand side of the figure along with the number of the corresponding pin. ØUT signals (30-37) are linked to multiplexer (236) at terminals (4.0 through 4.7).

Figure 19:
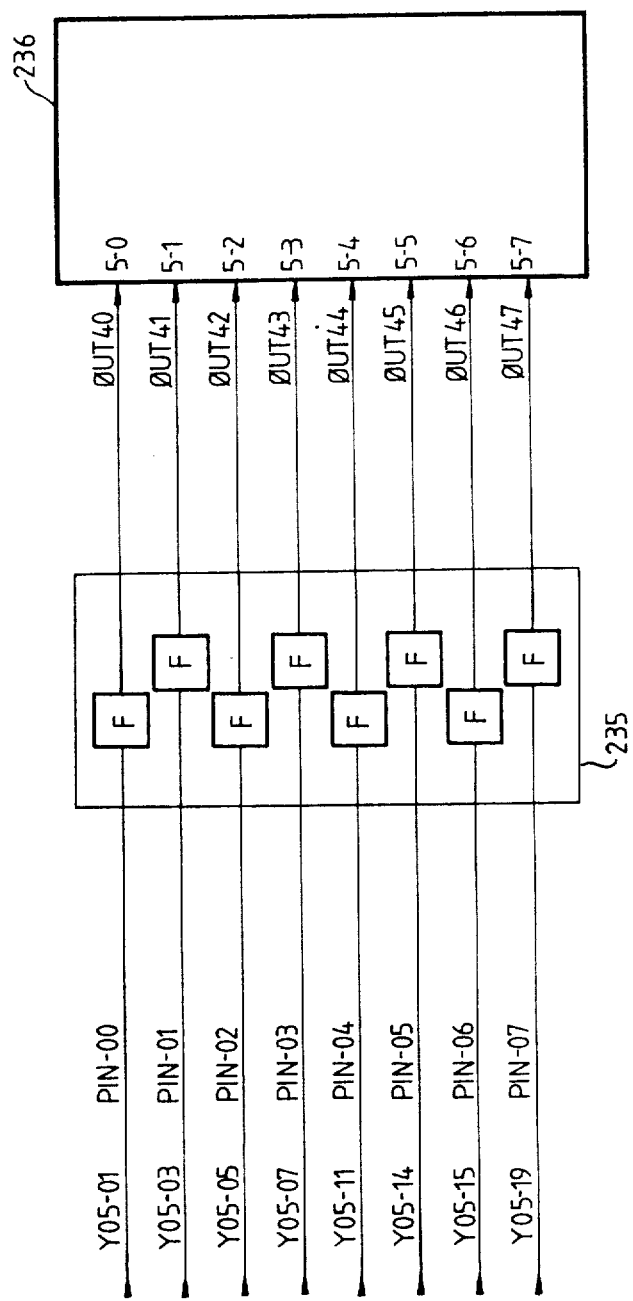
FIG. 19 is a detailed illustration of a fifth portion of the INTERFACE BLOCK (235) internal circuits.

FIG. 19 is a fifth detailed partial representation of the internal circuits of interface block (235). The internal circuit shown in this figure are those that generate the group of 8 ØUT signals (40-47). In this figure, each square containing the letter F represents an electric filter. Connector reference Y05 is indicated next to each input signal on the left-hand side of the figure along with the number of the corresponding pin. ØUT signals (40-47) are linked to multiplexer (236) at terminals (5-0 through 5-7).

Figure 20:
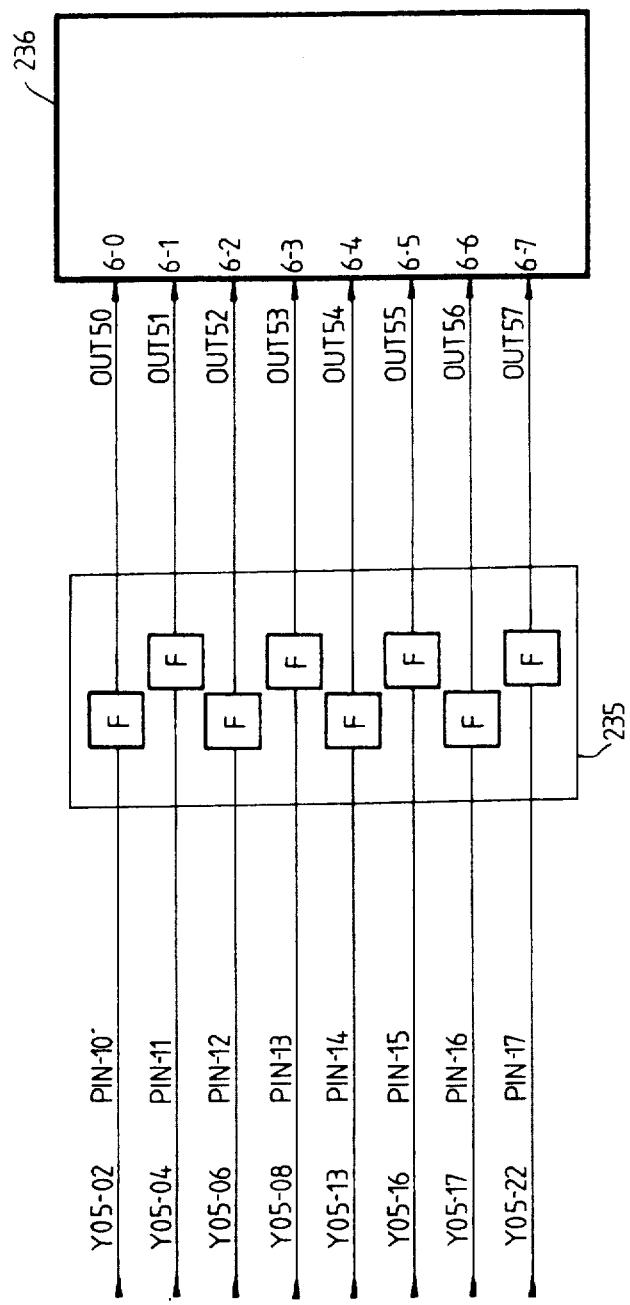
FIG. 20 is a detailed illustration of a sixth portion of the INTERFACE BLOCK (235) internal circuits.

FIG. 20 is a sixth detailed partial representation of the internal circuits of interface block (235). The internal circuits shown in this figure are those that generate the group of 8 ØUT signals (50-57). In this figure, each square containing the letter F represents an electrical filter. Connector reference Y05 is indicated next to each input signal on the left-hand side of the figure along with the number of the corresponding pin. ØUT signals (50-57) are linked to multiplexer (236) at terminals (6-0 through 6-7).

Figure 21:
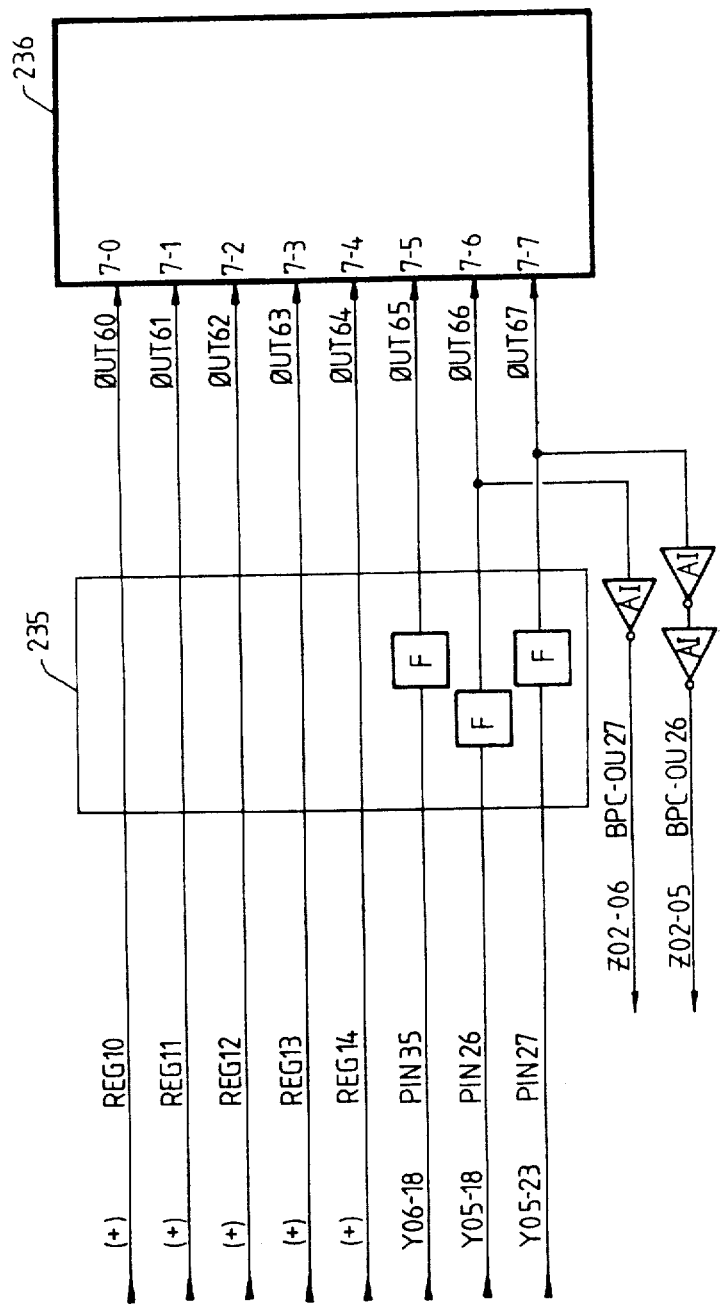
FIG. 21 is a detailed illustration of a seventh portion of the INTERFACE BLOCK (235) internal circuits.

FIG. 21 is a seventh detailed partial representation of the internal circuits of interface block (235). The internal circuits shown in this figure are those that generate the group of 8 ØUT signals (60-67). In this figure, each square containing the letter F represents an electrical filter. Connector reference Y05 or Y06 is indicated next to each input signal on the left-hand side of the figure along with the number of the corresponding pin. Signals REG 10, REG 11, REG 12, REG 13 and REG 14 do not make reference to a connector but are accompanied by a cross (+): this signifies that these signals are generated in the very heart of operation interface unit (74). Signals REG (10-14) are the signals generated by register (244), which was discussed with reference to the description of FIG. 14. ØUT signals (60-67) are linked to multiplexer (236) at terminals (7-0 through 7-7).

Figure 22:
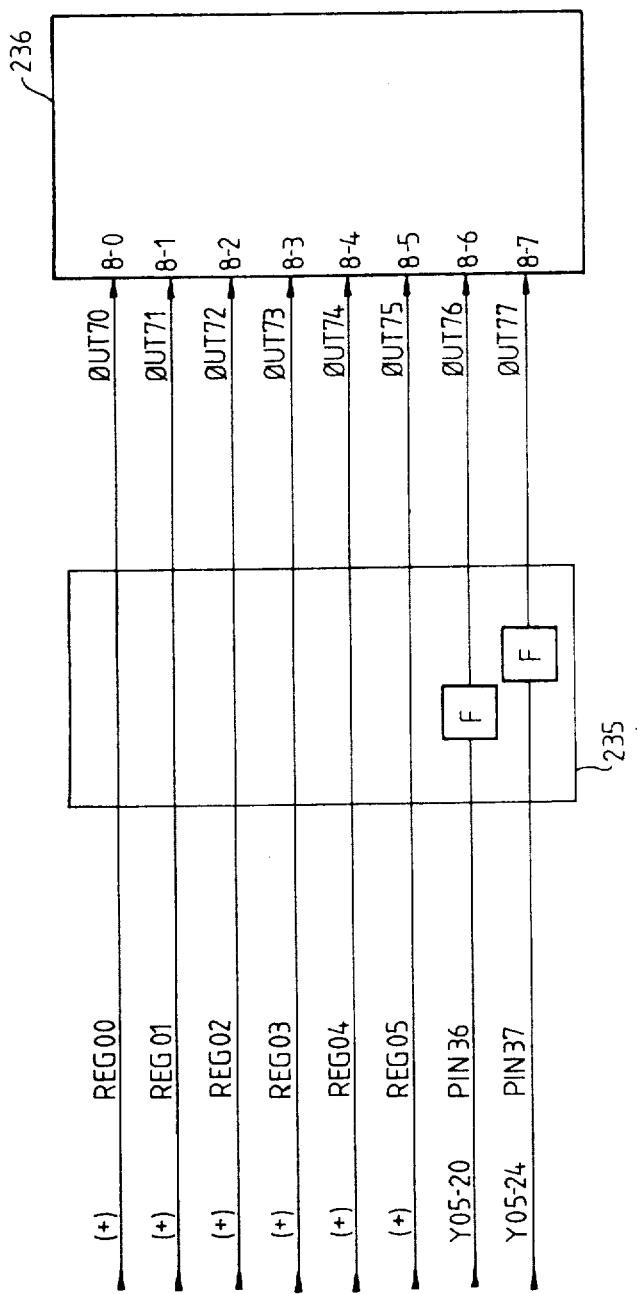
FIG. 22 is a detailed illustration of an eighth portion of the INTERFACE BLOCK (235) internal circuits.

FIG. 22 is an eighth detailed partial representation of the internal circuits of interface block (235). The internal circuits shown in this figure are those that generate the group of 8 ØUT signals (70-77). In this figure, each square containing the letter F represents an electric filter. Connector reference Y05 is indicated next to each input signal on the left-hand side of the figure along with the number of the corresponding pin. Signals REG00, REG01, REG02, REG03, REG04, REG05 do not make reference to a connector but are accompanied by a cross (+): this means that these signals are generated in the very heart of operation interface unit (74). Signals REG (00-05) are the signals generated by register (243), which was discussed with reference to the FIG. 14. ØUT signals (70-77) are linked to multiplexer (236) at terminals (8-0 through 8-7).

Figure 23A:
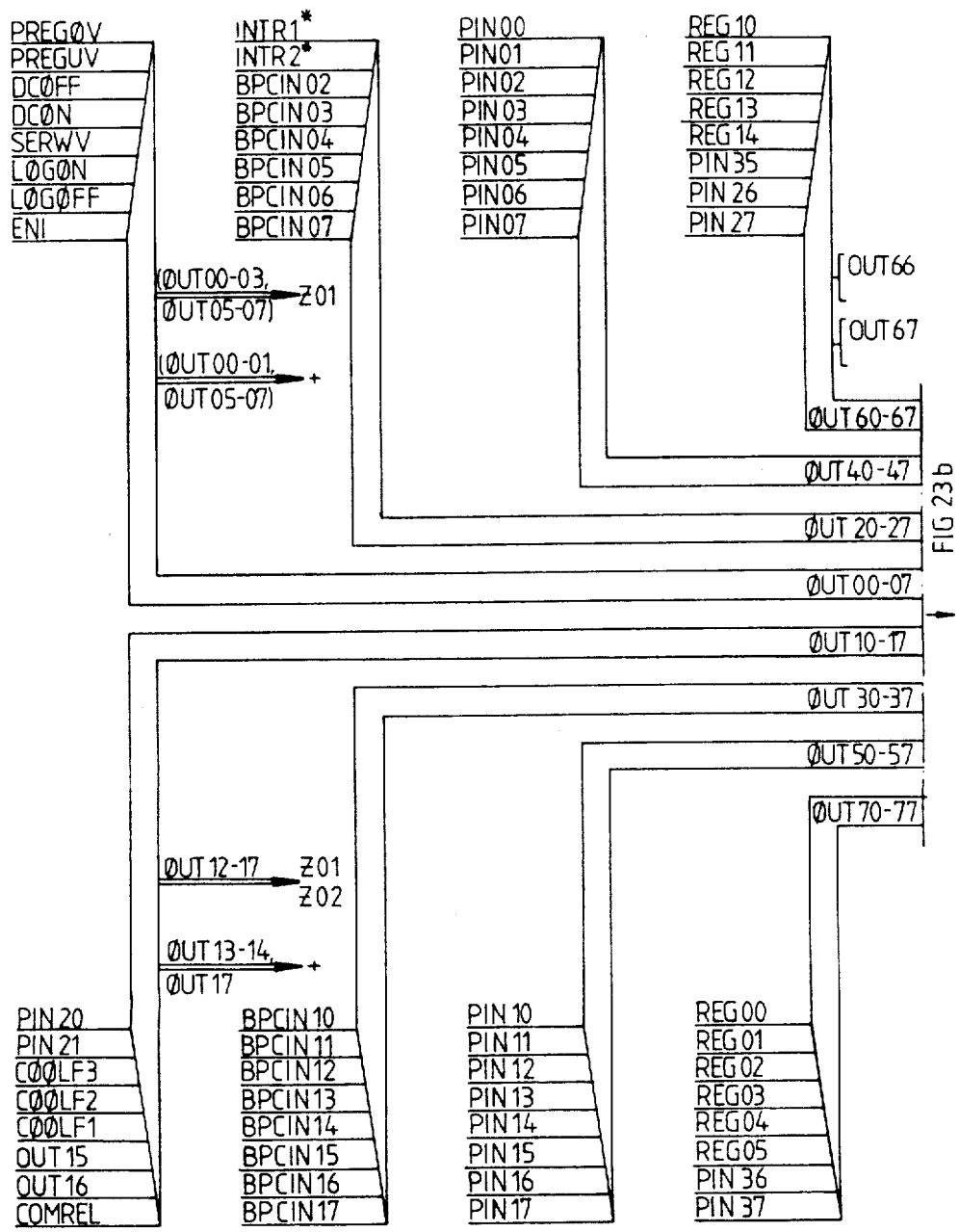
FIGS. 23a-23b is a block diagram of the input logic circuits in the AM904 OPERATION INTERFACE UNIT of FIG. 14.
Figure 23B:
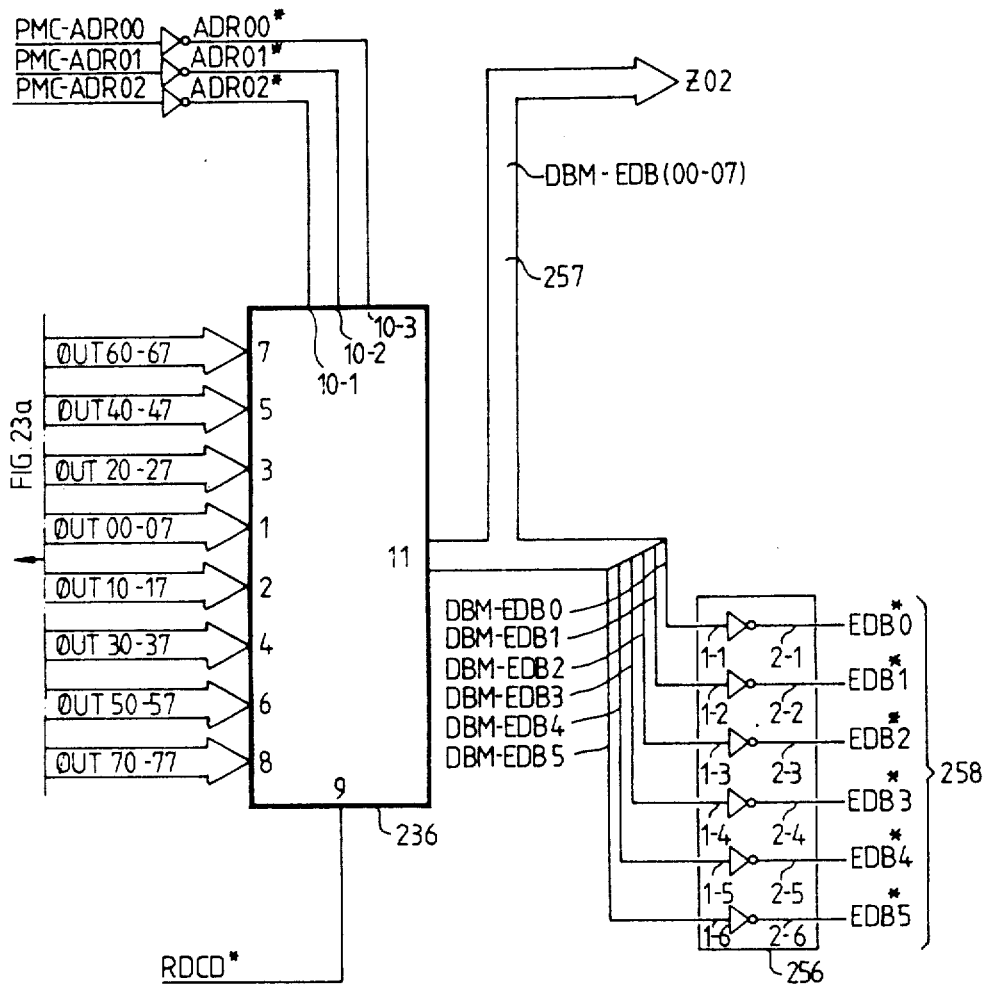

FIGS. 23a-b are a schematic representation of the signals brought into play in the left half of FIG. 14.

The 8 groups of signals are shown on the left:

ØUT (00-07) arriving at terminal 1 of multiplexer (236) and generated from input signals: PREGØV, PREGUV, DCØFF, DCØN, SERVUV, LØGØN, LØGØFF, ENI. Some of ØUT signals (00-03), (05-07) are routed to connector Z01 and some (00-01), (05-07) are routed to the very heart of operation interface unit (74).

ØUT signal (10-17) arriving at terminal 2 of multiplexer (236) and generated from input signals: PIN 20, PJN 21, CØØL F3, CØØL F2, CØØL F1, ØUT 15, ØUT 16, CØMREL. Some of ØUT signals (12-17) are routed to connectors Z01 and Z02 and some (13-14), 17 are routed to the very heart of operation interface unit (74).

ØUT (20-27) arriving at terminal 3 of multiplexer (236) and generated via input signals: INTR1*, INTR2*,

BPCIN02, BPCIN03, BPCIN04, BPCIN05, BPCIN06, PBCIN07.

ØUT (30-37) arriving at terminal 4 of multiplexer (236) and generated via input signals: BPCIN10, BPCIN11, BPCIN12, BPCIN13, BPCIN14, BPCIN15, BPCIN16, BPCIN17.

ØUT (40-47) arriving at terminal 5 of multiplexer (236) and generated via input signals: PIN00, PIN01, PIN02, PIN03, PIN04, PIN05, PIN06, PIN07.

ØUT (50-57) arriving at terminal 6 of multiplexer (236) and generated via input signals: PIN10, PIN11, PIN12, PIN13, PIN14, PIN15, PIN16, PIN17;

ØUT (60-67) arriving at terminal 7 of multiplexer (236) and generated via input signals: REG10, REG11, REG12, REG13, REG14, PIN35, PIN26, PIN37. ØUT signals 66 and 67 are used to generate signals BPCØU27 and BPCØU26;

ØUT (70-77) arriving at terminal 8 of multiplexer (236) are generated via input signals: REG00, REG01, REG02, REG03, REG04, REG05, PIN36, PIN37.

The multiplexer is controlled by addressing signals ADR00*, ADR01* and ADR02* and selection signal RECD*:

addressing signals ADR* (00-02) are obtained by inverting PMC-ADR (00-02) signals from the monitor address bus. This inversion is made solely for the technological needs of multiplexer (236). These addressing signals are applied to terminals 10-1, 10-2, 10-3 of multiplexer (236). These addressing signals sample one of the ØUT signal groups;

selection signal RDCD* is generated by circuit selecting and function defining block (237), as stated with reference to FIG. 14. Selection signal RDCD* enables the multiplexer when monitor (10) has, on the one hand, called in the operation interface unit (74) with PMC-ADR* (09, 10, 15) signals and, on the other hand, requested a read cycle with the PMC-MEMR* signal.

When multiplexer (236) is selected with the RDCD* signal and when one of the ØUT groups has been addressed with ADR* (00-02) signals, the contents of the addressed ØUT group is transferred to output 11 of multiplexer (236). This output is linked to data bus (237) DMB-EDB (00-07). This data bus (DBM-EDB (00-07):

passes, on the one hand, through connector Z02 to reach monitor (10); and on the other hand, supplies power to inputs 1-1, 1-2, 1-3, 1-4, 1-5 and 1-6 of inverting amplifier group 256 through the DBM-EDB (00-05) lines. Outputs 2-1, 2-2, 2-3, 2-4, 2-5 and 2-6 of these inverting amplifiers supply power to bus (258) EDB* (00-05). This bus drives in parallel inputs 6 of the 5 registers (238), (239), (240), (241) and (242), which are shown in FIG. 24.

In read mode, that is, when the RDCD* signal selects multiplexer (236), the registers (238), (239), (240), (241) and (242) have their inputs 6 blocked, and bus DBM-EDB (00-07) transmits the signals to monitor (10) only.

Figure 24A:
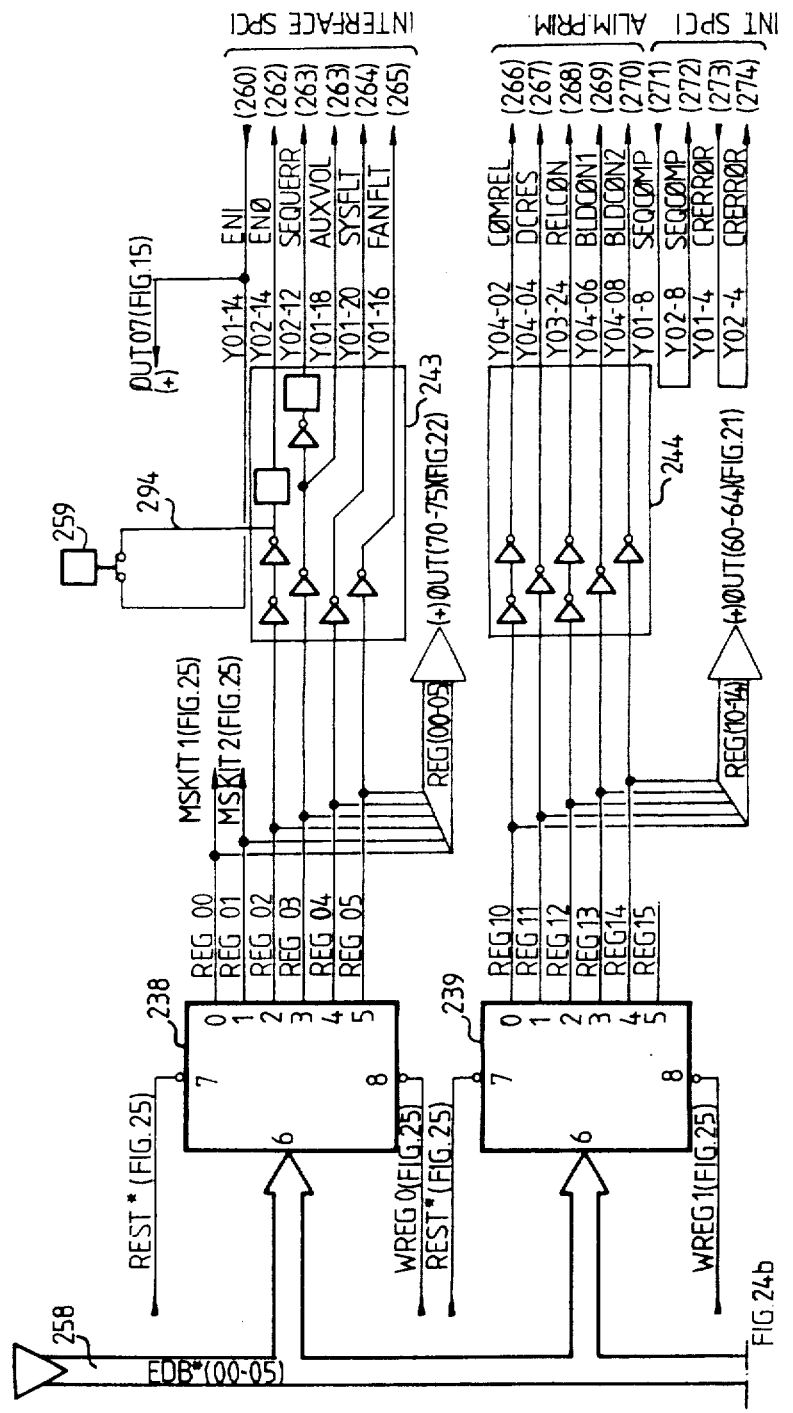
FIGS. 24a-24b is a block diagram of the output logic circuits in the AM904 OPERATION INTERFACE UNIT.
Figure 24B:
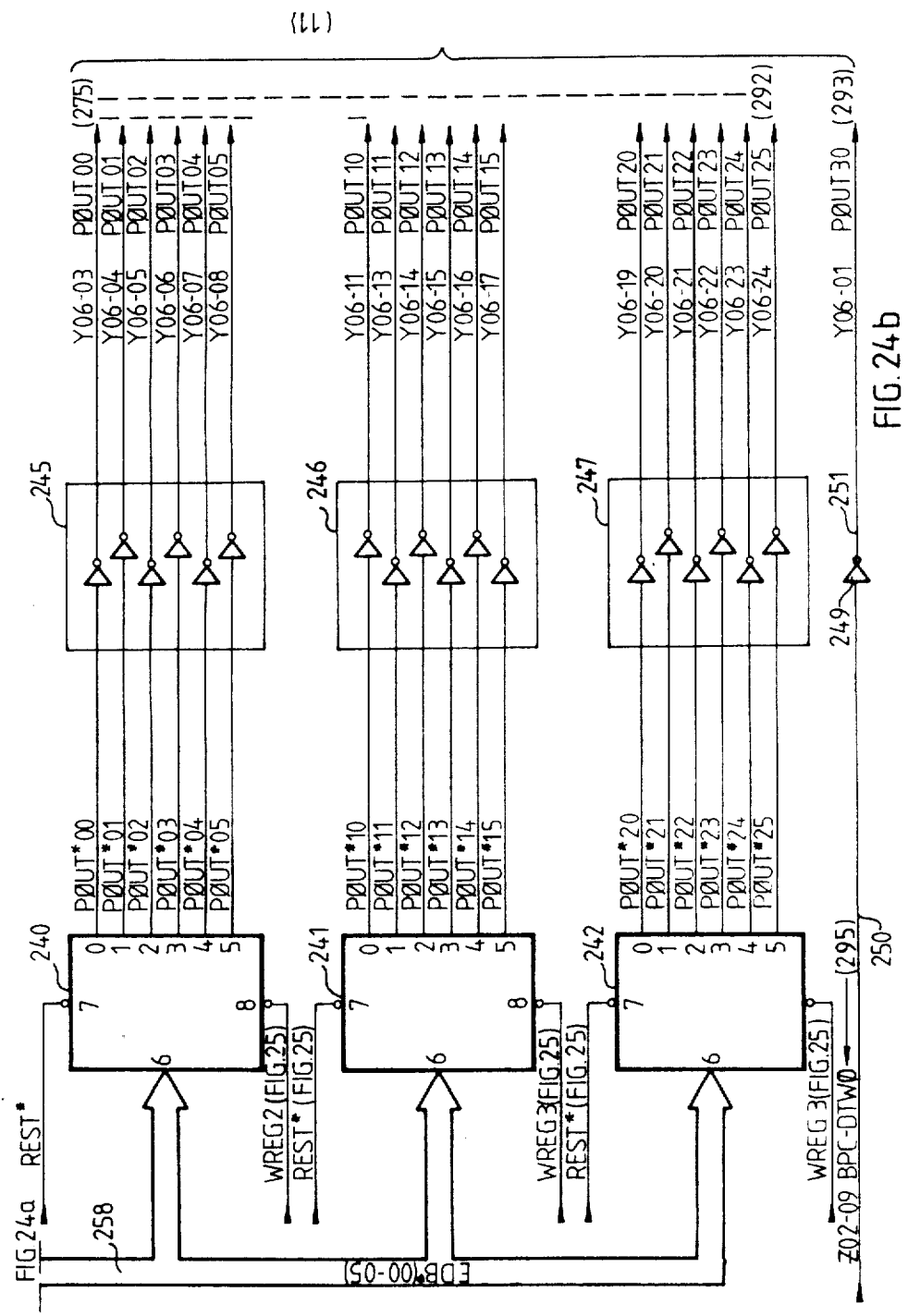

In write mode, things happen differently, as will now be seen with reference to the description of FIGS. 24a-b.

When monitor (10) requests a write cycle in operation interface unit AM904 (74), it carries out the following operations:

it addresses operation interface unit AM904 (74) by means of addressing signals PMC-ADR* (09, 10, 15);

it addresses one of the registers (238), (239), (240), (241) or (242) by means of the addressing signals PMC-ADR* (00-02);

it controls a write cycle by means of signal PMC-MCMW*.

When these conditions are fulfulled, circuit selecting and function defining block (237) (FIG. 14a) supplies power to the WREGX line corresponding to the register selected for writing. This WREGX signal applied to terminal 8 of the register causes the transfer of the contents of bus EDB* (00-05) (258) into the register. Following this operation, the contents of the register are modified and the EDB* (00-05) signals which were placed on input 6 of the register are now stored in the register. At the same time, these signals are each reproduced at outputs 0, 1, 2, 3, 4, 5 of the register.

It should be noted that the registers include another control input labeled 7. This input is a reset control input. When monitor (10) wishes to carry out a reset, it sends a PCM-REST 20 signal to circuit selecting and function defining block (237), which sends a REST* signal to the interior of operation interface unit (74). This REST* signal causes all the circuits it controls to be reset.

FIGS. 24a-b are a diagrammatic partial representation of FIG. 14. The right half of FIG. 14 is shown in FIGS. 24a-b.

As explained with reference to the description of FIG. 23, the output signals from the inverting amplifiers (256) are applied to bus (258) EDB* (00-05). This bus (258) EDB* (00-05) is located to the extreme left of FIG. 24a. This bus (258) EDB* (00-05) supplies power in parallel to inputs 6 of the 5 registers (238), (239), (240), (241) and (242). In order for anything to be written into one of registers (238), (239), (240), (241), and (242), it is necessary, as was previously explained, for monitor (10) to have:

requested a write cycle with the PMC-MEMW* signal;

selected operation interface unit 74 by the addressing signals PMC-ADR* (09, 10, 15);

designated one of registers (238), (239), (240), (241) or (242) by the PMC-ADR* (00-02) addressing signals.

When these conditions are fulfilled, the designated register is selected by a WREGX signal applied to its input 8:

register (238) is selected by the signal WREG0,
register (239) is selected by the signal WREG1,
register (240) is selected by the signal WREG2,
register (241) is selected by the signal WREG3,
register (242) is selected by the signal WREG4.

When a register is selected, the contents of bus EDB* (00-05) are transferred to the selected register. The contents will remain stored in the selected register until another operation brings new contents to that register or until a reset signal, REST*, is applied to input 7 of the register.

Register (238) located in the upper left part of FIG. 24a produces at its output terminal REG00, REG01, REG02, REG03, REG04, and REG05 signals. These signals correspond one by one to the signals which were loaded via bus EDB* (00-05): REG00 corresponds to EDB*00, REG01 to EDB*01, ... REG05 to EDB*05.

REG (00-05) signals supply power to the inputs of interface block (235) where they serve to generate ØUT (70-75) signals, as indicated in FIG. 22.

In another connection, REG (02-05) signals supply power to output amplifier block (243). Inside this output amplifier block (243), the triangles represent inverting amplifiers and the squares electric filters.

Signal REG02 passes through two inverting amplifiers and through an electric filter before generating synchronization signal ENØ (261). This ENØ signal (261) is the synchronization signal which was taken into account with reference to the description of FIGS. 10, 11 and 12. This ENØ synchronization signal (261) is transmitted by the following power supply system in the daisy chain in order to cause the start-up of said following power supply system.

It appears at this point that if a power supply system is shut down, it will be necessary to provide for a means which will short-circuit the power supply in the daisy chain which has been shut down, failing which the shutdown system, although it will receive the ENI synchronization signal, will never retransmit an ENØ signal. Therefore, relay (259) was placed in operation interface unit AM904 (74). When the power supply system is in operation, this relay is energized and its contacts are open. Under these conditions, synchronization signal ENI (260) will supply power to an input of interface block (235), as shown in FIG. 15. Then, the power supply system will process this signal with the object of further generating the synchronization signal ENØ. On the other hand, if the power supply system is shut down, relay (250) is deenergized and the contacts are closed. Synchronization signal ENI (260) will then be directly transmitted on wire (294) and from there it generates synchronization signal ENØ (261).

Relay (259) has thus enabled the power supply system to be short-circuited, and the path of synchronization signal ENI/ENØ in the daisy chain has not been cut off.

Signal REG03 passes through two inverting amplifiers, as well as through a filter in order to generate sequence error signal SEQUERR (262). This sequence error signal SEQUERR is generated by monitor (10) when it determines that certain operations have gone beyond a given period of time. However, a fault may have a deleterious effect on the power supply system and the sequence error signal (262) might not be generated for lack of an adequate slave power supply.

To remedy this situation, as was stated in the description of console (48), the latter is provided with an auxiliary voltage AUXVOL with a relatively high output impedance. This auxiliary voltage AUXVOL is applied to the input of the last inverting amplifier located in the path of signal REG03. If the slave power supply voltage (222) of the slave power supply system is faulty, the auxiliary voltage AUXVOL (263) will drive the input of this last inverting amplifier to impose a sequence error signal SEQUERR. In this way, a fault in the slave power supply voltage (222) will be indicated to console (48) as a sequence error.

Signal REG04 passes through an inverting amplifier to provide console (48) with a system fault signal SYSFLT (264) which is generated by monitor (10) when it detects a fault in the operation of the power supply system.

Signal REG05 passes through an inverting amplifier to provide console (48) with a thermal fault signal which is generated by monitor (10) when it detects at least one of the thermal faults (CØØLF1), CØØLF2 or CØØLF3.

Register (239) generates signals REG10, REG11, REG12, REG13 and REG14. One by one these signals correspond to the signals which were exchanged via bus EDB* (00-05): REG010 corresponds to EDB*00, REG11 to EDB01*, . . . , REG14 to EDB*04.

REG (10-14) signals supply power to the input of interface block (235) where they serve to generate ØUT signals (60-64), as shown in FIG. 21.

REG (10-14) signals provide power to output amplifier block (244). Inside this output amplifier block (244), the triangles represent inverting amplifiers.

Signal REG10 passes through two amplifiers before producing the CØMREL signal (266). This CØMREL signal (266) is the control signal for the switch to start the primary power source (226).

Signal REG11 passes through an inverting amplifier and generates the DCREST signal (267). This signal is a reset signal which enables monitor (10) to reset the controlled circuits.

Signal REG12 passes through two inverting amplifiers and generates the RELCØN signal (268). This RELCØN SIGNAL (268) indicates that the turn-on switch of the primary power supply (226) has indeed responded to control signal (266): it is a report of the closing emitted by the switch.

Signals REG13 and REG14 each pass through an inverting amplifier before generating, respectively, signals BLDCØN1 (269) and BLDCØN2 (270). These signals are signals which control the putting into operation of the ballast resistors located in the primary power supply (226).

Signal SEQCØMP (271) is the signal which indicates that the start-up sequence for a set of power supply systems included in an SPCI daisy chain is completed. This SEQCØMP (271) signal is none other than the output synchronization signal ENØ transmitted by the last power supply system located in the SPCI daisy chain. As a matter of fact, the last power suppy system of the chain transmits an output synchronization signal ENØ which is not expected by any power supply system but which, on the contrary, indicates that all the operating power supply systems have started. This information is useful for the operator or the technician who has initiated the start-up operation. Thus, the output synchronization signal ENØ of the last power supply system of the chain is, at the level of this system, connected to terminal 8 of connector Y01 by a strap on connector Y01. The output synchronization signal ENØ is retransmitted by terminal 8 of connector Y02 to the next-to-last power supply system of the SPCI daisy chain. The next-to-last power supply system receives, in turn, the output synchronization signal ENØ which has become the SEQCØMP signal at terminal 8 of connector Y02 of its operation interface unit AM905. This SEQCØMP signal is retransmitted by terminal 8 of connector Y02 of the AM904 operation interface unit of the next-to-last power supply system to the beforementioned circuit selecting and function defining block (237) of the first power supply system of the daisy chain. This signal is connected directly to terminal 4 of connector Y02 of the operation interface unit AM904. This terminal 4 of connector Y02 is linked by the SPCI interface cable to input 4 of connector Y01 of operation interface unit AM904 of the second operation system which, in turn, retransmits the CRERRØR signal to the third operation system. And so forth and so on until the last power supply system which transmits the CRERRØR signal to console (48). The arrival of this signal in console (48) enables one to be certain that all the Y01 and Y02 connectors in question are correctly plugged in, since the signal has passed through all the Y01 and Y02 connectors of the operation interface units AM904.

In summary, signals (260) through (274) of FIG. 24a are signals which belong to the SPCI interface. These signals serve to check from the console (48) the operation of the power supply system(s) connected thereto.

Signals (275) through (293) of FIG. 24b are the display control signals for the service panel (11). These signals are defined in the table of FIG. 26.

Register (240) generates PØUT*(00-05) signals which map directly to the signals that were loaded at input terminal 6 via EDB* bus (00-05): PØUT*00 maps to EDB*00, . . . , PØUT*05 to EDB*05.

Inverting amplifier block (245) contains the 6 inverting amplifiers needed to amplify, as well as invert, the PØUT*(00-05) signals in order to allow the PØUT(00-05) signals to drive the service panel (11) displays directly.

Register (241) generates the PØUT(10-15) signals which map directly to the signals that were loaded at input terminal 6 via EDB* bus (00-05): PØUT*10 maps to EDB*10, . . . , PØUT*15 to EDG*05.

Inverting amplifier block (246) contains the 6 inverting amplifiers needed to amplify, as well as invert, the PØUT*(10-15) signals in order to allow the PØUT(10-15) signals to drive the service panel (11) displays directly.

Register (242) generates the PØUT*(20-25) signals which map directly to the signals which were loaded at input terminal 6 via EDB* bus (00-05): PØUT*20 maps to EDB*00, . . . , PØUT*25 to EDB*05.

Inverting amplifier block (247) contains the 6 inverting amplifiers needed to amplify, as well as to invert, the PØUT signals (20-25) in order to allow the PØUT (20-25) signals to drive the service panel (11) display directly.

Finally, the BPC-DTWO signal (295) which is a cyclehalting (TRAP) signal transmitted by monitor (10) is transmitted by link (250) to the iput of the inverting amplifier (249). The output of this inverting amplifier (249) generates at link (251) the PØUT30 signal which will activate the "MONITOR" display (161-1) of the service panel (11).

Figure 25:
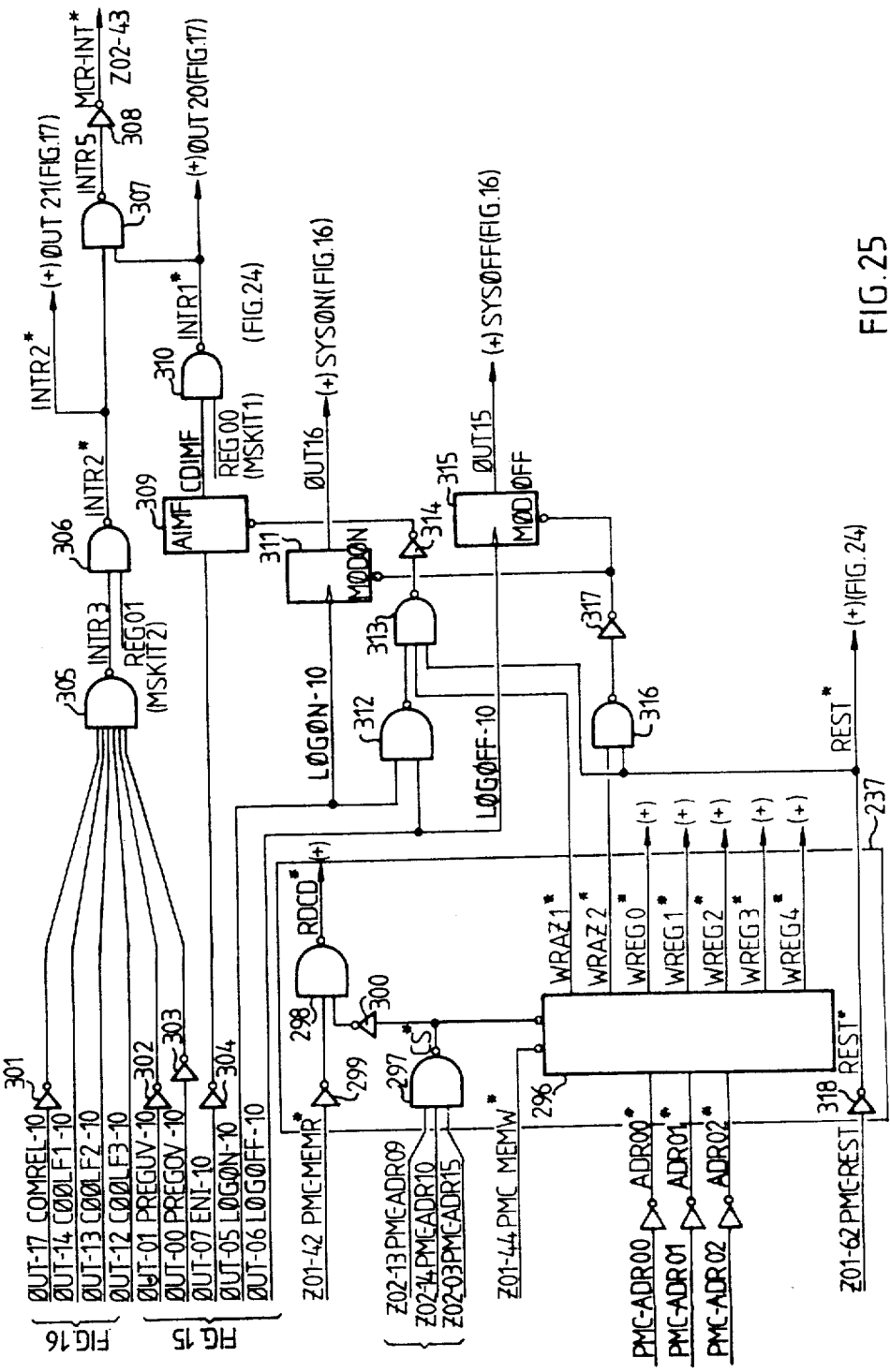
FIG. 25 is a detailed illustration of the circuits in a CYCLE CHANGE REQUEST PROCESSING BLOCK (248) contained in the AM 904 OPERATION INTERFACE UNIT as FIG. 13.

FIG. 25 is a detailed representation of the circuits in state and operation change processing block (48). Circuit selecting and function defining block (237) is not detailed herein, because it may be taken from current computer technology. It may be easily designed using an integrated circuit (296) such as a 75 LS 138, which is the case in the preferred embodiment of the invention, to which 2 NAND gates (297) and (298) and 2 inverting amplifiers (299) and (300) need to be added. The drawing shows how the NAND gate (297) constitutes the selector element of AM904 operation interface unit. When the AM904 operation interface unit (74) is selected, signal CS* (abbreviation of Chip Select) appears. Hence, it follows that the CS* signal is active at level zero, since this signal is followed by an asterisk (*) to indicate that it is inverted. This CS* signal will drive the inverting amplifier (298) whose output goes up and, in addition, enables the 74LS138 integrated circuit (296).

In this drawing, signals travel from left to right and, as a result, the input signals are found on the left-hand side of FIG. 25. The input signals belong to 3 categories:

data signals or, simply, DATA: ØUT17 (CØMREL), ØUT14 (CØØLF1), ØUT13 (CØØLF2), ØUT12 (CØØLF3), ØUT01 (PREGUV), ØUT00 (PREGØV), ØUT07 (ENI), ØUT05 (LØGØN10) and ØUT06 (LØGØFF10);

addressing signals or, simply, ADDRESSES: ADR*00, ADR*01, ADR*02, PMC-ADR09, PMC-ADR10, PMC-ADR15;

control signals or, simply, COMMANDS: PMC-MEMR*, PMC-MEMW*, PMC-REST-20.

The role of the addressing and the control signals was discussed in another connection, so that they will not be described in the following paragraphs, with the exception of the reset signals, which play a special role in operation state change processing block (248).

In data, two groups must be considered:
data concerning an operating state change originating externally, that is, a voluntary and normal state change requested by the operator or the maintenance technician. This is the case for ØUT07 data (ENI), ØUT06 (LØGØFF-10), and ØUT05 (LØGØN-10);
data concerning an operation state change originating internally, that is, a state change caused by the detection by monitor (10) of a fault or of an internal state change. This is true for data ØUT17 (CØMREL1), ØUT14 (CØØLF1), ØUT13 (CØØLF2), ØUT12 (CØØLF3), ØUT-01 (PREGUV), ØUT00 (PREGØV).

The circuits managing the data of the second group, that is, the data concerning state changes originating internally, can be found in the upper part of FIG. 25. Data concerning state changes originating internally will activate the input of the NAND gate (305). The output INTR3 of the NAND gate (305) goes up if at least one of its inputs comes down, that is, only one of the state change signals originating internally has to come down for the INTR3 signal to go up. State change signals or data of internal origin are:

the CØMREL signal, a signal which reports the closing of the primary power supply (226) contactor. This CØMREL signal passes through the inverting amplifier before driving the NAND gate (395). As a result, should the primary power supply (226) contactor close, starting this primary power supply (226), the CØMREL signal goes up and the output of the inverting amplifier (301) comes down. The low output of the inverting amplifier (305) causes the INTR3 interrupt signal to go up: if no other signal has contributed to half of the interrupt signal INTR3, this interrupt signal INTR3 signifies that the primary power supply (18) has been turned on and that the monitor (10) must intervene to continue the start-up of the power supply system.

the CØØLF1 signal activates the inverting amplifier (305) directly. This inactive signal indicates that the heating conditions of a specified zone of the power supply system are normal. It is produced by the thermal control circuits (224). This signal comes down if these heating conditions become abnormal. This low CØØLF1 signal causes the output INTR3 of the inverting amplifier (305) to go up. If this interrupt signal INTR3 has gone up solely because of the CØØLF1 signal's coming down, this signifies that an abnormal heating up in the zone monitored by the CØØLF1 signal has occurred. In this case, the interrupt signal INTR3 will cause monitor (10) to intervene in order to stop this abnormal rise in temperature.

CØØLF2 and CØØLF3 signals play similar roles as CØØLF1, but for 2 other zones of the power supply system. They indicate, for their respective zones, the occurrence of an abnormal overheating phenomenon.

the PREGUV (abbreviation of Preregulation Undervoltage) signal is a monitoring signal emanating from the primary power supply (226). The primary power supply (226) is a power supply whose functions include supplying one or more preset voltages to the sources of the power supply system. The significance of the PREGUV signal being high is that the set voltage(s) supplied by the primary power supply (226) are inferior to one or more of the specified lower limits. Under these conditions, the correct operation of the power supply system is in question. The PREGUV signal passes through inverting amplifier (302) and, therefore, it is a low signal which is applied to the input of the NAND gate (305) when the PREGUV signal is high. This low signal causes the INTR3 interrupt signal to occur. If the PREGUV signal is the only one to cause the occurrence of the INTR3 signal, this means that the monitor (10) has been requested to intervene following one or more subminimal voltages arising in the primary power supply (226).

the PREGØV (abbreviation of Preregulation Overvoltage) signal is another monitoring signal emanating from the primary power supply (226). Contrary to the PREGUV signal which has just been described, the PREGØV signal characterizes the fact that the output voltage(s) of the primary power supply (226) exceed one or more upper voltage limits. Although for different reasons, this situation is also detrimental to the proper operation of the power supply system. The appearance of one or more overvoltages causes the PREGØV signal to go up. This PREGØV signal passes through inverting amplifier (303) before activating the gate (305) and, as a result, a high PREGØV signal causes the INTR3 interrupt signal to go up. In this case and subject to the PREGØV signal's being the only one to cause the INTR3 signal to go up, the INTR3 interrupt signal means that monitor (10) has been requested to intervene by one or more of the overvoltages at the level of the primary power supply (226).

It follows from the above and from the very mode of operation of the NAND gate (305) that the INTR3 interrupt signal that monitor (10) has been requested to intervene following at least one of the signals: CØMREL, CØØLF1, CØØLF2, CØØLF3, PREGUV and PREGØV. In short, the NAND gate (305) groups together the requests transmitted within the framework of the operation state change requests originating internally. As will be explained in subsequent paragraphs, when the request for intervention by means of INTR3 interrupt signal is transmitted to monitor (10), it is up to monitor (10) to find out the signal(s) that has (have) requested it to intervene. As will be explained in subsequent paragraphs, this intervention is caused by the MCR-INTR* signal.

The INTR3 interrupt signal is applied to the input of the NAND gate (306). The NAND gate (306) has another input activated by the output REG01 of register (238). This REG01 gate of register (238) is also calld MSKIT2 (abbreviation of interruption mask 2). This REG01 output of register (238) or MSKIT2 is conditionally placed on the input of NAND gate (306); INTR3 interrupt signal will only be able to pass through NAND gate (306) if the MSKIT2 signal is high. The MSKIT2 signal is thus a MASK FOR THE INTR3 INTERRUPT SIGNAL. Monitor (10) can thus block or enable at will the transmission of the INTR3 interrupt signal by placing the output REG01 of register (238) either at 0 for diabling or at 1 for enabling said signal. This facility is used, as will be explained later on, during periods of trouble shooting when the services are used in the INHIBITION mode. This facility is also used during certain transition periods when transient random events can occur on the fault lines, such as, for example, during start-ups and shutdowns.

If the MSKIT2 signal is high, the occurrence of the INTR3 signal generates an INTR2* signal (low, since this is a signal marked by an asterisk) on the output of AND gate (306). This INTR2* signal is allocated to two locations:

(1) it is sent to input 3-1 of multiplexer (236), as indicated in FIG. 17, where it is also denoted by the name ØUT21;

(2) it is sent to one of the inputs of NAND gate (307). This NAND gate (307) carries out the grouping together of the 2 groups of interrupt requests;

INTR2* interrupt request transmitted by the operating state change request signals originating internally;

INTR1* interrupt request transmitted by the operating state change request signals originating externally.

Before going any further on the path of INTR2* signal, it is worth examining how the INTR1* interrupt request signal is generated.

The above consideration dealt only with a request of the operator or of the maintenance technician for the start-up of the power supply system (s). This request was posted to monitor (10) by the appearance of the LØGØN signal and the actual start-up was initiated by the ENI synchronization signal. Conversely, in the case of a shutdown request, the request is posted to the monitor through the appearance of the LØGØFF signal and the shutdown is initiated by the appearance of the ENI synchronization signal.

In the preferred embodiment of the invention, the 3 signals ENI, LØGØN and LØGØFF, or at least their derived signals ENI*, LØGØN-10 and LØGØFF-10, are each stored in a bistable circuit: ENI* in bistable circuit AIMF (abbreviation of Autorisation d'Inversion du Mode de Fonctionnement=Operating Mode Inversion Authorization), LØGØN in the MØDØN (abbreviation of Mode ON) bistable circuit (311) and LØGØFF (abbreviation of Mode OFF) in the MØDØFF bistable circuit (315).

It is necessary for the monitor (10) to have the capability of resetting these 3 bistable circuits (309), (311) and (315) at will. Circuit selecting and function defining block (237) enables these initialization operations. In fact, it was explained that a 74LS138-type integrated circuit (296) is provided in this circuit selecting and function defining block (237). This 74LS138 integrated circuit (296) is driven by the signals:

PMC MEMW*, which is the write cycle request signal originating from monitor (10);

CS*, which is the AM904 operation interface unit (74) selection signal;

ADR00*, ADR01*, ADR02*, which are the 3 lightly-weighted addressing signals from the addressing bus of monitor (10).

When the monitor requests via the MEMW* signal a write cycle from the AM904 operation interface (74) selected by CS*, the 74LS138 integrated circuit (296), which receives its power from the 3 addressing lines ADR00*, ADR01* and ADR02*, can select 8 addresses.

Four selected addresses have already been considered: WREG0*, WREG1*, WREG2* and WREG3*. Thus, four available addresses are left, two of which are specifically used for resetting:
WRAZ1* for resetting bistable circuit AIMF (309);
WRAZ2* for resetting bistable circuit MØDØN (311) and MØDØFF (315);

When monitor (10) wants to reset the AIMF flip-flop (309), it selectes AM904 operation interface unit (74) by means of addressing signals PMC-ADR (09, 10, 15), it requests a write cycle with the PMC-MEMW* signal, then it places in ADR* (00-02) the address mapping to the WRAZ1* signal.

Under these conditions, the WRAZ1* signal will be low since it is marked with an asterisk. This low signal applied to the input of NAND gate (33) generates a high signal at the input of inverting amplifier (314). The low output of the inverting amplifier (314) activates the AIMF flip-flop (309) to zero from its zero-forcing input.

When monitor (10) wants to reset flip-flops (MØDØN) (311) and MØDØFF (315), it uses a similar procedure, except that the address placed in ADR* (00-02) maps to the signal WRAZ2*. When this WRAZZ* signal is generated, i.e., when it is low, a low rank is applied to the input of NAND gate (316) The output of this NAND gate (316), which is high, is applied to the input of inverting amplifier (317). The output of amplifier (317), which is low, is applied to the reset inputs of bistable circuits MØDØN (311) and MØDØFF (315).

There exists for monitor (10) another means for driving circuits to zero: transmitting a master reset signal PMC-REST-20.

This master reset signal PMC-REST-20 is amplified by inverting amplifier (318). The resulting REST* signal is applied:
to the input of NAND gate (313) with inverted output where it has the same effect as reset signal WRAZ1*, i.e., the resetting of AIMF bistable circuit (309);
to the input of NAND gate (316) with inverted output, where it has the same effect as reset signal WRAZ0*, i.e., the resetting of bistable circuits MØDØN (311) and MØDØFF (315);
finally, it is transmitted to the reset inputs of registers (238), (239), (240), (241) and (242) shown in FIG. 24.

This master reset signal REST* carries out the general resetting of the registers and flip-flops of operation interface unit (74).

The reset circuits having been considered, a start-up sequence of the power supply system will now be examined as it takes place. Thus, it is assumed that the power supply system is turned off, i.e., the
MØDØN circuit (311) is low;
MØDØFF circuit (315) is high;
AIM bistable circuit (309) is:
low, if the shutdown or start-up of the power supply system has been taken into account by monitor (10), since the latter carries out this reset with a WRAZ1* signal as soon as it takes into account the state change interrupt INTR1* through an external request;
high, because it has just received an ENI synchronization signal associated with the change of state.

When describing FIG. 12, it was explained how the chronological series of LØGØN, LØGØFF and ENI signals was made.

The decision of the operator or the maintenance technician to change the state of operation of the power supply system from shutdown to start-up, this decision is expressed by the transmitting a logic signal LØGØN followed after a period of time by an ENI synchronization signal.

As shown in FIG. 15, the LØG-ØN signal is amplified to generate the ØUT-05 signal, which is also called LØG-ØN-10. This LØG-ØN-10 signal is applied to:
on the one hand, the input of MØDØN bistable circuit (311), which indexes itself, thus storing the start-up request which was just made;
on the other hand, to the input of NAND gate (312). This LØGØN signal, which is high, finds itself conditionally placed on the input of this NAND gate (312) along with the LOGOFF signal, which is also high, since the system is actually shut down as a result of a previous signal. Since the two signals LØGØN and LØGØFF are both high, the output of NOR gate (312) will be low. This low signal is applied to one input of NAND gate (313). Thus, NAND gate (313) transmits a high signal which is inverted in inverting amplifier (314). The output signal from inverting amplifier (314), which is low, activates the reset input of AIMF bistable circuit (309). This AIMF bistable circuit (309) would find itself restored to its initial state, had it stayed high following the non-satisfaction of the previous ENI signal. AIMF bistable circuit (309) will once again be indexed at 1 with the arrival of syncrhonization signal ENI which, passing though inverting amplifier (304) will come as the signal ENI* and trigger AIMF bistable circuit (309). The high output of AIMF bistable circuit (309) generates the CDIMF signal (abbreviation of "Commande D'Inversion de Mode de Fonctionnement"=command to invert the operation mode). This CDIMF signal is conditionally placed on the input of NAND gate (310) along with the REG00 signal transmitted by register 238. This REG00 signal, also called MSKIT1 (abbreviation of "mask for interrupt1"), is a masking signal which enables monitor (10) either to block at will the transmission of interrupt signal INTR1* by giving a low value to REG00, or to enable the transmission of interrupt signal INTR1* by giving a high value to REG00. In the case of this second hypothesis, the CØMIF signal generates a low signal INTR1* as the output of NAND gate (310). This INTR1* signal follows 2 directions:
on the one hand, it activates input OUT20 of multiplexer (236), thereby enabling monitor (10) to detect this INTR1* interruption by addressing the multiplexer and by requesting a read cycle;
on the other hand, it activates an input of a NAND gate (307);

This NAND gate (307) is the gate encountered during the description of the INTR2* signal. In fact, this NAND gate (307) performs the conjunction of the two interrupt request signals (INTR1* and INTR2*). If at least one of these two signals, INTR1* or INTR2*, is low, the INTR5 signal on the output of NAND gate (307) is high. This high INTR5 signal is inverted in inverting amplifier (308) so as to generate the interrupt signal MCR-INT* which is transmitted by the control bus all the way to monitor (10).

In brief, the 2 interrupt request signals INTR1* and INTR2* are added to create an MCR-INT* signal which advises monitor (10) of the presence of at least one of them. It is up to monitor (10), thus alerted, to seek out the origin of this global interrupt request MCR-INT*. To accomplish this, monitor (10) must address the multiplexer (236) and interrogate inputs ØUT20 and ØUT21: if input ØUT20 is low, this means that INTR1* is present, and if ØUT21 is low, this means that INTR2* is present. To know more about this, monitor (10) must interrogate:

for internal requests:
  ØUT 17 for CØMREL
  ØUT 14 for CØØLF1
  ØUT 13 for CØØLF2
  ØUT 12 for CØØF3
  ØUT 01 for PREGUV
  ØUT 00 for PREGØV
for external requests:
  ØUT 15 for LØGØFF
  ØUT 16 for LØGØN In the case under discussion, i.e., the start-up, monitor (10), advised by MCR-INT* of the appearance of an interrupt request, will seek out the type of interruption which has caused this MCR-INT* interrupt request. Supposing, to simplify matters, that only the start-up request is the cause of this MCR-INT* interrupt request, the monitor will interrogate the INTR1* (ØUT20) and INTR2* (ØUT21) signals. The reply will be positive for ØUT20, since we are dealing with a request emanating from AIMF bistable circuit (309).

The monitor (10) advised of the fact that the operation request originates externally, will attempt to find out whether a start-up or a shutdown of the power supply system is involved. To do this, it will interrogate ØUT16 SYSTØN) and ØUT15 (SYSTØFF). The affirmative reply comes from ØUT 16 (SYSTØN) because a start-up request is involved. Strengthened by this SYSTØN reply, monitor (10) will carry out the start-up process for the power supply system.

The shutdown process for the power supply system occurs in the same manner as for the start-up process. In this case, however, the positive response comes from ØUT15 (SYSTØFF) and monitor (10) carries out the process for shutting down the power supply system.

In the foregoing it was supposed that there was no interrupt request (INTR2*) originating internally. In the opposite case where there is an internal INTR2* interrupt request, monitor (10), while interrogating ØUT21 (INTR2*) receives a positive ØUT21 reply. At that moment, monitor (10) will seek out the origin(s) of this internal interrupt request INTR2* by interrogating ØUT19 (CØMREL), ØUT14 (CØØLF1), ØUT13 (CØØL42), ØUT12 (CØØLF3), ØUT01 (PREGUV), ØUT00 (PREGØV). According to the replies it will receive, monitor (10) will initiate the execution of the operations required by the presence of these internal interrupt requests.

In the foregoing, the AM904 operation interface unit (74) was described. Another type of interface unit will now be considered. Whereas the AM904 operation interface unit (74) serves to provide exchanges between monitor (10) and the operator console (48 ), the service panel (11), the primary power supply (18), and the slave power supply (9), the new type of unit serves to provide exchanges between the monitor (10) and the various power sources. This new type of unit is called "downstream interface unit AM903".

THE DOWNSTREAM INTERFACE UNIT AM903

Four downstream interface units AM903 are shown in FIGS. 2a–c: unit (51), unit (56), unit (61) and unit (66). It will be understood that this number of units is in no way limited. It is only given by way of non-limitative example herein. In the FIGURES, it can clearly be seen that every one of the downstream interface units (51), (56), (61) and (66) is divided into two equal parts:
unit (51) is divided into two parts (51-1) and (51-2)
unit (56) is divided into two parts (56-1) and (56-2)
unit (61) is divided into two parts (61-1) and (61-2)
unit (66) is divided into two parts (66-1) and (66-2)

This particularity lies in the fact that the dimensions chosen for the functional circuit boards enable the housing of two complete interface circuits. Therefore, the downstream interface unit AM903 will hereinafter be considered to consist of two half-units designated by ½AM903.

AM903 downstream interface unit (51) is shown schematically in FIG. 32. Needless to say, units (56), (61) and (66) are also identical to this module (51), and the explanations in this description limited to unit (51) can readily be extended to apply to the other units (56), (61) and (66).

This FIG. 32 shows how AM903 downstream interface unit (51) is contained on one functional circuit board made up of 8 connectors:
two back connectors Z01 and Z02;
six front connectors Y01, Y02, Y03, Y04, Y05 and Y06.

The symmetry of AM903 downstream interface unit (51) is shown in FIG. 32 by a broken horizontal line. This broken horizontal line divides the downstream interface module (51) into two parts denoted as ½AM903 (51-1) and ½AM903 (51-2). Half-unit (51-1) has the back connector (Z01) and the three front connectors (Y01, Y02, Y03), and the half-unit (51-2) has the back connector (Z02) and the three front connectors (Y04, Y05, Y06).

The half-unit (51-1) is linked to the elements surrounding it in the following manner:
connector (Z01) is connected to control bus (12)
connector (Y01) is connected by line (77) to AM908 intermediate unit (52). Line (77) is also called ISM1 (abbreviation of INTERFACE SOURCE MONITOR No. 1);
connector (Y02) is connected by line (78) to AM908 intermediate unit (53). Line (78) is also called ISM2 (abbreviation of INTERFACE SOURCE MONITOR No. 2);
connector (Y02) is connected by line (153) to command and control circuits located within the group receiving its power from the energy sources monitored by the two intermediate units AM908(52) and (52). This line (153) is also denoted by LSSCI (abbreviation for LOGICAL SUBSYSTEM CONTROL INTERFACE).

This line (153) is optional and, for example, it may be omitted if the group receiving its power from the energy sources controlled by the two AM908 intermediate sources (52) and (53) also receives a similar line. This is especially true for a group powered by the energy sources controlled by the four AM908 intermediate units (52), (53), (54) and (55), since in this case there are two LSSCI lines: line (153) and line (154). In this case, one of these two lines, (153) or (154), is not used.

The half-unit (51-2) is similar to the half-unit (51-1) and is linked by:
connector (Z02) to control bus (12);
connector (Z04) and, via line (79), to AM908 intermediate unit (54). Line (79) is also called ISM1;

connector (Y05) and, via line (80) to AM908 intermediate unit (55). Line (80) is also called ISM2;

connector (Y06) and, via line (154), to command and control circuits located within the group powered by the energy sources controlled by the two AM904 intermediate units (54) and (55). This line (154) is also called LSSCI.

From the above it follows that the symmetry between the two half-units (51-1) and (51-2) is complete:

connector (Z02) plays the same role for half-unit (51-2) as connector (Z01) for half-unit (51-1);

connector (Y05) plays the same role for half-unit (51-2) as connector (Y01) for half-unit (51-1);

connector (Y05) plays the same role for half unit (51-2) as connector (&02) for half-unit (51-1);

connector (Y06) plays the same role for half-unit (51-2) as connector (Y02) for half-unit (51-1).

This symmetry extends to the connector pins. For example, pin (21) of connector (Y04) plays the same role for half-unit (51-2) pin (21) of connector (Y01) plays for half-unit (51-1). In view of this total symmetry, the following description will only concern the half-unit (51-1); the extension of the description to half-unit (51-2) can readily be made.

The signals from the control bus (12) which are linked to AM903 half-unit (51) are shown in FIG. 40. This connector (Z01) has 70 pins numbered 1 through 70. In FIG. 40, opposite each pin number the logic name of the signal connected thereto is given.

FIG. 41 shows the logic signals linked to connector (Z02). As stated previously, the pins of connector (Z02) are connected in identical manner to the pins of connector (Z01).

FIG. 37 shows the signals conveyed in interface link ISM1. For one downstream interface unit AM903, there are two ISM1 links. This is clearly illustrated by links (77) and (79) in FIG. 37. ISM1 link (77) conveys the signals concerning AM903 unit (51-1) and ISM1 link (79) conveyes the signals concerning AM903 half-unit (51-2). The table in FIG. 37 is divided into two parts in the horizontal direction: the upper portion denoted by the term ISM1-IN concerns the input signals from the links (77) and (79), i.e., the signals transmitted by the sources to monitor (10). The lower portions labeled ISM1-ØUT concerns the output signals from links (77) and (79), i.e., the signals transmitted by monitor (10) to the sources.

The table in FIG. 37 is divided in the vertical direction into 3 main parts: the left-most part [logic reference] contains for each signal the logic reference(s) used in the description of the drawings. The middle portion denoted 77 FIG. 13 is, in turn, subdivided into three columns:

the CONNECT column containing the reference of the connector to which link (77) is connected;

the middle (PIN) column indicating the pin number to which each signal is linked;

the FIGURES column indicating the figure numbers where the logic signals are used.

The right-hand portion denoted 79 FIG. 13 serves the same purpose as the middle portion for link (79).

FIG. 38 is similar to FIG. 37, but it concerns the ISM2 interface signals, while FIG. 38 concerns the ISM1 interface signals. The organization of FIG. 38 is identical to that of FIG. 37, and in order to understand it all one has to do is to remember that the AM903 downstream interface unit has two ISM2 links, as indicated in FIG. 13: link ISM2 (78) and link ISM2 (80).

FIG. 39 contains a table showing the LSSCI interface signals. This table is divided into two parts in the horizontal direction. The upper part labeled LSSCI-IN concerns the signals transmitted by the powered group to monitor (10), and the lower part labeled LSSCI-ØUT concerns the signals transmitted by monitor (10) to the powered group. In vertical direction the table is divided into 3 main parts, just as for FIGS. 37 and 38: the left-hand part provides the logic term(s) for each signal, the middle portion shows the connection of each signal with respect to link (153) of FIG. 13, and the right-most portion shows the connection of each signal with respect to link (154) of FIG. 13.

It will be understood that the definitions of FIGS. 37, 38 and 39 are valid for all the downstream interface units AM903, because in all cases:

the ISM1 interfaces are linked to connector Y01 for the upper AM903 half-unit and to connector Y04 for the lower AM903 half-unit;

the ISM2 interfaces are linked to connector Y02 for the upper AM903 half-unit and to connector Y05 for the upper AM903 half-unit and to connector Y06 for the lower AM903 half-unit.

It follows from FIG.'s 32, 37, 38 and 39 that the downstream interface unit AM903 has two interface types: the interface of type ISM and the interface of type LSSCI. It will now be shown how these interfaces are made up:

ISM-type Interface (FIG. 37 for ISM1 and FIG. 38 for ISM2).

Interface ISM is made up of the border zone located between one of the connectors Y01 or Y02 or Y04 or Y05 of a downstream interface unit AM903 and the command and control circuits of an AM908 unit. This interface has two signal types: on the one hand, the ISM-ØUT command and control signals generated via monitor (10) and, on the other hand, the ISM-IN report and discharge signals returned by the controlled sources to monitor (10).

The ISM-ØUT control signals are:

ØUT 11, also called RESET-INHIBIT or INRZ, which is a signal inhibiting the reset of the storage circuits of intermediate unit AM908 and of the controlled sources. This signal is used to protect information. Its use will be discussed later.

ØUT12 and ØUT13, also called GD0 and GD1 or ADRE2, ADRE1.

These signals enable monitor (10) to define 4 addresses. They are used as follows: It was shown how intermediate unit AM908 enbles four sources to be controlled and checked. In the preferred embodiment of the invention, provision was made, though not in a limitative way, that each controlled source would have a state octet. This state octet will be defined later on with reference to FIG. 42. To access the contents of these octets, which are addressable, monitor (10) uses lines GD0 and GD1;

ØUT14, also called DCRESET or RZCP, is a general reset signal for the storage circuits of intermediate unit AM908 and for the monitored source(s). It is the action of this signal which is neutralized by the ØUT11 signal (RESET INHIBIT);

ØUT15, also called PØWER-LØCK or INVA. This signal is intended to prevent the buildup of the delivered voltage(s) by the controlled source(s). In this state of operation, the controlled source(s) have an artificial state of operation enabling monitor (1) to control and check the sources in a simulated mode where there no power is supplied. This enables, for example, maintenance operations or emergency repairs to be carried out without the risk of electrocuting the operator or of damaging the circuits.

ØUT16, also called DCØNCD1 or CDMA2. This signal is a start-up control signal for one or more sources.

ØUT17, also called DCØNCD2 or CDMA1. This signal, like the previous one, is a start-up control signal for one or more sources. The existence of thse two start-up control signal is justified by the fact that in the case where intermediate unit AM908 checks sources sources belonging to two categories requiring a timed start-up order, it is necessary to have two separate control signals. It will be understood that this number of control signals is not in any way limitative and may be increased without difficulty. It was limited to two in the preferred embodiment of the invention, because it met the particular requirements.

The ISM-ØUT report and acknowledge signals are:

DIN (10 through 16), also called STATUS (#7, #6, #5, #4, #3, #2, #1). These signals are state indicator signals transmitted by intermediate unit AM908. These state signals are characteristic of the operation of a source monitored by intermediate unit AM908. As explained earlier, in the preferred embodiment of the invention, an intermediate unit AM908 can monitor up to 4 sources. As a result, each intermediate unit AM908 has 4 registers in which the source state bits are stored. It is these 4 registers which can be addressed by the lines GD0 and GD1 discussed earlier. By means of these lines GD0 and GD1 the monitor can call the contents of one of the registers. These contents are placed on the DIN lines (10 through 16) by intermediate unit AM908. These state bits are defined in the table of FIG. 42. This table provides the definition of the state bits for the various configurations of sources monitored by intermediate unit AM908.

DIN17, called DEFC. This signal indicates the appearance of a fault within the monitored source(s).

LSSCI-type interface (FIG. 39)

The LSSCI interface is made up of a border zone located between one of connectors Y03 or Y06 of a downstream interface unit AM903 and the group of circuits powered by the sources. In the preferred embodiment of the invention, this LSSCI link is not systematically provided for all the downstream interface units AM903 of the power supply system. Only the connections required for the proper operation of the powered circuits are provided. Monitor (10) knows the LSSCI links used by looking up the system tables containing the LSSCI addresses in actual use. The LSSCI interface includes two types of signals: first, the LSSCI-OUT signals which are the control signals generated from the monitor (10) and, second, the LSSCI-IN signals which are the report and discharge signals returned by the powered circuits to the monitor (10).

The LSSCI-ØUT control and signals are:

ØUT 31 also called RESET-INHIBIT or INRZ. This signal is the signal that prohibits the resetting of the state and fault storage circuits of the powered circuits. This signal is used to protect data. Its use will be discussed later.

ØUT 32 also called DCØNCD or CMDA. This signal is a control signal. In the embodiment presently being described, this signal is intended to control the start of a reference voltage VREF found inside the powered circuits. This reference source VREF may, for example, be the reference source for the type CML (abbreviation of Current Mode Logic) logic circuits ØUT 33-1, ØUT 33-2, ØUT 33-3, also called CNLCK-ØUT (01 through 03) or CLCK. These three signals are control signals designed to carry out electric blocking inside the powered circuits. These signals are used by monitor (10) to intervene under certain conditions, for example, when the powered circuits do not operate normally.

ØUT 35, also called WARNING or ETWA. This signal is an alarm signal transmitted by monitor (10) to alert the powered circuits that it is going to perform, for example, a shutdown operation after a certain delay following the apearance of the WARNING signal (attempt to protect a context).

ØUT 36, also called PURS (abbreviation of POWER UNIT RESET). This signal is a reset signal for the storage circuits concerning the circuits directly supervised by the monitor.

ØUT 37, also called DCRESET or CDRZ. This signal is a reset signal for the group of storage circuits, including those belonging to the powered circuits.

The LSSCI-IN report and check signals are the DIN signals (34 through 37), also called STAT* (04, 03, 02, 01). These signals are state indicating signals transmitted by the powered circuits. In the embodiment of the invention being described, these signals map to operation states of the reference voltage VREF. These states are defined in the table of FIG. 42.

Figure 42:
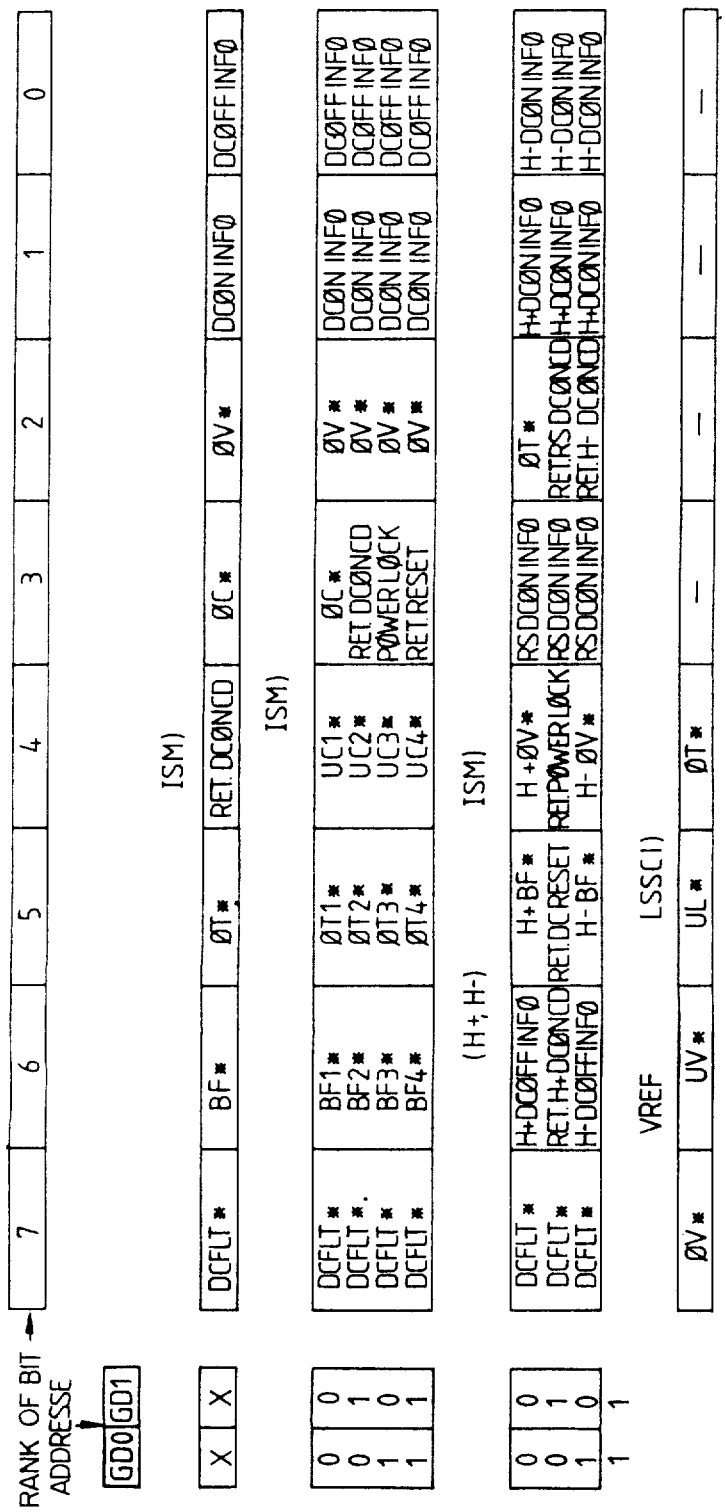
FIG. 42 contains tables defining the meaning of the state bits and contained in the state bytes, as a function of the type of power source being checked.

FIG. 42 contains, for the embodiment of the invention, the tables defining the octet state bit configurations.

The table at the top contains the octet state bits transmitted over ISM interface in the case where the intermediate module AM908 monitors only one energy source. These bits are the following.

rank 0 bit: DCØFINFO. This bit, when high, signifies that the output voltage of the checked source has reached a level low enough to be considered zero.

rank 1 bit: DCØNINFO. This bit, when high, signifies that the output voltage of the checked source can be considered to have reached its nominal value.

rank 2 bit: OV*. This bit indicates, when low, that an overvoltage has been detected in the checked source.

rank 3 bit: OC*. This bit indicates, when low, that an overcurrent has been detected in the checked source.

tank 4 bit: RET.DCØNCD. This bit, when high, indicates that the checked source has properly received the start-up command DCØNCD.

tank 5 bit: OT*. This bit, when low, indicates either an absence of ventilation of an overheating within the checked source.

rank 6 bit: BF*. This bit, when low, indicates that at least one fuse is defective in the checked source.

rank 7 bit: DCFLT*. This bit, when low, indicates that a MAJOR fault has occurred within the checked source.

The portion of the table below the one just described defines the octet state bits transmitted over the ISM interface in the case where the intermediate module AM908 checks a quadruple energy source delivering a single voltage. This table contains 4 lines. These lines are addressable by means of address signals GD0 and GD1, as indicated in the two columns to the extreme left of the figure. The signals represented by the state bits are similar to those previously described. The signals unaccompanied by indices such as DCØFFINFØ, DCØNINFØ, ØV*, ØC*, DCFLT*, RET.DCØNCD, PØWER-LØCK and RET. RESET concern the global power supply group constituted by the 4 sources. The signals accompanied by indices such as ØT1*, ØT2*, ØT3*, ØT4*, BF1*, BF2*, BF3*. BF4* each refer to the source mapping to the index associated with the abbreviation. The PØWER-LØCK signal represented by the third bit of the third word (GD0=1, GD1=0), when high, signifies that the group of power sources is operating artificially, i.e., all its functions are being carried out but its output voltage is not being built up. The signal RET.RESET represented by bit 3 of the fourth word (GD0=1, GD1=1), when high, signifies that the RESET signal resetting the power source storage circuits was well received by said sources.

The next portion of the table (H+, H—) defines the octet state bits transmitted to the ISM interface when the latter includes an energy source delivering two voltages. In this case, three octets are transmitted.

The first octet (address GD0=0, GD132 0) includes the following bits:

bit 0 designated by H-DCØNINFØ, when high, signifies that the output voltage of the negative voltage source has reached its normal state value;

bit 1 designated by H+DCØNINFØ, when high, signifies that the output voltage of the positive voltage source has reached its normal state value;

bit 2 designated by OT* signifies, when low, that a problem of a thermal nature is affecting the group of the two checked sources H+ and H—;

bit 3 designated by RSDCØNINFØ signifies, when high, that the series regulation device placed on one of the sources H+ or H— is operating normally;

bit 4, designated by H+ØV*, when low, signifies that an overvoltage phenomenon has occurred at the source H+;

bit 5, designated by H BF*, when low, signifies that at least one of the fuses of source H= is defective;

bit 6, designated by H+DCØFFINFØ, when high, signifies that the voltage of the source H+ has reached its quiescient state;

bit 7, designated by DCFLT*, when low, signifies that the group of sources is defective.

The second octet (address GD0=0, DD1=1) includes the following bits:

bit 0 designated by H—DCØNINFØ and bit 1 designated by H+DCØNINFØ have the same meaning as the bits 0 and 1 of the first octet;

bit 2 designated by RET.RSDCØND, when high, signifies that the start up command of the regulation series has been properly received;

bit 3 designated by RET.DCØNINFØ, when high, signifies that the start-up command for the sources has been properly received;

bit 4, designated by RET.PØWER-LØCK, when high, signifies that the PØWER LØCK COMMAND has been properly received by the sources;

bit 5 designated by RET.DCRESET, when high, signifies that the reset command for the power supply storage circuits has been properly received;

bit 6, designated by RET.H+DCØNCD, when high, signifies that the source H+ has properly received the start-up control signal;

bit 7 designated by DCFLT*, when low, signifies that the group of sources is faulty.

The third octet (address GD0=1, GD1=0) includes the following bits:

bit 0 designated by H—DCØNINFØ and bit 1 designated by H+DCØNINFØ have the same meanings as bits 0 and 1 of the previous octets;

bit 2 designated by RET.H—DCØNCD, when high, signifies that source H— has properly received the start-up control signal.;

bit 3 designated by RS.DCØNINFØ, when high, signifies that the start up command for the sources has been properly received;

bit 4 designated by H—ØV*, when low, signifies that the source H— is the site of an overvoltage phenomenon, bit 5 designated by H—BF*, when low, signifies that at least one fuse in the source H— is faulty;

bit 6 designated by H-DCØFFINFØ, when high, signifies that the voltage of the source H— has reached its normal state value bit 7 designated by DEFLT*, when low, signifies that the group of sources is faulty.

The bottom portion of the (VREF) represents the state octet transmitted by the reference source over the LSSCI interface. This octet consists of the following state bits:

bits 0 through 3, for the time being, have not been given a meaning and remain available for future assignment;

bit 4 designated by OT*, when low, signifies that a problem of a thermal nature is affecting the reference source;

bit 5 designated by UL*, when low, signifies that the output of the reference source is below a certain limiting value for the current;

bit 6 designated by UV*, when low signifies that the voltage supplied by the reference source is below a certain limiting value for the voltage;

bit 7 designated by ØV*, when low, signifies that the voltage supplied by the reference source exceeds a certain limiting value for the voltage.

Figure 33B:
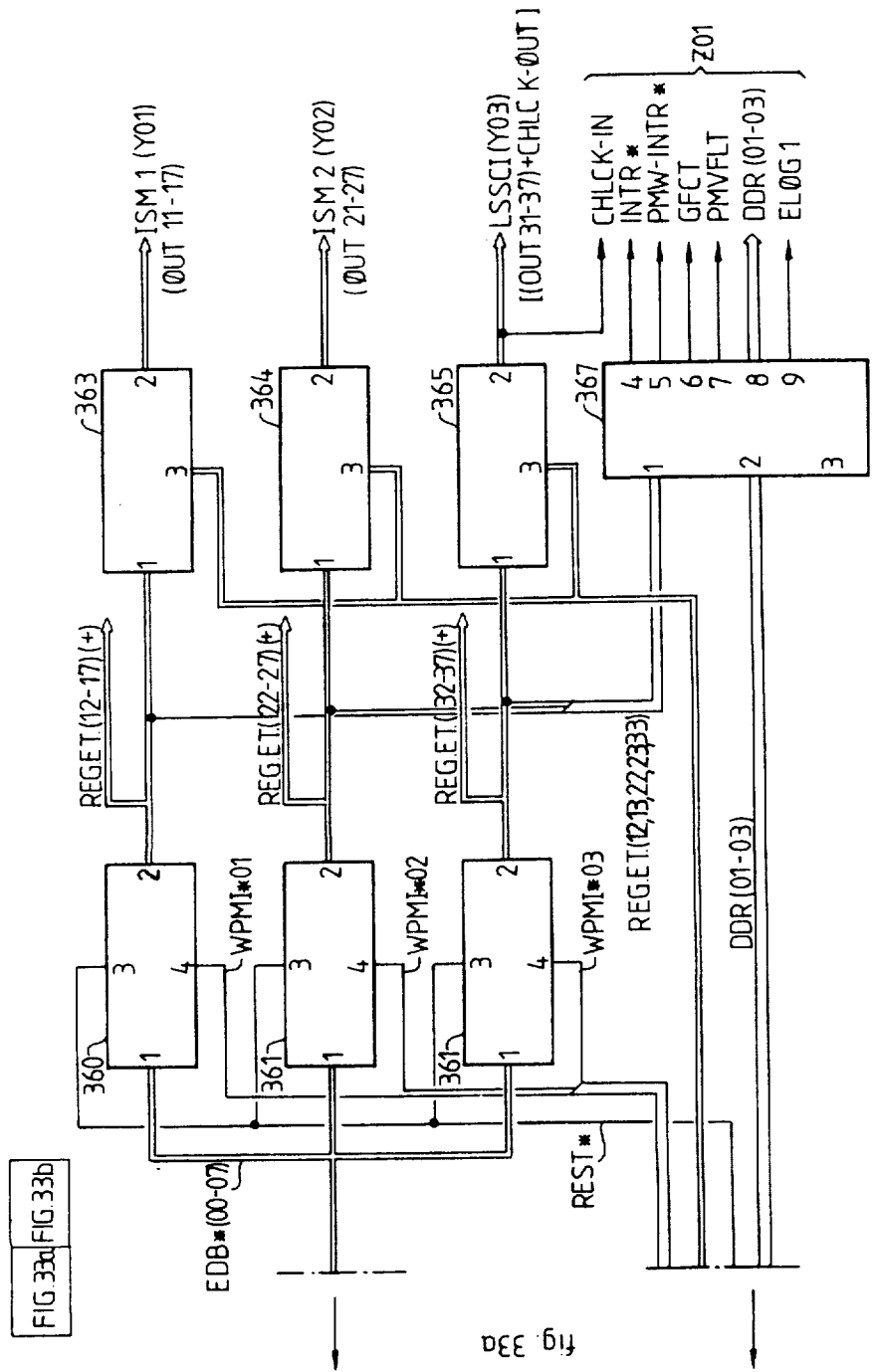

FIGS. 33a-b represent a synoptical diagram of the downstream interface half-unit AM903 (51-1). The synoptical diagram for downstream interface half-unit (51-2) is the same as that in the figure, with the difference that the connectors are different: connector Y04 replaces connector Y01, connector Y05 replaces connector Y02, connector Y-6 replaces connector Y03, and connector Z01 replaces connector Z02.

In FIGS. 33a-b, the signals travel from left to right with the exception of the buses where the signals travel in both directions, as well as certain special signals where the direction of travel is indicated. Taking this hypothesis into account, the input signals in the half-unit (51-1) are found to the left of the figure. These input signals have 5 origins:

the signals received through connector Y01: DIN*(10-17) which are the signals entering over interface ISM1;

the signals received through connector Y02: DIN*(20-27) which are the signals entering over interface ISM2;

the signals received through connector Y03: DIN* (30-37) which are the signals entering over interface LSSCI;

the signals received through connector Z01: [MEMR*, MEMW*, ADR (00, 01, 08, 15), SEL0, SEL1, GD0, GD1, DDW0, DDW, REST] which are the control signals transmitted by control bus 12. This connector (Z01) is also traversed by the external data bus EDB(00-07):

finally, the internal signals of the half-unit: [(+)REG.ET (12-17), (+)REG.ET(22-27), (+)REG.ET(32-37)] which are the input signals transmitted inside the half-unit (51-1).

The data signals reaching the half-unit AM903 (51-1) are placed on the inputs of an input interface block (350):

DIN*(10-17) data on input 1;
DIN*(20-27) input data on input 2;
DIN*(30-37) input data on input 3;
REG.ET(12-17) input data on input 5;
REG.ET(32-37) input data on input 5.
REG.ET(32-37) input data on input 6.

This input interface block (350) includes linking and matching circuits which will be described later. The data signals, after passing through interface block (350) circuits, exit from this block (350) via output terminals 7, 8, 9, 10, 11, 12 and supply power to links (351), (352), (353), (354), (355) and (356). These six links drive inputs 1, 2, 3, 4, 5, 6, respectively, of the (358) multiplexer block. Multiplexer block (358) is placed under the control and supervision of monitor (10): it is selected by the RDEN* signal and addressed by the signals (+)EA*(00, 01, 08). Selection signal RDEN* and addressing signals (+)EA*(00, 01, 08) are processed by the control block (366) which will be discussed later. Selection signal RDEN* authorizes the operation of multiplexer (358) and the addressing signals (+)EA*(00, 01, 08) address one of the inputs 1, 2, 3, 4, 5 or 6 of the multiplexer. Under these conditions, the addressed channel enters into direct communication with output (9) of multiplexer (348). This output (9) supplies power to the external data bus EDB(00-07) which is part of the control bus (12). This bus is linked, on the one hand, to connector Z01 and, on the other hand, to input 1 of inverting amplifier block (359). Inverting amplifier block (359) amplifies by inverting the signals placed at input 1 and places the amplied or inverted signal at output 2.

Output terminal 2 of inverting amplifier block (359) supplies power to bus EDB*(02-09). This bus EDB*(-02-09) supplies power to inputs 1 of 3 STATE REGISTERS (360), (361) and (362). These three registers are controlled by two types of signals:

the signal REST* placed on input terminal 3 (abbreviation of RESTORATION) which is a general reset signal for the contents of the registers;

a signal WPMI*OX placed at input 3 (abbreviation of WRITE POWER MONITOR INPUT) which is an addressing signal. The signal WPMI*01 addresses the state of register (360), the signal WPMI*02 addresses the state register (361), and the signal WPMI*03 addresses the state register (362). Only one single WMPI*OX signal at a time is present. This signal is processed by control block (366), which will be discussed later. When a WPMI*0X addressing signal is present, it authorizes the transfer of the contents of bus EDB*(02-07) to the addressed register.

Output terminal 2 of each state register supplies power to a link:

state register (360) supplies power to link REG.ET(12-17);

state register (361) supplies power to link REG.ET(22-27);

state register (362) supplies power to link REG.ET(32-37).

The link REG.ET(12-17) supplies power to several blocks.

(1) to input (4) of input interface block (350);
(2) to input (1) of output interface block (363);
(3) over lines REG.ET12 and REG.ET13 to input 1 of request transmission block (367), which will be described later.

Similarly, link REG.ET(22-27) supplies power to:
(1) to input 5 of input interface block (350);
(2) to input 1 of output interface block (364);
(3) over line REG.ET23 to input 1 of request transmission block (367), which will be described later.

Similarly, link REG.ET(32-37) supplies power to:
(1) to input 6 of input interface block (350);
(2) to input 1 of output interface block (364);
(3) over line REG.ET 33 to input 1 of block (367).

Output interface block (367) is powered over input (3) by the control and addressing signals GD0, GD1, DDW0 and DDW1 transmitted directly by the monitor (10) through the control block (366). These control and addressing signals GD0, GD1, DDW0 and DDW1 are intended for intermediate units AM908 as well as for the powered circuits.

Output interface block (364) as well as output interface block (365) are equally powered over their input (3) by the same control and addressing signals GD0, GD1, DDW0 and DDW1.

Output interface block (363) includes matching circuits which, after processing the signals placed at inputs 1 and 3, places the output signals at output 2. Output 2 of output interface block (363) is linked to the Y01 connector of downstream interface unit AM903. This Y01 connector, in turn, supplies power to the ISM1 interface.

Output interface block (364) fulfills the same functions as the previous block but for the benefit of connector Y02 and, thus, for the benefit of the ISM2 interface.

Similarly, output interface block (365) is intended to supply power to the Y03 connector which, in turn, supplies power to the LSSCI interface.

Control block (366) receives the following input signals from the monitor (10):

at its input 1, a PMC-MEMR* signal which is low when monitor (10) requests a write cycle;

at its input 2, a PMC-MEN* signal which is low when monitor (10) requests a read cycle;

at its input 3, the addressing lines PMC-ADR00, PMC-ADR01, PMC-ADR08 and PMC-ADR15. These addressing signals are used by monitor (10) to address the downstream interface unit AM903 as well as certain circuits within this AM903 unit;

at its input 4, the selection lines SEL0 and SEL1. These selection lines are used by monitor (10) to select circuits within the downstream interface unit AM903;

at its input 5, the data addressing signals GD0 and GD1 which are used by monitor (10) to address state buffer storages located within intermediate unit AM908;

at its input 6, the control signals DDW0 and DDW1 which are control signals enabling monitor (10) to transmit orders to the interior of intermediate unit AM908;

at its input 7, the reset signal RFSET which enables monitor 810) to reset the storage circuits of downstream interface unit AM903 as well as the storage circuits placed at the terminal ends of interfaces ISM1, ISM2 and LSSCI.

Via these signals control block (366) processes the following output signals:

at its input terminal 8: the sampling signal RDEN* which signifies, when low, that monitor (10) has selected the downstream interface unit AM903 and that it is requesting a read operation, i.e., the transfer of one of the inputs 1 through 6 of multiplexer (368) to the data output bus DBM-EDB(00-07). This RDEN* signal is routed to the input terminal (8) of the multiplexer (368):

its input terminal: three WMPI* signals (01 through 03) (abbreviation of WRITE POWER MONITOR TO INTERFACE) intended to select one of the three registers (360) or (361) or (362): only one of the WMPI* signals (01 through 03) is low at any given time:

when the WMPI*01 signal is low, this signifies that monitor (10) has requested the transfer of the contents of link EDB*(02-09) to register (360). This signal is connected to input (4) of register (360);

when the WMPI*02 signal is low, this signifies that monitor (10) has requested the transfer of the contents of link EDB* (02-09) to register (361). This signal is routed to input (4) of register (361);

when the WMPI*03 signal is low, this signifies that monitor (10) has requested the transfer of the contents of link EDB*(02-09) to register (362). This signal is connected to input (4) of register (362);

on its output 10: the signals GD0, GD1, DDW0 and DDW1. The signals GD0 and GD1 are addressing signals which enable monitor (10) to address the state bit registers located in intermediate unit AM908 either in the circuits powered under the control of the LSSCI interface. The DDW0 and DDW1 signals are the commands transmitted by monitor (10). The DDW0 command is also called RESET-INHIBIT, since its role is to inhibit the reset function. The DDW1 command is also called POWER LOCK, since its role is to inhibit the build-up of output voltage from the sources and, therefore, to enable the sources to operate artificially. These GD0, GD1, DDW0 and EEW1 signals are connected to the inputs 3 of the output interface blocks (363), (364) and (365)

on its output (11): the REST* signal which is a signal which, when low, controls the resetting of the storage circuits of the downstream interface unit AM903, the storage circuits of intermediate unit AM908, and the storage circuits linked to the LSSCI interface;

on its output (13) the addressing signals EA*(00, 01, 08) which are the signals resulting from the inversion of the PMC-EA(00, 01, 08) addressing signals, said signals being used to address multiplexer (358) to which they are routed at input 7.

Request transmission block (367) is driven at its input 1 by the signals:
REG.ET.12 and REG.ET.13 originating from register (360);
REG.ET.22 and 23 originating from register (361);
REG.ET.33 originating from register (362);

at its input 2 by the signals:
DDR01 originating from link (351);
DDR02 originating from link (352);
DDR03 originating from link (353).

Signals RET.ET.13, REG.ET.23 and REG.ET.33 are signals which enable the interrupt requests transmitted to, respectively ISM1, ISM2 or LSSCI interfaces to be disabled.

Signal REG.ET.12 is a signal which enables the interrupt circuits affecting the sources checked by ISM1 and ISM2 (pseudo fault) to perform self testing operations.

Signal REG.ET.22 is a signal which enables the interrupt circuits affecting the powered circuits (interface LSSCI) (pseudo fault) to perform self-testing operations.

Signal DDR01 corresponds to the input signal DIN17 which has been inverted. This signal, when low, signifies that the source(s) controlled by the ISM1 interface are signalling that they have detected a fault. Signal DDR01 performs the same operation for the source(s) controlled by the ISM2 interface and DDR02 signal does the same for the reference source VREF controlled by the LSSCI interface.

From signals placed on its inputs (1) and (2), request transmission block (367) processes a certain number of signals which it places at its outputs:

at its output (4), the signal INTR* (abbreviation of INTERRUPT REQUEST) which signifies, when low, that at least one of the two interfaces ISM1 or ISM2 is signalling that an operation fault has been detected by the intermediate unit AM908 and that this signalling was authorized by one or both REG.ET (13, 23) registers. This signal is placed on control bus (12) through connector Z01;

at its output (5), the PMV-INTR* signal (abbreviation of POWER MONITOR VREF-INTERRUPT REQUEST) which, when low, is signalling that an operation fault has been detected on the LSSCI interface and that this signalling was authorized by register REG.ET.22;

at its output (6), the GFLT signal (abbreviation of GENERATOR FAULT) which is the inverted signal from output 4INTR*. This signal is placed on control bus (12) through connector 01;

at its output (7), the PMVFLT signal (abbreviation of POWER MONITOR VREF-FAULT) which is the inverted signal from output 5 through connector Z01;

at its output (8), the DDR signals (01 through 03) which are, respectively, the input signals DIN(17, 27, 37). These signals are the signals indicating that an operation fault has arisen: DDR01 concerns the ISM1 interface, DDR02 the ISM2 interface, and DDR03 the LSSCI interface;

at its output (9) an ELØG1 signal (abbreviation of ENABLE LOCIC 1), which is a signal generated at the very heart of transmission request unit (367). This signal is at a high level only when the downstream interface half-unit AM903 is mounted in the rack. This ELØG1 signal, which is placed through connector Z01 on control bus (12) signifies that, when high, the downstream interface unit AM903 is properly plugged into the rack.

From the above it follows that the downstream interface half-unit AM903 includes the following connections:

with monitor (10) through the control bus (12) (connector Z01).
the external data bus DBM EDB(00-07);
the control signals PMCMEMR*, PMCMEMW*, PMCADR(00, 01, 08, 15), SEL0, SEL1, GE0, GD1, DDW0 DDW1, REST;
the request or report signals INTR*, PMV INTR*, GFLT, PMVFLT, DDR(01-03), ELØ1;

with the interface ISM1 through connector Y01:
the input data signals DIN*(10-17);
the output data signals ØUT(11-17)

with the interface ISM2 through connector Y02:
the input data signals DIN*(20-27);
the output data signals ØUT(21-27);

with the LSSCI interface through connector Y03:
the input data signals DIN* (30-37);
the output data signals ØUT(31-37).

When monitor (10) wants to read the data placed at inputs 1, 2, 3, 4, 5 and 6 of input interface block (350), it performs the following operations:
it selects the downstream interface half-unit AM903;
it addresses one of the multiplexer (358) channels;
it requests a read cycle These operations result in the contents of the selected input being placed at the external data bus DBM EDB (00-07). Thus, monitor (10) can gain knowledge at will of the contents of the selected input, i.e., either the DIN* (10-17) contents or the DIN*(20-27) contents or the DIN* (30-37) contents or the register REG.ET(12-17) contents or the register REG.ET(22-27) contents or the REG.ET(32-37) contents.

Conversely, when monitor (10) wishes to load the contents of one of the registers REG.ET (360), (361) and (362), it proceeds as follows:
it selects the downstream interface half-unit AM903;
it addresses the REG.ET register into which it wishes to insert the data;
it requests a write cycle.

Thus, it is possible for monitor (10) to insert data at will into the REG.ET register (360), (361) and (362). These registers supply power to interfaces ISM1, ISM2 and LSSCI, respectively, by means of output interface circuits (364), (365) and (366).

Moreover, request processing block (367) advises monitor (10) of the appearance of faults at interfaces ISM1, ISM2 and LSSCI, except if the monitor (10) prevents it from doing so by means of masks.

Figure 34A:
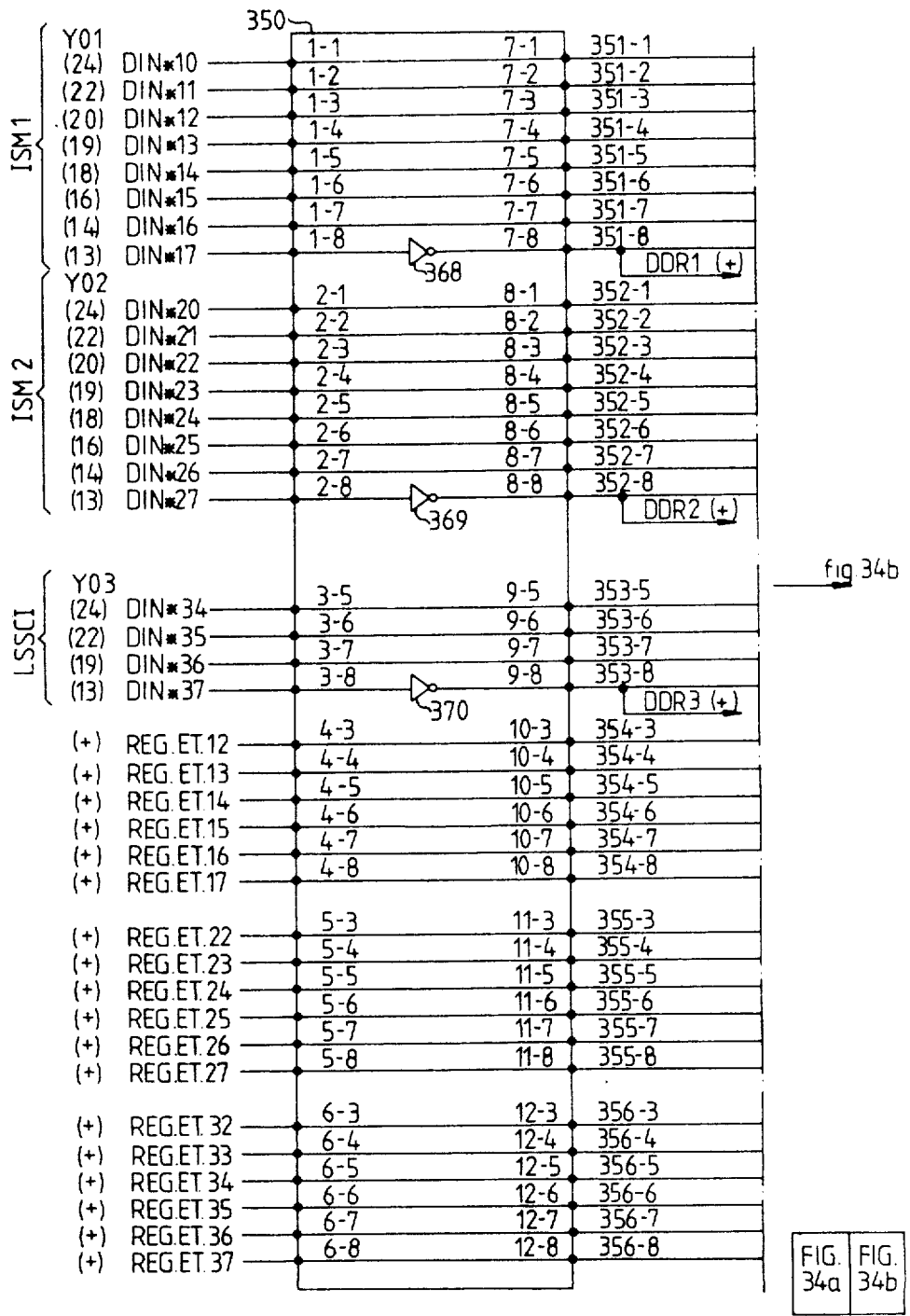
FIGS. 34a-34b is a detailed illustration of the input circuits of the half AM903 DOWNSTREAM INTERFACE UNIT illustrated in FIG. 33.
Figure 34B:
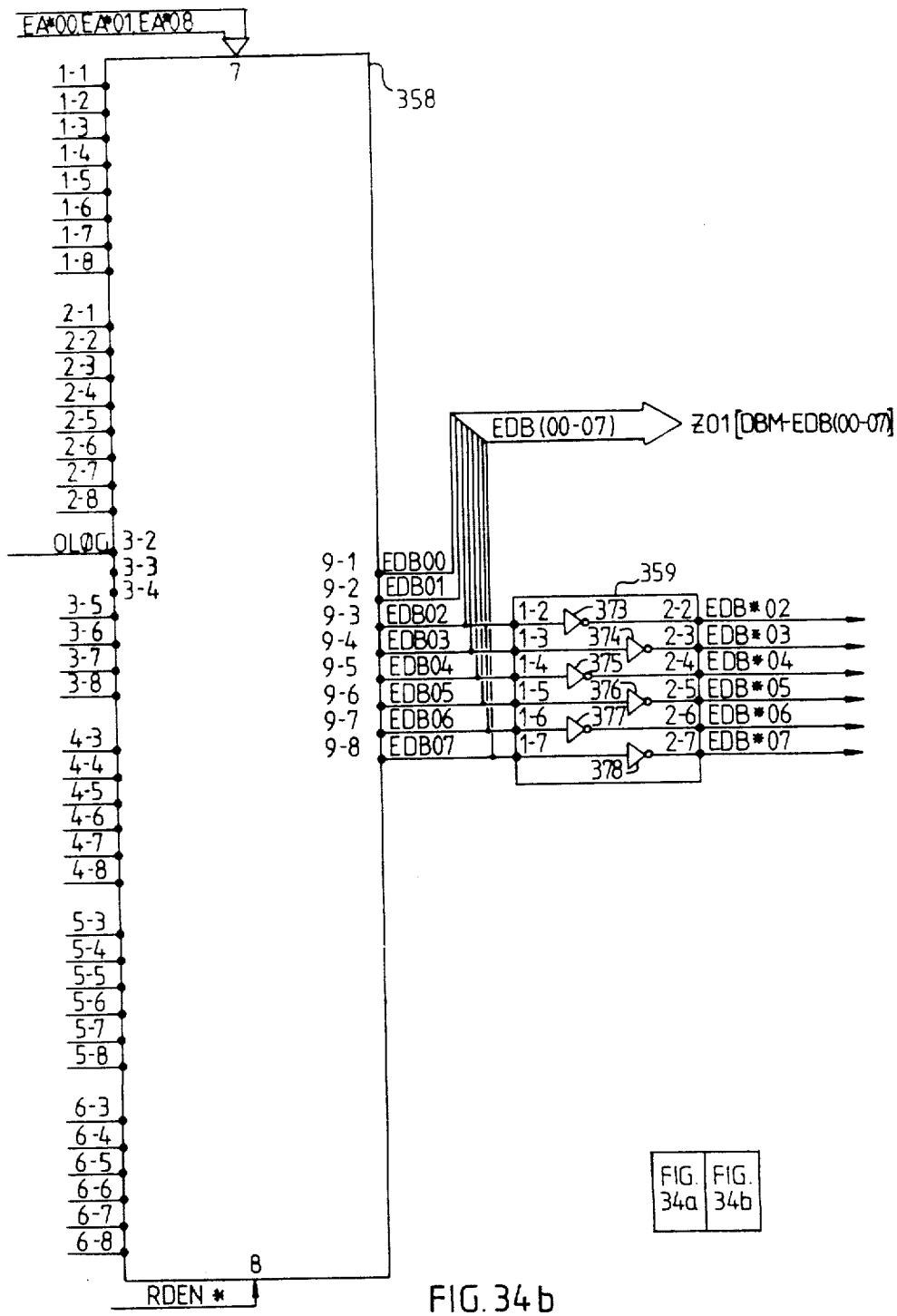
Figure 36:
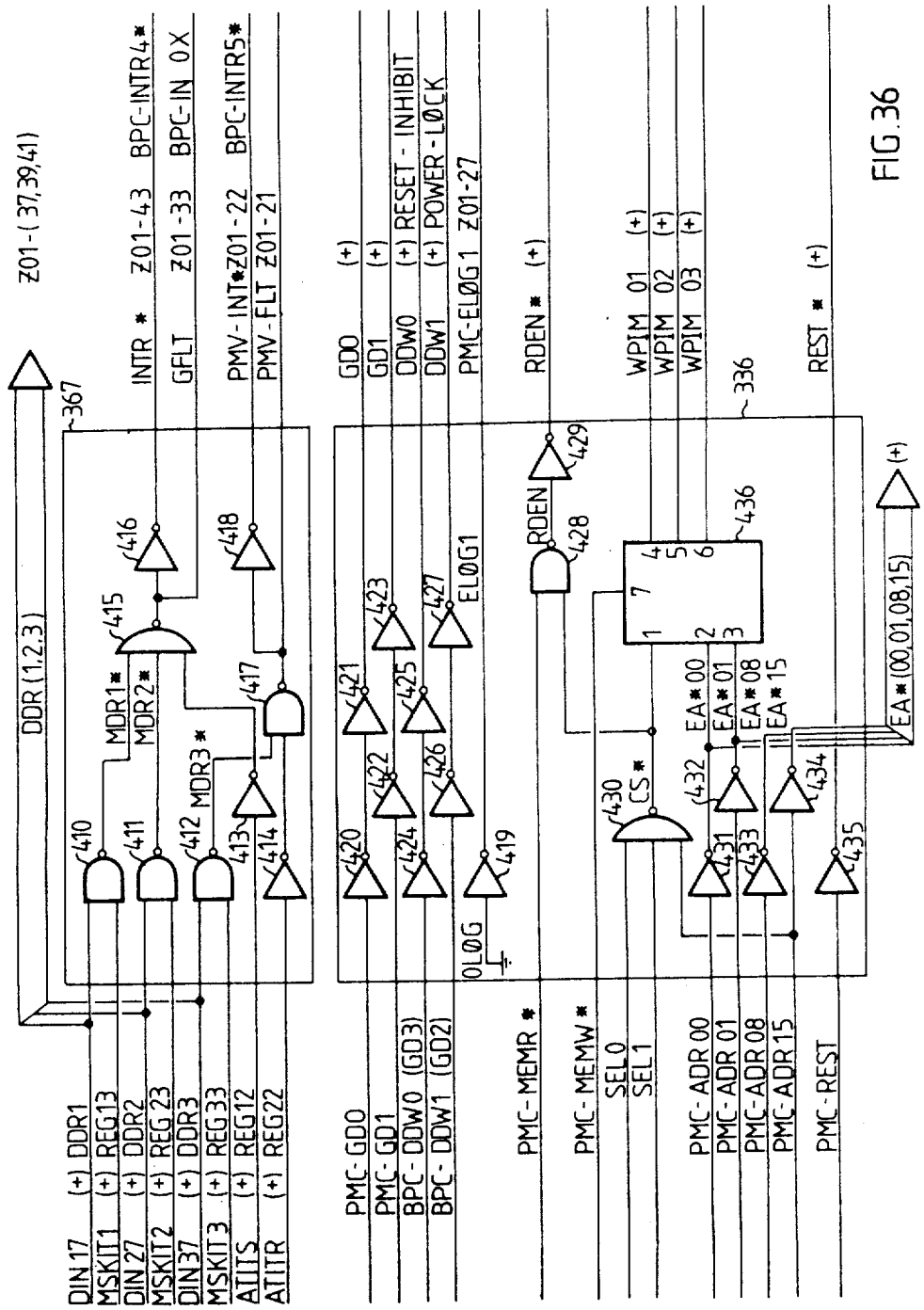
FIG. 36 is a detailed illustration of the CONTROL AND ADDRESSING BLOCK and of the REQUEST PROCESSING BLOCK in the half AM 903 DOWNSTREAM INTERFACE UNIT illustrated in FIG. 33.

FIGS. 34a-b are detailed representation of the circuits shown in FIG. 33a, with the exception of control and addressing block (366) which is shown in FIG. 36.

Input interface block (350) receives at these inputs (1-1 through 1-8), (2-1 through 2-8), (3-5 through 3-8), (4-3 through 4-8), (5-3 through 5-8), (6-3 through 6-8), the signals inverted to be transmitted to monitor (10):
the DIN* signals (10-17) which are the input signals for connector Y01. These signals are connected, respectively, to inputs (1-1 through 1-8). These signals, in turn, are retransmitted directly to the outputs (7-1 through 7-8) of input interface block (350), with the exception of signal DIN*17 which is inverted in inverting amplifier (368). The outputs (7-1 through 7-8) of input interface block (350) are connected, respectively, over links (351-1 through 351-8) to the inputs (1-1 through 1-8) of multiplexer block (358). Moreover, link (351-8) includes a branch labeled DDR1(+) which is linked to block (367), as shown in FIG. 36;
the DIN*(20-27) signals which are the input signals for the connector Y02. These signals are connected to, respectively, inputs (2-1) through (2-8). These signals are, in turn, retransmitted, respectively, to the outputs (8-1 through 8-8) of input interface block (350), with the exception of the signal DIN*27 which is inverted in inverting amplifier (369). The outputs (8-1 through 8-8) of input interface block (350) are connected by links (352-1 through 352-8), respectively, to inputs (2-1) through (2-8) of multiplexer block (358). Also, link (352-8) includes a branch labeled DDR2(+) which is linked to block (367), as shown in FIG. 36;
the DIN*(34-37) signals which are the input signals for the connector Y03. These signals are connected, respectively, inputs (3-5 through 3-8). These signals are, in turn, retransmitted directly to, respectively, the outputs (9-5 through 9-8) of the input interface block (350), with the exception of the signal DIN*37, which is inverted in inverting amplifier (370). The outputs (9-5 through 9-8) of the input interface block (350) are connected, respectively, by the links (353-5 through 353-8) to the inputs (3-5 through 3-8) of the multiplexer block (358). Moreover, the link (353-8) includes a branch labeled DDR3(+) which is linked to the block (367), as shown in FIG. 36.

the signals (+)REG.ET(12 through 17) which are the output signals for STATE REGISTER (360) which are shown in FIG. 35. These signals are connected, respectively, to the inputs (4-3 through 4-8). These signals, in turn, are retransmitted, respectively, to the outputs (10-3 through 10-8) of input interface block (350). The outputs (10-3 through 10-8) of input interface block (350) are connected, respectively, by the links (354-3 through 354-8) to the inputs (4-3 through 4-8) of the multiplexer block (358).

the signals (+)REG.ET(22 through 27), which are the output signals for STATE REGISTER (361) which are shown in FIG. 35. These signals are connected, respectively, to the inputs (5-3 through 5-8). These signals are, in turn, retransmitted to, respectively, the outputs (11-3 through 11-8) of input interface block (350). The outputs (11-3 through 11-8) of input interface block (350) are connected, respectively, by the links (355-3 through 355-8) to the inputs (4-3 through 4-8) of multiplexer block (350).

the signals (+)REG.ET(32 through 37), which are the output signals for STATE REGISTER (362) which are shown in FIG. 35. These signals are connected, respectively, to the inputs (6-3 through 6-8). These signals are, in turn, retransmitted, respectively, to the outputs (12-3 through 12-8) of input interface block (350). The outputs (12-3 through 12-8) of input interface block (350) are connected, respectively, by the links (356-3 through 356-8) to the inputs (6-3 through 6-8) of multiplexer block (350).

Multiplexer (358) includes, in addition to the data inputs (1, 2, 3, 4, 5 and 6) just described two other inputs: an input 7 for addressing and an input 8 for sampling.

Addressing input (7) receives three address signals EA*00, EA*01, EA*08. These signals are generated by the control module (366) described in FIG. 36. These signals enable the monitor (10) to select one of the inputs 1 or 2 or 3 or 4 or 5 or 6.

Sampling input (8) receives a signal RDEN* which, when low, enables the inputs sampled by the address signals EA* (00, 01, 08) to be transmitted wire by wire to the outputs (9-1 through 9-8) of multiplexer (358). This RDEN* signal is low when:
monitor (10) has requested a READ cycle (PMC-MEMR*);
monitor (10) has selected the half-unit AM903 in which it wants to perform this read operation.

When these conditions are met, the outputs (9-1 through 9-8) of multiplexer (358) receive the signals found at the selected input. These signals are applied to the lines EDB (abbreviation of EXTERNAL DATA BUS) (00-07), in that order. These EDB (00-07) lines are, on the one hand, linked to the bus DBM-EDB (00-07). This bus is the control bus data bus (12). On the other hand, the EDB (02-07) lines linked to the inputs (1-2 through 1-7), in that order, of the (359) inverting amplifier block. In this inverting amplifier block (359) an inverting amplifier can be found for each line: these inverting amplifiers are the inverting amplifiers (373), (374), (375), (376), (377). Each of these inverting amplifiers supplies power to one of the outputs (2-2) through (2-7): the index of the output corresponds to the index of the input. These outputs (2-2) through (2-7) supply power to the lines denoted by EDB*02 through EDB*08. These lines constitute a bus which is connected to input 1 of the STATE REGISTERS (360), (361) and (362), as shown in FIG. 35.

Figure 35B:
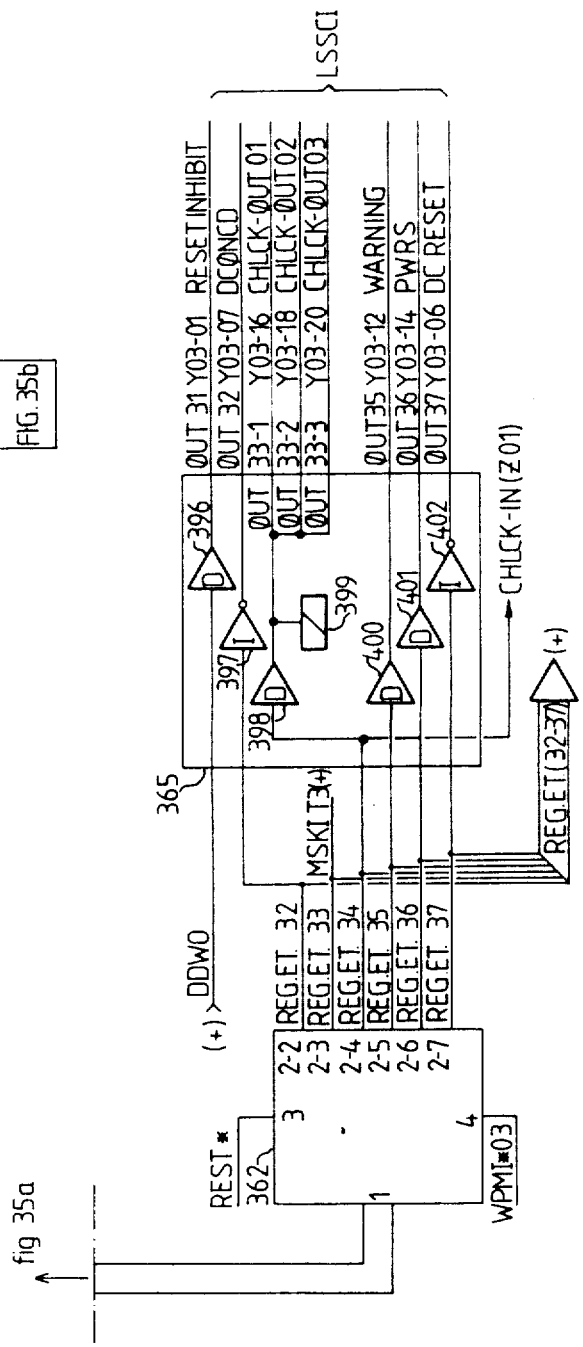

FIGS. 35a-b are a detailed representation of the circuits shown in FIG. 33b with the exception of the request processing block (367) which is described in FIG. 36.

The data signals arrive on the left-hand side of the figure over the data bus EDB* (02-07). This bus supplies power to input 1 of the 3 STATE REGISTERS (360), (361) and (362). Two other inputs are located at each of these state registers (360), (361) and (362):
- a reset input (3). A REST* signal reaches this input (3). This signal, when low, resets all the storage circuits located in the register concerned;
- a selection input (4). Here, the state register (360) receives the WPMI*01 selection signal, the state register (361)* receives the WPMI*02 selection signal, and the state register (361) receives the WPMI*03 selection signal. These signals WPMI* (01 through 03) are processed in the control and addressing block (366) shown in FIG. 36. When monitor (10) wants to transfer the data contained in bus EDB* (02-07) to one of the state registers (360) or (361) or (362), it causes the selection signal WPMI*0X corresponding to this register to come down. In this way, monitor (10) can modify at will the contents of each of the state registers (360), (361) and (362) on the basis of the data it will have placed previously on bus EDB* (02-07).

The output signals REG.ET (12 through 17) of the state state register (360) serve three purposes:
- on the one hand, they are returned to inputs 5 (3 through 8) of the input interface block (350), as previously explained with in connection with the description of FIG. 34. This return of the REG. ET (12 through 17) signals enables monitor (10) to find out at will the state of these signals. This is useful both for the management of the commands sent to the sources through the intermediate unit AM908, as well as for carrying out self-testing operations;
- on the other hand, they are associated with the control signals DDW0 and DDW1 as well as with the addressing signals GD0 and GD1 to form, through the output interface block (363), the control and addressing signals ∅UT (11 through 17) of the ISM1 interface.

Moreover, the RET.ET. 13 signal, also called MSKIT1 (+) (abbreviation of MASQUE INTERRUPTION (INTERRUPTION MASK) 1 is sent to the request processing block (367), as shown in FIG. 36. This signal, as its name indicates, enables monitor (10) to prohibit the transmission of any interruption originating in interface ISM1.

The control and addressing signals ∅UT (11 through 17) of the ISM1 interface are generated as follows:

∅UT 11 is obtained by amplifying the (+)DDW0 control signal through the direct amplifier (880)*. The (+)DDW0 signal is generated by the request processing module (367), as shown in FIG. 36. The ∅UT11 signal is also called RESET INHIBIT as a reminder of the operation it prompts in the intermediate unit AM908. This signal is applied to the terminal 01 of connector Y01.

∅UT12 is obtained by amplifying the (+)GD0 addressing signal through the direct amplifier (381). The (+)GD0 signal is generated by the request processing module (367), as shown in FIG. 36 (abbreviation of GATE DATA 0). This signal is applied to terminal 04 of connector Y01.

∅UT13 is obtained by amplifying the (+)GD1 addressing signal through the direct amplifier (382). The (+)GD1 signal generated by the request processing module (367), as shown in FIG. 36 (abbreviation of GATE DATA 1). This signal is applied to the terminal 02 of connector Y01.

∅UT14 is obtained by amplifying with inversion the REG.ET. 14 signal through the inverting amplifier (383). The signal ∅UT 14 is also called DC RESET to remind one of the operation it prompts in the intermediate unit AM908. This signal is applied to terminal 06 of connector Y01.

∅UT15, also called POWER-LOCK to recall the function it incites in the intermediate unit AM908, is obtained by the logic conjunction of two signals through the mixer (385):
- the signal REG.ET*15 which is formed by inverting signal REG. ET. 15 through inverting amplifier (384);
- the (+) DDW1 control signal which is formed by unit (367).

∅UT16 is obtained by amplifying signal REG. ET. 16 with inversion through inverting amplifier (386). The signal ∅UT16 is also called DC∅ND2 (abbreviation of DIRECT CURRENT ON COMMAND 2) to remind one of the operation it prompts within the intermediate unit AM908. In this connection, it should be recalled that an AM908 intermediate unit can perform its operations on multiple sources. These multiple sources may have to be started or shut down at different times. There are two separate commands, DC∅NCD1 and DCONCD2 in the ISM1 and ISM2 interfaces in order to control two sources or groups of sources separately such as, for example, a group of positive sources and a group of negative sources. It will be understood that the number of commands is not limited, but in the preferred embodiment of the invention it was chosen because it suited the solution of the given problem. This signal is applied to terminal 08 of connector Y01.

∅UT17 is obtained by amplifying, with inversion, the signal REG. ET. 17 through inverting amplifier (387). Signal ∅UT17 is also called DC∅ND1 (abbreviation of DIRECT CURRENT ON COMMAND1) to recall the operations it prompts within the intermediate unit AM908. This signal is the one that was mentioned above with reference to signal ∅UT17. This signal is applied to terminal 07 of connector Y01.

The output signals REG.ET. (22 through 27) of the state register (361) also serve three purposes:
first, they are returned to the inputs 5-(3 through 8) of the input interface block (35);
second, they are associated with the control signals DDW0 and DDW1, as well as with the addressing signals GD0 and GD1 in order to form, through output interface block (364), the control and addressing signals ∅UT (21 through 27) of interface ISM2;

finally, the signal RET.ET. 23, also called MSKIT2(+) (abbreviation of MASQUE INTERRUPTION 2 = Interrupt Mask 2) is sent to the request processing block (367), as shown in FIG. 36. This signal, as its name indicates, enables monitor (10) to prohibit the emission of any interruption originating in the ISM2 interface.

The control and addressing signals ØUT (21 through 27) of the ISM2 interface are similar to those of the ISM1 interface and are generated in like fashion:

ØUT21 is obtained by amplifying the (+)DDW0 control signal through the direct amplifier (388). This signal is also called RESET INHIBIT. This signal is applied to terminals 01 of connector Y02;

ØUT22 is obtained by amplifying the (+)GD0 addressing signal through the direct amplifier (389). This signal is applied to terminal 04 of connector Y02;

ØUT23 is obtained by amplifying the (+) GD1 addressing signal through the direct amplifier (390). This signal is applied to terminal 02 of connector Y02;

ØUT24 is obtained by amplifying, with inversion, signal REG.ET.14 through inverting amplifier (391). ØUT signal 24 is also called DC. RESET. This signal is applied to terminal 06 of connector Y02;

ØUT25, also called POWER-LOCK, is obtained by the logic conjunction, through the mixer (393), of two signals:
the signal REG.ET.25* which is itself generated by inverting signal REG.ET.25 through inverting amplifier (392);
the control signal (+)DDW1.
the ØUT signal 25 is applied to terminal 12 of connector Y02;

ØUT 26 is obtained by amplifying, with inversion, the signal REG.ET.26 through inverting amplifier (394). OUT signal 26 is also called DCØNCD2. This signal is applied to terminal 08 of connector Y02;

ØUT 27 is obtained by amplifying, with inversion, the signal REG.ET.27 through inverting amplifier (395). This signal is applied to terminal 07 of connector Y02.

The REG.ET signals (32 through 37) serve 3 purposes:

first, they are returned to inputs 6 (3 through 8) of input interface block (350), as previously explained when describing FIG. 34. The return of these REG.ET signals (32 through 37) enables monitor (10) to find out at will the state of these signals;

second, they are associated with the control signals DDW0 and DDW1 and with the addressing signals GD0 and GD1 to form, through the output interface block (365), the ØUT control and addressing signals (31 through 37) of the LSSC1 interface;

finally, the REG.ET signal 33, also called MSKIT3(+) is sent to the request processing block (367), as shown in FIG. 36.

As explained above, the LSSC1 interface is different from the ISM1 and ISM2 interfaces. In the preferred embodiment of the invention, this interface is intended to communicate with the circuits powered by the power-supply subsystem sources. This communication is made necessary for several reasons:

the powered circuits contain private sources which are not included in the sources directly controlled by the monitor. This is especially the case for the reference voltage sources (called VREF) used in the logic circuits with CML (Current Mode Logic) flow mode. The operation parameters of this (these) source(s) are found in specific state registers. The monitor, with the assistance of the LSSC1 can find out the state bits characterizing the operation of these sources.

monitor (10) needs to make known to the powered circuits the occurrence of certain characteristic events. In particular, monitor (10) needs to advise the powered circuits of the state of operation of the power supply subsystem; this data might, for example, be:
the voltage(s) has (have) reached its (their) normal operation state;
the voltage(s) is (are) in a transient operation state;
the voltage(s) is (are) faulty;
the operator or maintenance technician requests a reset of the powered circuits.

To perform these operations, the LSSCI interface includes control lines which are:

ØUT 32, also termed DCØNCD. This signal, when high, signifies that the output voltage(s) of the sources has (have) reached its (their) state of normal operation. Under these circumstances, the circuits are powered and are thus likely to operate normally;

ØUT 37, also termed DC.RESET. This signal, when high, signifies that the previous DC.RESET signal must not be taken into consideration. This RESET-INHIBIT signal is rendered necessary in certain situations where the state bits have to be preserved, such as during certain maintenance operations;

ØUT 35, also termed WARNING. The rise-front of this signal indicates the start of a specified time interval at the end of which the source(s) will be shut down or at least will be in an abnormal operation state;

ØUT 33-1, ØUT33-2, ØUT 33-3, also termed CHLCK ØUT 01, CHLCK ØUT 02, CHLCK ØUT 03 (abbreviation of CHANNEL LOCK OUT). These signals, when high, signify that access to the inputs and outputs of the powered circuits must be prohibited. This signal consists only of 3 lines in order to pass this prohibition directly to 3 locations in the powered circuits. This number is not in any way limitative and any other number may be chosen without changing the teachings of the invention. This prohibition is useful during specific periods such as, for example, the start-up and shutdown of the sources.

ØUT 30 also termed PWRD (abbreviation of POWER RESET). This signal, when high, signifies that the Monitor (10) requests the reset of the storage circuits within the powered circuits.

These LSSCI interface control signals are obtained in the output interface block (365) from the REG.ET. (32 through 37) signals and from the DDW0 control signal:

ØUT 31 or RESET INHIBIT is obtained by amplifying the DDW0 signal through amplifier (396). This signal is applied to terminal 01 of connector Y03.

ØUT 32 or DCØNCD is obtained by amplifying, with inversion, REG. ET. 32 through inverting amplifier (397);

ØUT 33-1, ØUT 33-2, ØUT 33-3 or CHLCK-ØUT01, CHLCK-ØUT02, CHLCK-ØUT03 are obtained by amplifying the signal REG.ET.34 through amplifier (398). Moreover, as soon as these signals go up, a self-holding contactor (399) holds the signals high as long as the power supply system is "ON". In this manner, the access prohibition is maintained even if the signal REG.ET.34 comes down. The only way to make these access prohibition signals come down is to put the power supply system in a "STOP" position. These CHLCK ØUT (01, 02, 03) signals are applied to, respectively, terminals 16, 18 and 28 of connector Y03;

ØUT 35, also termed WARNING, is obtained by amplifying the REG.ET.35 signal through amplifier (400): this signal is applied to terminal 12 of connector Y03;

ØUT 36, also termed PWRS, is obtained by amplifying the REG.ET.36 signal through amplifier (401). This signal is applied to terminal 14 of connector Y03;

ØUT 37, also termed DCRESET, is obtained by amplifying, with inversion, the REG-ET 37 signal through inverting amplifier (402). This signal is applied to terminal 06 of connector Y03.

FIG. 36 illustrates the control and addressing block (366) as well as the request processing block (367) included in the AM903 downstream interface half-units(51-1) interface half-units. Control and addressing block (366) receives on its left signals originating from monitor (10). These signals are conveyed through control bus (12) and arrive at connector Z01 at the level of the AM903 downstream interface half-units (51-1). These signals are of 3 types:

addressing signals PMC-ADR(00, 01, 08, 15), GD0, GD1;

selection signals SEL0, SEL1;

control signals: PMC-MEMR, PMC-MEMW, PMC-REST, DDW0, DDW1;

the addressing signals PMC-ADR(00, 01, 08, 15) are used by the Monitor (10) to address:
  in read mode, one of the 6 channels of multiplexer (355) shown in FIG. 34. To achieve this, each of the addressing signals PMC-ADR(00, 01; 08; 15) is amplified and inverted in inverting amplifiers (431), (432), (433) and (434) to generate the signals EA*(00, 01, 08, 15). These signals EA*(00, 01, 08, 15) are applied to the addressing terminal 7 of multiplexer (358) as shown in FIG. 34;
  in write mode, one of said state registers (360) or (361) or (362) shown in FIG. 35. To accomplish this, the amplified and inverted addressing signals EA*(00, 01) are applied to, respectively, terminals 2 and 3 of decoder (436). This decoder (436) in write mode defined by signal PMC-MEMW generates at its outputs (4), (5), (6) the signals designated by, respectively, WPMI*01, WPMI*02, WPMI*03 (abbreviation of WRITE POWER MONITOR INTERFACE). The signal WPMI*01 is applied to input (4) of state register (360), signal WPMI*02 is applied to input (4) of state register (361), and signal WPMI*03 is applied to input (4) of state register (362), as shown in FIG. 35. Only one of these signals may be low at any one time. The low signal corresponds to the address defined at inputs 2 and 3 of decoder (436).

adressing signals GD0 and GD1 are directly transmitted by monitor (10). Within block (367) GD0 is amplified through the two inverting amplifiers (420) and (421) and GD1 is amplified by the 2 inverting amplifiers (422) and (423). These two amplified signals GD0 and GD1 are sent to the intermediate units AM908, as shown in FIG. 35. These two addressing signals GD0 and GD1 enable monitor (10) to address one of the 4 state bytes for the sources contained within each AM908 unit.

selection signals SEL0 and SEL1 are transmitted directly to the input of the NAND element (430). The third input of this NAND element (430) is powered by addressing signal PMC-ADR15. When the conditions placed at the input of the NAND element (430) are met, the output of said NAND element (43) is at a low level so as to generate a selection signal for the half-unit AM903 CS*. This selection signal CS* of the half-unit AM903 is transmitted:
  to one of the 2 inputs of the NAND elements (428). The second input of this NAND element (428) is powered by the read cycle request PMC-MEMR transmitted by monitor (10). When these 2 input conditions are met, the output of NAND element (428) comes down and generates the RDEN (abbreviation of RED ENABLE) signal, authorizing reading. This RDEN signal, which authorizes reading, is amplified and inverted through inverting amplifier (429) to generate the RDEN* signal. This RDEN* signal is applied to input (8) of multipleser (358), as shown in FIG. (34). It is this RDEN* signal which authorizes the transfer of signals through multiplexer (358);
  to input (1) of decoder (436). When the CS* signal is present and when the PMC.MEW signal requests a write cycle, decoder (436) can carry out the decoding of the address signals EA* (00-01).

the control signals PMCMEMR, PMCMEMW, PMCRES, DDW0 and DDW1 enable monitor (10) to control the following operations:

PMC MEMR is the control signal for the read cycle transmitted by monitor (10). As previously explained, this PMCMEMR signal arrives as a condition to NAND element (428) in order to generate the enabling signal RDEN;

PMC-MEMRW is the control signal for the write cycle transmitted by monitor (10). This signal is applied to input 7 of decoder (436) in order to enable the operation of said decoder (436);

PMC-REST is the general reset signal transmitted by monitor (10). This signal is amplified and inverted through inverting amplifier (435) in order to deliver the REST* signal to the entire downstream interface half-unit AM903;

DDW0, also termed RESET-INHIBIT, is the signal which enables monitor (10) to prohibit the reset of the state bytes characterizing the operation of the sources controlled by the downstream interface half-unit AM903. This DDW0 signal is amplified through the 2 inverting amplifiers (424) and (425) in order to be sent to intermediate units AM908;

DDW1, also termed POWER-LOCK, is the signal which enables monitor (10) to command the artificial operation of the controlled source(s), i.e., the output voltage of these controlled sources does not built up, although all the other functions of these sources are being performed. This DDW1 signal is amplified through the 2 inverting amplifiers (426) and (427) in order to be sent to the intermediate units AM908. Finally, the control and addressing module (366) includes an OLØG (abbreviation of LOGICAL ZERO) signal. This signal is amplified and inverted in inverting amplifier (419) to deliver the ELØG1 (abbreviation of ENABLE LOGIC) signal. This ELØG1 signal is sent to monitor (10). This signal serves to advise monitor (10) that the downstream interface unit AM903 is properly plugged into the rack. In the absence of downstream interface unit AM903, the line is left floating and monitor (10) is aware of this absence.

Request processing block (367) receives on its left-hand side, from top to bottom, the following input signals:

The DDR1 signal, also termed DIN17. This signal is the signal generated by the (7-8) output of input interface block (350), as shown in FIG. 34. This DDR1 signal, when high, signifies that the source(s) supplied by the ISM1 interface are signalling the occurrence of a failure justifying interruption.

The REG.ET 13 signal, also termed MSKIT1 (abbreviation of MASK INTERRUPTION 1) is the output signal from terminal (2-7) of state register (360) in FIG. 35. This signal, when high, signifies that the DDR1 signal described above may be conveyed to monitor (10).

The DDR2 signal, also termed DIN27. This signal is the signal generated by the output (8-8) of input interface block (350). This DDR2 signal, when high, signifies that the source(s) supplied by the ISM2 interface are signalling the occurrence of a failure justifying interruption.

The REG.ET. 23 signal, also termed MSKIT2 (abbreviation of MASK INTERRUPTION 2) is the output signal from terminal (2-7) of state register (361). This signal, when high, signifies that the DDR2 signal described above may be carried to Monitor (10). It should be noted that the LSSCI interface, also called LSSCI/VREF interface, features an interrupt circuit separated from the interrupt circuits of the ISM1 and ISM2 interfaces. This set-up is necessary, because the interruptions do not have the same priority level and, therefore, it is mandatory to separate the requests.

The REV.ET.12 signal, also termed AUTO TEST IT SOURCE D.C. is the output signal from the state register (360). This signal, when high, energizes the interrupt request circuit of the ISM1 and ISM2 interfaces. It enables Monitor (10) to perform a check on the interrupt circuits in the ISM1 and ISM2 interfaces by creating a pseudo-interruption and by checking that this interrupt request is carried out normally.

The REG.ET.22 signal termed AUTOTEST IT VREF is the output signal from terminal (22) of state register (361). This signal plays the same role as the preceding signal, but with respect to the LSSCI/VREF interface.

Moreover, it should be noted that the signals (+)DDR1 or DIN17, (+)DDR2 or DIN27, (+)DDR3 or DIN37 are sent directly to Monitor (10) through the control bus (12). It is these signals DDR1, DDR2 and DDR3 that will enable Monitor (10) to find out the origin of the interrupt requests it will receive from the downstream interface units AM903.

The input signals to the request processing block (367) are connected within this processing block, as follows:

the interrupt request signal DDR1 and the mask signal for this interruption, MSKIT1, are each placed at either input of the NAND-element (410). The signal from this NAND-element (410 termed MDR1* is applied to the first of the 3 inputs of the NAND-element (415). The output signal from this NAND-element (415) termed GFLT (abbreviation of GENERATOR FAULT) is, on the one hand, sent directly to Monitor (10) through the control but (12) and, on the other hand, to the input of the amplifier (416) with inverted output. The output signal from this amplifier (416) with inverted output termed INTR* (abbreviation of INTERRUPT REQUEST) is sent directly to Monitor (10) through the control bus (12).

The interrupt request signal DDR2 and the masking signal for this interruption MSKIT2 are each placed at either input of the NAND-element (411). The output signal from this NAND-element termed MDR2* is applied to the second of the three inputs of NAND-element (415). The output signal from this NAND-element (415) termed GFLT follows the same path described above.

The interrupt request signal DDR3 and the mask signal for this interruption MSKIT2 are each placed at either input of the mixer (412) with inverted output. The output signal of this NAND-element (412) termed MDR3* is applied to the first of the 2 inputs of the NAND-element (417). The output signal from this NAND-element (417) termed PMV-FLT (abbreviation of POWER MONITOR REFERENCE VOLTAGE-FAULT) is, on the one hand, sent directly to monitor (10) through the control bus (12) and, on the other hand, placed at the input of inverting amplifier (418). The output signal from this inverting amplifier (418) termed PMV-INT* (abbreviation of POWER MONITOR REFERENCE VOLTAGE-INTERRUPT REQUEST) is sent directly to the monitor (10) through the control bus (12).

The AUTO TEST IT SOURCE DC signal is applied to the input of the inverting amplifier (413). The output signal from this inverting amplifier (413) is applied to the third input of the NAND-element (415). The output signal from this mixer (415) with inverted output termed GFLT follows the same path as the signal described with reference to the interreupt request for the ISM1 or ISM2 interface. Thus, it can clearly be seen that the AUTO TEST IT SOURCE DC enables the monitor (10) to initiate an ISM1 or ISM2 interface or ISM2 interface pseudo interrupt request.

The AUTO TEST IT VREF signal is applied to the input of the inverting amplifier (414). The output signal from this inverting amplifier (414) is applied to the second input of the NAND-element (417). The output signal from this NAND-element (417) termed PMV-FLT follows the same path as the signal described with reference to the interrupt signal transmitted by the LSSCI interface.

The operation of this request processing block (367) follows from what has just been described:

when the ISM1 interface transmits an interrupt request, this request is expressed by the rise of the signal DDR1. If the monitor (q0) authorizes the transmission of this request, is causes the mask signal MSKIT1 to go up. When the two signals DDR1 and MSKIT1 are high, the output of the NAND-element (410) MDR1* comes down, which is the sign that the interrupt request has been accepted. This MDR1* signal activates the first input of NAND-element (415). With the MDR1* signal coming down, the output of NAND-element (415) will go up and the fault signal GFLT will go up. This GLFT signal, when high, is sent, on the one hand, directly to the control bus (12) and, on the other hand, to the input of the inverting amplifier (415) which, as a result, generates at its output a low INTR* signal. This INTR* signal is, in turn, placed on the control bus (12). In the following paragraphs it will be seen how the monitor (10), warned by the signal INTR* about the existence of at least one interrupt request, will find out from the high GFLT signals which downstream interface units AM903 have transmitted these requests.

an identical technique comes into play in connection with a DDR2 interrupt request transmitted by an ISM2 interface, the difference being that the masking of the interruption is carried out by the signal MSKIT applied to the NAND-element (411);

when the LSSCI interface transmits an interrupt request, it causes the DDR3 signal to go up in the process. If the masking signal MSKIT3 goes up, the output MDR3* of the NAND-element (412) will come down, which signifies that the DDR2 interrupt request has been accepted. This MDR3* signal, at a low level, is applied to the first input of the NAND-element (417) which generates at its output a high PMV-FLT signal. This PMV-FLT signal is sent, on the one hand, directly to the control bus (12) and, on the other hand, to the input of the inverting amplifier (418) which generates at its output a low PMV-INT* signal;

when the monitor (10) wishes to test the operation of the interrupt circuit of the ISM1 and ISM2 interfaces, it will cause the REG.ET.12 cell of state go up. The REG.ET. 12 signal passes through the inverting amplifier (413). The output signal from this inverting amplifier (413) supplies power to the third input of NAND-element (415) which delivers a high GFLT signal to its output. The situation encountered during an accepted interrupt request by ISM is artificially re-created by the monitor (10) which can thus test the circuits found downstream;

when the monitor (10) wishes to test the operation of the LSSCI interface interrupt circuit, it does so by placing a one in the REG.ET. 22 cell of the state register (361). The REG.ET.22 signal drives the input of the inverting amplifier (414) which delivers a low signal to its output. This low signal activates the second input of the NAND-element (417) which delivers a high PMV-FLT signal to its output. The transmission conditions for an interrupt request from the LSSCI interface are thus genuinely re-created.

As previously stated, FIGS. 33, 34, 35 and 36 relate to the downstream interface half-unit AM903 (55-1). As a matter of fact, the power supply system of the preferred embodiment of the invention being described features eight downstream interface half-units AM903. These eight downstream interface half-units AM903 are denoted in FIG. 2 by the references: 55-1, 55-2, 56-1, 56-2, 61-1, 61-2, 66-1 and 66-2. Each one of these downstream interface half-units AM903 controls an ISM1 interface, an ISM2 interface, and an LSSCI interface. FIG. 43 shows the identification and addressing facilities characteristic of each downstream interface half-unit AM903.

The first line in the table of FIG. 43 indicates the location of the functional circuit boards supporting the downstream interface units AM903 in the rack: position 7 for unit 51, position 8 for unit 56, position 9 for unit 61, and position 10 for unit 66.

The second line in the table of FIG. 43 provides the reference to each downstream interface half-unit in FIG. 2: the half-unit (51-1) and the half-unit (51-2) constituting the downstream interface unit AM903 (51) are supported by the functional circuit board placed at position 7, unit (56) is located at position 8, unit (61) at position 9, and unit (66) at position 10.

The third line in the table of FIG. 43 provides the reference to the link conveying the fault signal GFLT corresponding to each half-unit:
the fault signal GFLT of half-unit (51-1) is called BPCIN-11,
the fault signal GFLT of half-unit (51-2) is called BPCIN-10,
the fault signal GFLT of half-unit (56-1) is called BPCIN-03,
the fault signal GFLT of half-unit (56-1) is called BPCIN-02,
the fault signal GFLT of half-unit (61-1) is called BPCIN-05,
the fault signal GFLT of half-unit (61-2) is called BPCIN-04,
the fault signal GFLT of halt-unit (66-1) is called BPCIN-07,
the fault signal GFLT of half-unit (66-2) is called BPCIN-06.

These signals BPCIN (02, 03, 04, 05, 06, 07, 11 and 12) are those shown in FIG. 14.

The fourth and fifth lines in the table of FIG. 43 denote the addressing signals SEL0 and SEL1 for the downstream interface half-units AM903:
the half-unit (55-1) is addressed by the lines PMCADR03 and PMCADR0
the half-unit (55-2) is addressed by the lines PMCADR03 and PMCADR0
the half-unit (56-1) is addressed by the lines PMCADR02 and PMCADR0
the half-unit (56-2) is addressed by the lines PMCADR03 and PMCADR0
the half-unit (61-1) is addressed by the lines PMCADR05 and PMCADR0
the half-unit (61-2) is addressed by the lines PMCADR02 and PMCADR0
the half-unit (66-1) is addressed by the lines PMCADR02 and PMCADR0
the half-unit (66-2) is addressed by the lines PMCADR02 and PMCADR0

These lines PMCADR (02, 03, 04, 05, 06, 07) will be described when describing the control module AM902b(75).

CONTROL MODULE AM902

Figure 44:
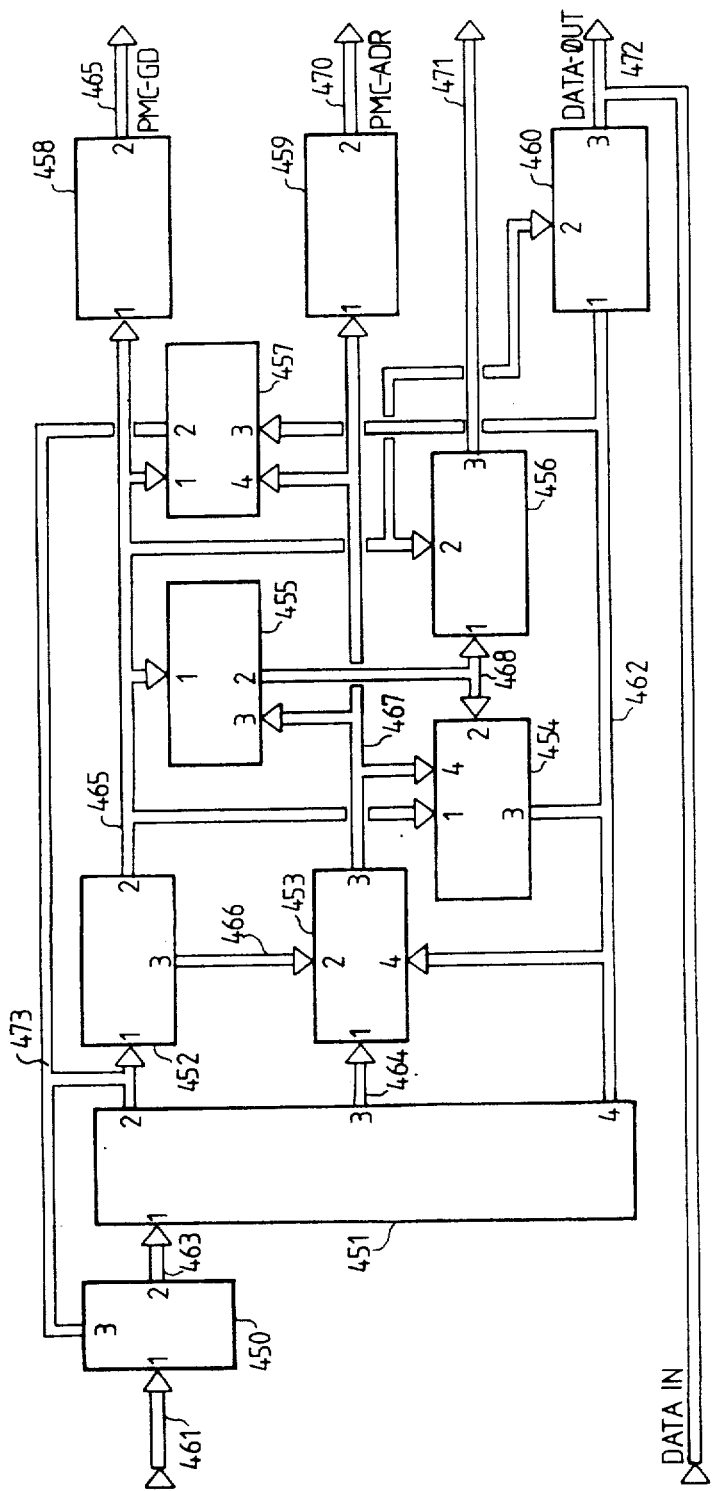
FIG. 44 is a block diagram of an AM 902B CONTROL UNIT of FIG. 2.

FIG. 44 is a schematic representation of the control MODULE AM902B(75). In this figure signals travel from left to right, except in the buses where the signals can travel in both directions as well as in the lines where a different direction has been marked: this AM902B control MODULE (75) is the core of the control device for the power supply system, since it contains the microprocessor as well as most of the storage devices necessary for the operation of the control monitor (10) for the power supply system.

On the left-hand side of FIG. 44 there are two input signal cables:
cable (461) which conveys the control signals for the operation cycle of the microprocessor (451). These cycle control signals are signals transmitted by the remainder of the power supply system with the object of requesting special operations from the microprocessor (451);
the bus (472) which conveys the input or output microprocessor (451) signals. For the operation of the microprocessor (45) in read mode the signals to be introduced into the AM902B MODULE (75) are placed by the power supply system at bus (472) and the microprocessor will read the contents of the bus (472) DBM-EDB (00-07).

The EXTERNAL CONTROL CABLE (461) arrives at input 1 of the CYCLE CONTROL BLOCK (450). This CYCLE CONTROL BLOCK (450) is also connected at its input/output 3 to the INTERNAL CONTROL CABLE (473).

The CYCLE CONTROL BLOCK (450) processes the signals received at its inputs (1) and (3) and delivers cycle control signals both at its output 2 to MICROPROCESSOR (451) and at its input/output 3 to the circuits downstream to the MICROPROCESSOR (451).

Output 2 of the CYCLE CONTROL block (450) is connected by the link (463) to input 1 of the MICROPROCESSOR (451). This input (1) of the microprocessor (451) receives external requests. During its operation, the microprocessor (451) the microprocessor (451) communicates with the power supply system via outputs 2 and 3 as well as via input/output 4:

output 2 transmits control signals and synchronization signals;

output 3 transmits heavily weighted addresses which are transmitted by the cable (464);

input/output 4 is the input/output for data exchanged between the microprocessor (451) and the rest of the power supply system. This input/output 4 is linked to the IDB (00-07) INTERNAL DATA BUS (462).

The internal control cable (473) is linked:
on one side, to input (3) of the cycle control block (451), as described earlier;
on the other side, to input (1) of the ORDER PROCESSING BLOCK (452);
finally, to input 2 of the TIME BASE BLOCK (457).

Cable (464) is connected to input 1 of the ADDRESS/DATA SWITCHING BLOCK (453).

INTERNAL DATA BUS (462) is linked:
to input 4 of the address/data switching BLOCK (453);
to input 3 of MEMORY BLOCK (454);
to input 3 of time base BLOCK (457);
to input 1 of the DIRECTION OF DATA TRANSFER COMMUNICATION BLOCK (460).

The command processing block (452) performs operations on the signals it receives at its input 1 and places commands at its outputs 2 and 3:

output 2 supplies power to the INTERNAL COMMAND CABLE (465);

output 3 supplies power to the ADDRESS/DATA SWITCHING CABLE (466).

Internal command cable (465) is linked to:
input 1 of memory BLOCK (454);
input 1 of selection BLOCK (455);
input 2 of BUFFER BLOCK (456) for EXTERNAL COMMANDS OF THE SECOND ORDER;
input 1 of BUFFER BLOCK (458) for EXTERNAL COMMANDS OF THE FIRST ORDER;
input 2 of the COMMUTATION BLOCK (460) FOR THE DIRECTION OF DATA TRANSFER.

The external commands of the first order are the commands transmitted by the channel of the AM903 downstream interface unit registers such as, for example: DCRESET (OUT 14), PØWER LØCK (ØUT15, DCØNCD2 (ØUT16), DCØNCD1 (ØUT17) in the ISM1 interface (FIG. 33).

The second-order external commands are the commands transmitted without passing through the registers of the downstream interface unit AM903 such as, for example: RESET-INHIBIT (ØUT11), GD0 (ØUT12), GD1 (ØUT13) in the ISM1 interface (FIG. 33).

Address/data switching cable (466) is linked to input 2 of the address/data switching block (453).

The address/data switching block (453) is required in the preferred embodiment of the invention, because the microprocessor (451) is an 8-bit type 8085 microprocessor. In this type of microprocessor, addressing is obtained by the concatenation of two bytes: the lightly weighted byte is obtained by sampling the byte placed by the microprocessor (451) on the IDB(00-07) internal data bus (462) and the heavily weighted byte is obtained by sampling the byte placed by the microprocessor (451) on the IA(08-15) INTERNAL ADDRESS cable (464).

The concatenation command is given by the command (order) processing block (452) through the address/data switching cable (466). The result of the concatenation, which represents a complete address, is placed at output 3 of the address/data switching block (453). This output 3 of the address/data switching block (453) supplies power to the IA(00-07) INTERNAL ADDRESSING CABLE (467). This initial addressing cable (467) is linked to:
terminal 3 of the selection block (455);
terminal 4 of memory block (454);
terminal 4 of time base block (457);
terminal 1 of address buffer block (459).

Selection block (455) receives, at its terminal 1, the commands transmitted by the microprocessor (451) and, at its terminal (3), addressing signals. From the commands and the addresses received the selection block (455) creates selection signals it places at its output 2, to which the SELECTION CABLE (468) is connected. The selection cable (468) is linked to:
terminal 1 of memory block (454);
terminal 1 of BUFFER block (456) for EXTERNAL COMMANDS OF THE SECOND ORDER.

Buffer block (456) for external commands of the second order receives at:
its terminal 1: selection signals conveyed by selection cable (48)
its terminal 2: commands conveyed by external command cable (465)

From the commands and the selection signals it receives, the buffer block (456) for external commands of the second order places at its output (3) one or more command signals which are conveyed by the cable (471) for external commands of the second order. This cable (471) for external commands of the second order is linked to one of the connectors (Z01) or (Z02) of the AM902B control module (75).

The time base block (457) receives at:
its terminal 1: commands and synchronous signals conveyed by the internal command cable (465);
its terminal 4: addressing signals conveyed by the internal addressing cable (467);
its terminal 3: data signals conveyed by the internal data bus (462).

All these received signals enable the time base block (457) to generate during up-time cycle control signals which are applied to its terminal 2 and conveyed by the internal cycle control cable (473). Time base block (457) receives one or more clock signals at its terminal 2, which it will use to measure time intervals.

Time base block (457) features a certain number of countdown circuits. At the command of the microprocessor (451), these count-down circuits are loaded with the initial values found on the internal data bus (462). Then, the count-down circuits are activated by the received clock signals. With each clock signal their contents are decreased by one unit. When the contents of one of them is zero, the time base block (457) generates an interrupt cycle signal which is transmitted to the microprocessor (451) through the internal cycle control cable.

Buffer block (458) for external commands of the first order receives at its terminal (1) the commands transmitted by the microprocessor (451) and intended for the AM904 operation interface units (74) and for the modules (55), (56), (61), (66) of the downstream interface AM903. These commands are amplified, formatted inside the buffer block (458) for external commands of the first order, and transmitted via terminal 2 of the command and control bus (469), which is part of the control bus (12).

Address buffer block (459) receives at its terminal (1) the lines of the internal addressing cable. The signals conveyed by this internal addressing cable are used and formatted, then transmitted via terminal (2) to the external address cable (470). This external address cable (470) is part of the control bus (12).

Commutation block (460) for the direction of data transfer is linked via:
its terminal 1 to internal data bus (462);
its terminal 2 to internal command cable (465);
its terminal 3 to external data bus (472);

By means of the internal command cable (465) the microprocessor (451) indicates to the commutation block (460) for the direction of data transfer the nature of the operation in progress, should this operation involve a data exchange with the exterior of the AM902B control module (75). If said operation in progress is a read operation, the commutation block (460) for the diection of data transfer commands the transfer from its terminal 3 to its terminal 1. In the opposite case, where said operation in progress is a write operation, commutation block (460) for the direction of data transfer commands the transfer from its terminal 3 to its terminal 1.

Figure 45:
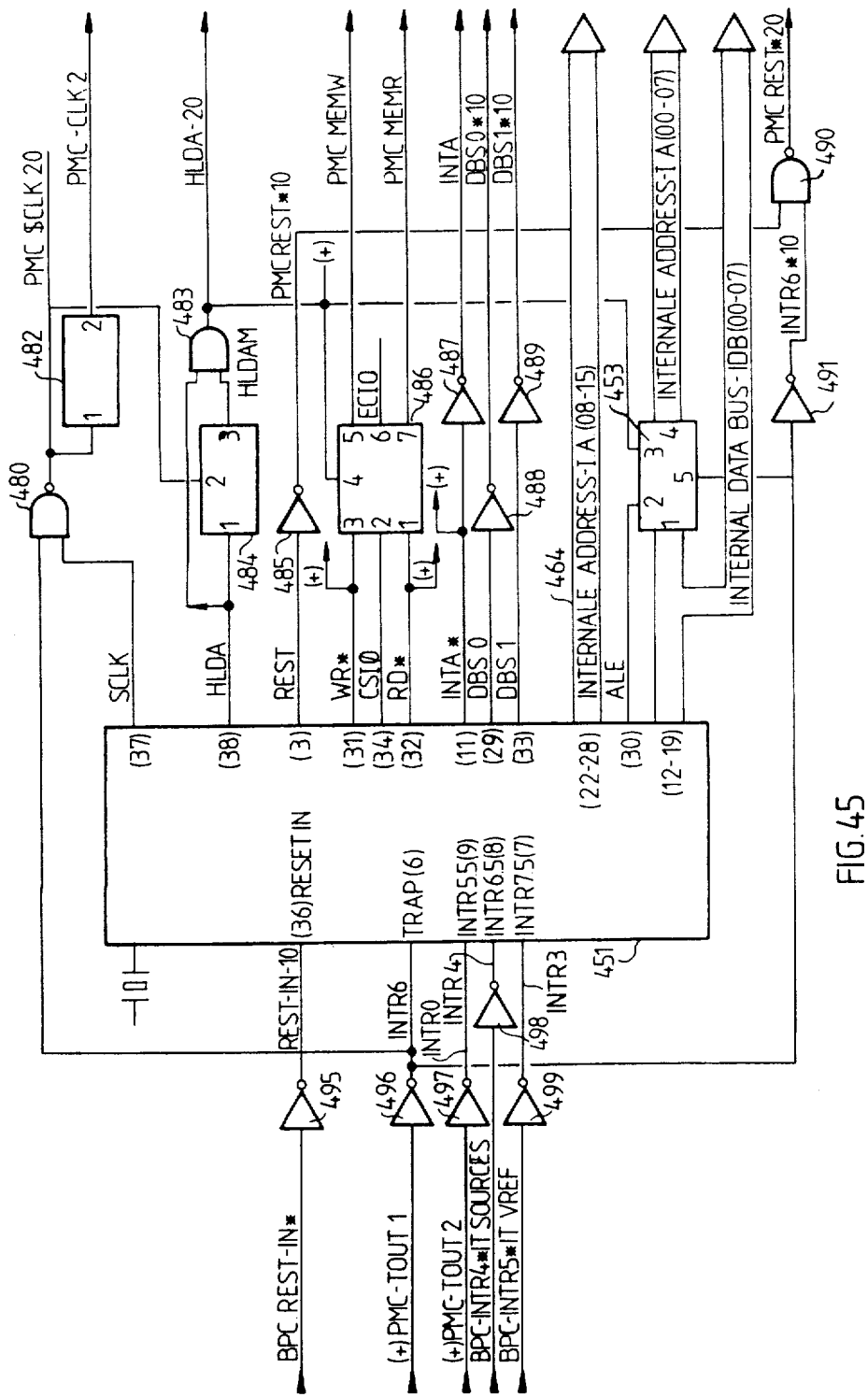
FIG. 45 is a detailed illustration of the circuits located in the left half of FIG. 44.

FIG. 45 is detailed representation of the left-hand side of FIG. 44. The elements of FIG. 44 which are shown are: the microprocessor (451), the cycle control block (450), the command processing block (452), the address-/data switching block (453), the external cycle control cable (461), the cable (463), the internal data bus (462), the internal cycle control cable (473), the heavily weighted address bus (464), the internal cable (465), the address/data switching cable (466). It will now be shown how these blocks, cables and buses are represented in FIG. 45:

The microprocessor (451) is represented by the rectangular block marked (451) on the left-hand side of FIG. 45. The microprocessor chosen for the preferred embodiment of the invention is a type 8085 INTEL microprocessor. In this rectangle (451) there appear:
numbers in parentheses. Each of these numberes maps to a pin number of the case enclosing the 8085 microprocessor;
terms which are the terms given by the 8085 microprocessor manufacturer to the signals corresponding to the pins asociated with these terms.

The cycle control block (450) is constituted by the inverting amplifiers (495), (497), (498) and (499).

Command processing block (452) is constituted by the NAND gate (480), the inverting amplifier (481), the divide by two (482), the AND gate (483), the flip-flop (484), the inverting amplifier (485), the 3-stage register (486), the inverting amplifiers (487), (488), (489), (491), and the NAND gate (490).

The address/data switching block (453) is represented by the switch (453).

The external cycle command cable (461) is represented by 3 lines denoted, respectively, by:
BPC.REST IN*, which is a reset signal. This BPC REST IN* reset signal is obtained via the INITIALIZATION signal described with reference to the AM904 operation interface unit (74). This signal is generated by means of the push button (163-8), as shown in FIG. 26.
BPC.INTR4* or IT SOURCES, which is none other than the signal resulting from the occurrence of a major fault signal GFLT* in at least one of the sources. This signal, marked by an asterisk, is thus low when it is active, i.e., when there is a major fault in at least one source.
BPC.INTR3* or IT VREF, which is the signal indicating the appearance of a fault in at least one of the reference sources VREF. This signal, too, is accompanied by an asterisk and will be active when it is low.

Cable (463) conveys the signals denoted by: REST IN 10, INTR6, INTR0, INTR4, INTR3:
REST IN 10* is the master reset signal. It enters the INTEL 8085 microprocessor (451) at terminal (36).
INTR6 is the halt-cycle-request signal (TRAP) caused by the time base (457) decremeter 1 going through zero, PMC-TOUT 1. This signal arrives at terminal (6) TRAP of the INTEL 8085 microprocessor (451).
INTR0 is the program interrupt request signal caused by the time base (457) decremeter 2 going through zero, PMC-TOUT2. This signal arrives at the terminal (9) INTR5.5 of the INTEL 8085 microprocessor (451).
INTR4 is the program interrupt request signal caused by the appearance of a major fault GFLT in at least one of the sources or a fault PMVINT of the shared resources. This signal arrives at the terminal (8) INTR6.5 of the INTEL 8085 microprocessor (451).
INTR3 is the program interrupt request signal caused by the appearance of a fault in the reference voltage VREF. This signal arrives at the terminal (7) INTR7.5 of the INTEL 8085 microprocessor (451).

The internal data bus (462) is represented by the bus with 8 lines (462) referred to as IDB INTERNAL DATA BUS (00-07).

The internal cycle control cable (473) is represented by the lines:
(+) PMC TØUT 1, which is a signal sent by the time base block (467) when the contents of the first decremeter have passed through zero;
(+) PMC TØUT 2, which is a signal sent by the time base block (457) when the contents of the second decremeter have passed through zero.

The heavily weighted address bus (464) is represented by the 8-line bus referred to as INTERNAL ADDRESS IA (08-15).

The internal command cable (465) is represented by the lines:
PMC-$CLK20, which is a clock signal intended to synchronize the circuits located downstream. This clock signal PMC-$SCLK20 is generated by the NAND gate (480). This signal is thus inhibited in the presence of the interrupt signal INTR6.
PMC-CLK2, which is a clock signal whose frequency is half that of the clock signal PMC-$CLK20, which has just been described. This signal is obtained by dividing into two the frequency of the clock signal CLK by means of the divider (482). Note how the CLK signal is itself at one-half the frequency of that of the quartz responsible for controlling the INTEL 8085 microprocessor cycles (451).

HLDA-20 is a signal which stores, during an INTEL 8085 microprocessor cycle, the address/data switch signal HLDA (abbreviation of HOLD ACKNOWLEDGE). The HLDA signal is stored in the flip-flop (484) which produces the HLDAM output signal (abbreviation of STORED HLDA). The HLDA and HLDAM signals are applied to the 2 inputs of the AND gate (483). The output signal from this AND gate (483) is the HLDA 20 signal.

PMC-REST*20 is a master reset signal, that is, of the circuits controlled by the monitor (10). This PMC-REST*20 signal is produced by the output of a two-input NAND gate (490). One of the inputs to the gate is the PMC-REST*10 signal and the other input is the INTR6* signal. The PMC-REST*10 signal is obtained by inverting, through the inverter (485), the REST reset signal sent by the INTEL 8085 microprocessor. The INTR6-10 signal is obtained through inversion via the inverter (491) of the INTR6 signal mentioned above, which is the TRAP signal. The INTR6-10 signal is high when a TRAP is requested and, thus, the NAND gate (490) enables in this case the PMC-REST*10 signal to pass, resulting in the transmission of the PMC-REST*20 signal.

PMC MEMW is a signal which indicates that the INTEL 8085 microprocessor is requesting a write cycle. This signal is obtained by amplifying in the bus signal amplifier (486) the WR* signal sent by the INTEL 8085 microprocessor. The bus signal amplifer (486) input is sampled by the HLDA-20 signal.

EC I∅ is not used in the present application of the INTEL 8085 microprocessor.

PMC MEMR is a signal which indicates that the INTEL 8085 microprocessor is requesting a read cycle. This signal is obtained by amplifying in the bus signal amplifier (486) the RD* signal sent by the INTEL 8085 microprocessor. The bus signal amplifier (486) input is sampled by the HLDA-20 signal.

INTA (abbreviation of INTERRUPT ACKNOWLEDGE) is an interrupt request acknowledgement signal. This signal is obtained by inverting in the inverting amplifier (487) the INTA* signal sent by the INTEL 8085 microprocessor.

DBS0*10 and DBS1*10 are signals which define the internal state of the data bus EDB (00-07).

|  | DBS0*10 | DBS1*10 |
|---|---|---|
| HALT | 0 | 0 |
| WRITE | 0 | 1 |
| READ | 1 | 0 |
| FETCH | 1 | 1 |

Each of these DBS0*10 and DBS1*10 signals are obtained by inverting in the DBS0 signal inverter (488) and inverting in the DBS1 signal inverter (489) the DBS1 signal. The DBS0 and DBS1 signals are produced by the INTEL 8085 microprocessor.

The data switching cable (466) is represented by the line labeled HLDA-20.

The operation of the circuits in FIG. 45 is easily understood from the abundant literature which has been written on the subject of the INTEL 8085 microprocessor. A brief bibliography is provided at the end of the present description.

It follows from what has just been said that, since the ECI∅ command and, hence, the CSI∅ command are not used, the AM904 operation interface unit (74) and the AM903 downstream interface units (51, 56, 61, 66) are considered by the INTEL 8085 microprocessor (451) as storage locations and not as peripheral devices. Consequently, exchanges between the INTEL 8085 microprocessor (451) and the AM904 operation interface unit (74) and the AM903 downstream interface units (51, 56, 61, 66) will be made by write or read operations addressed to artifical storage locations. These artificial storage locations will, in fact, be used by the registers of the AM904 operation interface unit (74) and the AM903 downstream interface units (51, 56, 61, 66).

During normal operation, the INTEL 8085 microporcessor (451) executes a program which it fetches from memory. To fetch instructions from memory, the INTEL 8085 microprocessor (451) has available:
the PMC-CLK2 synchronization signal;
the HLDA-20 hold address signal;
the PMC-MEMR read command signal;
the IA internal address bus (00-15);
the IDB internal data bus (00-07).

The execution of instructions involves data to be read or written to specific addresses. For this purpose the INTEL 8085 microprocessor (451) has available:
the PMC-CLK2 synchronization signal;
the HLDA-20 hold address signal;
the PMCMEMW write command signal or the PMCMEMR read control signal, depending on the type of operation requested;
the IA internal address bus (00-15);
the IDB internal data bus (00-07).

In particular, it happens here that when the INTEL 8085 microprocessor (451) wants to send a command to either the AM904 operation interface unit (74) or the downstream interface units (51, 56, 61, 66), it does so by requesting a write cycle. This write cycle will be reflected in the addressed interface unit(s) by the setting of a register. It is this set register which will send the desired command.

The execution of the program in progress can be interrupted by:
a cut-off in the power supply to the microprocessor (451), or
a master reset requested from the service panel (11). This request reaches the microprocessor (451) by means of the BPC-REST.IN* signal. This signal is inverted in the inverter (495) to produce the RES.IN 10 signal. This REST.IN 10 signal applied to the INTEL 8085 microprocessor (451) pin (36) produces the REST output signal at the microprocessor (451) pin (3). This REST signal is inverted through the inverter (485) and produces the PMC REST*10 signal. This PMC REST*10 signal is applied to one of the two inputs of the NAND gate (490), which outputs the PMC REST*20 master reset signal. It is this PMC REST*20 signal which, when propagated throughout the entire power supply system, will cause the register of said power supply system to be reset; or
by the occurrence of one of the (+) PMC T∅UT1, (+) PMC T∅UT2, IT SOURCES or IT VREF interrupt requests. The (+) PMC T∅UT1 interrupt request is produced within the AM902B control module (75). The production of this (+) PMC T∅UT1 signal can be seen above with reference to the description of FIG. 46. This (+) PMC TØUT1 signal is inverted in the inverter (496) to deliver the signal called INTR6*. The INTR6* signal is active when low, that is, it expresses an interrupt request when its level is low. This INTR6 signal is transmitted in 3 directions:

on the one hand, it is applied to one of the 2 inputs of the NAND gate (480). The SCLK synchronization signal is applied to the other input of the NAND gate (480). When the INTR6 signal is present, that is, when its level is low, the NAND gate (480) is closed and the PMC SCLK-20 clock signal can no longer be produced: the clock signals are blocked;

on the other hand, it is applied to the INTEL 8085 microprocessor (451) input (6) called (TRAP). As the name indicates, this TRAP input (6) is an input for inhibiting the operation of the INTEL 8085 microprocessor 451. Thus, in this case this (+) PMC TØUT1 interrupt request is, in fact, a TRAP request;

finally, the INTR6 signal is transmitted, on the one hand, to the input (5) of the address/data switching block (453) which it resets and, on the other hand, to the input of the inverter (491). The output signal of this INTR6-10 inverter (491) is transmitted to one of the inputs of the NAND gate (490), which is thus ready to transmit the PMC REST*10 reset signal, as explained above.

The (+) PMC TØUT2 interrupt signal is also generated within the AM902B control module (75). The generation of this (+) PMC TØUT2 signal will also be seen with reference to the description of FIG. 46. This (+) PMC TØUT2 signal is inverted in the inverter (497) so as to deliver an interrupt signal called INTR6*. This INTR6* signal is applied to the INTR5.5 pin (9) of the INTEL 8085 microprocessor (491). The occurrence of the INTR0 signal thus causes the initiation of the type 5.5 interrupt process in the INTEL 8085 microprocessor (451).

The IT SOURCES interrupt request signal originates from a wire which groups together all the GFLT failure signals produced in the AM903 downstream interface units and the MCRINT* signal produced by the AM904 operation interface unit (74). This failure signal bus line is located in the backplane of the BACK PANEL CONTROL rack to be described later. The presence of at least one of the GFLT or MCRINTR* signals results in the occurrence of the IT SOURCES signal also called BPCINTR4*. This IT SOURCES signal is applied to the input of the inverter (498) which produces the INTR4 signal at its output. This INTR4 signal is applied to the pin (8) of the INTEL 8085 microprocessor (451). This pin (8) generates a level 6.5 interrupt in the INTEL 8085 microprocessor (451).

The IT VREF interrupt request signal originates from a wire which groups together all the PMVINT* signals produced in the AM903 downstream interface units. This interrupt request bus line of the VREF reference sources is part of the backplane of the rack to be described later. When at least one of these PMVINT* signals is present, this signal is applied to the input of the inverter (499), whose output produces the INTR3 signal. This INTR3 signal is applied to the INTR7.5 input (7) of the INTEL 8085 microprocessor (451). The rising edge of the INTR3 signal triggers a level 7.5 interrupt in the INTEL 8085 microprocessor (451).

Figure 46:
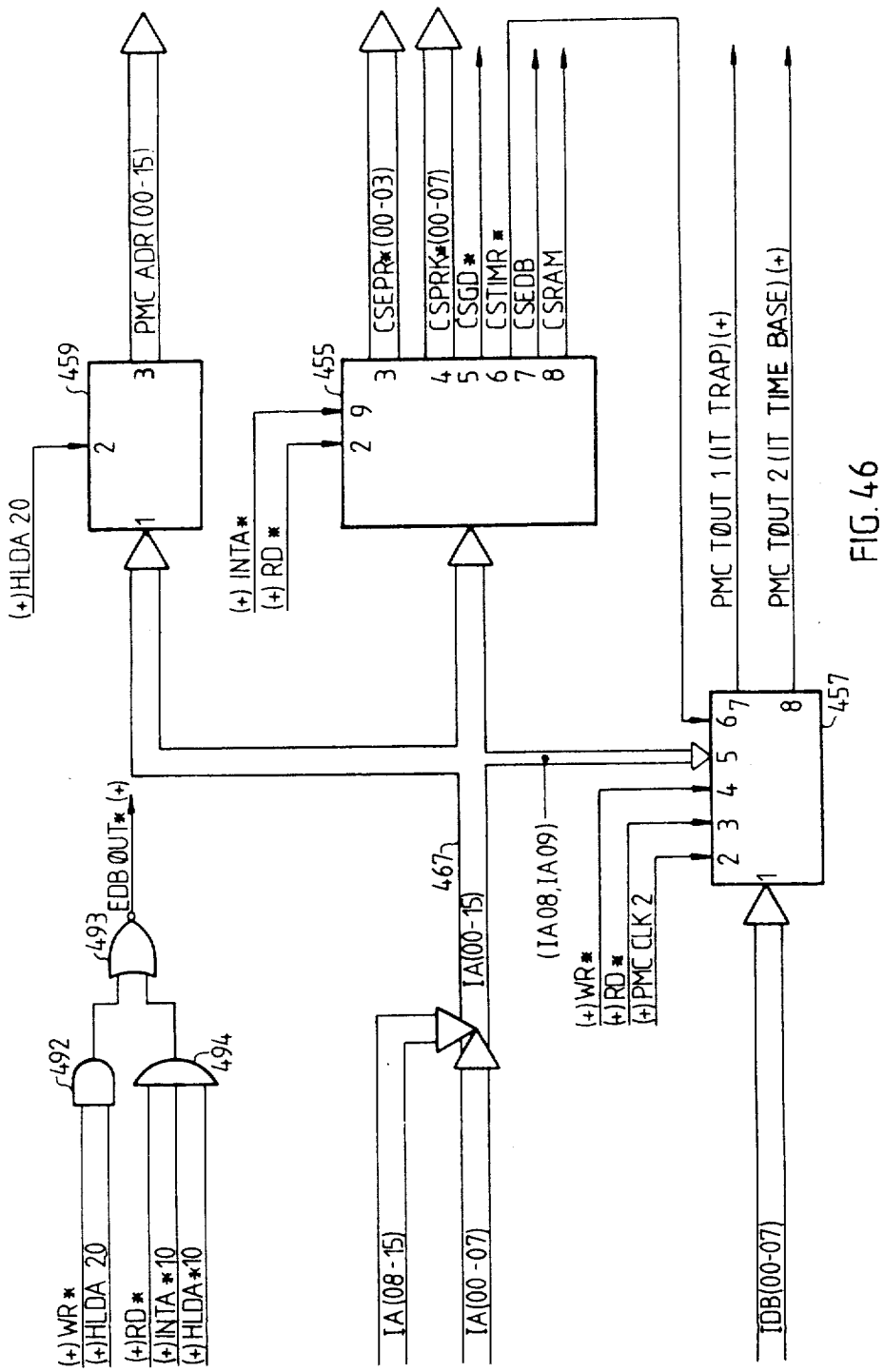
FIG. 46 is a detailed illustration of an address buffer block, a selection block, and a timing block contained in the AM 902 B CONTROL MODULE.

FIG. 46 specifies the operation of the address buffer block (459), the selection block (455) and the time base block. In addition, this figure contains the description of the circuit which produces the EDBØUT signal used to control the data buffer block (460) described in FIG. 47.

The circuits which produce the EDBOUT signal are situated in the upper left portion of FIG. 46.

During a write operation, the (+) WR* and (+) HLDA20 signals are high and the output signal of the AND gate (492) is high. This high signal activates the upper input of the NOR gate (493) whose low output delivers the EDBØUT* signal.

During a read operation, the (+) RD*, INTA*10 and HLDA*10 are high and the output signal from the AND gate (494) is high. This signal activates the lower input of the NOR gate whose low output delivers the EDBØUT* signal. The EDBØUT* signal, as the name indicates, signals that the microprocessor is executing an operation involving data output. This EDBØUT signal is used to control the transfer direction of conventional amplifiers.

The address bus amplifier (459) is located in the upper right portion of FIG. 46. This 16-channel amplifier (459) receives on its input 1 the 16 lines of the IA (00-15) internal address bus (467). The 16 IA (00-15) signals applied to the input of the amplifier (459) are enabled by the (+) HLDA 20 enabling signal. When this enabling signal is high, the value of the IA (00-15) internal address signals is transferred to the output 3 of the amplifier (459). This output 3 powers the external PMC ADR (00-15) address bus.

Figure 47:
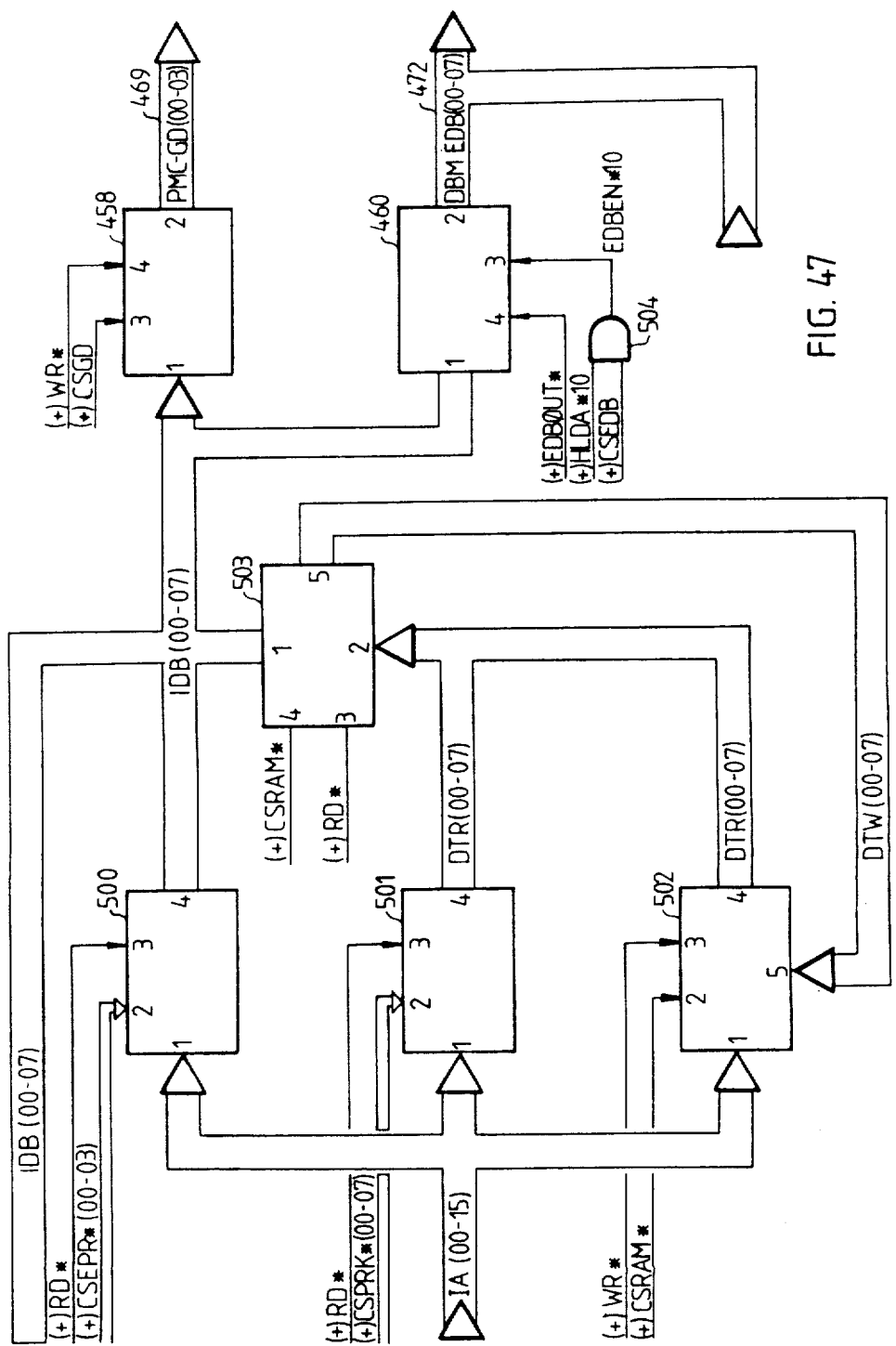
FIG. 47 is a detailed illustration of a memory block, a data transfer switch, a first level external control block, and a data buffer block contained in the AM 902 B CONTROL MODULE.

The selection block (455) is situated in the center right of FIG. 46. This selection block (455) receives on its input (1) the 16 lines of the IA (00-15) internal address bus (467), on its input (2) the RD* read command signal, and on its input (9) the (+) INTA interrupt acknowledge signal. By combining the signals received on its inputs (1), (2) and (9), the selection block (455) yields the CSEPR* (00-15), CSPR*(00-03), CSGD*, CSTIMR*, CSEDB, CSRAM selection signals:

the 4 CSEPR* (00-03) signals are used to select one of 4 erasable programmable read only memories (EPROM) of block (500) shown in FIG. 47;

the 8 CSPRK* (00-007) signals are used to select one of 8 programmable read only memories (PROM) of block (501) shown in FIG. 47;

the CSGD* signal is used to select the level 1 command buffer block (458);

the CSTIMR* signal is used to select the time base block (457) which it reaches through input 6;

the CSEBD signal is used to select the data buffer block (460) shown in FIG. 47;

the CSRAM signal is used to select the read/write addressable RAM memory block (502).

Finally, the time base block (457) is shown in the lower right portion of FIG. 46. In the preferred embodiment of the invention, this block (457) has an integrated INTEL 8253-type circuit. This time base block (457) receives:

on its input (1): the 8 wires of the IDB (00-07) internal data bus;

on its input (2): the (+) PMC CLK2 synchronization signal;

on its input (3): the (+) RD* read command signal;

on its input (4): the (+) WR* write command signal;

on its input (5): the internal address lines IA08 and IA09, and on its input (16): the CSTIMR selection signal.

The time base block (457) delivers 2 output signals:

on its output (7): the PMC TØUT1 (IT TRAP) signal;

on its output (8): the PMC TØUT2 (IT TIME BASE) signal.

The time base block (457) has two independent countdown circuits. Originally, each count-down circuit is loaded by the microprocessor (451) with an initial value: the countdown circuit No. 1 with a No. 1 COUNT, and the count-down circuit No. 2 with a No. 2 COUNT. To that end, the microprocessor (451) requests two write cycles. On the first cycle, the microprocessor (451) addresses the count-down circuit No. 1 with the CSTIMR selection signal and the IA (08, 09) address lines. It then puts the value of the No. 1 COUNT on the IDB (00 07) internal data bus. The occurrence of the (+) PMC CLK2 synchronization signal transfers the contents of the IDB (00-07) internal data bus to the count-down circuit. On the second cycle, the microprocessor (451) loads in similar fashion the No. 2 count-down circuit with the No. 2 COUNT. Then, with each occurrence of the PMC CLK2 clock signal, the contents of each count-down circuit are decremented by one. When the contents of the No. 1 count-down circuit reaches zero, the time base block (457) sends a PMC TØUT1 output signal. When the contents of the No. 2 count-down circuit reaches zero, the time base block (457) sends a PMC TØUT2 output signal.

The time base device (457) enables the microprocessor (451) to program two time reference signals PMC TØUT1 and PMC TØUT2. In the preferred embodiment of the invention, the time reference signals PMC TØUT2 occur every 4 milliseconds and the time reference signal PMC TØUT1 every 60 milliseconds.

The PMC TØUT2 time reference signal, also called IT TIME BASE (TIME BASE INTERRUPT) starts a control program also called DISPATCHER. The internals of this control program will be discussed later. However, it must be stated that one of the first actions of this control program is to reinitialize the No. 1 countdown circuit, which is thus reloaded with COUNT No. 1 and the No. 2 count-down circuit, which is reloaded with COUNT No. 2.

Thus, the PMC TØUT1 reference signal, also called IT TRAP or WATCH DØG, occurs when the dispatcher has not been able to reload COUNT No. 1 and the contents of the No. 1 count-down circuit have reached zero. IN other words, this PMC TØUT time reference indicates that the time represented by COUNT No. 1 has elapsed without the dispatcher being able to take control of the microprocessor (451). This PMC TØUT1 signal triggers a cycle-halting operation (TRAP) in the microprocessor (451): operation of the power supply system is inhibited and all interfaces are interlocked (RAZ of all the registers).

FIG. 47 details the operation of the memory block (454), the data transfer direction switching block (460), the level 1 external command block (458), and the data buffer block (460).

The memory block (454) is composed of 3 memory groups: the erasable programmable read only memory (EPROM) group (500), the programmable read only memory (PROM) group (501), the random access memory (RAM) group (502), and a bus switching block (503).

The erasable programmable read only memory (EPROM) group (500) is shown in the upper left-hand portion of FIG. 47. This erasable programmable read only memory (EPROM) group (500) is composed of 4 EPROM memories called EPROM00, EPROM01, EPROM02, EPROM03. The erasable programmable read only memory (EPROM) group (500) is connected to the rest of the AM902B control module (75), as follows:
on its input 1 it receives the 11 lines of the IA (00-10) internal address bus;
on its input 2 it receives the 4 (+)) CSERP* (00-03) selection lines;
it is connected by its output 4 to the 8 lines of the IDB (00-07) internal data bus.

The programmable read only memory (PROM) group (501) is shown in the middle left portion of FIG. 47. This programmable read only memory (PROM) group (501) is composed of 8 PROM memories called: PRØM00, PRØM01, PRØM02, PRØM03, PRØM04, PRØM05, PRØM06 and PRØM07. The programmable read only memory (PROM) group (501) is connected to the rest of the AM902B control module (75), as follows:
on its input 1 it receives the 10 IA (00-09) internal address bus lines;
on its input 2 it receives the 8 (+) CSPRK (00-07) selection lines;
on its input 3 it receives the read command signal RD*;
it is connected by its output 4 to the 8 read DTR (00-07) read memory data bus lines.

The random access memory (RAM) group (502) is shown in the bottom left portion of FIG. 47. This group (502) is connected to the rest of the AM902B control module (75), as follows:
it is connected by its input 1 to the 10 IA (00-09) internal address bus lines;
it is connected by its input 2 to the (+) CSRAM* selection line;
it is connected by its input 3 to the WR* Read/Write command line;
it is connected by its output 4 to the 8 DTR (00-07) read memory data bus lines;
it is connected by its input 5 to the 8 DTW (00-07) write memory data bus lines.

The bus switching block (503) is shown in the center of FIG. 47. This bus switching block (503) enables the connection of the DTR (00-07) read memory data bus and the DTW (00-07) write memory data bus to the IDB (00-07) internal data bus. This bus switching block (503) is connected to the rest of the AM902B control module (75), as follows:
on its input/output 1 it receives the 8 IDB (00-07) internal data bus lines;
on its input 2 it receives the 8 DTR (00-07) read memory data bus lines;
on its input 3 it receives the (+) RD* read command signal;
on its input 4 it receives the (+) CSRAM* Read/Write random access memory (RAM) selection signal;
on its input 5 it receives the 8 DTW (00-07) write memory data bus lines.

The level 2 command buffer block (458) is shown in the upper right portion of FIG. 47. This block is intended to store and amplify the commands sent by the multiprocessor (451) directly to the AM908 intermediate unit as well as the LSSCI interfaces. This level 2 command buffer block (458) is connected to the rest of the AM902B control module (75), as follows:
on its input 1 it receives the 8 IDB (00-07) bus lines;
it is connected by its output 2 to the 4 PMC-GD (00-03) command lines, as seen during the description of the AM903 downstream interface unit. These command lines are also called: GD00=ADRE2, GD01=A-

DRE1, GD02=DDW0=RESET INHIBIT, GD03=DOW1=POWER LOCK;

on its input 3 it receives the (+) CSGD selection signal;

on its input 4 it receives the (+) WR* write command signal;

The data transfer direction switching (buffer) block (460) is shown in the middle and right-hand portion of FIG. 47. This block is designed to enable the exchange of data in two directions INPUT and OUTPUT between the 2 buses IDB (00-07) and DBM EDB (00-07). This data transfer direction block (460) is connected to the rest of the AM902B control module (75), as follows:

on its input 1 it is connected to the 8 IDB (00-07) internal data bus lines;

on its input 2 it is connected to the 8 DBM EDB (00-07) external data bus lines (472);

on its input 3 it receives the EDBEN*10 command signal which controls the data input to the microprocessor (451). This input data command signal originates from the AND gate (504) which receives the (+) HLDA*10 signal on one of its inputs and the (+) CSEDB selection signal on the other input;

on its input 4 it receives the (+) EDBOUT* signal which controls the data output from the microprocessor (451).

FIG. 48 shows the Z01 input/output connector pin assignment of the AM902B control module (75).

FIG. 49 shows the Z02 input/output connector pin assignment of the AM902B control module (75).

FIGS. 45, 46 and 47 show the operation and construction of the AM902B control module (75).

The 8085 microprocessor (451) used for this application has command and synchronization facilities (AMC-CLK2, HLDA-20, PMC MEMW, PMC MEMR, INTA, DBS0*10, DBS1*10), addressing facilities [IA (00-05)], data transfer facilities [IDB (00-07)], reset facilities (PMC REST*20, RESTIN-10). It also has interrupt facilities (INTR6, INTR0, INTR4, INTR3).

These various facilities enable the 8085 microprocessor (451) to fetch instructions or data from memory or to store data into memory. It should be noted here that modules connected to the AM902B control module (75) are considered by the 8085 microprocessor (451) as specific storage locations. Thus, to read the interface status registers, the microprocessor (451) addresses said state registers and performs a read cycle. Conversely, to load registers or send commands to the supplies, the microprocessor (45) addresses the registers or supplies and performs a write cycle therein. All the addresses concerning these registers or supplies are contained in the AM927 configuration module (76) which will be described below.

THE AM927 CONFIGURATION MODULE

Figure 50:
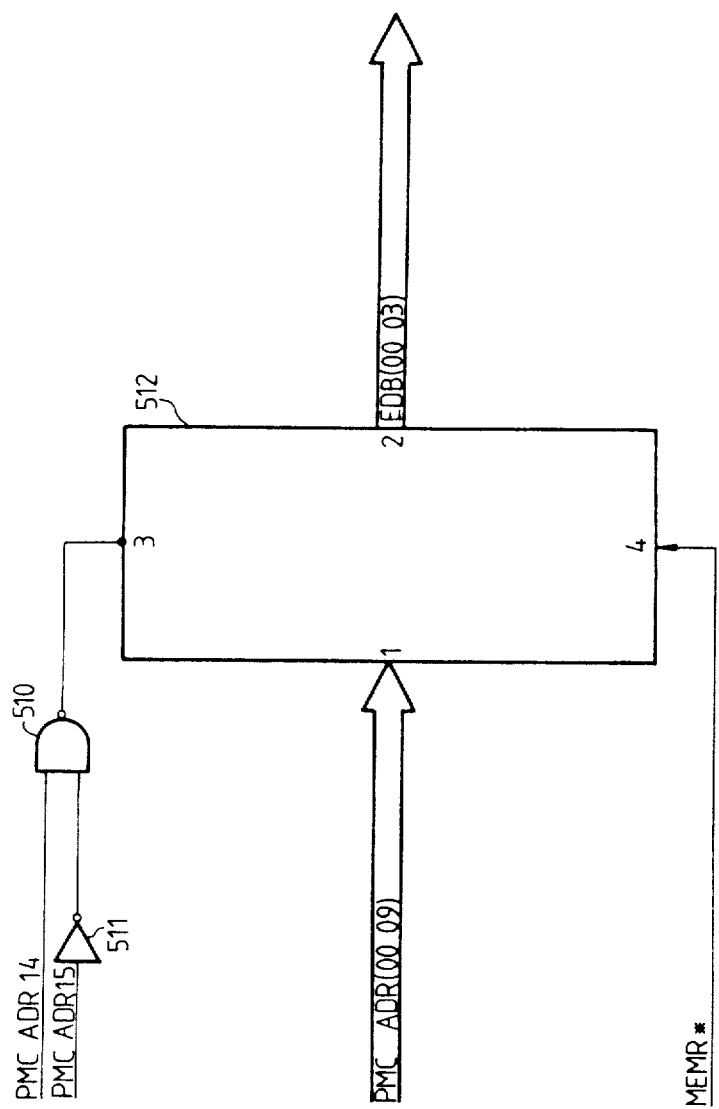
FIG. 50 is a block diagram of the AM 927 configuration module of FIG. 2.

FIG. 50 is a schematic drawing of the AM927 CONFIGURATION MODULE (76). This module includes an essential component which is a programmable read only memory (PROM) (512). This memory contains all the data which enable the monitor (10) to again find the configuration of the power supply system. Here "configuration of the system" is understood to mean the way in which the system is organized: the number of AM903 downstream interface units with their respective numbers, the number of AM908 intermediate modules with their respective addresses, the composition of the supplies associated with each AM908 intermediate module, the composition of the LSSCI interfaces, the composition of the power supply subsystems. All this information is contained in tables which the monitor (10) consults as needed.

The NAND gate (510) receives the PMC ADR14 address signal (513) on one of its inputs, and the ADR15* address signal (515) on the other. The ADR15* address signal (515) is obtained by inverting the PMC ADR15 address signal (514) through the inverter (511). The output of the NAND gate (510) produces a selection signal which is applied to the input 4 of the configuration memory (512).

The PMC MEMR* signal (516) is sent by the AM902 control module (75) to indicate that the microprocessor (451) requests a read cycle. This PMC MEMR* signal (516) is applied to input 3 of the PROM configuration memory (512).

The PMC ADR(00-09) address signals arrive on input 1 of the PROM configuration memory (512). These PMC ADR (00-09) signals are used to name addresses within the PROM configuration memory (512).

Output 2 of the PROM configuration memory (512) powers the 4 DBM-EDB(00-09) wires of the DBM-EDB(00-07) external data bus.

When the microprocessor (451) wants to consult this memory, it performs the following operations:

it selects the PROM configuration memory (512) by means of the PMC ADR14 and PMC ADR15 address lines;

it addresses the location in the PROM configuration memory (512) it wants to read by means of the PMC ADR14 and PMC ADR15 address lines;

it requests a read cycle by means of the MEMR* signal (516).

Under these conditions, the PROM configuration memory (512) places the contents of the addressed location on the DBM-EDB(00-08) external data bus lines. In the preferred embodiment of the invention, each location in the PROM configuration memory (512) contains 4 bits. Thus, 2 read operations are necessary for the microprocessor (451) to obtain the required byte of information. This choice was made for cost reasons, but imposes no limitations, and the PROM configuration memory (512) could just as well contain 8 bit locations.

THE BACK PANEL

FIGS. 52 and 53 define the wiring for the Z01 and Z02 connectors on the BACK PANEL of the power supply system. FIGS. 52 and 53 each contain a table. Each of these tables has 4 header rows at the top:

the "MODULE NAME" row defines the type of module in each column;

the "FIG. 2 REFERENCE" row defines the reference made in FIG. 2 to each of the modules in the columns;

the "RACK LOCATION" row defines the position of each module on the rack;

the "CONNECTORS" row defines the connector for each module in each half-column.

Below these 4 header rows, several interconnection definition rows are shown. Each interconnection definition row corresponds to a control module (12) bus line.

For instance, FIG. 52 shows the 2 buses:

DBM.EDB (00-07), which is the external data bus;

PMC.ADR (00-15), which is the address bus; FIG. 52 shows the following lines:

PMC-MEMR*, which is the read cycle command line;

PMC-MEMW*, which is the write cycle command line;

PMC REST 10, which is a reset command line;
PMC SCLK2, which is a synchronization signal line;
PMC GD0, which is an address line;
PMC GD1, which is an address line;
BPC INTR4*, which is an interrupt line;
BPC INTR5*, which is an interrupt line;
BPC INTR6*, which is an interrupt line;
BPC INTR6*, which is an interrupt line;
BPC DDN0, which is an address line;
BPC DDN1, which is an address line;
BPC REST IN, which is a reset command line;
BPC IN (02-07, 10, 11), which are command lines.

Every interconnection definition row features:

on the left, the definition of the MNEMONIC LABELING THIS ROW;

then, moving to the right, 2 boxes per module of the power supply system. The box on the left refers to the Z01 connector of the corresponding module and the box on the right refers to the connector Z02 of the corresponding module. The number indicated in these boxes, when there is one, corresponds to the number of the pin to which the line is connected. When there is no number in a box, it means that this line is not wired to the corresponding connector.

For example, in FIG. 53: taking the first interconnection definition row, it can be seen that the PMC MEMR* line is the read cycle command line:

for the AM902 control module (75) plugged into slot 14 of the rack, is connected to pin 42 of connector Z01 and is not connected to connector Z02;

for the AM903 downstream interface module (51) plugged into slot 7 of the rack, is connected to:
pin 42 of connector Z01;
pin 42 of connector Z02;

for the AM903 downstream interface module (56) plugged into slot 8 of the rack, is connected to:
pin 42 of connector Z01
pin 42 of connector Z02;

for the AM903 downstream interface module (51) plugged into slot 9 of the rack, is connected to:
pin 42 of connector Z01;
pin 42 of connector Z02;

for the AM903 downstream interface module (66) plugged into slot 10 of the rack, is connected to:
pin 42 of connector Z01;
pin 42 of connector Z02;

for the AM927 configuration module (76) plugged into slot 134 of the rack, is connected to:
pin 42 of connector Z01;
pin 42 of connector Z02.

An examination of FIG. 52, in particular, shows the addressing method for the AM903 downstream interface units. Actually, as seen above, these AM903 downstream interface units are identical for the purpose of cost reduction and simplification of construction. To enable the monitor (10) to identify them, their connection to the backplane is dependent upon the slot they occupy in the rack. This differentiation is clearly evident by looking at the PMC ADR 02 to PMC ADR 07 interconnection definition rows.

While several embodiments of the invention have been illustrated and described, it will be obvious to those skilled in the art that variations theret may be made without departing from the true spirit and full scope of the invention which is defined in the appended claims. Accordingly. it is intended by the appended claims to encompass all such variations.

BIBLIOGRAPHY

MCS 80 USER'S MANUAL (with introduction to MCS-85) INTEL CORPORATION 1977 (Reference T205/0878/30k CP)

INTEL COMPONENTS DATA CATALOG INTEL CORPORATION 1978 (Reference C117/0278/95K CP)

INTEL MEMORY DESIGN HANDBOOK INTEL CORPORATION (Reference MMC-273-0975/30k)

THE TTL DATA BOOK FOR DESIGN ENGINEERS TEXAS INSTRUMENTS (Reference CC-411/71241-23-C41)

SUPPLEMENT TO THE TTL DATA BOOK FOR DESIGN ENGINEERS TEXAS INSTRUMENTS (Reference CC-416/50014-54-CSS)

We claim:

1. Apparatus for controlling and monitoring a power supply system that includes a plurality of power sources for supplying power to a plurality of devices, the power sources being allocated among a plurality of power supply subsystems in a predetermined configuration, the apparatus comprising a control bus; first interface means for interfacing the power sources to the control bus and including first circuit means responsive to signals on the control bus for controlling and monitoring the power sources; second interface means for interfacing, to the control bus, operating console means for operating the system and power supply means for supplying power to the power sources, the second interface means including second circuit means responsive to signals on the control bus for controlling and monitoring the operating console means and the power supply means; a configuration definition unit connected to the control bus and including memory means for storing parameters defining the types, the numbers, and the configuration of the power sources; and a control unit for exchanging signals over the control bus with the configuration definition unit and with the first and second interface means for controlling and monitoring the power sources, the operating console means and the power supply means.

2. The apparatus of claim 1, wherein the first interface means comprises, for each power supply subsystem, a downstream interface unit connected to the control bus and a plurality of intermediate units connected to the downstream interface unit and to the power sources, each intermediate unit being capable of interfacing a plurality of power sources to the downstream interface unit and including said first circuit means for controlling and monitoring the power sources connected thereto.

3. The apparatus of claim 2, wherein each downstream interface unit is further connected directly to the devices powered by the power sources of its associated power supply subsystem.

4. The apparatus of claim 3, wherein each downstream interface unit is addressable by the control unit and includes means for storing control signals transmitted thereto by the control unit for controlling the power sources of its associated subsystem and for storing monitor signals received from its intermediate units representative of the states of the sources, and means for transmitting selected monitor signals to the control unit.

5. The apparatus of claim 4, wherein said storing means further includes means for storing monitor signals from the devices being powered by said sources.

6. The apparatus of claim 5, wherein said storing means comprises a plurality of storage registers for storing said monitor signals, and the first circuit means includes a plurality of control circuits responsive to the cotrol signals for controlling said sources.

7. The apparatus of claim 6, wherein said first circuit means includes means for detecting faults in said sources and the devices powered by said sources, and means for transmitting interrupt signals to the control unit upon a fault being detected.

8. The apparatus of claim 7, wherein each downstream interface unit includes input interface means for interfacing the registers to the control bus, to the intermediate units, and to the devices powered by said sources, and multiplexer means for selecting signals stored in the registers for transmission to the control unit.

9. The apparatus of claim 8, wherein the multiplexer means is responsive to address signals on the control bus for transmitting selected signals from the storage registers to the control unit.

10. The apparatus of claim 1, wherein the operating console means comprises an operator console and a service panel, and wherein the second interface means comprises an operation interface unit having means for processing system operating signals input from the console and the service panel, and means responsive to said operating signals for transmitting control signals to the control unit.

11. The apparatus of claim 10, wherein the service panel includes means for displaying the state of the system and for indicating system faults, including a failure of the control unit.

12. The apparatus of claim 11, wherein the displaying means includes means for displaying the operating states of all the power sources of the system, and means for distinguishing between minor faults and major faults.

13. The apparatus of claim 12, wherein the displaying means comprises a single display device for each power supply subsystem, the display devices being capable of assuming different observable states for indicating different states of the subsystems.

14. The apparatus of claim 13, wherein the display devices are luminous devices controlled so as to produce different modes of lighting.

15. The apparatus of claim 14, wherein each power source has associated therewith a register with a predetermined address for storing data bits representative of the operating parameters of the source, and the displaying means comprises means for scanning the registers successively to display the data stored therein on said display devices.

16. The apparatus of claim 15, wherein the displaying means includes means for initially indicating the subsystems having faults, and means responsive to the scanning means for successively indicating each source having a fault and the nature of the fault.

17. The apparatus of claim 16, wherein the scanning means comprises means for generating successively the addresses of registers storing fault data so as to successively display such data.

18. The apparatus of claim 10, wherein the service panel includes means for controlling the system, including means for controlling individual sources, and means for authorizing and prohibiting start-up and shutdown of the system by the control unit.

19. The apparatus of claim 18, wherein the controlling means includes means for placing subsystems in a maintenance mode, and means for addressing the sources within such subsystems to enable testing thereof.

20. The apparatus of claim 19, wherein the displaying means enables the display of the state of a source having a fault immediately prior to the appearance of the last fault and the display of the state of the source immediately following the appearance of the last fault.

21. The apparatus of claim 20, wherein the system includes fault storage devices for storing data indicative of faults, and wherein the service panel includes means for resetting such faults storage devices.

22. The apparatus of claim 21, wherein the controlling means includes means enabling subsystems to be switched to an inhibit mode wherein said subsystems operate normally except that they do not deliver power to their associated devices.

23. The apparatus of claim 1, wherein the control unit comprises a microprocessor, the microprocessor being responsive to operator inputs from the operating console means for controlling the system and being responsive to monitor signals impressed upon the control bus by the first and second interface means for displaying on display means associated with the operating console means the state of the system.

24. The apparatus of claim 1, wherein the memory means comprises a read only memory that stores data related to the addresses and characteristics of each subsystem and the configuration of sources within each subsystem.

25. The apparatus of claim 1, wherein said operating console means includes an operating console, and wherein said apparatus is employed for controlling a plurality of power supply systems connected in series to said operator console.

26. The apparatus of claim 25, wherein the operator console comprises means responsive to a start-up request for generating a start-up sequence signal for sequentially powering up each power supply system and responsive to a shutdown request for generating a shutdown sequence signal for sequentially shutting down each power supply system.

27. The apparatus of claim 26, wherein the series-connected power supply systems are connected in a loop to the operator console such that upon completion of a sequence the operator console receives an end-of-sequence signal.

28. The apparaus of claim 1, wherein said power supply system supplies power to a data processing system.

* * * * *

UNITED STATES PATENT AND TRADEMARK OFFICE
CERTIFICATE OF CORRECTION

PATENT NO. : 4,495,568

DATED : January 22, 1985

INVENTOR(S) : Takats et al

It is certified that error appears in the above-identified patent and that said Letters Patent is hereby corrected as shown below:

On the title page Item (19), delete "Gilbert" and substitute -- Takats --.

On the title page inventors should read
-- Gilbert Takats and Gerald Dumay --.

Signed and Sealed this

Twenty-first Day of January 1986

[SEAL]

Attest:

DONALD J. QUIGG

Attesting Officer

Commissioner of Patents and Trademarks